United States Patent
Warren et al.

(10) Patent No.: US 7,382,790 B2
(45) Date of Patent: Jun. 3, 2008

(54) METHODS AND APPARATUS FOR SWITCHING FIBRE CHANNEL ARBITRATED LOOP SYSTEMS

(75) Inventors: Bruce Gregory Warren, Poulsbo, WA (US); William P. Goodwin, Bothell, WA (US); Carl Mies, Snohomish, WA (US); Bruce E. Johnson, Federal Way, WA (US); Michael L. White, Oak Harbor, WA (US); Warren Eng, Renton, WA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 0 days.

(21) Appl. No.: 10/617,148

(22) Filed: Jul. 10, 2003

(65) Prior Publication Data

US 2004/0081187 A1 Apr. 29, 2004

Related U.S. Application Data

(63) Continuation-in-part of application No. 10/612,753, filed on Jul. 1, 2003.

(60) Provisional application No. 60/393,164, filed on Jul. 2, 2002, provisional application No. 60/395,107, filed on Jul. 10, 2002.

(51) Int. Cl.
 *H04L 12/28* (2006.01)
(52) U.S. Cl. .................. 370/401; 370/389; 370/422
(58) Field of Classification Search ........... 370/222, 370/223, 225, 241, 242, 250, 391, 421, 423, 370/424; 714/2, 100
See application file for complete search history.

(56) References Cited

U.S. PATENT DOCUMENTS 5,619,497 A 4/1997 Gallagher et al.

(Continued)

FOREIGN PATENT DOCUMENTS

EP 0 858 190 A2 8/1998

OTHER PUBLICATIONS

*Fibre Channel Arbitrated Loop (FC-AL-2) Rev 7.0*, ANSI T11.3 Project 960M FC-AL and Project 1133-D FC-AL2, Apr. 1, 1999, Global Engineering, Englewood, CO.

(Continued)

*Primary Examiner*—Chi Pham
*Assistant Examiner*—Kevin Mew
(74) *Attorney, Agent, or Firm*—Morrison & Foerster LLP

(57) ABSTRACT

Methods and apparatus for switching Fibre Channel Arbitrated Loop Systems is provided between a plurality of Fibre Channel Loop devices. In one aspect of the invention, the system switches based at least in part on arbitrated loop primitives. An exemplary interconnect system may include a first port and a second port, both including port logic to monitor certain arbitrated loop primitives, a connectivity apparatus, a route determination apparatus including a routing table consisting of ALPA addresses and their associated ports, the route determination apparatus coupled to each port and the connectivity apparatus, where the connectivity apparatus creates paths between the ports based on arbitrated loop primitives. In one embodiment, the connectivity apparatus is a crossbar switch. Examples of the arbitrated loop primitives that cause the switch to create paths between ports includes one or more of the following: ARB, OPN and CLS. In yet other aspects, the system ensures device access fairness through one or more techniques, including a rotating priority system, a counter to count the number of OPNs, especially sequential OPNs, and/or priority based on port type. Device zoning may be implemented. In one implementation, the system includes trunking such that frames may be transferred on multiple ports.

6 Claims, 52 Drawing Sheets

U.S. PATENT DOCUMENTS

| | | | |
|---|---|---|---|
| 5,751,715 | A | 5/1998 | Chan et al. |
| 5,754,549 | A | 5/1998 | DeFoster et al. |
| 5,978,379 | A * | 11/1999 | Chan et al. .................. 370/403 |
| 5,991,891 | A * | 11/1999 | Hahn et al. ..................... 714/4 |
| 6,118,776 | A | 9/2000 | Berman |
| 6,185,203 | B1 | 2/2001 | Berman |
| 6,192,054 | B1 | 2/2001 | Chan et al. |
| 6,243,386 | B1 | 6/2001 | Chan et al. |
| 6,324,181 | B1 * | 11/2001 | Wong et al. ................. 370/403 |
| 6,396,832 | B1 * | 5/2002 | Kranzler ..................... 370/360 |
| 6,470,007 | B1 | 10/2002 | Berman |
| 6,532,212 | B1 | 3/2003 | Soloway et al. |
| 6,614,796 | B1 * | 9/2003 | Black et al. ................. 370/403 |
| 6,754,210 | B1 * | 6/2004 | Ofek .......................... 340/389 |
| 6,804,245 | B2 * | 10/2004 | Mitchem et al. ....... 370/395.31 |
| 6,999,460 | B1 | 2/2006 | Fiore |
| 7,009,985 | B2 | 3/2006 | Black et al. |
| 2002/0044561 | A1 * | 4/2002 | Coffey ........................ 370/403 |
| 2002/0044562 | A1 * | 4/2002 | Killen et al. ................. 370/406 |
| 2002/0196773 | A1 | 12/2002 | Berman |
| 2003/0108058 | A1 | 6/2003 | Black et al. |
| 2003/0189935 | A1 * | 10/2003 | Warden et al. ......... 370/395.21 |

OTHER PUBLICATIONS

*Fibre Channel Private Loop SCSI Direct Attach (FC-PLDA) Rev. 2.1*, ANSI T11.3 Project 1162-DT, Sep. 22, 1997, Global Engineering, Englewood, CO.

"Increasing Intelligence Within the SAN Fabric", Internet Citation: URL:http://www.brocade.com/san/white_papers/pdf/IncreasingIntelligienceWithinSan.pdf.

Fibre Channel Fabric Generic Requirements, American National Standard, Aug. 7, 1996, pp. 1-23.

"Optimizing The Perfomance And Management of 2 Gbit/sec SAN Fabrics With ISL Trunking", Internet Citation, Mar. 2002, Retrieved from the Internet: URL:hrrp://www.brocade.com/san/white_papers/pdf/ISL_Trunking_WP_R5.pdf.

* cited by examiner

Fibre Channel Arbitrated Loop Hub

Arb detected on
port rx_data

Connection established.
Open sourced

Arbf0 replaced with Arbff. Data Transfered.
Close sourced.

Arbff detected on port rx_data.
Disconnect. Source idles

Arbs forwarded. Open sourced.

Open detected at port receiver.
Port receiver holds open.
Provides ALPA to router and asserts opn_connect_req.

Arbff detected on port rx_data. Disconnect. Source idles.

Arbs forwarded.
Open Sourced.

Arb 13 forwarded.
Data Transfered.
Close sourced.

Close forwarded by node 12.
Arb 13 received by node 13.
Open sourced by node 13.

Close source by node 13.
Forwarded by node 12.
Arb ff Detected on port rx_data.
Disconnect.
Source idles.

Open forwarded to Port 2.   Open received from Port 1.
Data transferred.   Data received.
Close sourced.   Close forwarded.

Close detected at transmiliter and receiver. Connection broken.

Cls detected at port receiver from node 12.
Cls sourced from port transmitter.

Port 2 still connected.

DISK = Fibre Channel
Hard Disk Drive

DISK = Fibre Channel Hard Disk Drive

DISK = Fibre Channel
Hard Disk Drive

METHODS AND APPARATUS FOR SWITCHING FIBRE CHANNEL ARBITRATED LOOP SYSTEMS

RELATED APPLICATION INFORMATION

This application is a continuation-in-part of U.S. Utility application Ser. No. 10/612,753, filed Jul. 1, 2003, entitled "Method and Apparatus for Switching Fibre Channel Arbitrated Loop Devices", which in turn claims priority to U.S. Provisional Application 60/393,164, filed Jul. 2, 2002, entitled "Method and Apparatus for Switching in a Fibre Channel Network" and U.S. Provisional Application 60/395,107, filed Jul. 10, 2002, entitled "System and Method for Multiple Trunk Connections Between Fibre Channel Switches", all of which are incorporated by reference as if fully set forth herein.

BACKGROUND OF THE INVENTION

Fibre Channel is an American National Standards Institute (ANSI) set of standards which describes a high performance serial transmission protocol which supports higher level storage and networking protocols such as HIPPI, IPI, SCSI, IP, ATM, FDDI and others. Fibre Channel was created to merge the advantages of channel technology with network technology to create a new I/O interface which meets the requirements of both channel and network users. Channel technology is usually implemented by I/O systems in a closed, structured and predictable environment where network technology usually refers to an open, unstructured and unpredictable environment.

Advantages of Fibre Channel include the following. First, it achieves high performance, which is a critical in opening the bandwidth limitations of current computer to storage and computer to computer interfaces at gigabit speeds. Second, utilizing fiber optic technology, Fibre Channel can overcome traditional I/O channel distance limitations and interconnect devices over distances of 6 miles at gigabit speeds. Third, it is high level protocol independent, enabling Fibre Channel to transport a wide variety of protocols over the same media. Fourth, Fibre Channel uses fiber optic technology which has very low noise properties. Finally, cabling is simple in that Fibre Channel typically replaces bulky copper cables with small lightweight fiber optic cables.

Fibre Channel supports three different topologies, point-to-point, arbitrated loop and fabric attached. The point-to-point topology attaches two devices directly. The arbitrated loop topology attaches devices in a loop. The fabric attached topology attaches a device directly to a fabric.

In a Fibre Channel Arbitrated Loop topology up to 126 devices and one connection to a fabric switch may exist in a single Arbitrated Loop Physical Address (ALPA) space. Data within an ALPA space physically travels from node to node in a daisy-chain fashion, ultimately traveling in a loop. Control by a device on the loop is obtained through the process of loop arbitration, after which the device winning arbitration sends data. In a half duplex mode, only one device is transferring data at any point in time. In a full duplex mode, two devices may communicate with each other at the same time.

Generally, the disadvantages of the Arbitrated Loop topology include: first, it is a blocking topology, that is, only a single connection between a pair of nodes is allowed at any point in time (excluding the broadcast mode). Second, device buffering occurs in each device as it has a six word buffer, creating a delay of up to 225 nanoseconds. This delay is additive with each device in the loop. The delay creates overhead for the communicating devices when a large number of devices are connected to a loop. Third, distance also adds delay to a loop and is additive for each device. Fourth, robustness is an issue since all devices are on one loop any device failure will cause the entire loop to fail or reset. Fifth, the total bandwidth available is limited to the bandwidth of the loop itself.

Loop devices are typically interconnected on an Arbitrated Loop with a hub. The hub is a passive device, that is a loop exists within the hub. A hub in most cases maintains the loop's integrity when devices are removed, powered off, or fail by using port bypass circuits. Hubs simply receive and redrive the signals to individual devices.

Hub advantages include low cost, low complexity, ease of use and interoperable with a large number of Fibre Channel Arbitrated Loop supported devices.

There are also many disadvantages when interconnecting Fibre Channel Arbitrated Loop devices with hubs: First, hubs do not address the blocking nature of the loop topology. Second, jitter is propagated from bypassed nodes. This additive affect causes loop instability when a large number of devices are interconnected. Third, when data is currently being transferred and a device attached to a hub is powered off or fails, the loop could be reset which is destructive to the communicating devices. Fourth, if a device is inserted into a live loop the loop will be reset which is destructive to the communicating devices.

In Berman U.S. Pat. No. 6,185,203, entitled "Fibre Channel Switching Fabric", there is disclosed apparatus which comprises separate port control modules, one for each attached device, a central router module, a switch core module, a fabric control module and a brouter (bridge/router) module. The port control modules are connected to the router modules by separate route request connections and separate route response connections. Through this structure, route requests may be provided from the port control module to the router while simultaneously the router provides route request responses to the same port control module. Preferably, a common route request channel is utilized. Thus, apparatus is provided to return a route response to a previously requesting port while other ports are arbitrating and sending route requests to the centralized router. More generally, this apparatus provides for reading resource requests from multiple requesters while at the same time returning resource grant responses to previous requesters.

In Berman U.S. Pat. No. 6,118,776, entitled "Methods And Apparatus For Fiber Channel Interconnection Of Private Loop Devices", methods and apparatus are provided for Fiber Channel interconnection between a plurality of private loop devices through a Fiber Channel private loop device interconnect system. In the preferred embodiments, the Fiber Channel private loop device interconnect system is a fabric or an intelligent bridging hub. In one aspect, a Fiber Channel private loop device is connected to two or more Arbitrated Loops containing, or adapted to contain, one or more private loop devices. Preferably, the interconnect system includes a routing filter to filter incoming Arbitrated Loop physical addresses (ALPAs) to determine which Fiber Channel frames must attempt to be routed through the fabric. Numerous topologies of interconnect systems may be achieved. In another aspect, a method is provided for implementing a logical loop of private loop devices by switching the logical loop into a plurality of sets, assigning each set to a physical Arbitrated Loop and connecting the Arbitrated Loops to a Fiber Channel private loop device interconnect system. Additional methods are provided for restricting attached devices to Arbitrated Loop physical addresses within certain ranges. Additionally, methods are provided for resetting hosts, the method generally comprising the steps of detecting the addition of a storage device to a first Arbitrated Loop, and thereafter, resetting the Arbitrated Loop or loops on which a host or hosts reside on second Arbitrated Loop. Methods for operation with use of SCSI initiators generate a link service reject when no address match is found, or when an address match is found, but where no device with the destination ALPA exists on the Arbitrated Loop corresponding to the destination.

What is needed is an ability to interconnect Fibre Channel Arbitrated Loop devices in a low cost and simple to deploy manner.

As such, it is the goal of this invention to provide apparatus and methods that solves or mitigates these problems with a resulting solution that is low cost and easy to deploy and manage.

SUMMARY OF THE INVENTION

Methods and apparatus for switching Fibre Channel Arbitrated Loop Systems is provided between a plurality of Fibre Channel Loop devices. In one aspect of the invention, the system switches based at least in part on arbitrated loop primitives. An exemplary interconnect system may include a first port and a second port, both including port logic to monitor certain arbitrated loop primitives, a connectivity apparatus, a route determination apparatus including a routing table consisting of ALPA addresses and their associated ports, the route determination apparatus coupled to each port and the connectivity apparatus, where the connectivity apparatus creates paths between the ports based on arbitrated loop primitives. In one embodiment, the connectivity apparatus is a crossbar switch. Examples of the arbitrated loop primitives that cause the switch to create paths between ports includes one or more of the following: ARB, OPN and CLS.

Yet another version of the system for interconnecting Fibre Channel Arbitrated Loop devices comprises a first Arbitrated Loop containing one or more Fibre Channel arbitrated loop devices, a second Arbitrated Loop Device, a Fibre Channel arbitrated loop interconnect system, the interconnect system including a first port containing port logic coupled to the first Arbitrated Loop, a second port containing port logic coupled to the second Arbitrated Loop, and route determination apparatus for selecting a route between ports, where the said route determination apparatus selecting routes based on received Fibre Channel Arbitrated Loop primitives from the ports and including a routing table containing ALPA addresses and their associated ports, and connectivity apparatus coupled to the first and second ports and to the route determination apparatus for switching frames between ports under control of the route determination apparatus. Again, the connectivity apparatus may be a crossbar switch, and the Arbitrated Loop primitives may be ARBs, Opens and Closes.

In yet another aspect of the invention, methods and apparatus for trunking are provided. By way of example, such a system for interconnecting Fibre Channel Arbitrated Loop devices may comprise a first Fibre Channel Arbitrated loop switch, a second Fibre Channel Arbitrated loop switch, both including port logic, connectivity apparatus and route determination logic, the route determination logic creating routes based on the receipt of certain arbitrated Loop primitives, such as ARB, OPN and CLS, characterized wherein the first and second loop switches are interconnected by two or more Fibre Channel Arbitrated Loop links and transfer frames on both ports.

In yet another aspect of the invention, systems and methods attempt to ensure device access fairness in a Fibre Channel Arbitrated Loop system. Such a system may include a plurality of Fibre Channel Arbitrated Loop ports each including port logic, a route determination apparatus, a connectivity apparatus, and logic implementing predefined loop control criteria to enforce fairness. By way of example, the predefined loop control criteria implemented by the logic may limit the number of times a connected device opens another device. More particularly, it may limit the number of times a connected device sequentially opens another device. This may advantageously be implemented by a counter to count the number of opens, particularly sequential opens. Optionally, the system may proactively close a device. In yet another aspect regarding fairness, the ports may be assigned different access priorities, such as based on port type. In yet another aspect, a rotating priority system may aid in ensuring device access fairness.

In yet another aspect of the invention, device zoning in employed in a Fibre Channel Arbitrated Loop System. An exemplary system would include a plurality of Fibre Channel Arbitrated Loop ports each including port logic, a route determination apparatus, connectivity apparatus, e.g., a crossbar switch, adapted to connect the Fibre Channel Arbitrated Loop ports based on the receipt of certain Fibre Channel Arbitrated Loop primitives, whereby a LIP received on said first port is selectively propagated to one or more of the ports.

OBJECTS OF THE INVENTION

Accordingly, it is an object of this invention to provide a Fibre Channel Arbitrated Loop system that effectively and efficiently switches based at least in part based on arbitrated loop primitives, such as ARB, OPN and CLS.

It is yet another objective of these inventions to provide systems and methods having improved device access fairness.

It is yet another objective of these inventions to provide systems having trunking, such that frames may be transferred on multiple ports.

It is yet another object of the invention to provide a system and method that employs Device Zoning.

DETAILED DESCRIPTION OF THE INVENTION

Figure 1:
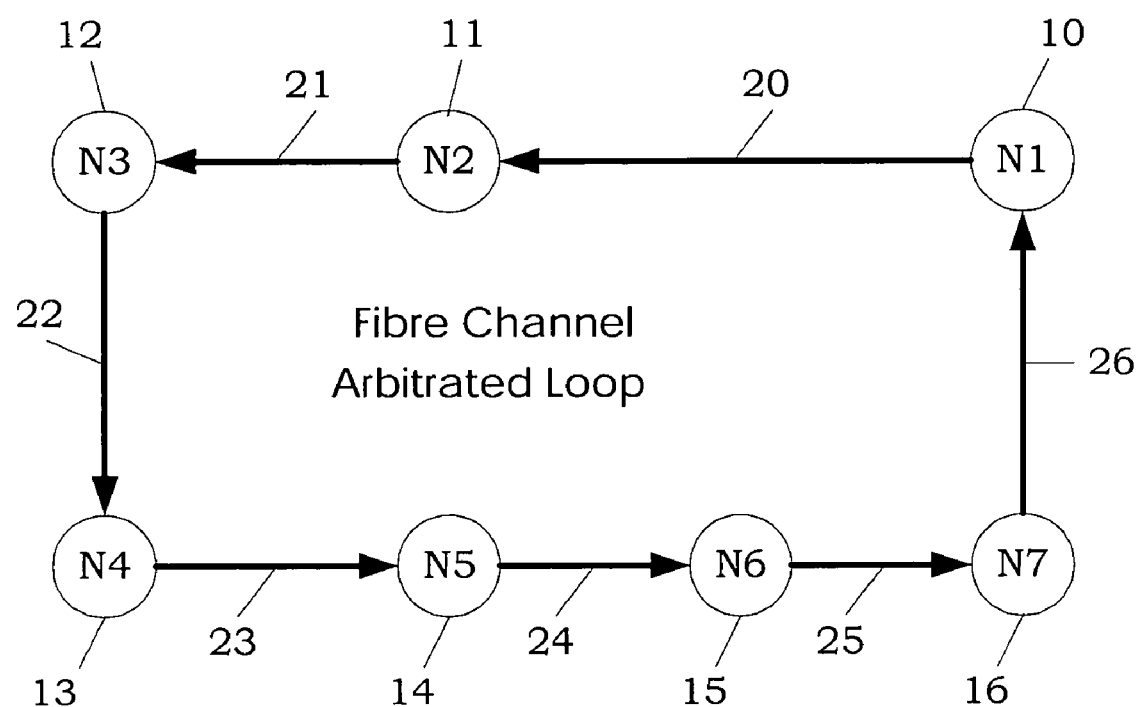
FIG. 1 is a diagram of devices interconnected in a Fibre Channel Arbitrated Loop.

Table of Contents
1. Definitions
2. Loop Switch Feature Set
3. Functional Overview
   3.1 Hub Emulation Mode (Shared Bandwidth)
   3.2 Non-overlapping Hard Zoning (Multiple Loops)
   3.3 Switching (segmenting) Mode
   3.4 Overlapping Hard Zoning (Virtual Loops)
4. Architectural Description
   4.1 Port Logic
   4.2 Router
   4.3 Switch Logic
   4.4 Fibre Channel Port
   4.5 Internal Serdes
5. Functional Description
   5.1 Loop Switch Internal Selftest
   5.2 Internal Loopback
   5.3 Port Insertion
      5.3.1 Establishing Word Sync
      5.3.2 Detection of Direct Connection to Vixel Loop Switch
      5.3.3 Serial Number Exchange on Connect (SEOC)
      5.3.4 SEOC Failure
      5.3.5 Completion of Port Insertion
      5.3.6 Port Insertion Failure
   5.4 Port Bypass
   5.5 Device Discovery
      5.5.1 Passive Device Discovery During Full-Loop Switch Initialization
      5.5.2 Shadow Device ALPA Resolution with LILP
      5.5.3 Shadow Device ALPA Resolution without LILP
      5.5.4 Device Discovery Errors
      5.5.5 Loop Initialization Timeout
   5.6 Idle Replacement by ARBff
   5.7 Switching (Segmenting) Mode Operation
      5.7.1 Source and Destination nodes on the same port
      5.7.2 Source and Destination nodes on the different ports
      5.7.3 Simultaneous open connect request
      5.7.4 OPN sent to non-existent device
      5.7.5 R_RDYs following OPNs
      5.7.6 Node Failure
      5.7.7 Microprocessor Assisted Operation
   5.8 Cascading
      5.8.1 Single Cascade
      5.8.2 Duplicate Cascades—Trunking 5.9 Port Fairness
  5.9.1 Single Loop Switch Fairness
  5.9.2 Multiple Loop Switch System Impacts on Fairness
  5.9.3 Repetitive Closure Impacts on Fairness
5.10 Zoning
  5.10.1 Non-overlapping Zoning
  5.10.2 Overlapping Zoning (switching mode)
5.11 LIP Isolation
  5.11.1 Non-Stealth Modes
  5.11.2 Stealth Mode
  5.11.3 Stealth Mode Isolation, Single ASIC, Devices in a Single LIP Zone, No Route Blocking
  5.11.4 Stealth Mode Isolation, Single ASIC, Devices in Multiple LIP Zones, No Routes Blocked
  5.11.5 Stealth Mode Isolation, Single ASIC, Devices in Multiple LIP Zones, With Blocked Routes
  5.11.6 Stealth Mode Isolation, Multiple ASICs, Devices in Multiple LIP Zones, With Blocked Routes
  5.11.7 Stealth Mode Isolation, Multiple ASICs, Multiple Zones, HBA #1 & HBA #2 in Connection
  5.11.8 Stealth Mode Isolation, Multiple ASICs, Devices in Multiple LIP Zones, Simultaneous LIPs
5.12 CPU Port Interface
  5.12.1 CPU Port Description and Operation
5.13 Port Management Functions
  5.13.1 Port Control
  5.13.2 Port Status
  5.13.3 Ordered Set Detection
  5.13.4 User Match Functions
  5.13.5 Ordered Set Transmission
  5.13.6 GBIC/SFP Status and Control
  5.13.7 FBIC/SFP Serial ID
  5.13.8 Error Counters
  5.13.9 Port Monitoring Mode
  5.13.10 Port External Loopback
  5.13.11 Frequency Check Circuit
  5.13.12 Port Operational Policies
  5.13.13 ALPA to Port Map
  5.13.14 Traffic Patterns (Switching Mode Only)
  5.13.15 Port/Loop Segment Utilization Measurement
  5.13.16 Port Overlapping Hard Zoning (Switching Mode Only)
  5.13.17 Raw Data Snoop Port
5.14 Loop Switch Management Functions
  5.14.1 Input Data Signals
5.15 Loop Switch Management Functions
  5.15.1 Environments Monitoring
  5.15.2 Loopstate Detection and LED
  5.15.3 Loop Initialization
5.16 FC Port Interfaces
  5.16.1 GBIC/SFP Pins
  5.16.2 Lock-to_reference
5.17 System Interface
5.18 Microprocessor Interface
  5.18.1 Interrupt Signal
  5.18.2 I$^2$C Serial Interface
  5.18.3 Parallel Processor Interface
5.19 Serial EEPROM Interface
6. Register Definitions for Vixel's SOC422 Loop Switch
  6.1 Router Register Definitions
    6.1.1 Router Configuration Register
    6.1.2 Router Control Register #1
    6.1.3 Router Control Register #2
    6.1.4 Remove Connection/Pending OPN Registers
    6.1.5 Stall Threshold Register
    6.1.6 Router Local SEOC USER Register
    6.1.7 RTR SW Matrix Configuration Register
    6.1.8 Port Active Status Registers
    6.1.9 Switch Matrix Control Register
    6.1.10 Switch Matrix Select Register
    6.1.11 Rem conn_cnt Register
    6.1.12 Port Unfair Registers
    6.1.13 Port 15-0 Interrupt Status Register
    6.1.14 Future Port 31-23/Port 22-16 Interrupt Status Register
    6.1.15 Router Status Register #1
    6.1.16 Router Status Register #2 (Router Interrupt Status)
    6.1.17 Router Status Register #3
    6.1.18 Router Status Register #4
    6.1.19 Block ALPA/Router Loop Up Counter Register
    6.1.20 Router Control Register #3
    6.1.21 System LED Override Registers
    6.1.22 Router Interrupt Mask Register
    6.1.23 Port Fairness Control Register
    6.1.24 Variable Priority Timer Register
    6.1.25 Router Overlapping Hard Zone Control Registers
    6.1.26 Router Opened Port Map Registers
    6.1.27 Router ALPA Port Map Register
    6.1.28 Router ALPA Position Map (LILP Payload) Register
    6.1.29 Router Serial EEPROM Capture Registers
    6.1.30 Loop Initialization Master WWN Register
    6.1.31 Software Override Initiator Bit Map
    6.1.32 Captured Initiator Bit Map
    6.1.33 Trunk Grouping Registers
    6.1.34 Learned Initiator Port Map Registers
    6.1.35 Close Count on Destination ALPA Registers
    6.1.36 Per ALPA Open Counter Max Registers
    6.1.37 Stealth Isolation Control Register #1
    6.1.38 Stealth Isolation Control Register #2
    6.1.39 Stop Traffic Control Registers
    6.1.40 Status Register #5
    6.1.41 Mask Register for Status Register #5 Interrupt
    6.1.42 Stealth Timeout Register
    6.1.43 Status Register #6 (Stealth State)
    6.1.44 Stealth LIP Inter-Switch Transmit Payload Registers
    6.1.45 Stealth Received Inter-ASIC Frame Registers
    6.1.46 LIFA Frame Modification Registers
    6.1.47 LIRP Frame Modification Registers
    6.1.48 Router Blocking Registers, Group 0 to 7
    6.1.49 Router Blocking Registers, Group 8 to E
    6.1.50 LIP Isolation Zone Control Registers
    6.1.51 Stealth Generic Inter-Swtich Frame Header Registers
    6.1.52 Stealth Generic Inter-Switch Frame Transmit Payload Registers
    6.1.53 Stealth Generic Inter-Switch Frame Payload Registers
  6.2 Port Register Definitions
    6.2.1 Port Configuration Register
    6.2.2 Port Control Register #1
    6.2.3 Port User Ordered Set Match Register
    6.2.4 Port User Ordered Set Transmit Register
    6.2.5 User 10B Word
    6.2.6 Local SEOC P_INFO
    6.2.7 Port Interrupt Mask Register #1

6.2.8 Port Interrupt Mask Register #2
6.2.9 No Comma Timer Register
6.2.10 OS/CRC Error Threshold Registers
6.2.11 Port Control Register #2
6.2.12 Stall Counter Register
6.2.13 Port Error/Change Status Register #1
6.2.14 Port Error/Change Status Register #2
6.2.15 Port Status Register #1
6.2.16 Port Status Register #2
6.2.17 Port Detector Register #1
6.2.18 Port Detector Register #2
6.2.19 Port OS Error Count
6.2.20 Current Destination Register
6.2.21 Port Match Count Register
6.2.22 Port Utilization % Register
6.2.23 Port Capture Ordered Set Register
6.2.24 Invalid OPN/Broadcast (ARBx) ALPA Capture Register
6.2.25 Port Insertion/Loop Up Counter Register
6.2.26 Port CRC Error ALPA Register
6.2.27 RX Frame Count Register
6.2.28 Port Connections Attempted Register
6.2.29 Port Connections Held Off Register
6.2.30 Port Clock Delta Counter
6.2.31 Src/Dest ALPA Register
6.2.32 Port ALPA Bitmap Registers
6.2.33 Remote SEOC P_INFO Register
6.2.34 Remote SEOC USER Register
6.2.35 GBIC/SFP Read Address Register
6.2.36 Port Open Lockup Max Count Register
6.2.37 GBIC/SFP Serial ID Data Register
6.2.38 Src/Dest ALPA on Mismatch OPN Register
6.2.39 Destination ID on OPN Mismatch Register
6.2.40 Src/Dest ALPA from Unknown OPN/Lost Node Register
6.2.41 Extra Control Register
6.2.42 SCSI Statistics ALPA
6.2.43 SCSI Read IO Counter
6.2.44 SCSI Write IO Counter
6.2.45 SCSI Read Byte Counter
6.2.46 SCSI Write Byte Counter
6.3 CPU Port Registers
6.3.1 Interrupt Register
6.3.2 Interrupt Mask Register
6.3.3 Control Register
6.3.4 Xmt FIFO Read and Write Pointer Register
6.3.5 Xmt FIFO Data Register
6.3.6 Rcv DMA Service Timer Register
6.3.7 Rcv FIFO Read and Write Pointer Register
6.3.8 Rcv FIFO Data Register
6.3.9 Statistics Counter Registers
6.3.10 Millisecond Timebase Control Register
7. Signal Descriptions 1. Definitions Abbreviation & Description
Arbitrated Loop—A Fibre Channel topology where Ports use arbitration to gain access to the Loop
ARB—Fiber channel arbitrate primitive (ordered set). Used to gain control of the loop.
AL_TIME—Arbitrated Loop Timer: Timer defined in AL standard with default value=15 ms.
ALPA or AL_PA—Arbitrated Loop Physical Address: a unique one-byte (8 bit) value, refer to the FCAL T11 Spec for more definition
API—Application Programming Interface
ASIC—Application Specific Integrated Circuit
Beaconing—Flashing LEDs on a port to draw attention for service personnel.
Cascade—Connection nominally between two hubs. Arbitration mechanism is modified to promote fair system operation.
CLS—Close fibre channel primitive. A procedure used by an L_Port to terminate a Loop circuit
CRC—Cyclic Redundancy Check. Used to check data integrity of a data frame.
DITH—Deer In The Headlights. Algorithm used by the Loop Switch ASIC to make the SEOC information transfer meet the FC-AL specification.
Duplicate Cascade—when there are two or more interswitch links between the Loop Switches. Also known as trunking
Dynamic Load Balancing—the ability to steer frame traffic over two or more links between the same two Loop Switches
EWRAP—Electrical WRAP: Loopback signal to a transceiver
EEPROM—Electrically Erasable & Programmable ROM
Fairness window—(or Access Fairness Window) the period during which a fair L_Port can arbitrate and win access to the Loop only once, refer to the ANSI FCAL for more information
FC—Fibre Channel
FC-AL—Fibre Channel-Arbitrated Loop protocol
FC MAC—Fibre Channel Media Access Control. Implements FC0, FC1 and some of FC2—ANSI Fibre Channel functions.
FPGA—Field Programmable Gate Array
FL_Port—An F_Port (i.e., Fabric Port) which contains the Loop Port State Machine defined by FCAL
GBIC—Giga-Bit Interface Converter
Gbps—Giga Bit Per Second
Hard Zones—zones or areas that are separate from each other, i.e., no Fibre Channel frames or Arbitrated Loop primitives pass through the zones.
HBA—Host Bus Adapter
Hub Emulation Mode—A mode where the Loop Switch emulates a hub by wiring all ports together, the result being similar to a hub connection.
I²C—Inter-Integrated Circuit protocol (I²C)
JBOD—Just a Bunch Of Disks. A group of FC-AL disks in a single enclosure connected by port bypass means.
LIM—Loop initialization master—the L_Port which is responsible for initializing the Loop.
LIP—Loop Initialization Primitive Sequence—any of the LIP Primitive Sequences, see FCAL
LIP Blocking—The act of blocking the propagation of LIPs. Used on ports of the Loop Switch so as not to disrupt any communications.
LIP Zones—A list of devices that the Loop Switch will propagate a LIP if received by any device in the zone.
Loop—the Arbitrated Loop described in ANSI FCAL
Loop circuit—a bidirectional path that allows communication between two L_Ports on the same Loop
Loop Switch—A switch that switches on FCAL primitives such as ARB, OPN and CLS. A Loop Switch can include a crossbar Switch, router and port logic.
LPB—Loop Port Bypass Primitive Sequence
LPE—Loop Port Bypass Primitive Sequence
L_Port—either an FL_Port or an NL_Port as defined in ANSI X3, FCPH
LPSM—Loop Port State Machine
NL_Port—An N_Port (i.e., Node Port) which contains the Loop Port State Machine defined in FCAL Open—a procedure used by an L_Port to establish a Loop circuit OPN—Open fibre channel primitive used to open a connection to a specific device identified by ALPA, see FCAL OS—Ordered Set: A fiber channel primitive, 4 bytes in length POST—Power-On Self Test Primitive Sequence—Three identical consecutive Ordered Sets before the function conveyed by the Primitive Sequence is performed, see ANSI FCPH.

RAR—Register-Select-Register

SOC422—Vixel's Loop Switch on a single ASIC product.

SBOD—Switched Bunch Of Disks. A group of FC-AL disks in a single enclosure connected by a switch.

Switching or Segmenting mode—A mode of the Loop Switch that utilizes the crossbar switch to make simultaneous non-blocking connections to devices attached to different ports. The connections are created on OPNs and closed by CLS loop primitives.

SEOC—Serial number Exchange On Connect. A protocol used to exchange serial numbers before connection for Fibre Channel FC-AL interconnect Devices.

Serdes—Serializer/Deserializer

Serial ID—A type of GBIC with a serial EEPROM that contains configuration data.

SFP—Small Form Factor transceiver

Smart Insertion Algorithms—algorithm that adds choices to when to determine to declare the port as operational SN—Serial Number Stall—A connection which has been opened in a Loop Switch, but not used for a period of time Stealth mode—a mode where not all Loop Primitives and/or Fibre Channel frames are propagated to all devices Stealth LIP isolation—limited the propagation of LIP's to all devices String Cascade—Cascade connection where each Loop Switch connected via string is treated as a single logical device on a virtual loop. An ARBx must circle the entire string cascade chain to win control and place an OPN on the cascade.

Tree Cascade—Cascade connection where each Loop Switch arbitrates with only the immediately adjacent Loop Switch for control of the link before placing its OPN on the cascade.

Trunking—Using multiple connections between Loop Switches to provide increased bandwidth USER—A user-defined ordered set 2. Loop Switch Feature Set The following describes the features of the Loop Switch by discussing the implementation contained in a Vixel based product, the SOC422. Although the foregoing describes on implementation a Loop Switch it may be readily apparent to those of ordinary skill in the art in light of the teachings of this invention that certain changes and modifications may be made thereto without departing from the spirit or scope of the described implementation or invention. It should be noted that implementations of the Loop Switch include the Vixel SOC422.

22 port ASIC with internal serdes supporting 1, 2 or 4 Gb/s Fibre Channel data rates (number of ports can expand both up and down for higher and lower port ASIC).

Supports single and multiple cascade connection(s) between hub emulation mode or switching (segmenting) mode Loop Switches without processor assistance. In switching (segmenting) mode, duplicate cascade connections support dynamic load balancing with firmware support. In loop mode, multiple cascade connections are bypassed, only the primary cascade connection is active.

Supports either a parallel processor interface with 16 address, 16 data, RD, WR, CS and Interrupt lines or an I$^2$C interface. These interfaces provide read and write access to the internal register set.

Optional EEPROM provides configuration information for cascades, duplicate cascades, serdes configuration and port configuration for operation without a processor.

Can operate in hub emulation mode or switching (segmenting) mode.

Supports cascading of multiple Loop Switch ASICs.

Supports 16 non-overlapping hard zones with LIP isolation in switch mode without processor assistance.

Supports overlapping hard zones in switching (segmenting) mode.

Supports zone isolation (LIP blocking) in hub emulation mode and switching (segmenting) mode.

Supports Stealth LIP isolation with overlapping LIP zones across multiple ASIC systems.

Supports in-band Interswitch Frames.

Supports the following port functions:

Implements Smart Insertion algorithms in hardware

Implements OS detection circuitry in each port.

Port LED functionality. In switching mode, each port has a port activity LED.

Programmable replacement of Idles with ARBff or other user specified ARB types for EMI emission reduction.

Any port can be configured to passively snoop on any other port, via management. For use by an analyzer to diagnose port and loop operation.

An external loopback path for attached devices to verify link to switch is good.

Provide a bad transmission character count (24 bits) per port.

Provide a CRC error count (8 bits) for each port.

Provide ability to transmit ordered sets to a port before or after insertion into loop. While in the loop, ordered sets can be transmitted a programmable number of times or continuously.

Provide a frequency check function utilizing elasticity buffer inserts/deletes.

Support for reading the serial ID from GBICs/SFPs that support I$^2$C interface.

Provide port loop utilization counter. Measures % of bandwidth used for data, or % of time a switching connection is active or requested.

Implements unique fairness scheme (in addition to the FCAL Access fairness algorithm) to guarantee equal port access for each device.

Provides ability to isolate LIPs on a port basis.

Uses Odd parity to monitor the integrity of the data paths through each port.

Compares the destination ID in each frame to the destination ALPA in the last OPN to validate frame routing.

Provides a register interface to monitor system status signals.

Provide a shift register interface to drive the LEDs (to save pins).

An environment monitoring function that accepts input from a temperature sensor or stuck fan rotor sensors and report the failure in a status register as well as drive an LED.

Control of Management Ethernet Activity LED. Takes input from the card to drive LED.

Controls Loopstate LED to indicate whether loop is up or trying to complete initialization.

Provide LED selftest mode after reset, where LEDs are turned on for 2 seconds then turned off for 2 seconds and then return to normal mode.

External status bit to indicate presence of management card to control special operating modes.

CPU Port (Fibre Channel MAC, FC2) functions

Provides processor interface to be able to send and receive Fibre Channel frames.

Ability to perform NL_Port or FL_Port functions to the arbitrated loop standard.

Performs loop initialization as a LIM or not as a LIM to take an ALPA or several user programmable ALPAs.

Implements a buffer to buffer incoming and outgoing frames before the processor needs to service the FIFO.

3. Functional Overview

The Loop Switch has the ability to operate in different modes. The two basic modes are hub emulation mode and switching (segmenting) mode. In addition, variations on each mode allow Loop Switch to meet a range of different system requirements.

3.1 Hub Emulation Mode (Shared Bandwidth)

The Fibre Channel Arbitrated Loop standard defines a topology that allows many devices to be connected together in a ring configuration, see FIG. 1. The transmitter of one device is connected to the receiver of another device and so on until the last device's transmitter is connected back to the first device's receiver.

Figure 2:
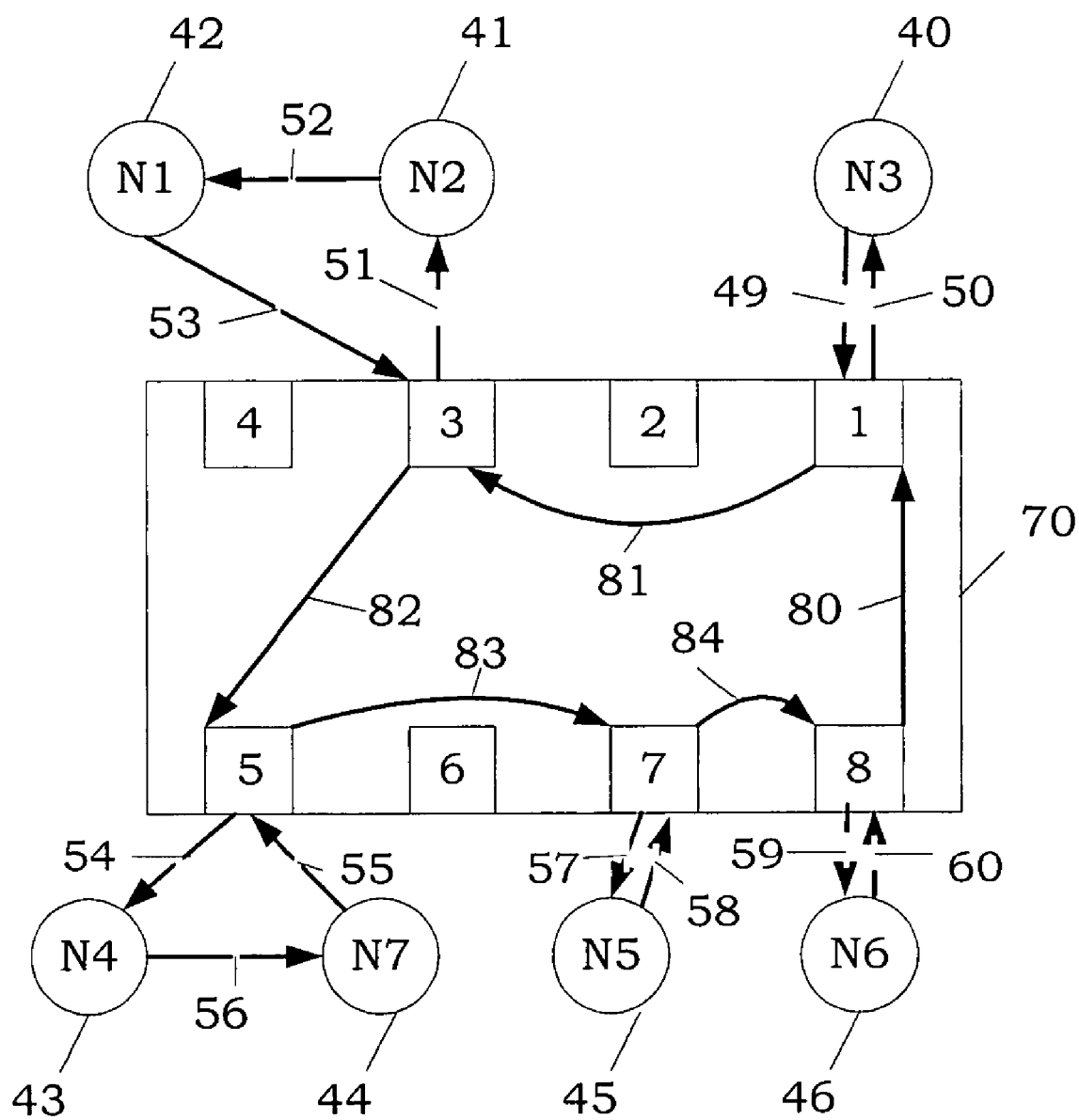
FIG. 2 is a diagram of a Loop Switch in hub emulation mode.

Of course, the problem with this configuration is that each interconnect 20, 21, 22, 23, 24, 25, 26 and each node 10, 11, 12, 13, 14, 15, 16, becomes a single point of failure for the entire loop. If any device or link fails, all communication stops. This is where the hub is deployed, see FIG. 2. A hub 70 converts the ring topology of an Arbitrated Loop into a star topology that provides for simpler cable installation.

Figure 3:
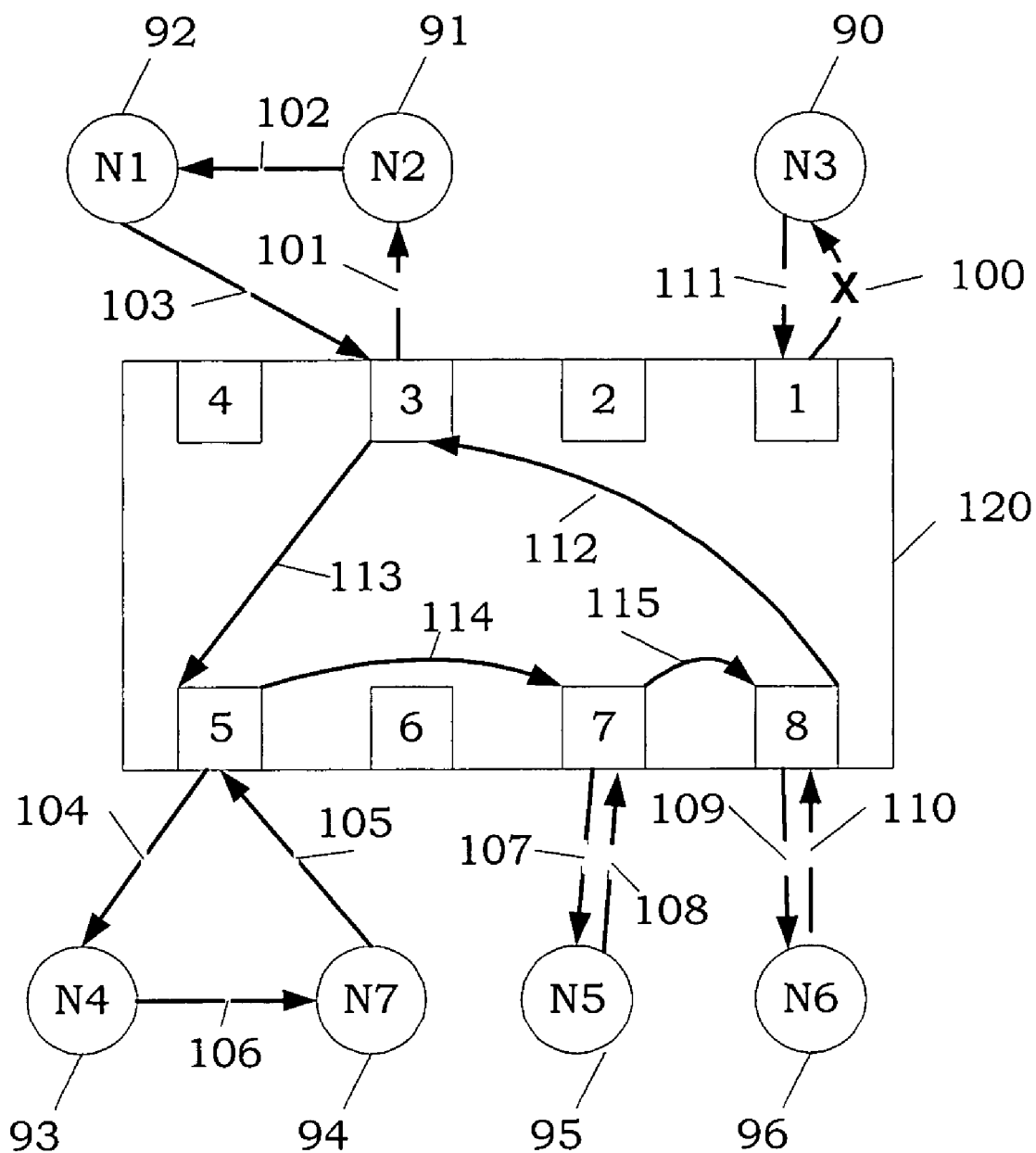
FIG. 3 is a diagram of a Loop Switch in hub emulation mode with a device link error.

A hub also provides a mechanism to bypass unused or malfunctioning nodes or interconnects to keep the loop operational. As shown in FIG. 3, Node 3 90 has a broken fiber 100 that would normally render the loop inoperable. The hub 120 bypasses the port 112 that has Node 3 connected to it and maintains an operable loop 112, 101, 102, 103, 113, 104, 106, 105, 114, 107, 108, 115, 109, 110 with the remaining devices 91, 92, 93, 94, 95, 96.

3.2 Non-Overlapping Hard Zoning (Multiple Loops)

While operating in hub emulation mode, the Loop Switch also has the ability to assign each of it ports to one of a number of 'Zones'. Each zone represents a unique and isolated loop, with its corresponding 127-node address space and separate initialization space. This allows several separate loops to be functioning within a single Loop Switch. With this type of zoning each loop is totally independent and LIPs on one loop do not affect the other loops in any way.

3.3 Switching (Segmenting) Mode

In the switching mode a Loop Switch utilizes a crossbar switch and switches based on the Fibre Channel arbitrated loop primitives instead of FC2 frames like fabric switches. Benefits of this type of switching are that the connected FCAL device does not have to implement Fibre Channel fabric services. Implementing Fabric Services adds complexity of management and interoperability.

The switching mode can be used to interconnect individual nodes, strings of many nodes, normal loop FC-AL hubs with many nodes attached and can also be connected to a Fibre Channel switch fabric. Most FC-AL devices can be attached to the Loop switch without changing drivers, firmware or software and get the benefits of the hub. It shares many of the characteristics of both a hub and a switch. When configured to operate in Loop Switch (segmenting) mode, the Loop Switch exhibits some of the following hub-like characteristics:

Can only be used on an arbitrated loop. It can't be used with fabric attach (N-Port) only devices.

The maximum number of devices that can be attached is 127 per zone. Unlike a true switch, doesn't provide for extending the loop address space.

The switch-like characteristics of the Loop Switch switching (segmenting) mode are:

Partitions a loop up into multiple loop segments.

Because of the loop partitioning, more than one pair of devices can be communicating simultaneously. Up to 10 pairs of ports can be communicating simultaneously on a 20 port Loop Switch.

Like a switch, each port of the Loop Switch is independent of the others. The traffic between two nodes is only present on the Loop Switch ports that service the involved nodes. The traffic is not sent on any of the other ports or their associated loop segments. This provides for isolating high bandwidth conversations and also can be used to isolate long loop segments from other local traffic.

Loop segments can be isolated from each other during loop initialization. After that point, the Loop Switch can be configured to block LIPs from spilling over from one loop into another. This results in less system downtime on non-initializing loop segments.

Figure 5:
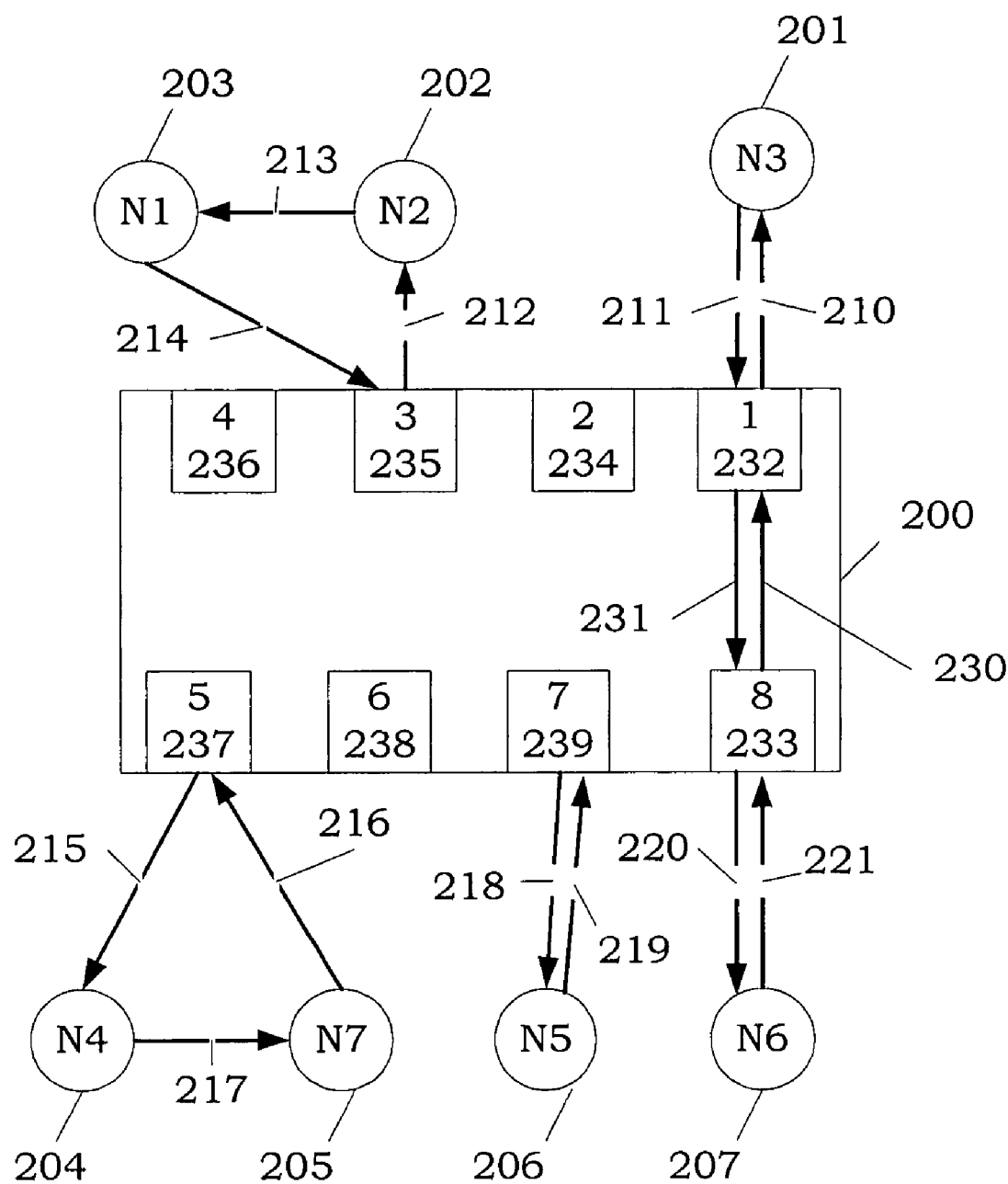
FIG. 5 is a diagram of two communicating Fibre Channel devices through a Loop Switch.

When all ports on a Loop Switch are idle, each port is completely isolated from every other port, see FIG. 5. The Loop Switch 200 listens on each and looks for arbitration activity. If a device arbitrates for the loop, such as Node 3 201 on port 1 232, the Loop Switch accepts the ARBs and simply passes them back out 210 port 1 232 back to Node 3 201. Node 3 201 sees its own ARBs and then sends an OPN (in this case the OPN is for Node 6 207). The Loop Switch 200 will lookup which port the destination device is on and make the connection through the switching matrix 230, 231 and pass the OPN on to the device.

As FIG. 5 shows, a connection exists 230, 231 between Node 3 201 and Node 6 207 via port 1 232 and port 8 233. The remaining ports 234, 235, 236, 237, 238, 239 are still idle.

Figure 6:
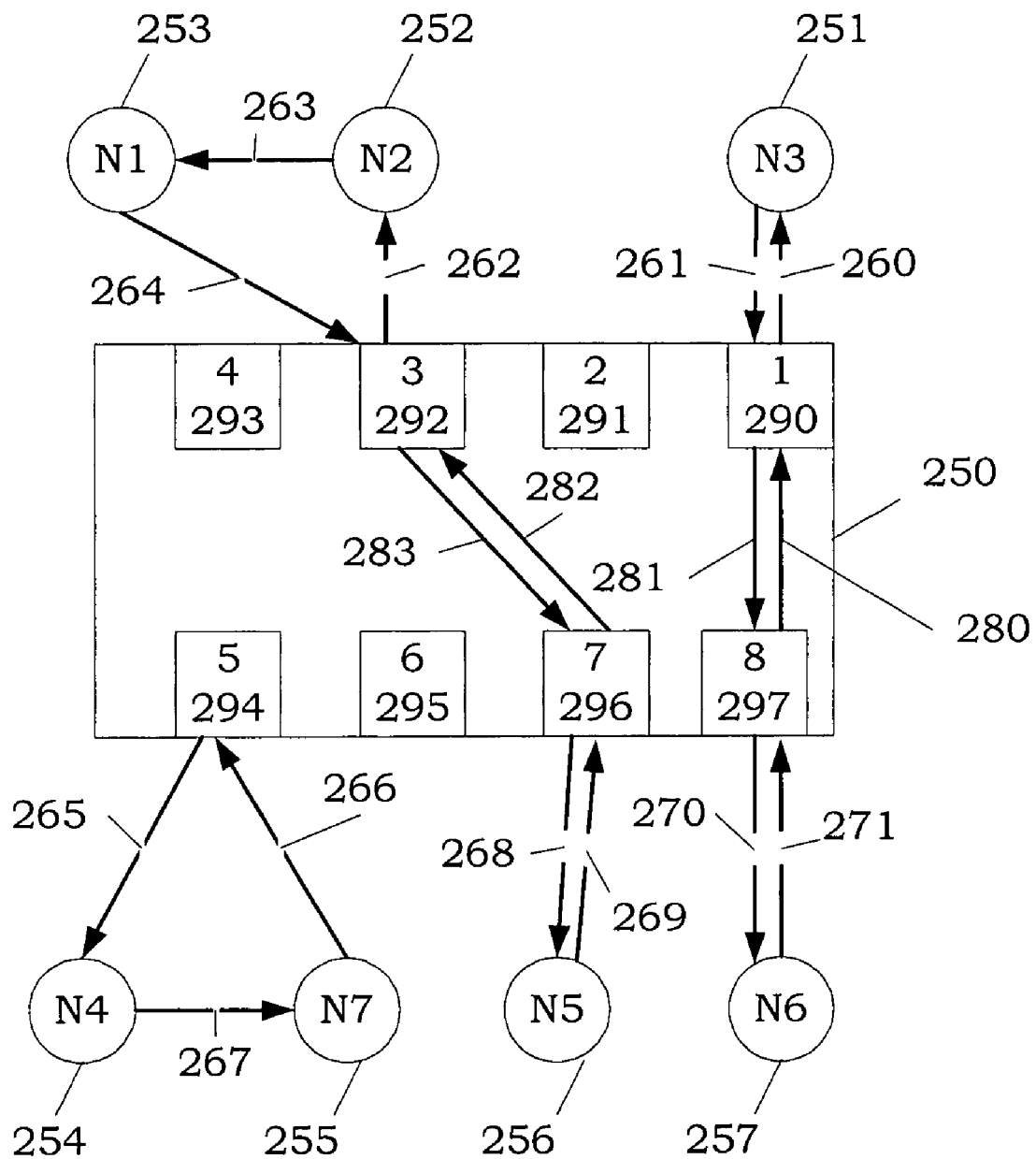
FIG. 6 is a diagram of two pairs of simultaneous communicating Fibre Channel devices through a Loop Switch.

If other nodes attempt to arbitrate and the ports they are on are idle, the Loop Switch provides the requested connections as shown in FIG. 6. FIG. 6 shows two connections made through the switch 283, 282 and 281 and 280, using port pairs 3,7 292, 296 and 1,8 290, 297. FIG. 6 also illustrates how a destination node that is on the same port as the source node is handled. On port 5 294, Node 7 255 is communicating with Node 4 254. The Loop Switch 250 simply connects the port 294 to itself to allow this. In this example note that the ability to have the 3 simultaneous conversations means that the total aggregate bandwidth has been increased to 3 times the line rate. Also note that if Node 5 256 was a remote tape back-up system 10-km away, only the loop segments on ports 3 292 and 7 296 are affected by the long segment. The conversations occurring on the other ports can operate at much lower latencies and higher bandwidths.

In FIG. 5, if Node 5 206 attempted to OPN Node 3 201 while it was already connected to Node 6 207, the Loop Switch 200 holds the OPN until the destination port is released. If the sourcing node does not get through, it is expected that the node aborts the attempt by either issuing a CLS or re-initializing the loop. This terminates all connection requests in the chip.

3.4 Overlapping Hard Zoning (Virtual Loops)

When Loop Switch is configured in switching (segmenting) mode, it has the capability to create overlapping hard zones or virtual loops. This capability means that a particular port on the Loop Switch in switching (segmenting) mode can be configured so that access is restricted to any of the other ports. As an example, this would allow a user to connect 3 Microsoft NT servers to 3 ports on the Loop Switch and to connect 3 disk arrays to 3 other ports on the Loop Switch and create associations from one server to one array while the remaining arrays can be restricted from a particular server. At the same time, a shared tape library could be connected to yet another port and the user can allow access to the tape for all the servers. This way the loop can be used as a high bandwidth interconnect from the servers to the disk arrays and also to provide shared access to the tape.

4. Architectural Description

Figure 4:
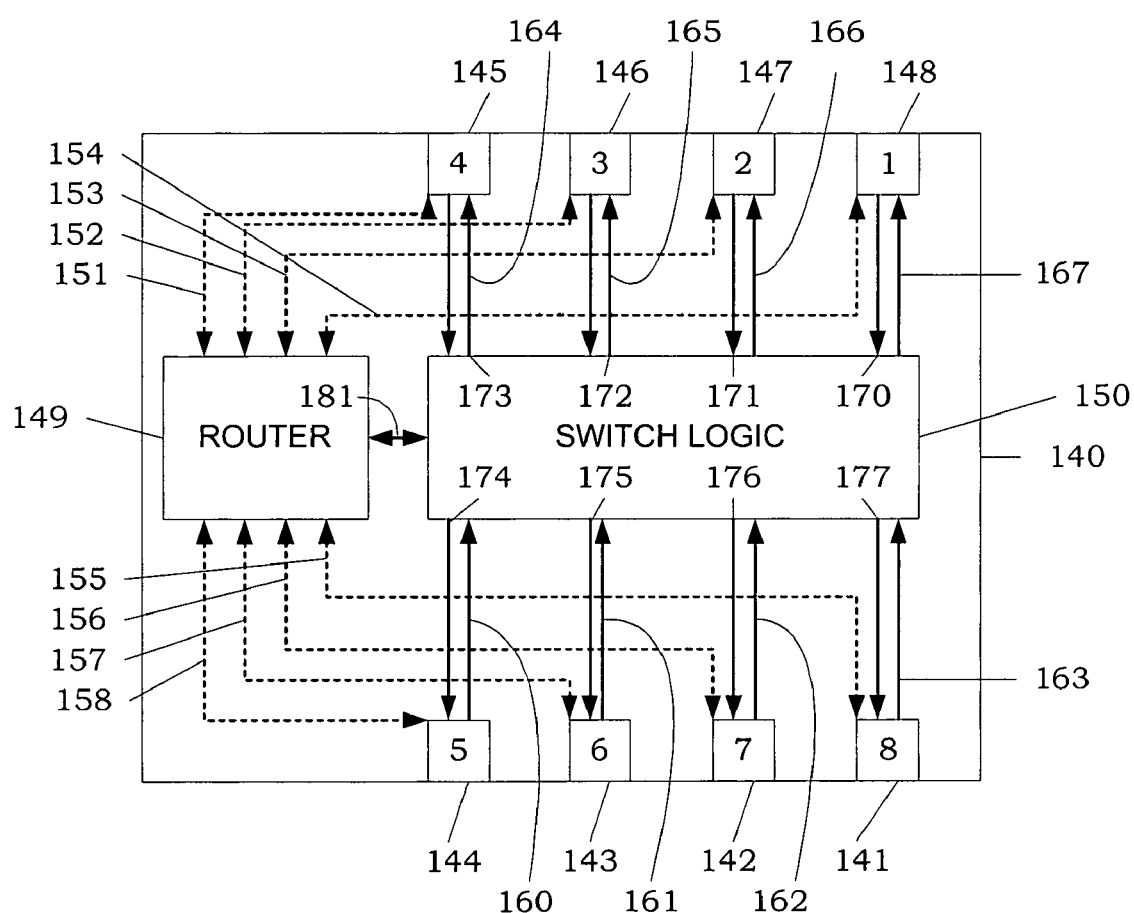
FIG. 4 is a block diagram of the architecture of a Loop Switch.

FIG. 4 shows the high level architecture for the Loop Switch 140. The major components include the port logic 141, 142, 143, 144, 145, 146, 147, 148, the router 181, and the switch logic 150. For brevity only an 8 port Loop Switch is shown but any number of ports can be supported, e.g., the SOC422 supports 22 ports.

4.1 Port Logic

Figure 8:
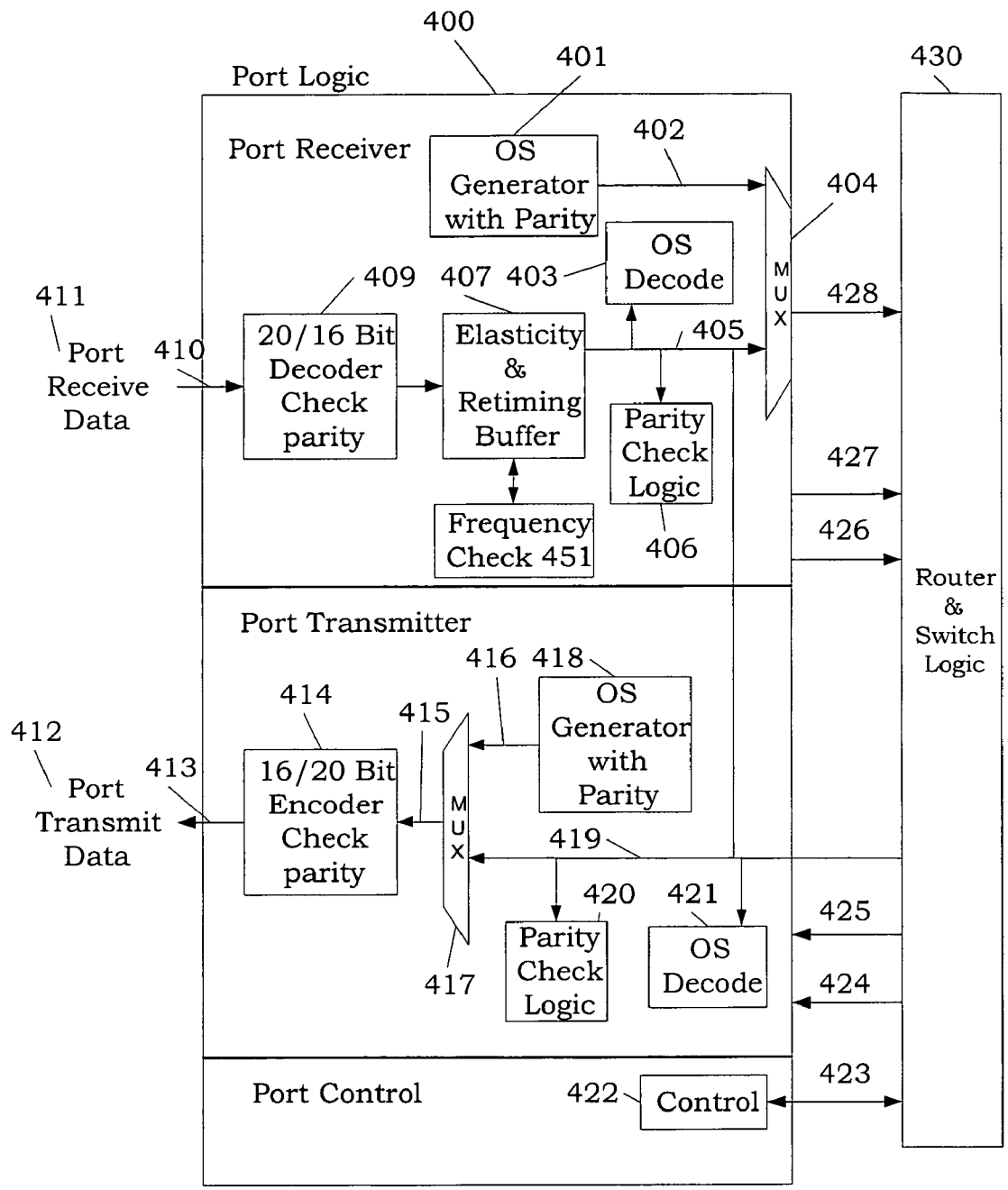
FIG. 8 is a block diagram of the port logic of a Loop Switch.
Figure 9A:
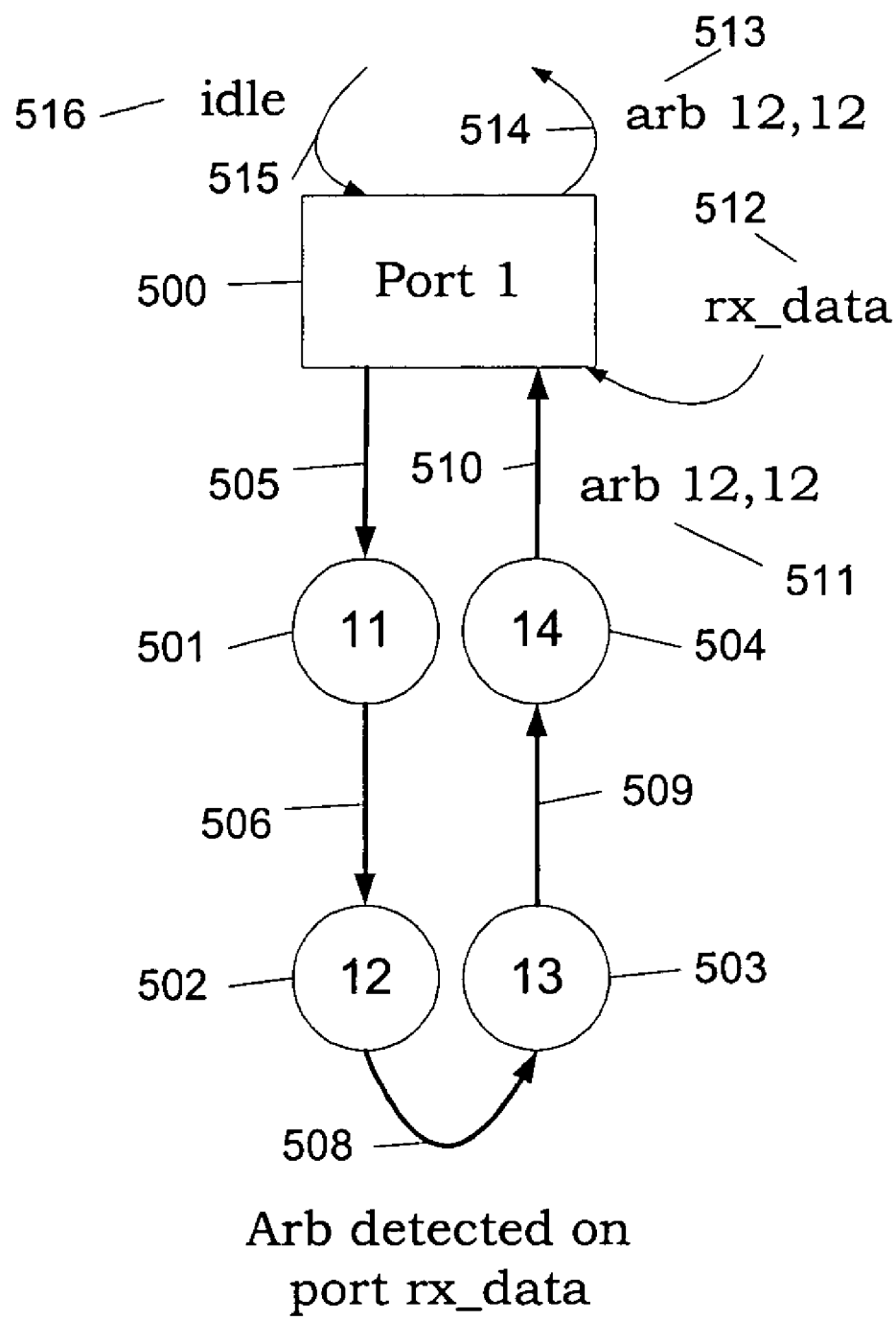
FIG. 9a is a diagram of communicating devices on an Arbitrated Loop attached to a Loop Switch.
Figure 9B:
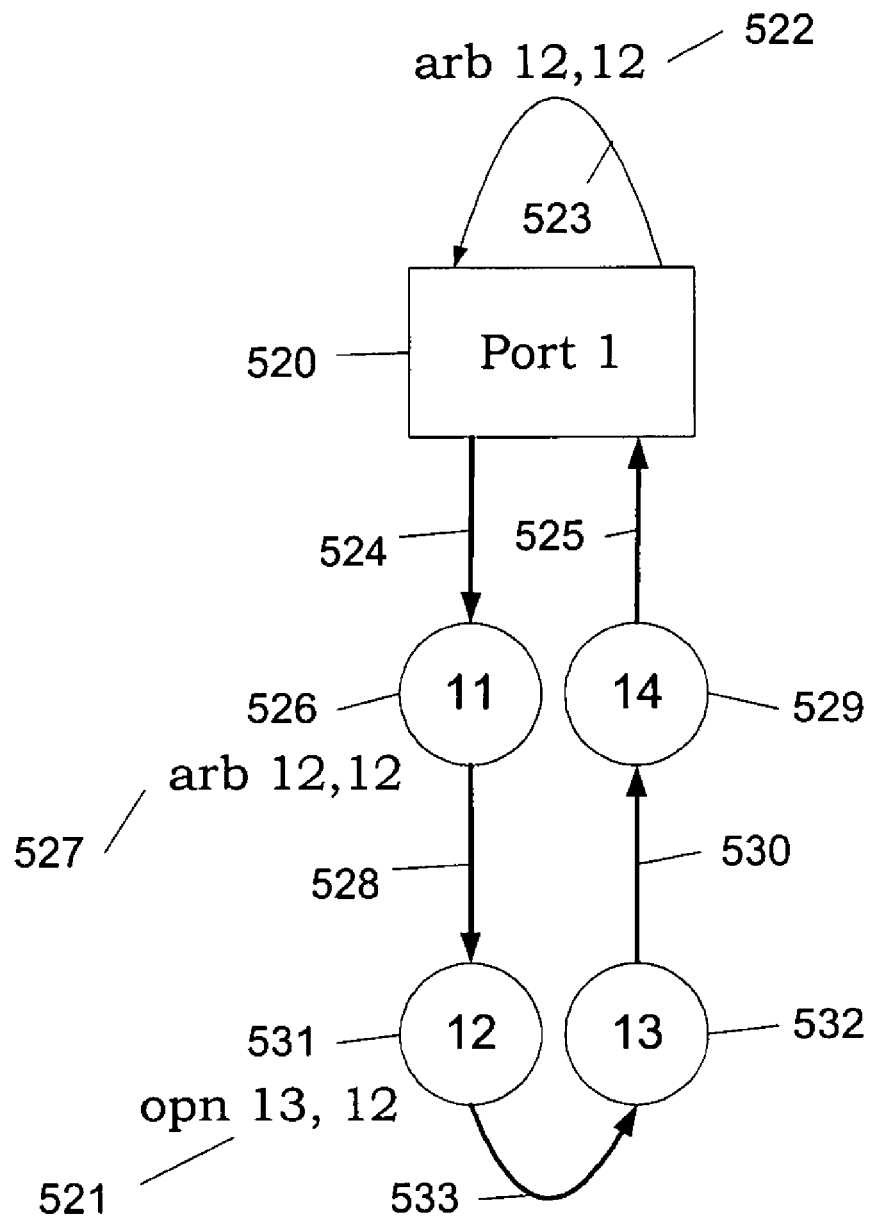
FIG. 9b is a diagram of communicating devices on an Arbitrated Loop attached to a Loop Switch.
Figure 9C:
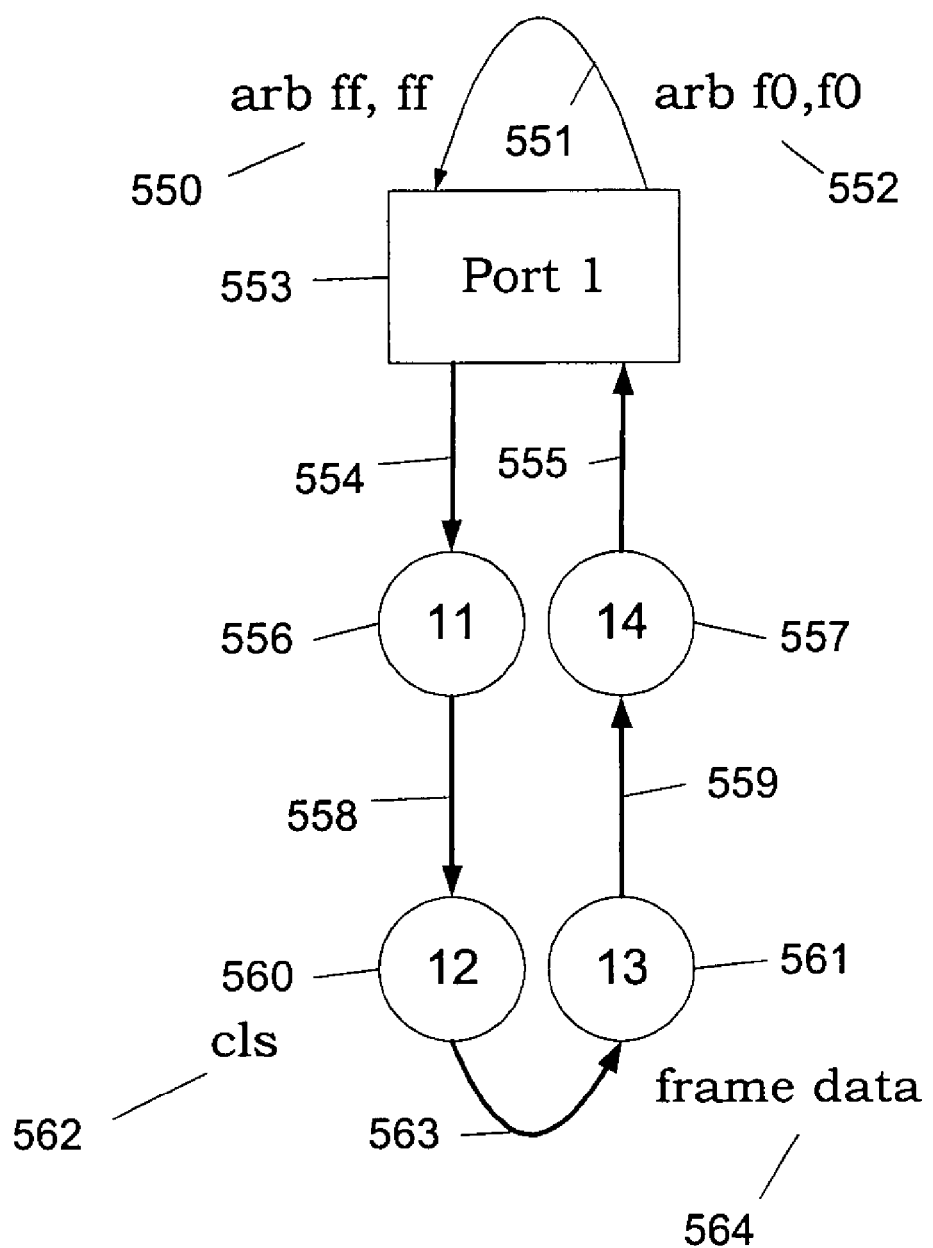
FIG. 9c is a diagram of communicating devices on an Arbitrated Loop attached to a Loop Switch.
Figure 9D:
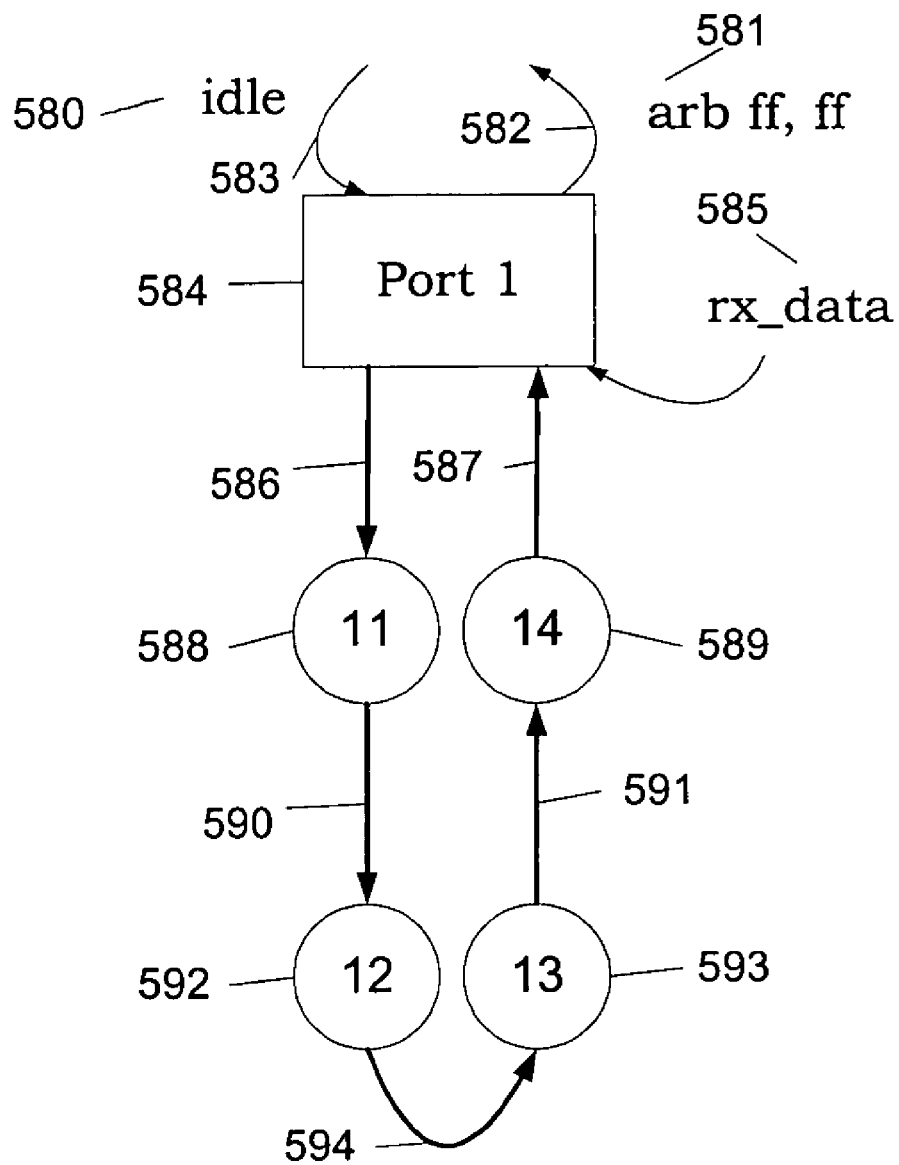
FIG. 9d is a diagram of communicating devices on an Arbitrated Loop attached to a Loop Switch.
Figure 10A:
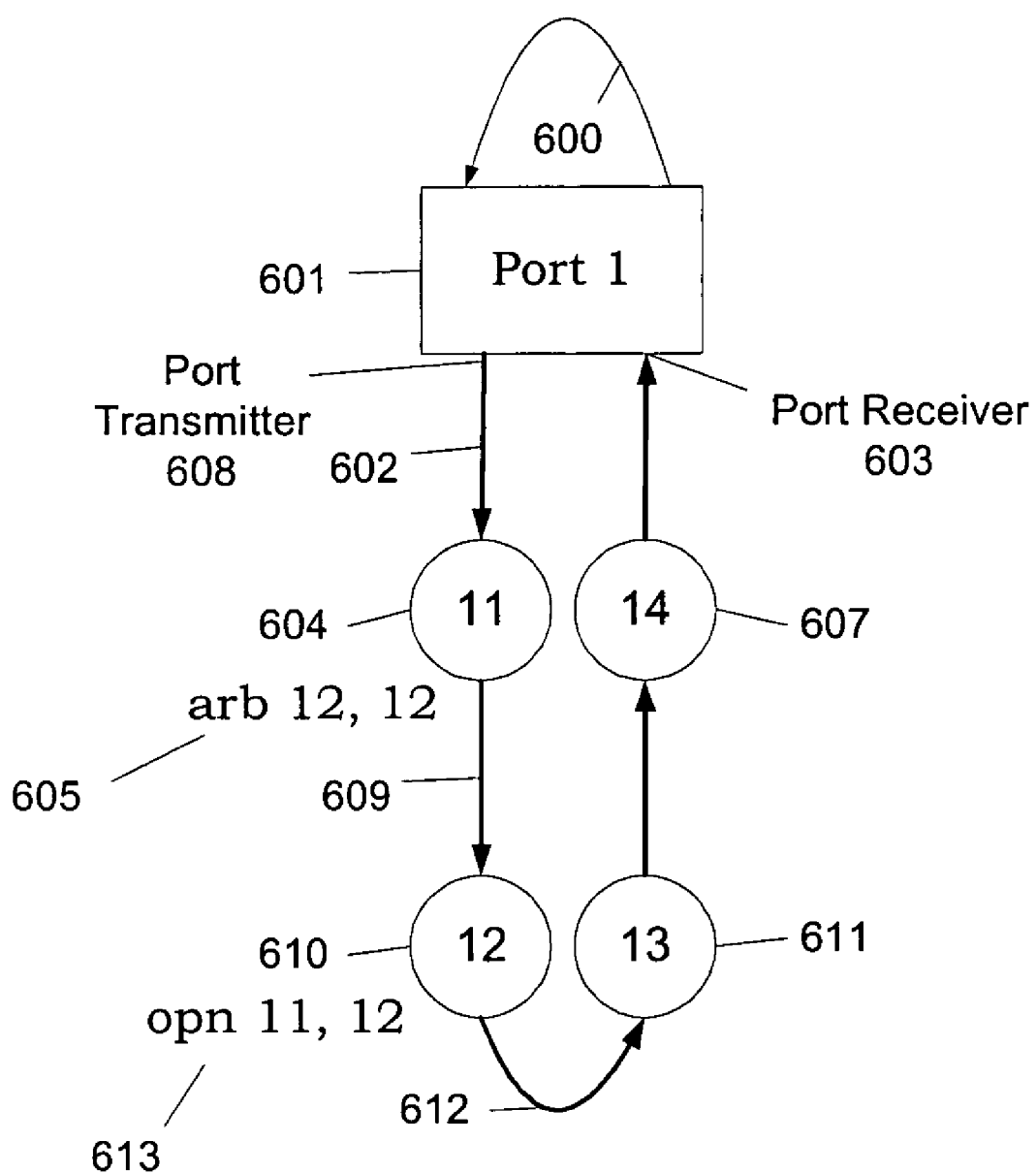
FIG. 10a is a diagram of communicating devices on an Arbitrated Loop attached to a Loop Switch.
Figure 10B:
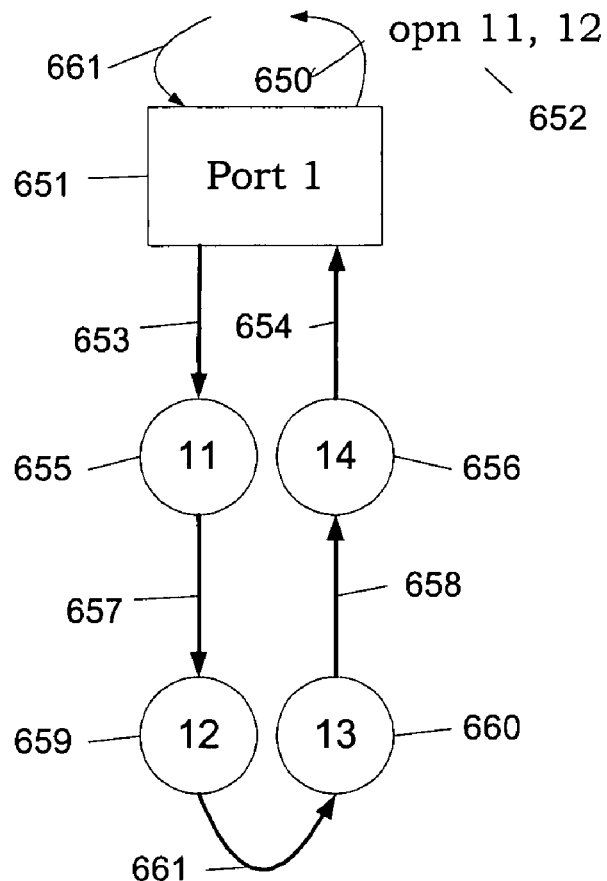
FIG. 10b is a diagram of communicating devices on an Arbitrated Loop attached to a Loop Switch.
Figure 10C:
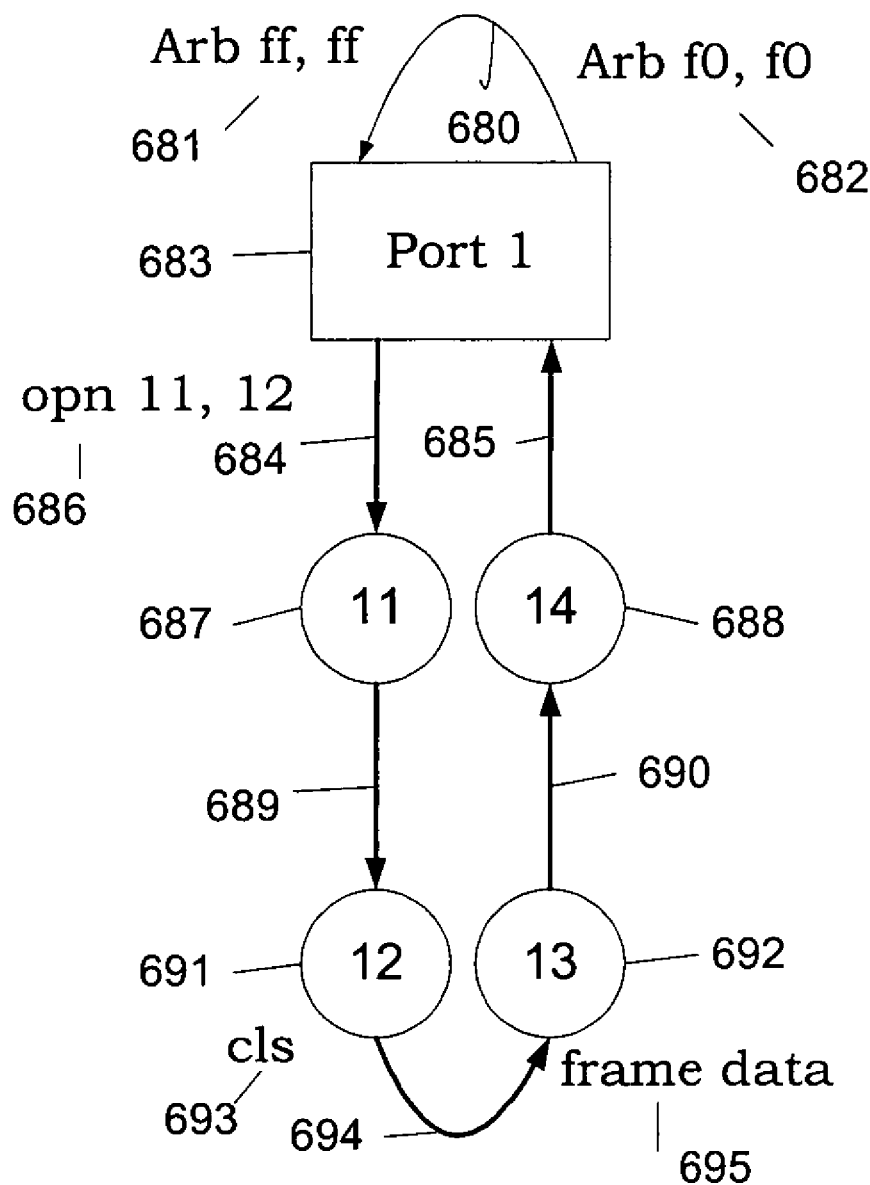
FIG. 10c is a diagram of communicating devices on an Arbitrated Loop attached to a Loop Switch.
Figure 10D:
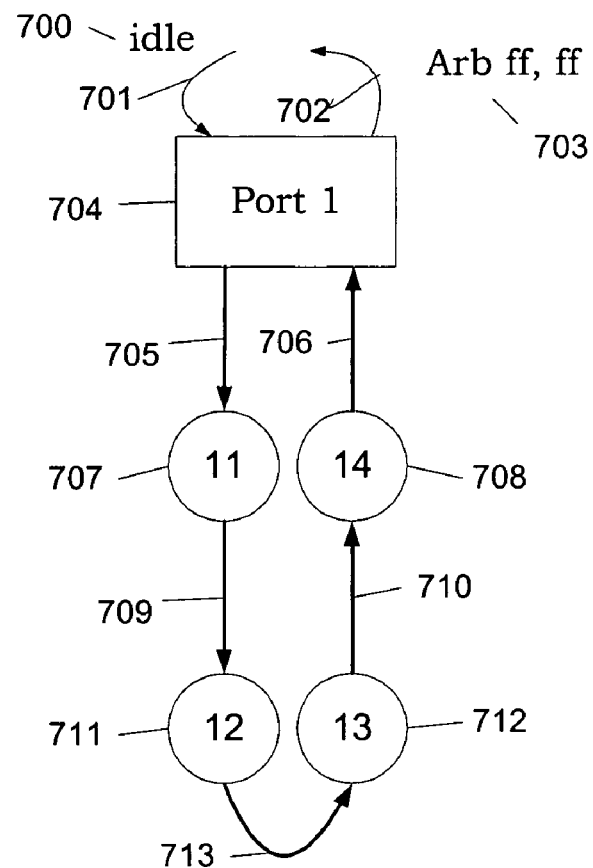
FIG. 10d is a diagram of communicating devices on an Arbitrated Loop attached to a Loop Switch.

Some of the blocks that comprise the port logic includes, see FIG. 8:

16/20 bit Encoder 414 and 20/16 Decoder 409

OS Decode 403, 421

Elasticity and Retiming buffer 407

OS Generator 401, 418

Parity Check Logic 406, 420

Main Control Logic 422

Frequency Check Logic 451

The port is responsible for monitoring the Fibre Channel link for loop primitives in which to signal the router. The port control also removes and inserts loop primitives to manipulate the connected loop arbitration.

4.2 Router

The loop switch contains a router module, see FIG. 4. The router is connected to each port module 151, 152, 153, 154, 155, 156, 157, 158 and connected to the switch logic 181. The port logic signals the router when certain conditions arise. The signals include a connect request based on receiving certain ARB and OPN loop primitives are received, see FIG. 8, 426, 427, 424, 425.

4.3 Switch Logic

As shown in FIG. 4 the switch logic is connected to each port 160, 161, 162, 163, 164, 165, 166, 167, 170, 171, 172, 173, 174, 175, 176, 177 and the router 181. The switch logic implements a full N×N nonblocking crossbar switch, where N is the number of ports. Vixel has implemented a 22×22 crossbar switch for it's SOC422 product but the design is not limited to 22 ports. As shown in FIG. 8, the data path 428 from the port logic 400 to the switch 430 and from the switch to the port logic 419 are unidirectional buses. Some control signals from the port logic 400 to the router and switch logic 430 include the Arbitrate loop primitive connect request (arb_connect_req) 427 signal and the OPEN loop primitive connect request (opn_connect_req) signal 426. Some control signals from the router and switch logic 430 to the port logic 400 include the source connect (src_connect) signal 425 and the destination (dest_connect) signal 424.

4.4 Fibre Channel Port

Figure 7:
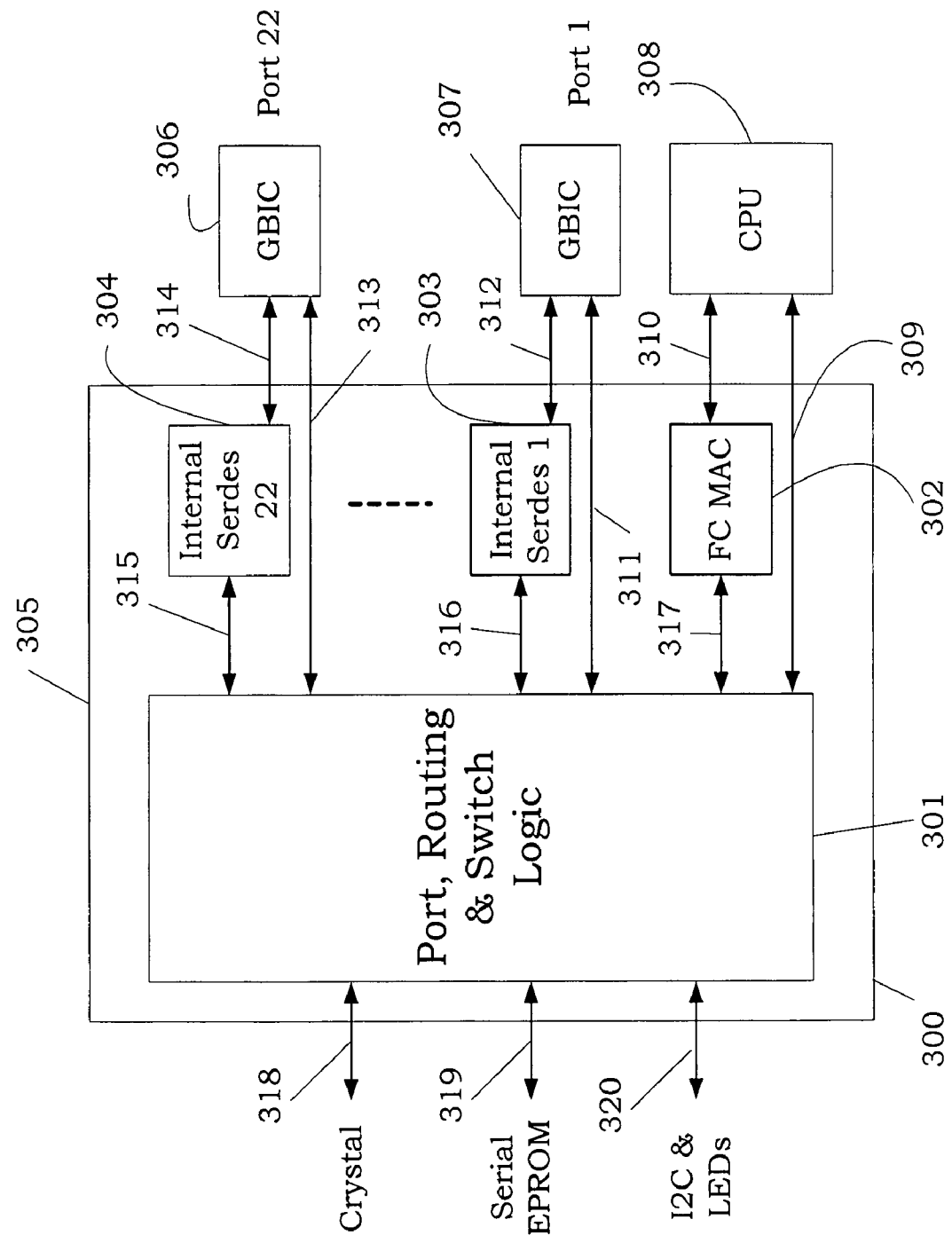
FIG. 7 is a block diagram of an architecture of a Loop Switch with a Fibre Channel MAC block.

The SOC422 Loop Switch adds additional functionality as shown in FIG. 7. This includes a Fibre Channel MAC module 302. This module interfaces 317 with the switch crossbar switch 301 and acts as a Fibre Channel end device, complete with an NL_Port or FL_Port interface. The Fibre Channel MAC module 302 then interfaces with a CPU device 308 through a memory or parallel interface 310. The CPU 308 then has access to Fibre Channel word decoded frames. The FC MAC 302 performs all 8B/10B encoding and decoding, implements the FCAL loop port state machine, implements buffer-to-buffer management through R_RDY's and other features necessary in a Fibre Channel end device.

4.5 Internal Serdes

As shown in FIG. 7 the SOC422 Loop Switch also includes internal Fibre Channel Serdes, one for each port 303, 304. This allows for a more integrated and cost effective solution.

5. FUNCTIONAL DESCRIPTION

5.1 Loop Switch Internal Selftest

The Loop Switch has a state machine that is used to execute a selftest of the high-speed data path within the Loop Switch ASIC. The selftest is executed after each reset after the serial EEPROM is read or by setting the RUN-_SELFTEST mode in the Router Configuration Register. Note that during this testing, the Rx_LOS signal (a GBIC/SFP interface signal) is ignored since there may or may not be a GBIC/SFP installed. The state machine then configures the switch matrix to make a complete loop of all ports that are to be tested, enables for which port to test are contained in the serial EEPROM. The router generates approximately 1 ms of IDLE ordered sets to allow the serdes to acquire sync. Next the router generates a fixed data pattern and sends it into the configured loop. The state machine compares the returned data on the loop and if the data is exactly the same, it indicates that the selftest passed. Note that the Loop Switch ASIC reset sets the Hub Fault State, which in turn causes the Hub Fault LED to be illuminated. If selftest passes, the state machine clears this state and turns off the LED. A selftest failure also sets the Hub Fault bit in the Router Status Register #1 and prevents the Loop Switch from inserting any ports into the loop. For the purpose of debugging, this fault condition can be overridden by writing to the H_Fault override bit in the Router Configuration Register.

The serial EEPROM contains configuration bits for the Loop Switch chip. The port_en bits indicate which ports are to be enabled and included in the selftest. The data pattern has a recognizable ending character pattern that is used as an end of selftest flag. Once the Loop Switch passes the pattern completely through its ports and back out the cascade, it turns off the selftest mode and goes to hub emulation.

Note that the pattern sent, shown in the table below, actually has two sets of patterns. The first is the actual test pattern (words 0-18). This is the pattern that is validated. The second pattern (words 0-21) is only sent if the first pattern is validated.

This pattern has the termination pattern.

| Word # | OS Type | Word Definition |
|---|---|---|
| 0 | MRK 00, fb | K28.5 D31.2 D0.0 D27.7 |
| 1 | ARB ff | K28.5 D20.4 D31.7 D31.7 |
| 2 | ARB f0 | K28.5 D20.4 D16.7 D16.7 |
| 3 | ARB ef | K28.5 D20.4 D15.7 D15.7 |
| 4 | RRDY | K28.5 D21.4 D10.2 D10.2 |
| 5 | OPN 01, ef | K28.5 D17.4 D1.0 D15.7 |
| 6 | CLS | K28.5 D5.4 D21.5 D21.5 |
| 7 | LIP f7, f7 | K28.5 D21.0 D23.7 D23.7 |
| 8 | LIP f7, f7 | K28.5 D21.0 D23.7 D23.7 |
| 9 | LIP f7, f7 | K28.5 D21.0 D23.7 D23.7 |
| 10 | LIP f8, f7 | K28.5 D21.0 D24.7 D23.7 |
| 11 | LIP f8, f7 | K28.5 D21.0 D24.7 D23.7 |
| 12 | LIP f8, f7 | K28.5 D21.0 D24.7 D23.7 |
| 13 | SOFi3 | K28.5 D21.5 D22.2 D22.2 |
| 14 | data1 | D28.5 D28.5 D28.5 D28.5 |
| 15 | EOFn | K28.5 D21.5 D21.6 D21.6 |
| 16 | SOFi3 | K28.5 D21.5 D22.2 D22.2 |
| 17 | IDLE | K28.5 D21.4 D21.5 D21.5 |
| 18 | OLS | K28.5 D21.1 D10.4 D21.2 |
| 19 | OLS | K28.5 D21.1 D10.4 D21.2 |
| 20 | OLS | K28.5 D21.1 D10.4 D21.2 |
| 21 | EOFni | K28.5 D10.4 D21.6 D21.6 |

5.2 Internal Loopback

The Loop Switch also lets the microprocessor control the internal loopback mode via a control bit in the Router Configuration Register. The microprocessor can assert this bit, configure the switch matrix into a complete loop using the Router Switch Matrix Control Register and then send test patterns into the configured loop using one of the Port's Transmit Ordered Set Registers and monitor the detectors on all the other ports.

Note that setting the internal loopback control bit in the Router Configuration Resister causes ALL the port's transceivers to be placed in loopback.

5.3 Port Insertion

Port insertion occurs when a GBIC/SFP is inserted in the Loop Switch and a device is connected to the GBIC/SFP, or when loop initialization occurs on a port that has already been connected. The port validates the incoming data stream, cuts the port's receiver into the loop and then forces LIPs out to the device and waits for them to propagate around the loop and back to the transmitter. Once a LIP is detected at the transmitter side of the port, the port is fully cut in and normal loop initialization is allowed to continue.

5.3.1 Establishing Word Sync

When a port has no GBIC or SFP installed, the port logic does not transmit anything; i.e. the differential TX outputs are held at a steady state. If a GBIC or SFP is installed then the port transmits either the information present on the internal loop or is sourcing IDLEs. If the chip has been strapped as a Loop Switch and there is a functioning loop in the Loop Switch, then the port transmits that loop data. In the case where the Loop Switch is in hub emulation mode or if there is no operating loop in the Loop Switch, then IDLEs are sent.

Once a signal is detected on the receiver of a port, the port checks on the incoming data stream to verify that word sync has been acquired. Once word sync is established, the port stops repeating data already on the loop and begins sending a stream of IDLEs.

5.3.2 Detection of Direct Connection to Vixel Loop Switch

Following word sync, the port logic then looks to see if the attached device is behaving like another Vixel Loop Switch. Normally when a L_Port receives a stream of three or more LIPs, it retransmits at least 12 of the same LIPs it received. The L_Port then sends Idle for 15 ms and ignores all incoming ordered sets. The DITH algorithm takes advantage of this to detect direct connections to Vixel Loop Switches that support the serial number exchange on connect (SEOC) algorithm. Following word synchronization, the Loop Switch port transmits LIP(F7,FB) for 10-20 us (2 timer ticks) and the LIPs cause each L_Port on the attached loop to retransmit the same LIPs. Instead of sending out LISM's after the LIPs, a Loop Switch port instead sends out a stream of ARB(FB) ordered sets. If a SEOC-compliant Vixel Loop Switch is not attached to the port that is initializing, the ARB(FB) is not recognized or retransmitted by an L_Port. If a SEOC-compliant Vixel Loop Switch is attached to the initializing port, then both sides of the connection are sending ARB(FB) at the same time and each port recognizes that both sides of the connection support the serial number exchange algorithm. If a Loop Switch port does not detect ARB(FB) within 8 ms, it assumes another type of device is attached, skips the SEOC process, and continues with normal insertion. If ARB(FB) is detected by the Loop Switch port within 8 ms it assumes a SEOC-compliant Vixel is attached and attempts to exchange serial numbers with it.

5.3.3 Serial Number Exchange on Connect (SEOC)

The SEOC exchange is communicated thru 8 proprietary primitive sequences labeled SN1, SN2, SN3, SN4, SN5, P_NFO, USER1 and USER2. Following the ARB(FB) exchange, the port transmits another short burst of LIP(F7, FB) for 10-20 microseconds. The port then transmits SN1 continuously until it receives SN1 from the connected port. When a SEOC sequence is received, the embedded serial number is loaded into the remote serial number, port information and user registers for that port. The payload byte, byte 4, of each ordered set is initialized on the transmitting side by registers in the router memory map space with the exception of the P_INFO. P_INFO is unique for each port and is thus mapped into port memory map space. Upon power-up, the P_INFO field is initialized to the corresponding port number.

| Ordered Set | Byte 1 | Byte 2 | Byte 3 | Byte 4 |
|---|---|---|---|---|
| SN1 | K28.5 | 95 | FB | SN byte 1 |
| SN2 | K28.5 | 95 | FD | SN byte 2 |
| SN3 | K28.5 | 95 | EF | SN byte 3 |
| SN4 | K28.5 | 95 | F0 | SN byte 4 |
| SN5 | K28.5 | 95 | F7 | SN byte 5 |
| P_INFO | K28.5 | 95 | F8 | Port Info |
| USER1 | K28.5 | 95 | FE | User 1 |
| USER2 | K28.5 | 95 | FF | User 2 |

The Loop Switch port then transmits another short burst of LIP(F7,FB), followed by continuous SN2 until a SN2 sequence is received. When SN2 is received, the embedded serial number byte is again stored in the remote serial number register for that port. The same process takes place for SN3 through USER2 until all eight bytes have been stored in the appropriate registers for that port. When USER2 has been stored a serial number change interrupt is triggered for that port. The microprocessor must then read this serial number, along with the other information and verify whether it is a duplicate address and write a bit to the port's control register to release the chip to complete the insertion. If the port doesn't have another Vixel Loop Switch detected, this microprocessor interaction is skipped. After this, the port completes the cut-in process. If any of the respective SEOC Ordered Sets has not been received within 10 ms while the port is waiting for it, the port timeouts and restarts the insertion process from the beginning. The captured serial number remains stored and valid until a GBIC or SFP is removed or until loss of signal is detected. When either of these events occurs, the remote serial number, P_INFO and User registers are reset to zero.

| Port # | P_info Value | Port # | P_info Value | Port # | P_info Value |
|---|---|---|---|---|---|
| 0 | 00 | 8 | 18 | 16 | 27 |
| 1 | 01 | 9 | 1b | 17 | 29 |
| 2 | 02 | 10 | 1d | 18 | 2a |
| 3 | 04 | 11 | 1e | 19 | 2b |
| 4 | 08 | 12 | 1f | 20 | 2c |
| 5 | 0f | 13 | 23 | 21 | 2d |
| 6 | 10 | 14 | 25 | | |
| 7 | 17 | 15 | 26 | | |

5.3.4 SEOC Failure

If the attached device is something other than another Vixel Loop Switch, the port logic transmits LIP(F7,F7) continuously for 112 ms and attempts to validate a valid stream of LIP(F7,F7) into the receiver. The Port ignores all LIP(F8)s for the first 15 ms to allow attached devices to cycle through an AL_TIME. Then the Port monitors for LIP(F8) for 97 ms. If LIP(F8) is received, the Port begins the insertion process all over again (detect if a Vixel Loop Switch is attached). This sets the insert_lipf8_fault bit in the Port Error/Status Change register. If no LIPf8 is received during the 97 ms and if LIP(F7) is received by the end of the 97 ms, the port inserts its receiver into the loop, but continues to transmit LIP(F7,F7). If LIP(F7) was not received by the end of the 97 ms time period, the port starts the insertion process all over and sets the insert_timeout bit in the Port Error/Status Change register.

The reason the port ignores all LIPs other than LIP(F8) for 112 ms is that some devices send out a LIP(F8) sequence once every 100 ms. Looking for LIP(F8) and ignoring LIP(F7,F7) up to 112 ms allows the port to correctly detect a device behaving in this manner without excessive cycling between the active and inactive states. The 112 ms value was chosen to provide coverage for 100 ms with some additional margin.

5.3.5 Completion of Port Insertion

Following either the successful completion of SEOC, or the validation of a received stream of LIP(F7,F7) if SEOC was not successfully completed, the port scrubs the loop to guarantee that LIP(F7,F7) has propagated around the entire loop. The port continuously transmits LIP(F7,F7) and monitors the input stream to its transmit data path, which is fed by the receive data stream from the adjacent upstream port, for LIP(F7) to make sure that LIPs have gone all the way around the loop. When LIP(F7) is detected at the transmitter input, the transmitter side is inserted and the port starts transmitting normal loop traffic. If LIP(F7,F7) (per.FC-AL) or a sequence of SOF, EOF and IDLES without receiving any ARBs (per FC-AL-2) is not received within 50 ms, then the port insertion is aborted.

5.3.6 Port Insertion Failure

If port insertion fails for any reason it is automatically be retried until it is successful. Certain failure conditions also trigger a reset of the GBIC or SFP by asserting the tx_disable signal. When tx_disable is asserted it remains asserted for approximately 10 ms. The minimum spacing of the tx_disable pulses is 350 ms. The failure conditions that trigger a tx_disable pulse are:

SEOC not completed and either a link failure condition was detected (see note below) or forced bypass is true
SEOC ordered sets not receive within 10 □s
2.418 second timer expired during scrub loop operation
For the above conditions, a link failure is defined as
1. tx_fault input detected
2. GBIC/SFP unplugged
3. loss of signal detected
4. loss of word sync detected for 100 ms
5. LIP(F8) received
6. no comma character received for 100 ms and dis_by-p_no_comma

5.4 Port Bypass

An inserted port is bypassed on the occurrence of one of the following circumstances:

Rx_LOS—A port is immediately bypassed when the Rx_LOS signal is asserted by the GBIC/SFP.

tx_fault—A port is immediately bypassed when the tx_fault signal is asserted by the GBIC/SFP or fixed receiver circuitry.

LIPf8—If a port detects received LIPf8s, the port substitutes LIPf7s for them and forwards 16 of these LIPs onto the loop and then bypasses the port.

Loss of synchronization—If a port loses synchronization for 100 ms, a timeout is triggered and the port is bypassed.

Software initiated bypass

Note that when the port is bypassed because of one of these reasons, the port also causes the loop to be reinitialized by sending out 16 LIPs to the remaining ports before the actual bypass. This of course assumes that the policy bits have not disabled the LIP on bypass function. Note: Policy bits are described in the Port Operational Policies section's text.

5.5 Device Discovery

The device discovery process is used to build up an ALPA map table that describes which Loop Switch port each ALPA is attached to. This table is useful for management software and is required for Loop Switch operation (as opposed to Loop Switch mode). Device discovery is initiated whenever a LIP is detected and full-Loop Switch loop initialization occurs. At this time all of the devices are mapped into a single loop and are initialized together, regardless of whether they are attached to the same port.

5.5.1 Passive Device Discovery During Full-Loop Switch Loop Initialization

A passive device discovery process is used during full-Loop Switch loop initialization. Each time a LISM frame passes through the data path in the router module, the WWN in the payload of the frame is stored in registers and any previous value is overwritten. The result is that the WWN of the LIM is captured and stored from the end of one loop initialization cycle until the start of the next cycle. This value is readable by the microprocessor.

During each phase (LIFA, LIPA, LIHA, LISA) of full-Loop Switch loop initialization each port usually sees an outbound frame and then an inbound frame of the same type.

Each port captures the outbound and inbound frame ALPA bitmaps and then computes the difference between the two bitmaps after each phase. The difference for that phase is accumulated with the differences from the previous phases and stored into a holding register until the LISA phase is complete. The accumulated difference between the inbound and outbound bitmaps represents all ALPAs claimed on that port of the Loop Switch during loop initialization. When the LISA phase is complete, the accumulated ALPA bitmap difference in each port is used to update the ALPA map.

The one special case for calculating the outbound and inbound frame bitmap differences is on the loop where the LIM resides. In order to initially determine the LIM port, each port sets a flag when it receives an ARB(F0) during loop initialization. The first Loop Switch port to see the ARB(F0) is identified as the LIM port. The LIM port number is then stored in the device discovery logic until the next full-Loop Switch loop initialization cycle. Since the LIM originates all loop initialization frames, the Loop Switch does not see a frame go out onto a port before the same frame type comes back in. Therefore the outbound bitmap must initially be assumed to be zero on the LIM port when the LIFA frame is first received. The bitmap difference for the LIFA phase would then be equal to the inbound LIFA frame ALPA bitmap. From that point on, the LIM port calculates its bitmap difference by comparing the inbound LIPA and outbound LISA, inbound LIHA and outbound LIFA, inbound LISA and outbound LIHA frames.

This process identifies all ALPAs claimed except for those located on the same loop as, but upstream from the LIM device. These devices are referred to as shadow devices since they are located in the "shadow" of the LIM for the purposes of device discovery, and they are resolved later in the process. The reason for this is that the LISA frame received at the LIM never makes it back to the inbound side of the port. Therefore, the final LISA bitmap cannot be captured on the port where the LIM resides.

The ALPA map stores 8 bit port assignments for each of the 127 possible ALPA values. When any port detects a LIP sequence, the Loop Switch exits switching mode and begins the loop initialization process. At this time each entry in the ALPA map is marked with the value 0xE0 to indicate that the port assignment for each ALPA is unmapped. When a LISA frame is received on a given port, that port begins to enter data into the ALPA map to identify all ALPAs claimed on that port. The port number (0x00-0x1F) for each of the claimed ALPAs is entered into the appropriate locations in the ALPA map. Any unclaimed ALPAs are not resolved at this point and their ALPA map locations retain the unmapped port indicator (0xE0). Valid port values (0x00-0x1F) or the invalid indicator (0xC0) later replace remaining devices with unmapped port values either by passive or active means as the shadow device ALPAs are resolved. Note: Ports 0x14-0x1F are possible future implementations and are not currently valid entries.

5.5.2 Shadow Device ALPA Resolution with LILP

If LIRP and LILP are supported for all devices on the Loop Switch, then these frames follow the LISA on the loop. If an LILP does appear, its payload is captured and searched in order to complete the ALPA map. The stored LILP payload may also be used by management software. As the payload is searched, all claimed ALPA values that do not have a valid port value that was previously entered are marked with the port value corresponding to the LIM port. The remaining ALPA map locations that are still marked with the unmapped port indicator are then marked as invalid ALPA values. If LILP is supported, then this action completes device discovery and the Loop Switch is allowed to enter switching (segmenting) mode, if selected.

5.5.3 Shadow Device ALPA Resolution without LILP

If LIRP and LILP are not supported for all devices connected to the Loop Switch, then a CLS follows the LISA frame. This completes the passive portion of the device discovery process and the Loop Switch is allowed to enter switching mode, if selected. From that point on, ALPA map locations marked as having unmapped port locations are passively resolved only during switching mode operation and only as they are needed. When an OPN is detected and its destination is an ALPA marked with as an unmapped port location in the ALPA map, the received OPN is routed to the LIM port. If the device does not exist then the OPN is returned back to the LIM port on the Loop Switch and the corresponding device position in the ALPA map is marked as an invalid device. If the device does exist on the LIM port then an R_RDY or a CLS causes the port to be recorded in the ALPA map as being a valid device on the LIM port. When an OPN is sourced on the LIM port and is also forwarded back to an unmapped device on the LIM port, the port does not have enough visibility into the loop protocol to resolve an unmapped ALPA since it cannot detect a reflected OPN. Therefore, this event does not trigger a change in the ALPA map.

Once an ALPA map location is marked as an invalid device, any future OPNs that are sent to that ALPA are routed back to the sender. Eventually each of the unresolved ALPAs is accessed and determined either to be valid and marked with the appropriate port value, or invalid and marked as having no valid port value.

5.5.4 Device Discovery Errors

One error that is flagged occurs when a single ALPA is claimed on multiple Loop Switch ports. For that to happen a position in the LIXA frame bitmap would have to be set on one port, cleared on another port, and then set again on a third Loop Switch port. If this condition occurs the corresponding position in the ALPA map is marked as a "known invalid" device location, and the port discovery error interrupt is asserted in the router status register. If any accesses are attempted to this ALPA and an OPN is sent to that location, the Loop Switch routes the OPN back to the source. If present, the microprocessor can then force a LIP out onto the loop to restart the process if desired. If a microprocessor is not present the device that sent the OPN may then choose to reinitialize the loop to clean up this error.

Another error that may occur is that a CRC error may be detected in a received frame during port discovery. If a CRC error is detected in a LIXA frame the hardware does not complete the device discovery process. The CRC error interrupt is triggered in the port error status register (true for any CRC error) and the map_done status bit is not set in the router status register. If present, the microprocessor can then force a LIP out onto the loop to restart the process if desired. If a microprocessor is not present and an OPN is sent to valid, unmapped devices the OPN is returned back to their source. The device that sent the OPN may then choose to reinitialize the loop to clean up this error.

5.5.5 Loop Initialization Timeout

To help recover from locked up loop initialization cycles, a 500 ms internal watchdog timer will cause the external pin lip_timeout to go low until a valid LIP is received or the ASIC is reset. External logic is required to reset the ASIC if that function is required.

5.6 Idle Replacement by ARBff

In order to reduce EMI emissions, the port logic in the Loop Switch uses an algorithm to replace IDLEs that are being received with ARBff. The frequency content of an IDLE has a very large 531 MHz component. The ARBff spectral content is much broader. The standards committee has accepted this change for FC-AL-2. The actual process looks for IDLEs in the receive symbol stream and forward 6 IDLEs out the transmit port. If subsequent consecutive IDLEs are received, the logic replaces them with the ARBffs. The ARBff is defined as the lowest priority ARB and is viewed as the same as an Idle. This type of IDLE replacement is only performed once a port has been inserted and has completed loop initialization. Any time loop initialization is triggered this replacement is not allowed until loop initialization has been completed.

(Note: IDLEs may also be replaced by ARBs with ALPA=0xff in order to establish port fairness for effective switching mode operation. In this case no IDLEs are allowed to pass prior to replacement by ARBff. This is a proprietary implementation and is a completely different usage of ARBff than the procedure described in FC-AL-2. Refer to the section that describes port fairness for more details.)

5.7 Switching (Segmenting) Mode Operation

A Loop Switch that has been configured for switching (segmenting) mode goes through the same process as in the hub emulation mode whenever a configuration change occurs, including the device discovery phase. If this is completed successfully, the Loop Switch enters switching (segmenting) mode.

If the device discovery process completes successfully and the Loop Switch is configured in the switching (segmenting) mode, the Loop switch enters switch (segmenting) mode. At this time all ports are disconnected and IDLEs are being sourced by the port transmitter. When a port receives an ARB, the port requests a connection by asserting the arb_connect_req signal, see FIG. 8, 427. Router logic 430, FIG. 4 149 connects the port to itself, and asserts the src_connect (source connect) 425 and dest_connect (destination connect) 424 signals. The ARBs are forwarded through the switch logic and received by the device that originally sourced them. This device then sources an OPN to the destination device. At this time, the Loop Switch port substitutes ARBff for each IDLE. As the Loop Switch switches from sending ARBx to ARBff it does not allow any IDLEs to pass ahead of the ARBff. The ARBs from the Loop Switch are used to determine when all the devices on the loop have completed their conversations and the loop is idle. The default ALPA value for this feature is 0xff, but it can be reprogrammed through the microprocessor.

5.7.1 Source and Destination Nodes on the Same Port

As shown in FIG. 9a, 9b, 9c and 9d, if the destination device 532 is downstream from the device sourcing 531 the OPN 521 is on the same port 520, the loop tenancy occurs without further intervention. When the connection is closed 523 and no other port is requesting access, ARBff 581 is detected at the port receiver 585 at the completion of the loop tenancy. When this occurs, the connection through the switch logic is broken 582, 583 and IDLEs 580 are again sourced by the port transmitter. The paths 515, 514, 523, 551, 583 and 582 are internal to the Loop Switch.

As shown in FIG. 10a, 10b, 10c and 10d, if the destination device 604 is upstream from the device sourcing 610 the OPN 613, an OPN is detected at the port receiver 603. When the OPN is detected, it is stored in a register in the port receiver, the destination ALPA is supplied to the router and the opn_connect_req signal is asserted, see FIG. 8, 426. The router 430 breaks the port connection FIG. 10b 650, 661 and performs a port lookup of the ALPA provided. Note that the router must break the port connection—without this the priority logic would not be enabled which could lead to starvation of port. If the ALPA resides on the same port, the router connects the port to back to itself, asserts the src_connect 425 and dest_connect 424 signals establishing a new connection 680. The port receiver sends the OPN to the switch receive data bus and the loop tenancy begins. Again, the port substitutes any IDLE received with an ARBff. When all devices on the loop have completed their conversations, ARBff is detected at the port receiver. When this occurs, the connection through the switch logic is broken 701, 702 and IDLEs 700 are again sourced by the port transmitter 608.

As discussed above and shown in FIG. 10a, 10b, 10c, and 10d, a port is connected to itself during arbitration and when the destination device is on the same port as the source device. In this case, port receiver logic replaces ARBf0s 682 it detects with ARBff 681. All other ARBs are forwarded to minimize the complexity involved in maintaining fairness on each segment. Due to this, several loop tenancies could occur during single connection when a port is connected to itself. The paths 600, 661, 650, 680, 701, 702, 720 are internal to the Loop Switch.

Figure 11A:
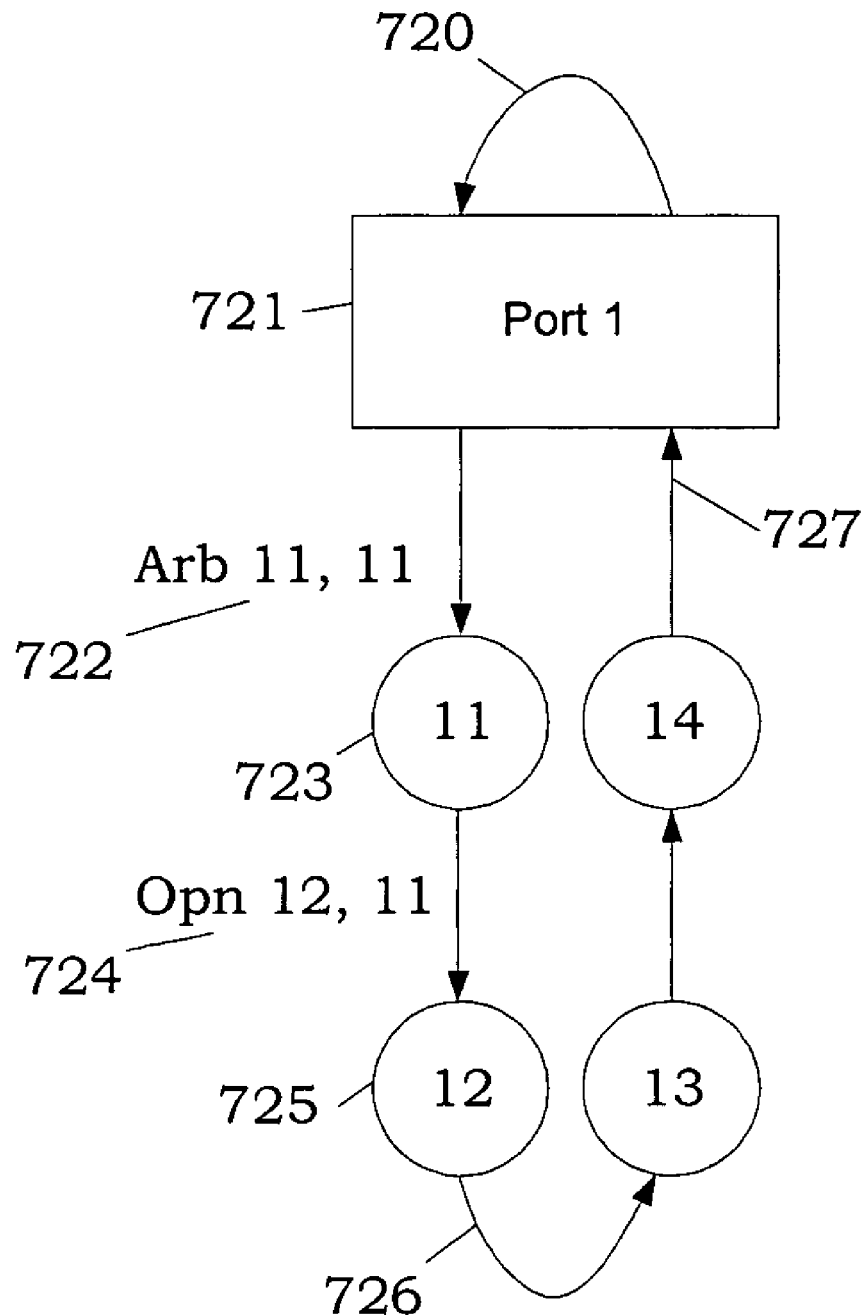
FIG. 11a is a diagram of communicating devices on an Arbitrated Loop attached to a Loop Switch.
Figure 11B:
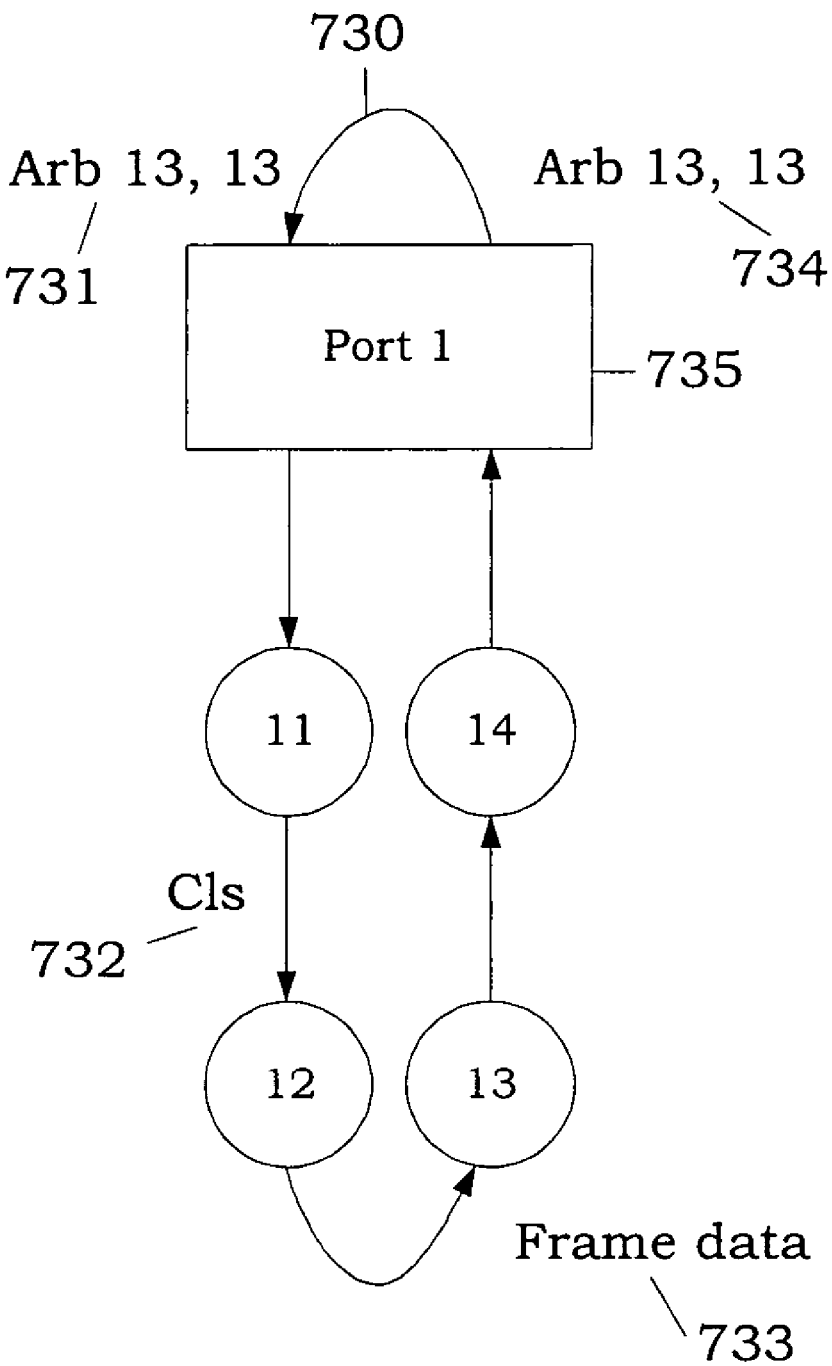
FIG. 11b is a diagram of communicating devices on an Arbitrated Loop attached to a Loop Switch.
Figure 11C:
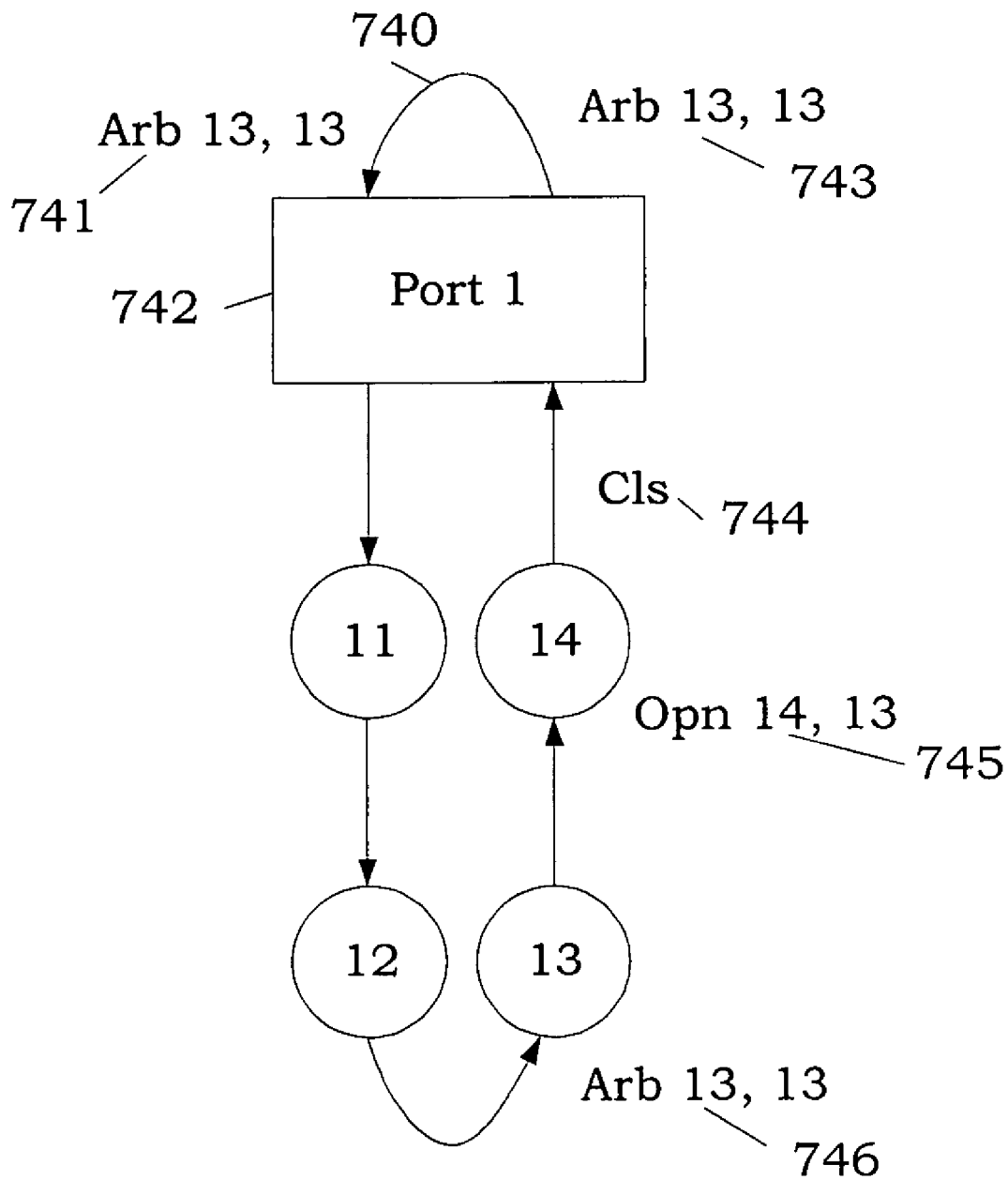
FIG. 11c is a diagram of communicating devices on an Arbitrated Loop attached to a Loop Switch.
Figure 11D:
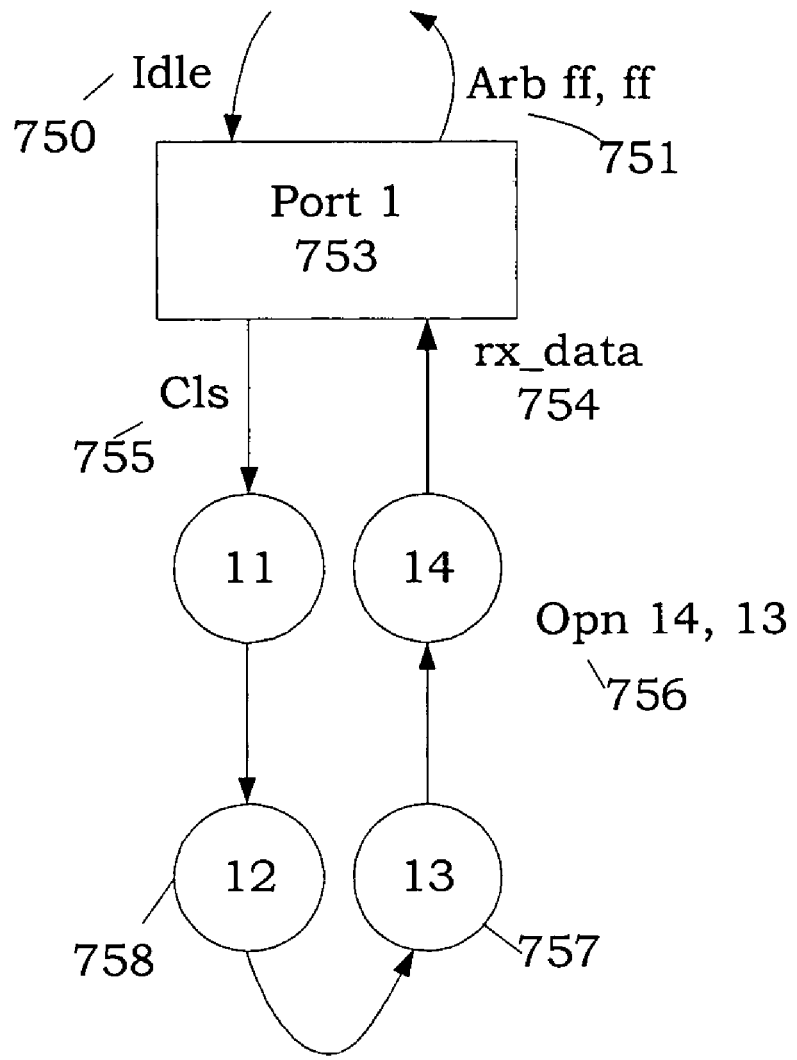

FIG. 11a, 11b, 11c, and 11c, illustrates this case. Node 11 723 initially arbitrates, connects and sources an OPN 724 to node 12 725. While node 11 723 is open to node 12 725, node 13 arbitrates. When the tenancy between node 11 and node 12 completes, node 13 receives its ARB and sources an OPN 745 to node 14. The tenancy between node 13 and node 14 occurs without any intervention.

All nodes on any port could source one OPN during a single connection. At that point, blocking the ARBf0s at the port receiver insures the loop access window is not reset. Provided all nodes are operating "fairly", this mechanism guarantees that the port connection is broken, allowing access by other ports. The paths 720, 730, 740, 750 and 751 are internal to the Loop Switch.

5.7.2 Source and Destination Nodes on the Different Ports

When a connection is established as a result of ARBs being detected at the port receiver and an OPN is sent to a device that is on a different port, the OPN is detected at the port receiver.

5.7.2.1 Destination Port not Connected

Figure 12A:
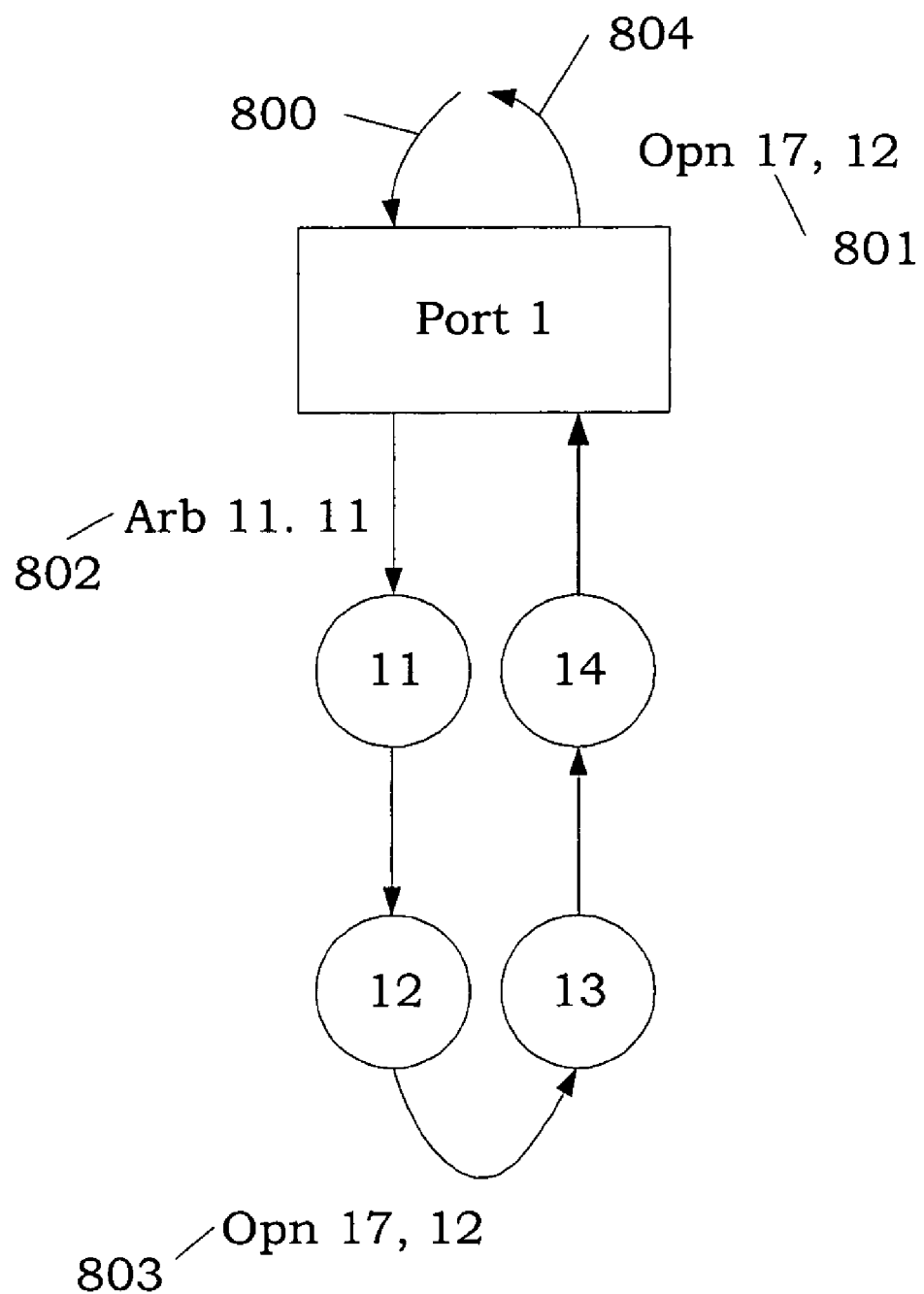
FIG. 12a is a diagram of communicating devices on an Arbitrated Loop attached to a Loop Switch.
Figure 12B:
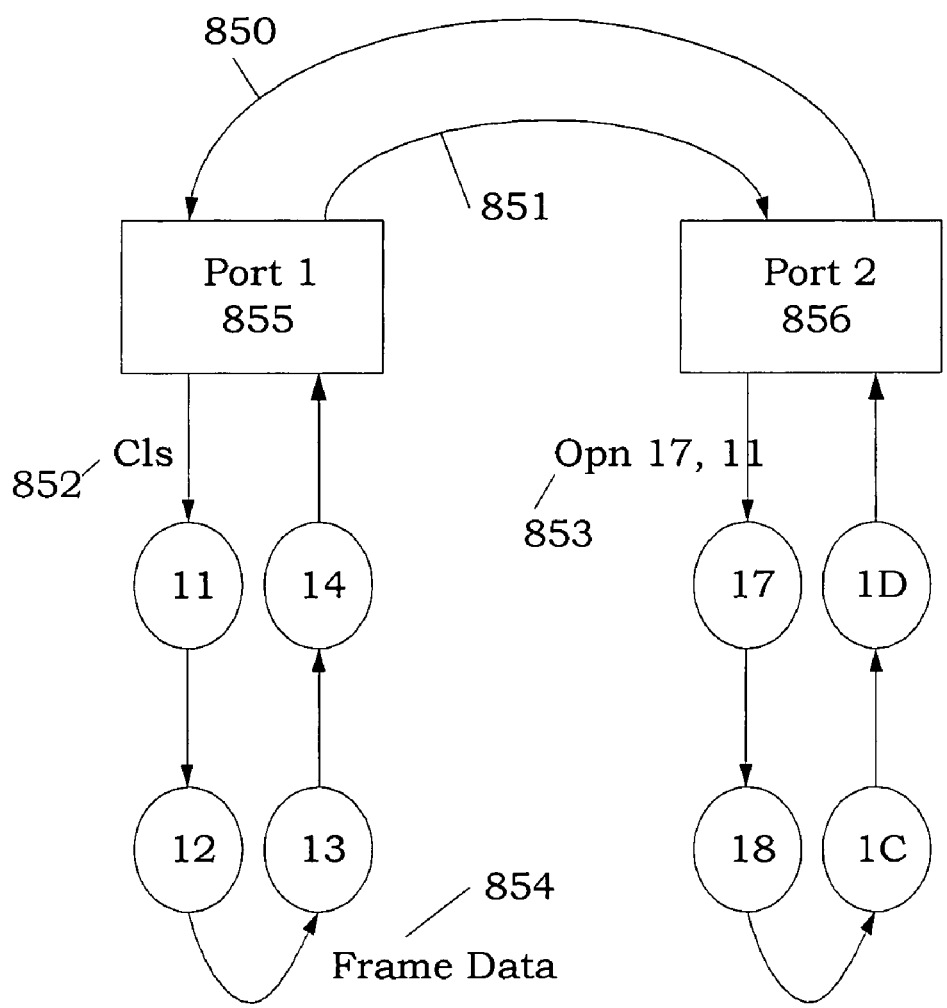
FIG. 12b is a diagram of communicating devices on an Arbitrated Loop attached to a Loop Switch.
Figure 12C:
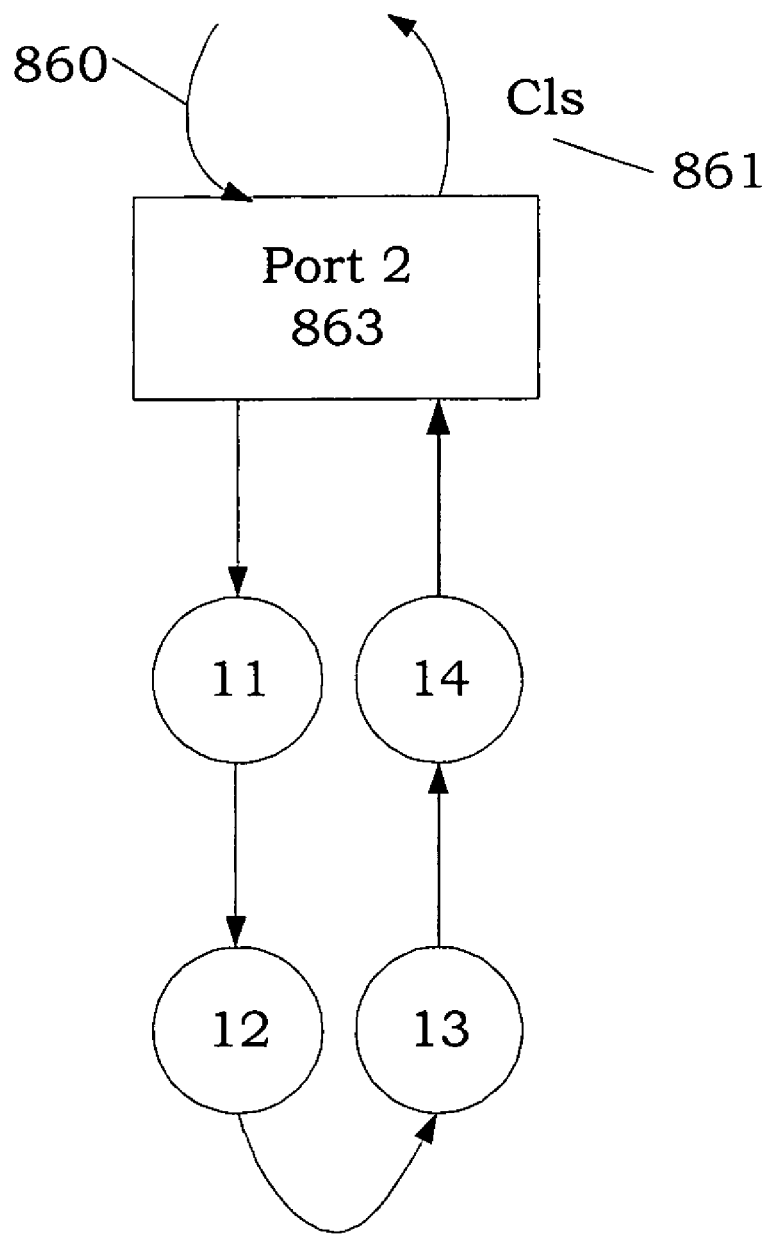
FIG. 12c is a diagram of communicating devices on an Arbitrated Loop attached to a Loop Switch.

When the OPN is detected, the port receiver stores the OPN in an internal register FIG. 12a, 801, supplies the destination ALPA to the router, and asserts opn_connect_req signal, FIG. 8 426. The router breaks the port connection established when the ARB was passed and performs a port lookup of the ALPA provided. If the ALPA is on a different port 856 than the port sourcing the OPN 855, the router connects the source and destination ports 850, 851, asserts the src_connect signal, FIG. 8, 425 to the port sourcing the OPN 855 and asserts_the dest_connect signal FIG. 8 424 to the destination port 856. The port receiver logic in this case replaces all ARBs with ARBff. This prevents any additional tenancies during this connection. The receipt of a CLS on both the port receiver and the port transmitter determines the end of this tenancy. When both of these conditions are met, the connection between the ports is broken. FIG. 12a, 12b and 12c illustrates this scenario. Paths 800, 804, 850, 851, 860, 861 are internal to the Loop Switch.

5.7.2.2 Destination Port Connected

Figure 13A:
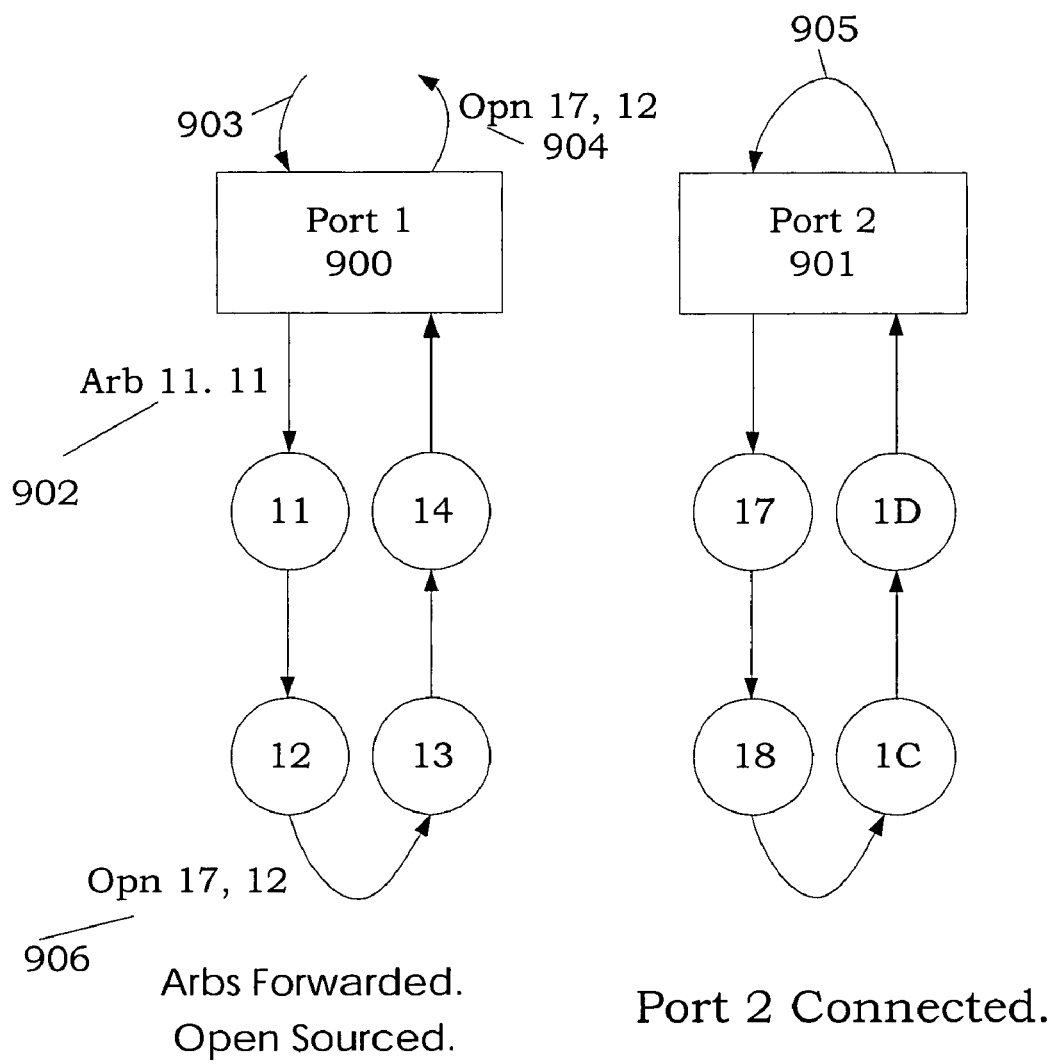
FIG. 13a is a diagram of communicating devices on an Arbitrated Loop attached to a Loop Switch.
Figure 13B:
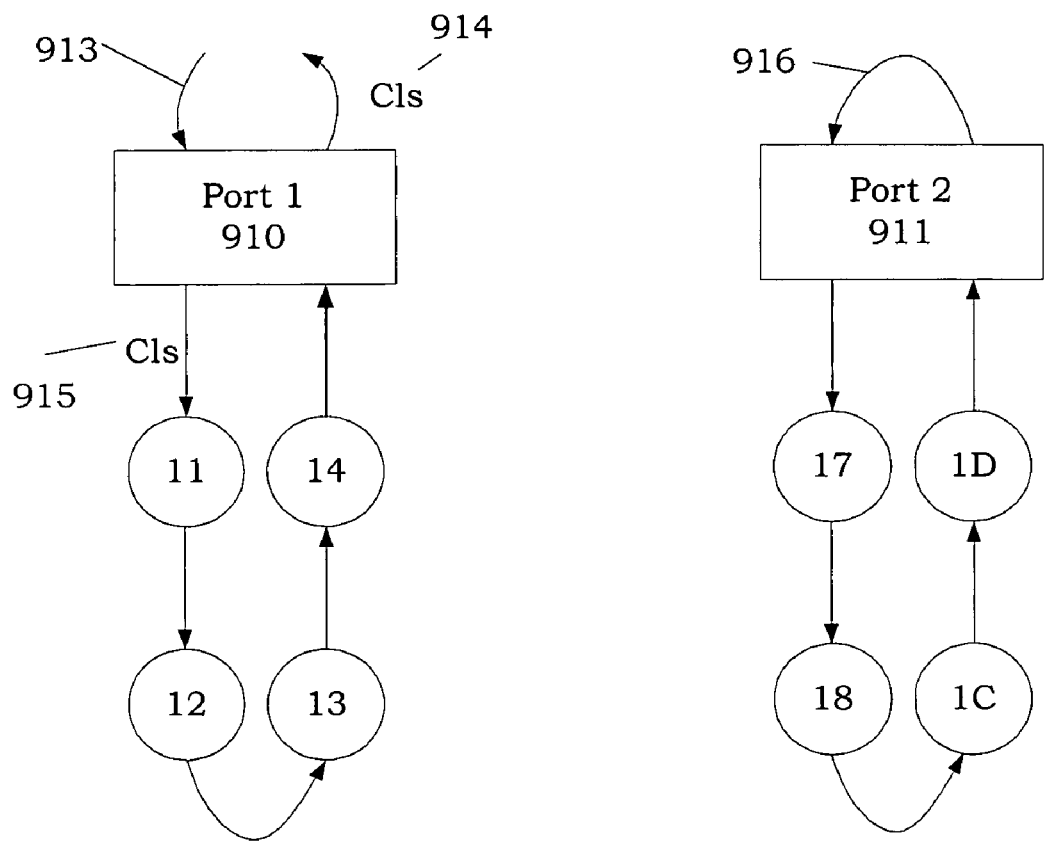
FIG. 13b is a diagram of communicating devices on an Arbitrated Loop attached to a Loop Switch.

As illustrated in FIGS. 13a and 13b, if a port 900 requests a connection to a destination port 901 that is already connected 905, port logic waits for the connection to be established. The node that sourced the open may decide to source a close. If this occurs, the opn_connect_req, FIG. 8 426 is deasserted and the port transmitter forwards the close back 915 to the device that sourced the open.

5.7.3 Simultaneous Open Connect Requests

Figure 14A:
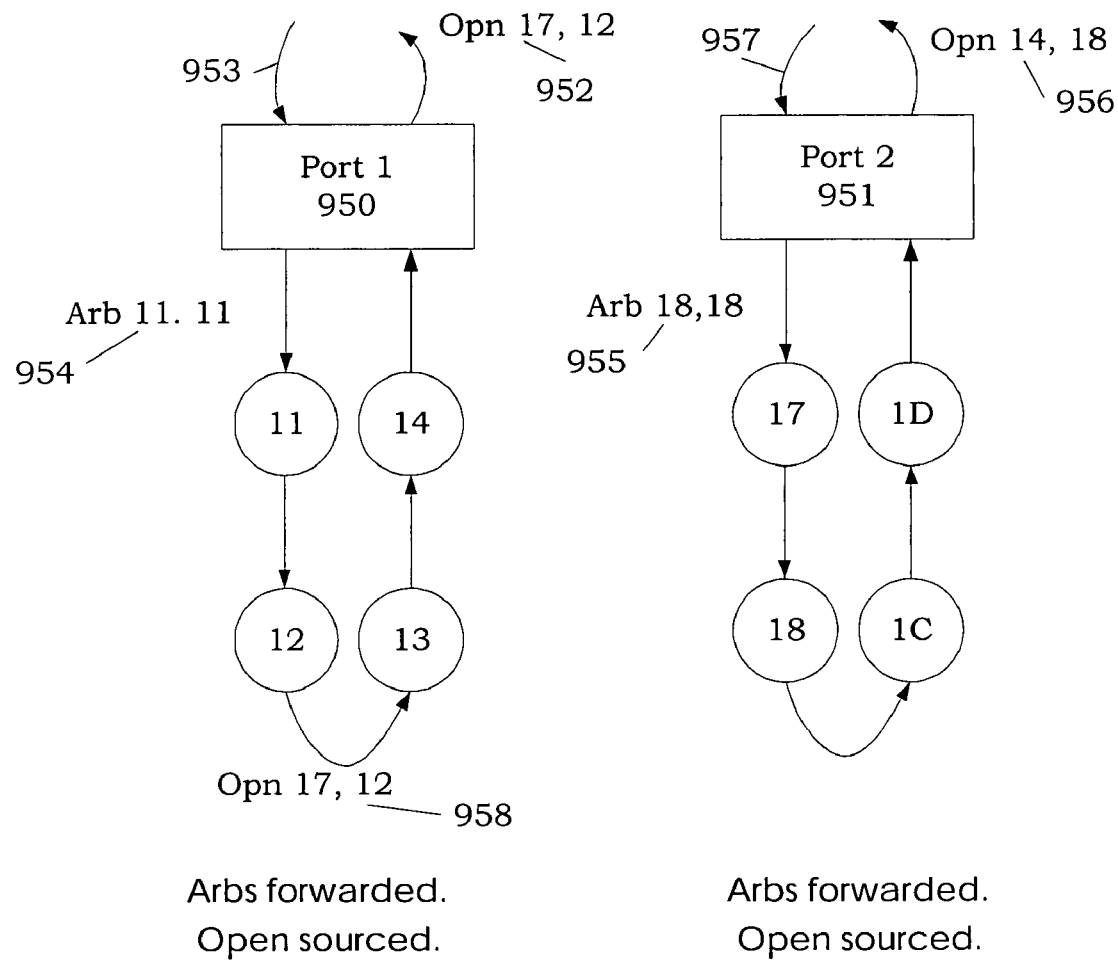
FIG. 14a is a diagram of communicating devices on an Arbitrated Loop attached to a Loop Switch.
Figure 14B:
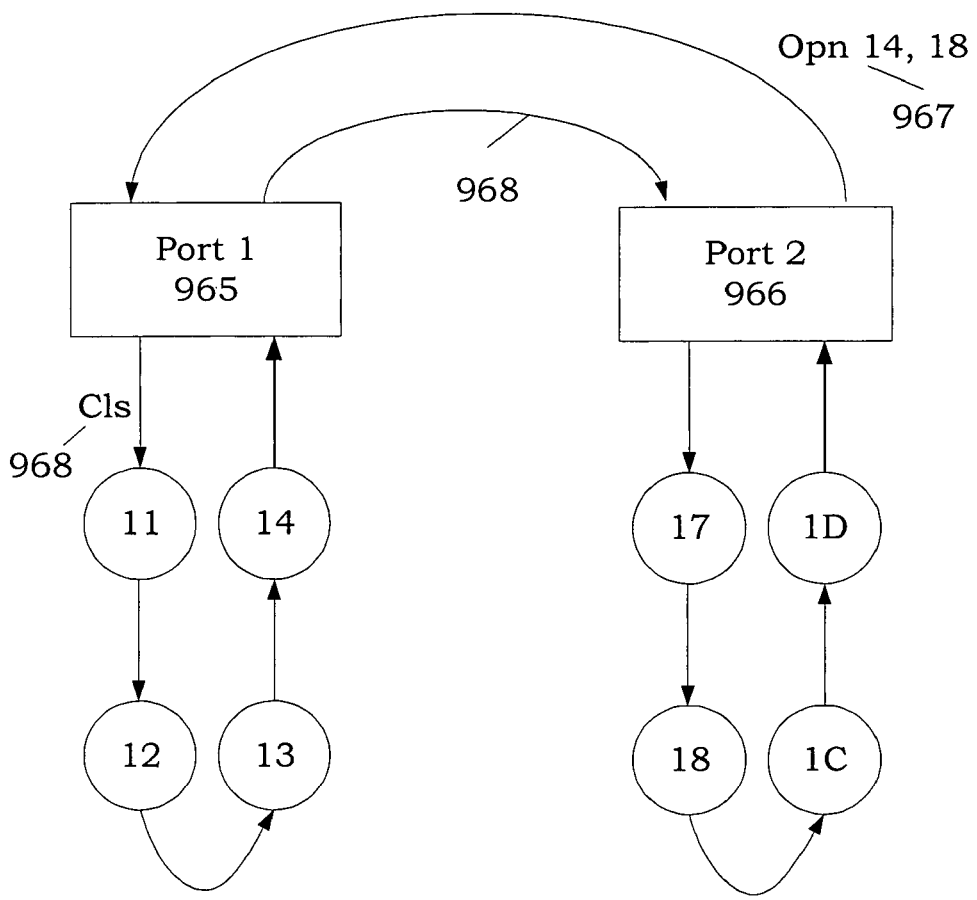
FIG. 14b is a diagram of communicating devices on an Arbitrated Loop attached to a Loop Switch.
Figure 15A:
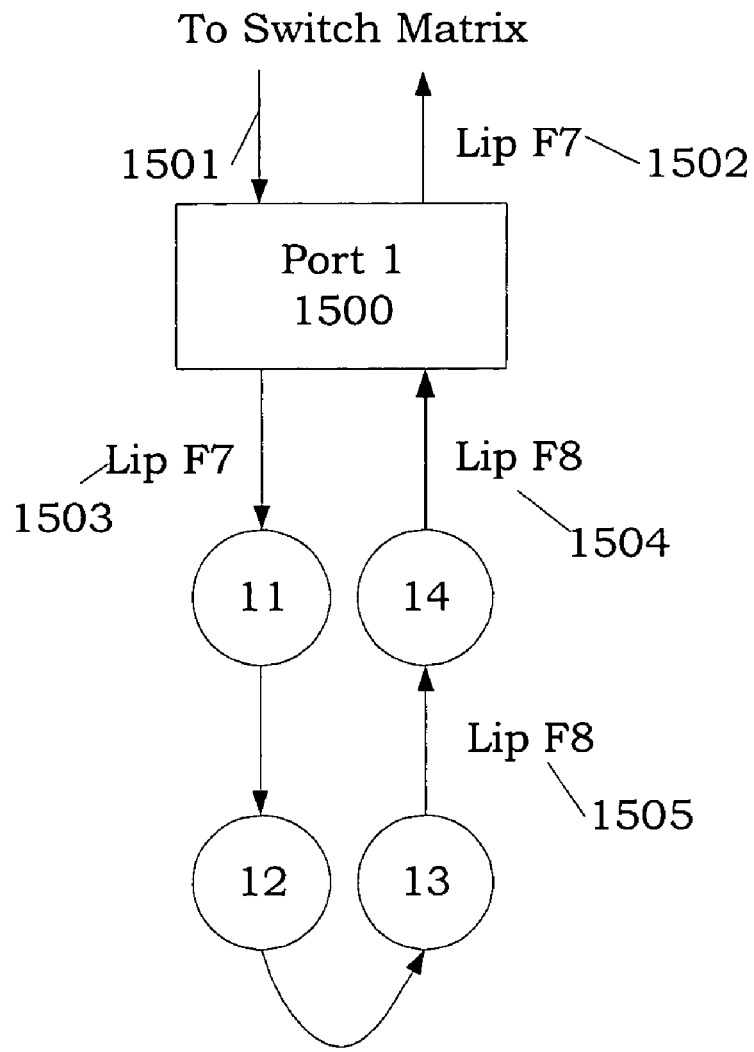
FIG. 15a is a diagram of communicating devices on an Arbitrated Loop attached to a Loop Switch.
Figure 15B:
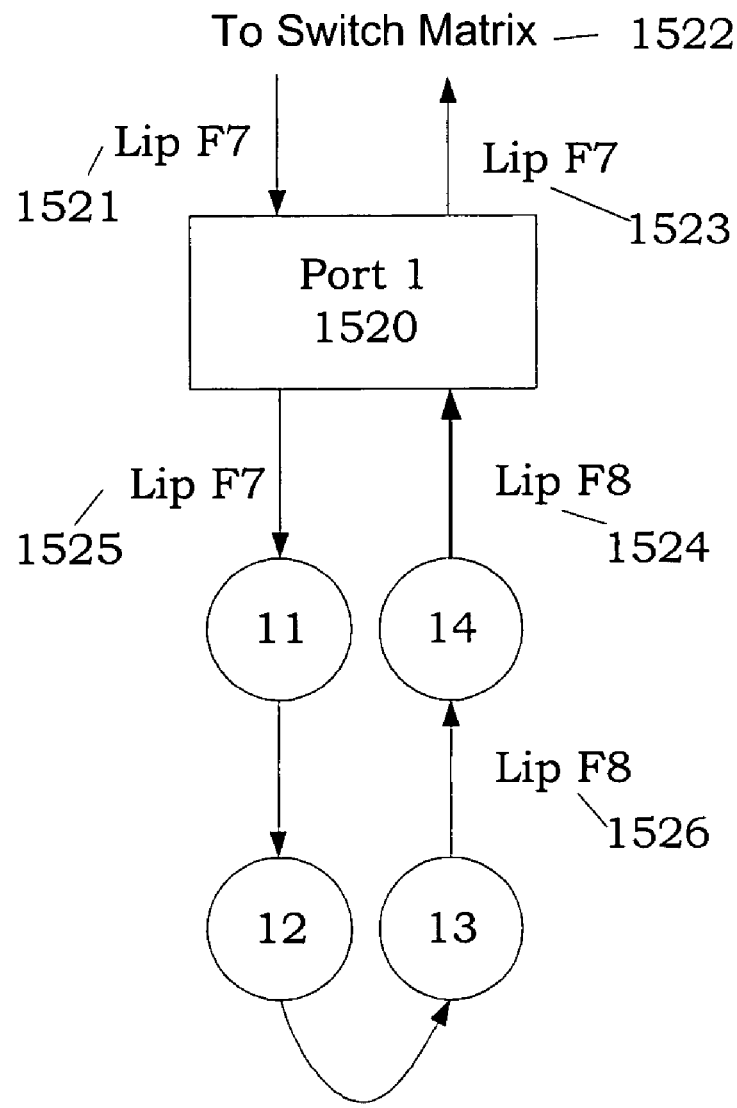
FIG. 15b is a diagram of communicating devices on an Arbitrated Loop attached to a Loop Switch.
Figure 15C:
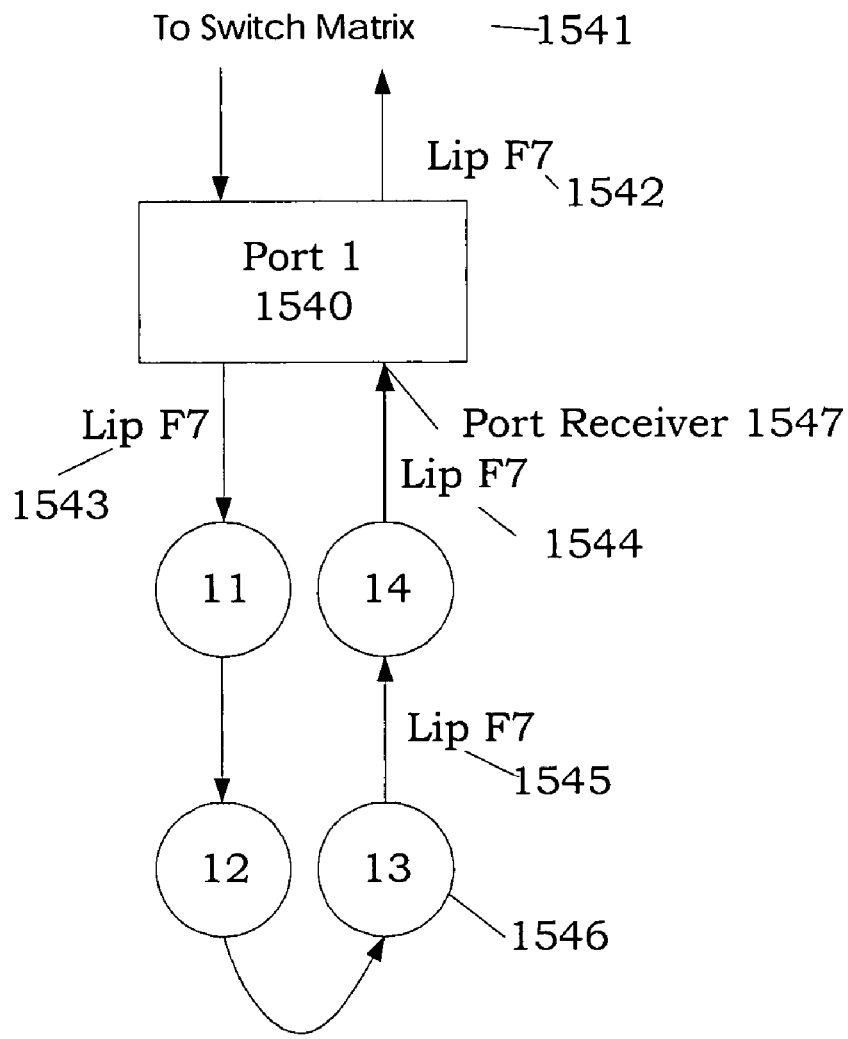
FIG. 15c is a diagram of communicating devices on an Arbitrated Loop attached to a Loop Switch.
Figure 15D:
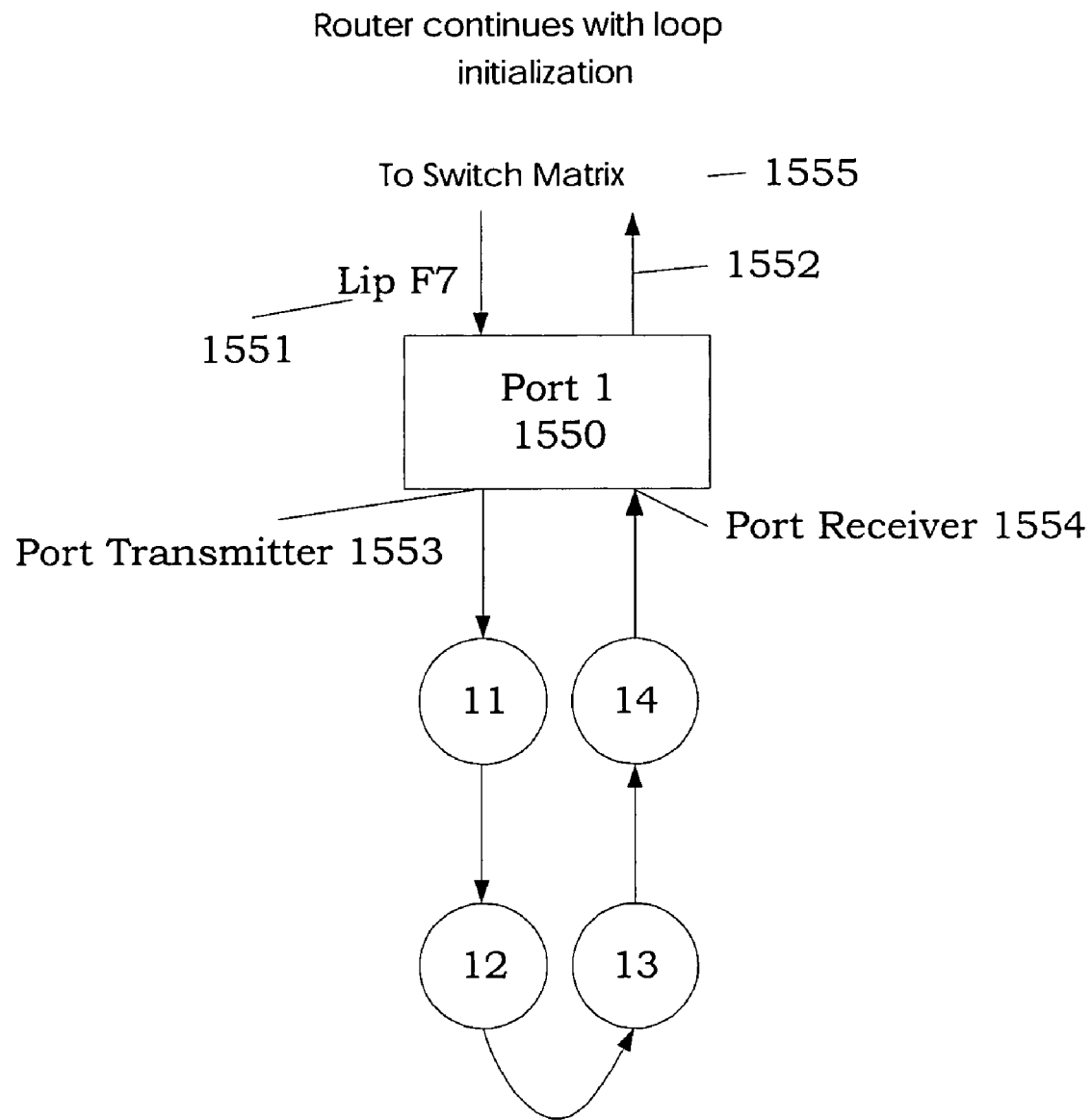
FIG. 15d is a diagram of communicating devices on an Arbitrated Loop attached to a Loop Switch.

As shown in FIGS. 14a and 14b, if port 1 950 requests a connection to port 2 951 at the same time port 2 951 requests a connection to port 1 950, a priority scheme is used which insures that all ports are serviced fairly. (This priority scheme is discussed in more detail in the section that describes port fairness.) Once the winning 967 and losing 958 requests have been established through the priority comparison, the losing source port 950 that is to be opened as a destination port sends a CLS 968 from its port transmitter prior to forwarding the winning OPN. The device that sent the losing OPN must later re-arbitrate and send the OPN again in order to complete its transfer. The paths 953, 952, 957, 956, 968, 967 are internal to the Loop Switch.

In the general case where both the highest priority source loop and its destination loop both have an OPN request being generated, the lower priority port always receives a CLS. However, if a lower priority port has an OPN request asserted and does not need to be closed to service the highest priority OPN request from another port, the lower priority port remains opened until its OPN request is serviced at a later time.

5.7.4 OPN Sent to Non-Existent Device

If an OPN is sent out from a destination port on the Loop Switch and is returned back to the Loop Switch destination port, the OPN is sent back out from the source port so that the source device can detect the error and respond appropriately. This condition may occur when access is attempted to invalid devices that have not yet been identified as such in the ALPA map. When this condition occurs Loop Switch disconnects the connected ports when a CLS is sent around the loop.

5.7.5 R RDYs Following OPNs

When an OPN is detected at the port receiver, in addition to saving the open in an internal register, the port receiver must count any R_RDYs that are detected but not forwarded. Up to 255 R_RDYs can be counted, stored, and later resent. When a connection is provided, the port receiver must send the R_RDYS after the OPN is sent. This is accomplished by replacing every third fill word after the OPN with an R_RDY and decrementing the R_RDY counter. This continues until the counter is 0. Note that the R_RDY forwarding has to tolerate a frame arriving before they are all sent. In this case, the remaining R_RDYs are sent after the frame is forwarded.

Careful consideration has been taken to guarantee that at least two fill words are sent before and after each R_RDY. This is difficult since frames can arrive at the output of the elasticity FIFO at any time. Therefore, the R_RDY retransmit logic is spread across the corresponding receive and transmit data paths to guarantee sufficient lookahead capability to meet the ordered set spacing requirement. Initially, as R_RDYs are counted and stored, the first R_RDYs to be resent are sent out of the counter. Once the counter has been fully decremented and all of the buffered R_RDYs have been sent out, all further R_RDYs are simply passed through without being buffered in the counter. From then on, the R_RDY source port is responsible for guaranteeing the minimum ordered set spacing.

5.7.6 Node Failure

Port logic always monitors the port receiver for LIPf8s, refer to FIG. 15a, 15b, 15c and 15d. Router logic, FIG. 4, 149 always monitors the lip_received signal from the ports 151, 152, 153, 154, 15, 156, 157, 158. If a port detects this primitive, the port receiver FIG. 15, 1554, 1547 replaces the LIPf8 1504, 1524 with LIPf7 1502, 1523. When the router logic detects the assertion of the lip_received signal 151, 152, 153, 154, 155, 156, 157, 158, it reconnects all active ports to the Initialize State—non-switched mode (note that this can happen in the middle of a frame or multiple frames and these are lost). When the port has forwarded 16 LIPs, it deasserts its port active signal. The router FIG. 4, 149 then instructs 181 the switch matrix 150 to bypass the port. The loop then reinitializes without the port with the node sourcing the LIPf8s present.

The port logic also sources LIPf7s 1503, 1525, 1543, at the port transmitter 1553 and continues to monitor the port receiver 1554. If the port receives LIPf7, the node that originally sourced the LIPf8 is now functional. The port then asserts its port active signal. The port is inserted back into the loop at this point. The port transmitter continues to source LIPf7 until it receives LIPf7 at the port transmitter. On receipt of LIPf7 at the port transmitter, the node stops sourcing LIPf7 at its port transmitter which allows initialization to complete.

5.7.7 Microprocessor Assisted Operation

The Loop Switch is designed to provide either hub emulation or switching (segmenting) operation without the assistance of a microprocessor, with a few exceptions. These exceptions are detailed below.

One type of processor interaction with Loop Switch might be needed during the device discovery phase. If discovery fails for any reason, Loop Switch signals the error in a status register and the microprocessor can read the cause for the error. At that time, the processor could force a re-initialization to try and recover from the error. This process is not required, but it might be useful to get Loop Switch to an improved performance level if these errors were common.

The processor can also be used together with the embedded Fibre Channel MAC to manually enter switching (segmenting) mode. In order to do this, the following steps must be taken. The port discovery disable bit in the router must be set in order to bypass the normal port discovery process. After each loop initialization cycle, which would be detected with interrupts in each port module to indicate that the loop has gone down and come back up again, the processor would assist in performing device discovery through the FC MAC. The processor would initialize the user match bits inside each port to detect the first OPN to be sent and then send out the OPN and see which of the ports actually see the OPN as it passes around the loop. When the OPN is not passed on from one port to the next, it is assumed that the device targeted by the OPN resides on the port just after the last port that saw the OPN. The processor then proceeds to step through all OPN values in the same way and determine the information it needs to write into the ALPA map. Following the processor device discovery, it then must set the ARB blocking bit in the router. This holds off all loop traffic once any existing loop tenancies have been completed and allows a smooth transition into switching mode. The processor then loads the ALPA map with port values for each of the ALPAs. Next, the processor sets a bit in the router to force Loop Switch into switching mode, and then resets the ARB blocking bit, also in the router. Resetting the ARB blocking bit completes the manual entry into switching mode and allows normal traffic to resume.

5.8 Cascading

Cascading refers to interconnecting Loop Switches together. In the following sections the Loop Switches are contained in root switches, see FIG. 16b 919 and FIG. 16c 944 and SBODS, see FIG. 16a 1906, 1908, 1910, 1912, FIG. 16b, 1924, 1926, 1928, 1930 and FIG. 16c, 1950, 1947. One implementation of a root switch is with a Loop Switch ASIC on a printed circuit board with a microprocessor and support logic, a power supply, all within a single chassis. This is a Loop Switch contained in a stand-alone switch box. Another deployment of Loop Switches is within a hard disk drive storage enclosure, i.e., a JBOD. When the Loop Switch is contained on a printer circuit board and plugged into the backplane or mid-plane of a hard disk drive storage enclosure it becomes a switched bunch of disks or SBOD. Each disk is directly connected to the Loop Switch.

5.8.1 Single Cascade

5.8.1.1 Hub Emulation Mode

In order to provide additional connectivity, two Loop Switches may be cascaded in hub emulation mode. No special considerations need to be made for a single Loop Switch to Loop Switch hub emulation cascade.

5.8.1.2 Switching (Segmenting) Mode

When a Loop Switch is cascaded in switching mode, there are special considerations that are needed to guarantee correct operation. If one cascaded Loop Switch is operating in the switching mode and the other is operating in the hub emulation mode then the IDLE replacement with ARBff scheme used to detect a busy loop can be used as previously described and there are no operational issues. The Loop Switch in switching mode can blindly send OPNs to destination loops without arbitrating since the port determines through sending and receiving ARBff if the loop is busy. But when two Loop Switches in switching mode are cascaded, both of the connected Loop Switch ports would send and receive ARBff and could then send OPNs at any time under the normal (non-cascade) rules of operation. If both sides were to send OPN at approximately the same time, then a conflict would occur since both sides of the connection would assume full control over the cascade loop connection. In order to avoid this contention, cascaded ports on Loop Switches must behave differently than non-cascaded Loop Switch ports.

Figure 16A:
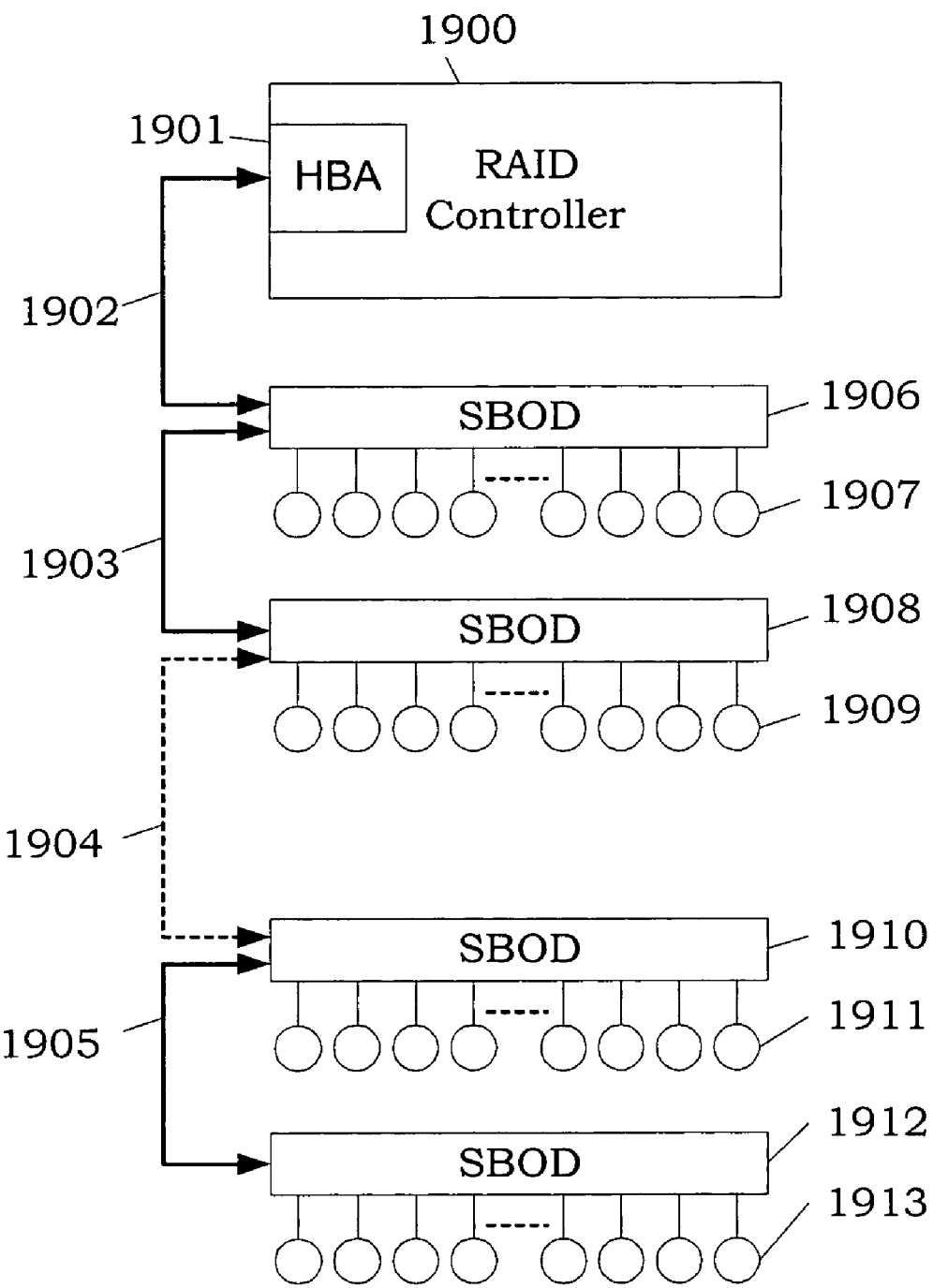
FIG. 16a is a diagram of a string cascade of Loop Switches.
Figure 16B:
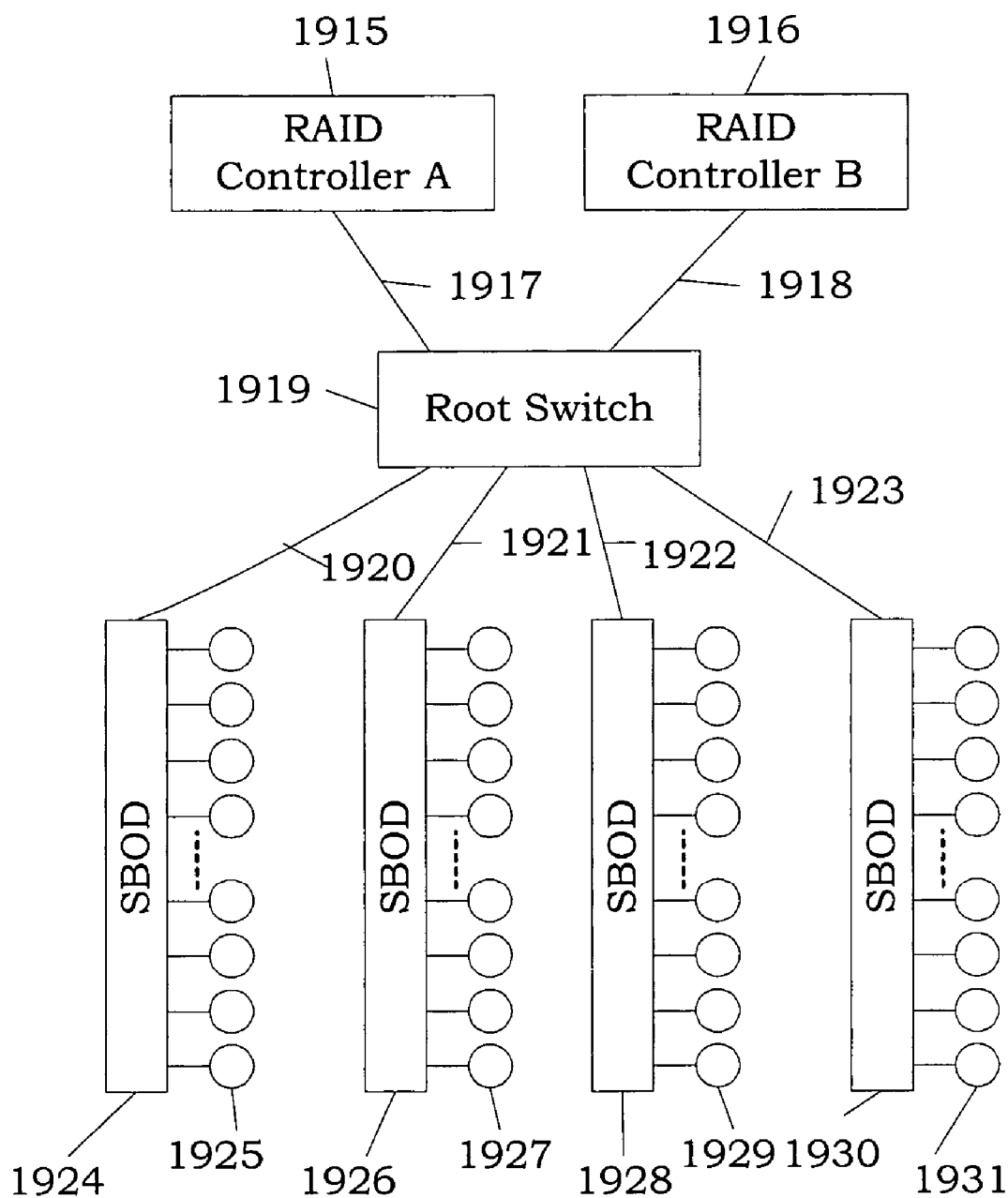
FIG. 16b is a diagram of a tree cascade of Loop Switches.
Figure 16C:
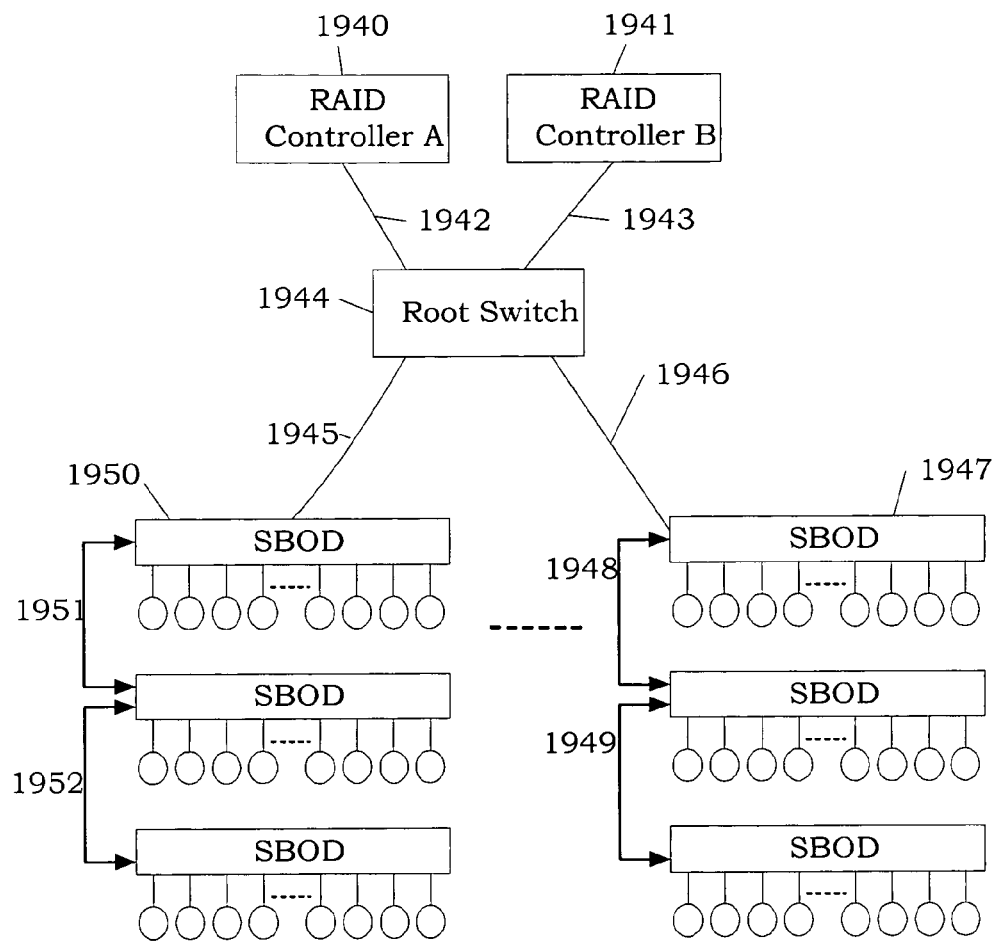
FIG. 16c is a diagram of a tree of strings cascade of Loop Switches.

When two Loop Switches in switching mode are cascaded, one of two types of cascade arbitration configuration must be set up: tree cascade, FIG. 16b or string cascade, FIG. 16a. There are additional deployments of Loop Switches that combine the tree and string cascade configurations. One of these deployments is a tree of strings cascade, see FIG. 16c.

A tree cascade interconnects Loop Switches 1919, 1924, 1926, 1928, 1930 using one in a central or root position, 1919 and the rest to ports on that root switch 1920, 1921, 1922, 1923. In a tree cascade, both ports on the cascade connection 1920, 1921, 1922, 1923 do not rely on the ARBff propagation characteristics to determine if a port is busy. Instead, they actively arbitrate for the loop between the cascaded ports 1920, 1921, 1922, 1923 and determine a winner before sending an OPN to the other side, for example 1917, 1918. The ARBx ALPA value sent out on the cascade port is the same ALPA value as the one received in the ARBx back at the port where the OPN was sourced. The cascade port arbitrates according to the normal rules of FC-AL loop protocol. However, the standard ARB(f0) arbitration fairness scheme (FCAL Access Fairness Algorithm) does not apply to this situation. The reason for this is that the arbitration loser has to be disconnected to yield access to the winning side. Therefore, the loser does not continue to arbitrate and cannot gain access until the winning connection is removed. At that point, the next winner is determined by two factors: (1) time of arrival of arbitration request, and (2) priority of the source ALPA value. This arbitration occurs only between two directly connected Loop Switches 1920, 1921, 1922, 1923 and has no effect on Loop Switches on either side of the two Loop Switches arbitrating for the cascade.

In a string cascade, FIG. 16a, each Loop Switch 1906, 1908, 1910, 1912 is treated as a logical device on a virtual loop. Arbitration must win control of the entire string of Loop Switches 1902, 1903, 1904, 1905 to gain control of the cascade. The arbitration winner is determined solely by the priority of the source ALPA as in a standard arbitrated loop. To gain control of the string cascade, a Loop Switch places the ARBx ALPA of a device requesting access on the string cascade loop and waits for the ARBx ALPA to be received back. If a higher priority ALPA is received before the Loop Switch receives it's own ALPA, the Loop Switch forwards on the higher priority ARBx ALPA. A lower priority ARBx ALPA or an ARBx ALPA received after the Loop Switch receives it's own ARB is blocked as in a standard loop. Once a Loop Switch determines it has won control of the cascade string loop, it then places it's OPN on the loop and makes the desired connection. Once the connection is closed down, the Loop Switch sends an ARB(f0) around the loop to indicate the loop is free. If the originating Loop Switch receives the ARB(f0) back, it determines the loop is free and sends IDLEs around the loop. If the loop is not free, the Loop Switch forwards on the received ARBx ALPA ordered set. Each Loop Switch has only one turn on the loop per IDLE reset period to ensure Loop Switch fairness.

Both of these approaches support the Fibre Channel loop protocol and any non-Vixel Loop Switch connected to a "cascaded" port behaves as a normal device in the manner it uses to gain control of the destination loop. This allows the Loop Switch to interoperate with non-Vixel devices attached to cascade ports.

5.8.2 Duplicate Cascades—Trunking

5.8.2.1 Hub Emulation Mode

In hub emulation mode, if two identical remote serial numbers are captured on two different ports then the lower numbered device is designated as the master and the other is the slave. The master Loop Switch in hub emulation mode assigns one cascade port to be the primary cascade by writing a bit in the port control registers. The remaining cascade ports on the master Loop Switch in hub emulation mode are marked as duplicates in the port control registers. Each port designated as a duplicate port is bypassed. This guarantees that if a duplicate port on a Loop Switch in hub emulation mode is connected to a port on a Loop Switch in switching mode, the switching mode Loop Switch does not try to use the connection. This is required since simultaneous activation of duplicate cascade ports on Loop Switches in hub emulation mode results in an invalid loop topology.

5.8.2.2 Switching (Segmenting) Mode (Trunking)

Figure 27:
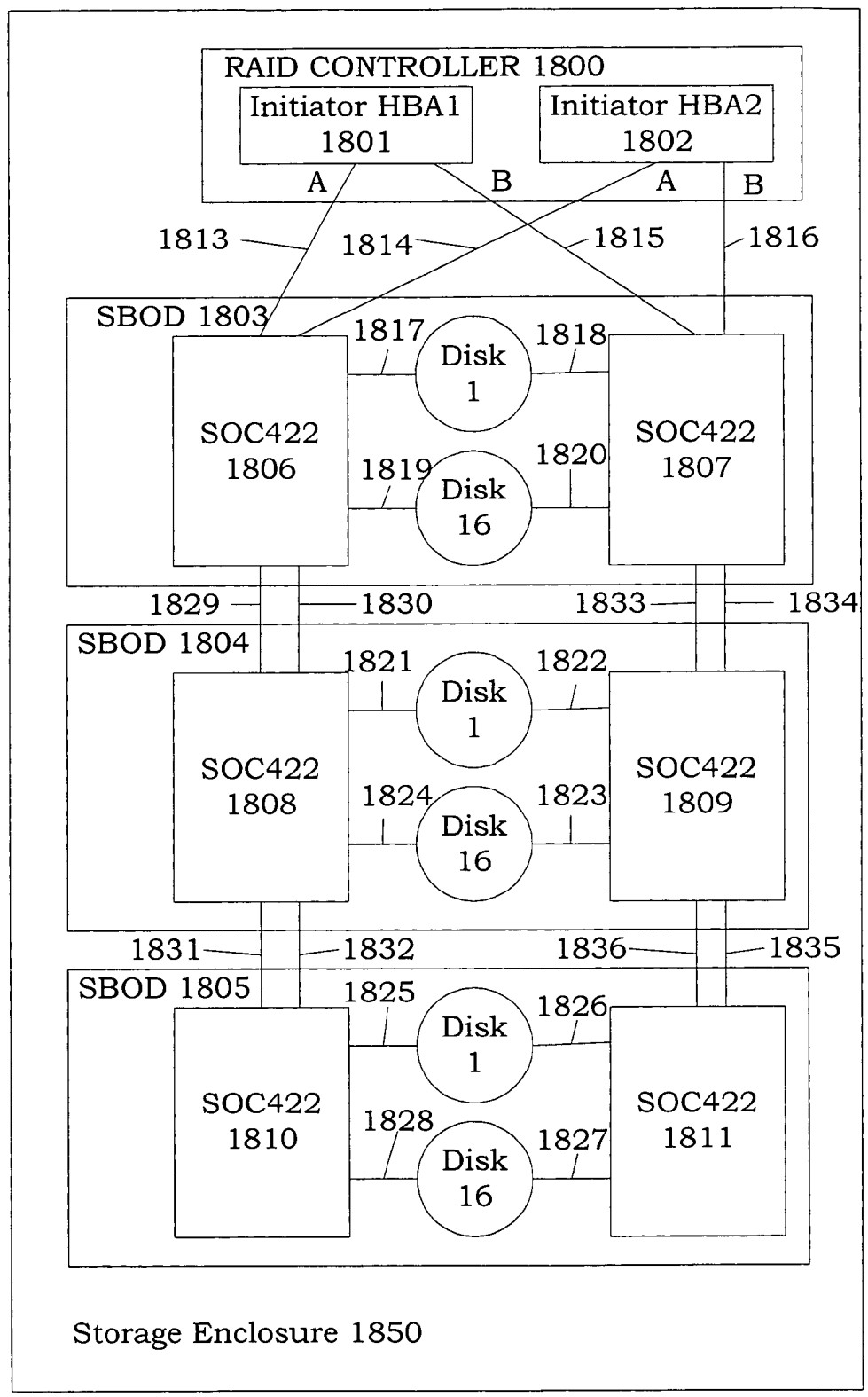
FIG. 27 shows a string of loop switches within a storage enclosure.

Multiple duplicate cascades between Loop Switches in switching mode are used to increase throughput between adjacent Loop Switches and can be simultaneously activated without creating an invalid loop topology. Load balancing between the cascades on an initiator basis is supported, see FIG. 27. In a system with two initiators and a primary/duplicate cascade pair each initiator can have a logical cascade chain dedicated to it providing approximately 2× the throughput of a single cascade system. For example as shown in FIG. 27 HBA1 1801 has a full bandwidth path 1813, 1829, 1831 thru the string of SBODs 1803, 1804, 1805. Initiator HBA2 1802 also has a full bandwidth path 1814, 1830, 1832 thru the string of SBODs 1803, 1804, 1805. Simultaneous communication between HBA1 and a disk in an SBOD and HBA2 and a disk in an SBOD can occur. For example, HBA1 can communicate with Disk 1 1817 in SBOD 1803 using the path 1813, 1817 at the same time HBA2 1802 can communicate with Disk 16 1819 in SBOD 1803 using the path 1814, 1819. The number of duplicate cascades in a trunk is not limited by the hardware. A trunk group could be defined as 21 trunks in a 22 port ASIC if so desired (1 port must not be assigned to the trunk to provide the other side of the connection). If more initiators than cascades are added, throughput is affected based on the relative traffic assigned to each trunk within a group.

5.8.2.3 Initiator Detection

State machines inside the Loop Switch ASIC determine which initiators ALPAs are present on the loop by monitoring any Fibre Channel frame such as Port Login (PLOGI), SCSI FCP or PRLI frames based on the setting of a bit in the Router Control Register. A state machine resides in each port to allow for the detection of simultaneous Response Frames. Logic in the router core of the Loop Switch then collects the initiator ALPAs and stores them in a table in the router. This table has a bit assigned for each ALPA and a '1' indicates that ALPA has been identified as an initiator. The table format is identical to the ALPA mapping in LixA (LixA=LISA, LIHA, LIFA, etc.) frames.

Hardware initiator detection can be disabled globally via a disable bit in the Router Control Register or individually by the Software Override of Initiators Registers located in the Router Registers. The Software Override bits are XOR'ed with the Hardware Detected Initiator Bits thus allowing the inclusion of initiators that weren't detected for some reason or the exclusion of initiators that were detected.

5.8.2.4 Initiator Load Balancing

With the initiator ALPA table in the router, the microprocessor has all the information it requires to load balance the initiators across the groups of trunks connected to the Loop Switch. The software determines which initiators this Loop Switch controls as the load-balancing master by cross-referencing three pieces of information. The information includes 1) the initiators in the system, 2) which port each ALPA resides on and 3) which ports are primary and duplicate cascades and how they are grouped together. Any initiator that is located on a port that is not part of a trunk group is determined to belong to this Loop Switch for purposes of load balancing. Additionally, if an initiator is detected on one trunk group, the software must assign that initiator to any other trunk groups on that Loop Switch. If cascade ports are strung together however, the hardware automatically follows the string path.

Figure 17:
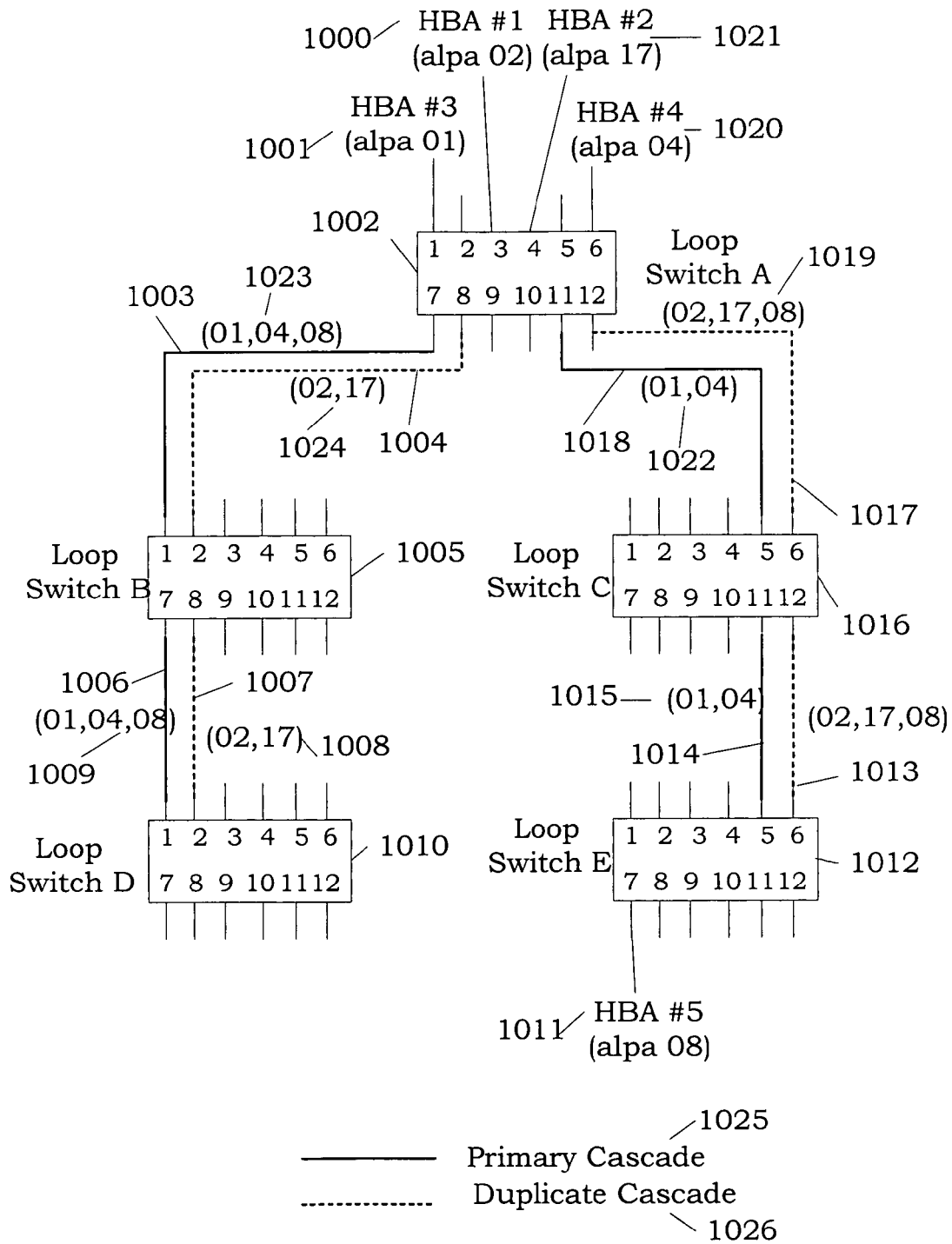
FIG. 17 is a diagram of a duplicate tree cascade of Loop Switches.

Once the software has determined the initiators it needs to control for load balancing, it initializes the Trunk Grouping table located in the Router registers. Each initiator should have one entry in the Trunk Grouping for each set of Primary/Duplicate(s) Cascades. Assuming a desired configuration and traffic flow, see FIG. 17, the Trunk Groupings would be as follows:

| Loop Switch | Trunkset Primary Port | Assigned Trunk Port | Initiator's ALPA |
|---|---|---|---|
| A 1002 | 7 1003 | 7 | 01 |
| A | 7 | 8 | 02 |
| A | 7 | 7 | 04 |
| A | 7 | 8 | 17 |
| A | 11 1018 | 11 | 01 |
| A | 11 | 12 1017 | 02 |
| A | 11 | 11 | 04 |
| A | 11 | 12 | 17 |
| A | 7 1003 | 7 | 08 |
| E 1012 | 5 1014 | 6 1013 | 08 1011 |

Loop Switch A 1002 has assigned all the local initiators 1000, 1001, 1020, 1021 to specific trunks. The initiator that comes in on the tree cascade group associated with port 11 1018 is also assigned to a trunk on the cascade group associated with port 7 1003. Loop Switch E 1012 has one local initiator 1011 that it is the master of and must assign.

Loop Switches B 1005, C 1016, D 1010 are not masters and will auto-learn which trunk to send each connection based on the path the previous OPN from each initiator reached the Loop Switch. Alternatively, the connections may be learned from the source and destination ID within each frame. For this example, it is assumed that Loop Switches B 1005 and C 1016 have string associations connecting the primary 1018, 1003 and secondary trunks 1004, 1017 and the connections will then follow the string as transactions pass through the Loop Switches. If the cascade connections in Loop Switches B 1005 and C 1016 are not defined as strings, initiators would have to be assigned to the cascade trunks 1003, 1004, 1006, 1007, 1018, 1019, 1014, 1013 to maintain the desired load balancing. In Loop Switch B 1005, ALPAs 01, 04 and 08 1023 would have to be assigned to port 7 and ALPAs 02 and 17 1024 would be assigned to port 8. Likewise, in Loop Switch C, ALPAs 01 and 04 1022 would be assigned to port 11 1018 and ALPAs 02, 17 and 08 1019 would be assigned to port 12 1017.

If one of the initiator's ALPA's is not loaded into the Trunk Grouping Table in the Router Register map, that initiator's traffic defaults to the primary port 1003, 1006, 1014, 1018. To extend the trunk assignment of initiators to support more initiators that can be held in the table, omit entries that assign an initiator to a primary port.

To minimize the possibility of lockup cases where OPNs between the same 2 devices pass on different trunks two rules override the trunk assignments that are either explicity set in the Grouping Table or learned by monitoring OPNs from initiators.

1. Initiator-to-initiator traffic always goes on the primary trunk.
2. Half-duplex traffic always goes on the primary trunk.

5.8.3 Target Load Balancing

In a single initiator system, the software initiator override table and the rule that initiator-to-initiator traffic always goes on the primary link provides a mechanism to define a basic target load-balancing mechanism for a 2 trunk cascade connection. All "true" initiator traffic is assigned to the duplicate cascade and half of the targets are defined as initiators. In this case traffic will be split between the two trunks. All traffic between the "true" initiator and software assigned initiators will be on the primary link. All other traffic will be on the duplicate link.

5.9 Port Fairness

The Arbitrated Loop specification has an algorithm for loop fairness called the Access Fairness Algorithm. As is well known in the FC_AL art (see Robert W. Kembel *Arbitrated Loop* 1997 Connectivity Solutions) a device is required to arbitrate for the loop before sending an open (OPN) request. After the arbitration (ARB) cycle has gone around the loop and the device has won access to the loop, the device is then not allowed to arbitrate again until an idle (IDLE) is received. The winning port replaces any ARB (x) it receives from another port trying to win the loop with the fill word ARB (F0). If the winning port receives its own ARB (F0) back then the winning port knows that no other port is ARBing for the loop. In this case the winning port sends around the fill word IDLE. This fill word, when received by the other ports on the loop allows those ports to set their access capability to TRUE. This, in turn, permits a port that was earlier prohibited from access to the loop because other lower priority ports had not had their turn yet, to again arbitrate for control of the loop. If, on the other hand, there are other pending devices that desire access to the loop while the winning port is controlling the loop and sending out the ARB (F0) fill word then these ports discard the ARB (F0) and substitute their own port address. The controlling port now sees an ARB (y) returning and doesn't send the reset IDLE word but instead continues to send the ARB (F0) around. When the controlling port is finished with the loop it then allows the ARB (y) for the highest priority pending port to pass and when the "y" port when it receives its ARB (y) back it can now take control of the loop.

5.9.1 Single Loop Switch Fairness

As discussed in the section describing switching or segmenting operation, IDLEs are replaced by ARBff for the purpose of establishing port fairness at the loop level. But this differs from the standardized case of ARBff replacement in that three IDLEs are not allowed to pass prior to the ARBff substitution. The idle blocking at the Loop Switch port guarantees that each node device on a loop has had a chance to gain control of that loop and the access window is not reset immediately. The Loop Switch first allows another port to connect to the previously busy port before a device on the busy port can initiate another connection through the router. The idle blocking operation can be modified through a register write to the blocking ALPA register so that an ALPA other than 0xFF is used in case there are any interoperability issues associated with using ARBff.

If a fixed priority scheme that assigned fixed priority values to each port were used to determine which OPN requests were serviced first, the lower priority Loop Switch ports could suffer from degraded throughput and might eventually starve for data. To observe this condition, consider the case where 3 ports (port 1, port 2, and port 3) are continually accessing a fourth port (port 4). Ports 1 and 2, having higher priority than port 3, could alternately gain access to port 4 while preventing port 3 from ever acquiring access. To prevent this, an ordered list of port access is maintained. This list is used to determine access priority when requests are made from multiple ports to determine what port to service first. Whenever a port is granted a connection due to the receipt of an OPN, it is moved to the bottom of the list and the lower priority ports are moved up toward the top of the list. If two ports are trying to access each other, the port with the lower priority is sent a CLS, allowing the port with higher priority to make a connection.

5.9.2 Multiple Loop Switch System Impacts on Fairness

The rotating priority scheme described in the paragraph above is reasonably sufficient for a single Loop Switch system but may not provide adequate fairness for multiple Loop Switch systems. Multiple Loop Switch systems are interconnected by configuring ports as either a "tree", FIG. 16*b* or "string", FIG. 16*a* cascade. If a port configured as a cascade port has a pending request that collides with a pending request from a port configured as a device, the first-come, first-served rotating priority may not be the best solution for system performance. A pending OPN request from a cascade port implies that at least two Loop Switches are already involved in the connection. Allowing a pending OPN from a locally connected device to close down a connection that has already propagated through several Loop Switches would adversely affect system performance.

Optionally, a second layer may be added to the fairness mechanism. This layer improves system performance as compared to the true rotating priority system. A port-type based priority system that takes precedence when differently configured ports have pending access collisions was implemented. Since a "string" cascade implies multiple Loop Switches connected together and a "tree" cascade implies only two Loop Switches interconnected the priority, based on port type, is set as shown below:

| | |
|---|---|
| String cascade | Highest Priority |
| Tree cascade | 2$^{nd}$ Highest Priority |
| Device Port | Lowest Priority |

If two ports of the same type have an access request collision, the rotating priority scheme allows the first connection request received to proceed, closing down the request that came second.

5.9.2.1 Fairness in a String Cascade

A "virtual" Arbitrated Loop, consisting of only the switches interconnected with "string cascades", arbitrates to determine which switch wins control of the interconnection and allows its device with a pending open request access to the inter-switch cascade loop. Each switch in the cascade string follows the Fibre Channel Arbitrated Loop standard for arbitration and device fairness to gain control of the virtual loop. Previous methods for determining device access across inter-switch cascades utilized a combination of first-come, first-served and ALPA priority to determine access to an available cascade. This mechanism did not ensure fairness in a large system resulting in device open close (OPN-CLS) cycle thrashing due to collisions during the first-come, first-served portion of the access resolution as well as allowing the higher priority ALPA devices to starve the lower priority ALPA devices. The challenge with connecting multiple switches together, in a non-fabric switching manner is to ensure each device on all the switches in the cascade have equal access.

Fibre Channel implementations using a single Loop Switch treats each port of the switch, if containing multiple devices, as a separate loop. This does not present a problem for the single Loop switch because the switch has the knowledge, kept in an internal register, of which port had the last access to a different switch port and which port is next in line for access, thereby enforcing its own fairness scheme. On the other hand when multiple switches are connected in a cascade, each switch is unaware of what is happening in the other switches. Since the devices are spread out among different switch loops the traditional Arbitrated Loop Access Fairness Algorithm no longer works as originally designed. The present invention solves this problem by treating each switch, when cascaded together in a string of switches, as a single device on a single arbitrated loop. Therefore there is a "virtual" loop of interconnected Loop Switches. Each Loop Switch will, in turn, get its chance to communicate similar to the chance each device received when part of a standard Fibre Channel arbitrated loop. The priority logic of each individual switch's cascade string port (the port connecting the individual switches into a cascade of switches) ensures that each device associated with that switch has its own turn. A host bus adapter (HBA) is the interface between a server or workstation bus and a Fibre Channel network. An HBA, along with the switches, can be on the interconnected switch loop. However the HBA is treated as just another switch when it comes to achieving priority over the cascade loop. Therefore a cascade string of three switches, one switch having an associated HBA connected to it, means that four entities will be arbitrating for the loop.

Figure 28:
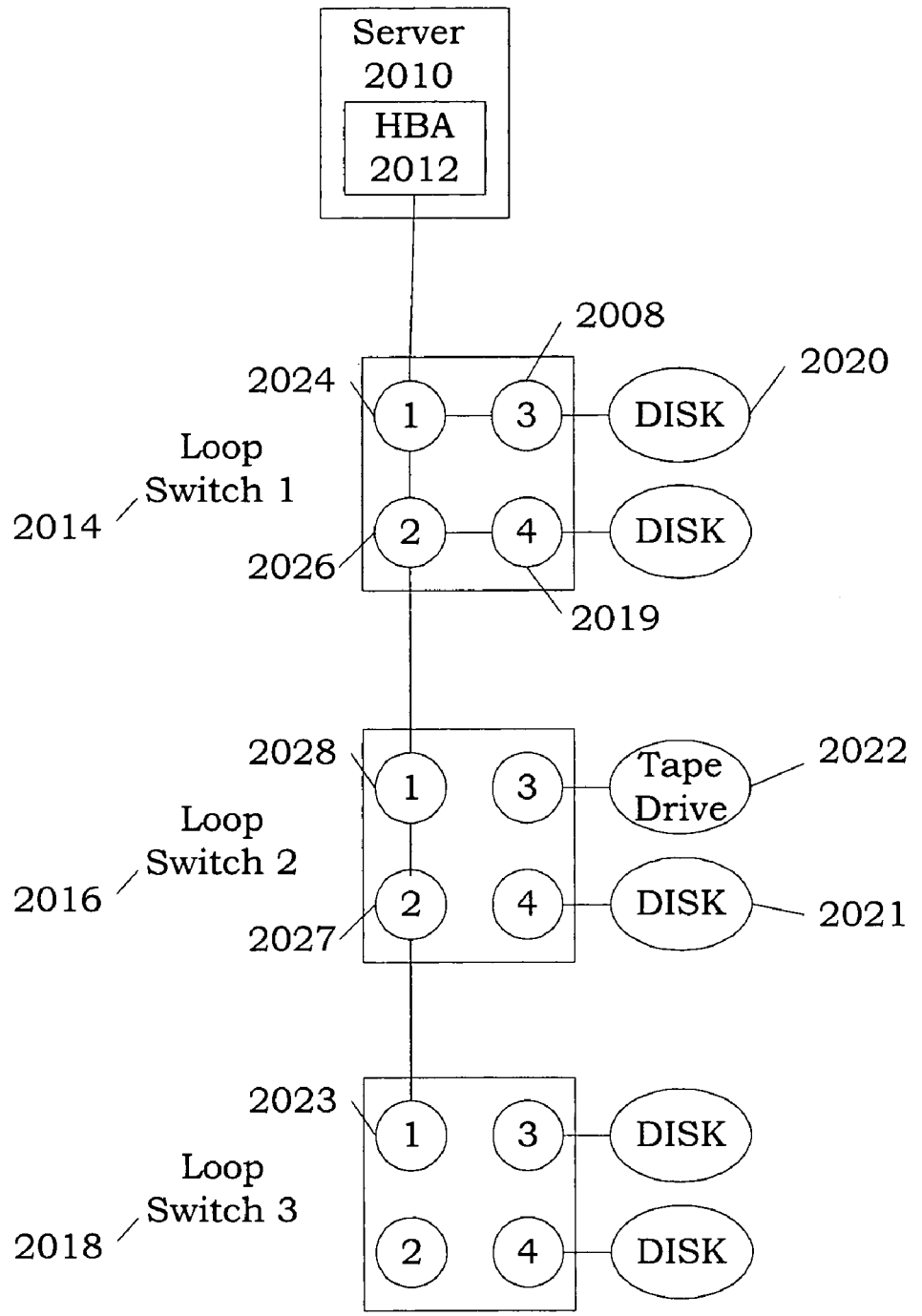
FIG. 28 shows a string of loop switches.

In the preferred embodiment any port on the switch may be configured to act as a string cascade port. A logical connection is made between the ports in a single switch when the switches are configured in the "cascade string" mode. This logical connection allows the ARB to be passed through one port of a particular to another string port on that switch and then through the physical connection between the switches in the string. An example is shown in FIG. 28. As may be seen the Switch 1 2014 has the HBA 2012 attached to string cascade Port 1 2024 and a logical cascade connection is made to string cascade Port 2 2026. In addition to these connections there are external memory storage devices 2020 attached to Port 3 2008 and Port 4 2019 of this switch. Ports 1 and 2 are configured to be cascade string ports. This connects the HBA to a virtual switch loop that connects the switches together. On Switch 2 2016 the cascade string ports are also configured to be ports 1 2028 and 2 2027 and again external memory storage devices 2021 and 2022 are attached to Ports 3 and 4. This repeats until the last switch is reached, this switch only needs one cascade string port since there are no switches after Switch 3 2018 that need to be connected to the cascade loop.

In the FIG. 28 configuration, the HBA 2012 wants to send an OPN to an Arbitrated Loop device located on the last switch 2018 in the cascade loop. The HBA will first send an ARB message requesting ownership of the switch loop. Since the HBA is located on the cascade string of the switch (remember Ports 1 and 2 are the cascade string ports) the ARB will travel through each switch's ports that are in the cascade string. The ARB begins to be transmitted out of Port 2 2026 on Switch 1 2014 and travels to Port 1 2028 of Switch 2 2016. The ARB is then routed to Port 2 2027 of Switch 2 2016 and continues on to Port 1 2023 of Switch 3 2018. This is repeated with any following switch until the last switch receives the ARB on its Port 1. The last switch then returns the ARB out of the same port (because it is the last switch, it uses the same port for receiving and sending signals). The ARB then returns back to the initiating HBA through each switch's cascade string ports. Once the HBA receives the ARB back, it sends its open (OPN) signal. The OPN will then travel to the correct switch based on the destination address associated with the OPN signal. When the correct switch is reached the signal travels through the Crosspoint Switching module and into the correct switch device port. When there are multiple pending OPN's (on different switches) requesting access to the cascaded string loop, their access is controlled by the traditional Arbitrated Loop fairness algorithm. The loop of switches act similarly to a loop of devices in the standard Arbitrated Loop protocol. Each switch that has a pending OPN request can transmit an ARB into the cascade loop string. When an ARB comes to a port that also has an ARB pending then the highest priority (the usual case is that the highest priority belongs to the lowest address) ARB is passed along and the lower priority ARB is blocked. This ensures that there is only one winner among the ARB requests. Once the higher priority ARB is finished and the appropriate device has delivered its data to the appropriate address, that winning device then sends a close signal (CLS) and it is not allowed to ARB again until a system idle has been communicated. A system idle is only communicated when each switch with a device requesting a connection has had a chance on the virtual switch loop. The system idle then resets the access window of all the switches whereupon the cycle starts over. Therefore the other pending devices, which might normally lose another ARB contest with the lower addressed (therefore higher priority) port, are allowed to have a turn. It is important to note that once a device wins control of the virtual cascade switch loop, that device's OPN command cannot be overridden except by its own request, or when it has received the CLS from the device that was addressed.

Figure 29:
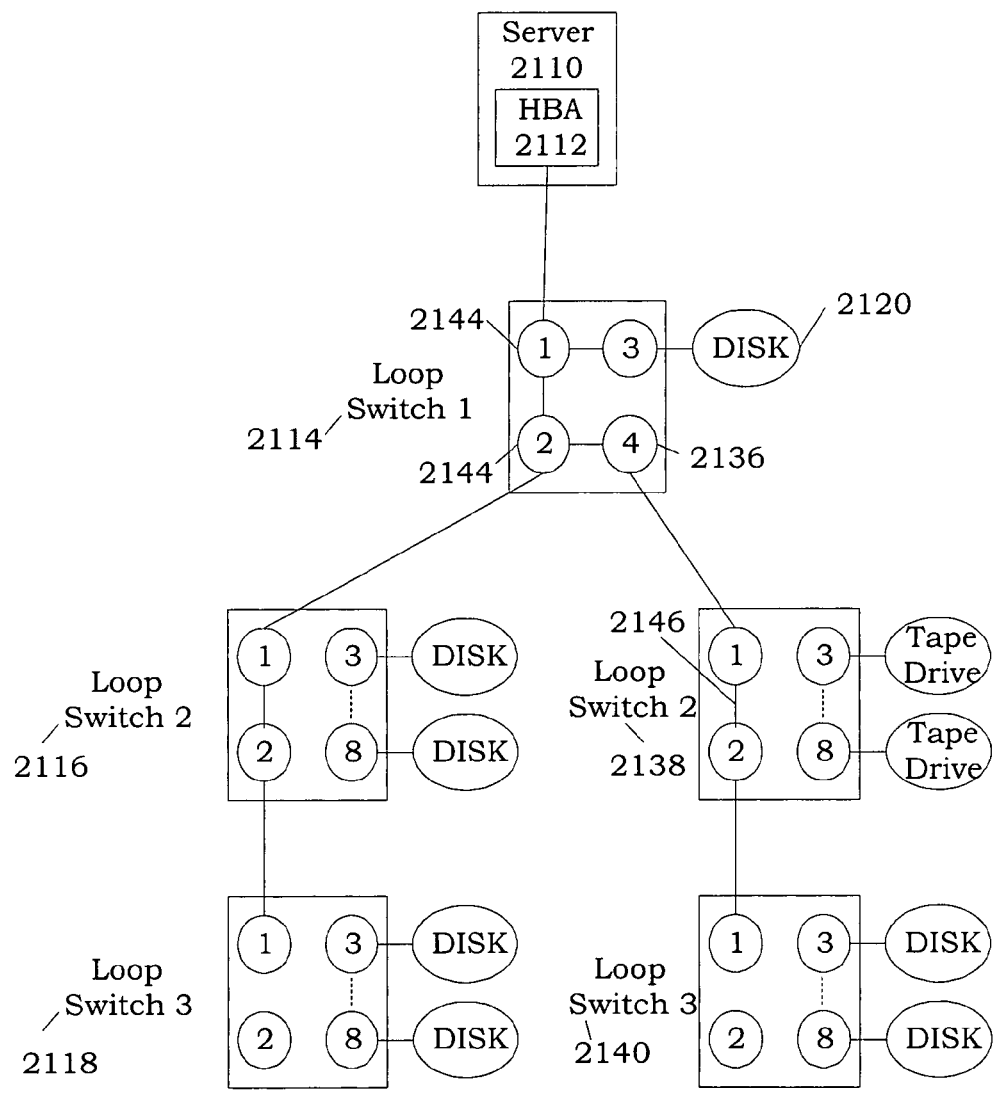
FIG. 29 shows a tree and string of loop switches.

Another embodiment of the present invention is shown in FIG. 29. This shows a tree of cascade loop strings. The top Loop Switch 1 2114 Port 1 2144 has the HBA 2112 on it. The other Loop Switch 1 2114 ports 2 2142 and 4 2136, each have a serial pair of switches connected to them, Loop Switch 2 2116 and Loop Switch 4 2138. The ports are configured as cascade ports, designated as tree cascade ports. Loop Switch 4 2138 and Loop Switch 5 2140 are shown cascading down from Port 4 2136 of Switch 1 2114 have their own cascade string loop 2146 connecting them together. The situation that can occur with this configuration is that when an OPN is received by Switch 1 Port 4 and has a destination of Switch 1 Port 1 (Port 4 won the arbitration) and then a second OPN is received by Port 1 from the HBA and it has a destination of Port 2; then Port 1 after ARBing for the cascade string could be closed by the Port 4 OPN. This is the correct operation because the OPN from Port 4 has priority over Port 1's operation but what occurs is that Port 1 was ARBing for the left side of the cascade string and is now closed down so that the Port 1 ARB is left out on the loop. The ARB will now circle the loop and will cause problems if not dealt with. A solution for this situation is to have a timeout period to allow the ARB to propagate around the loop until the end of that period and be scrubbed off by Port 2. The timeout period is set in a register and its preferred default is 30-40 µsec.

Figure 30:
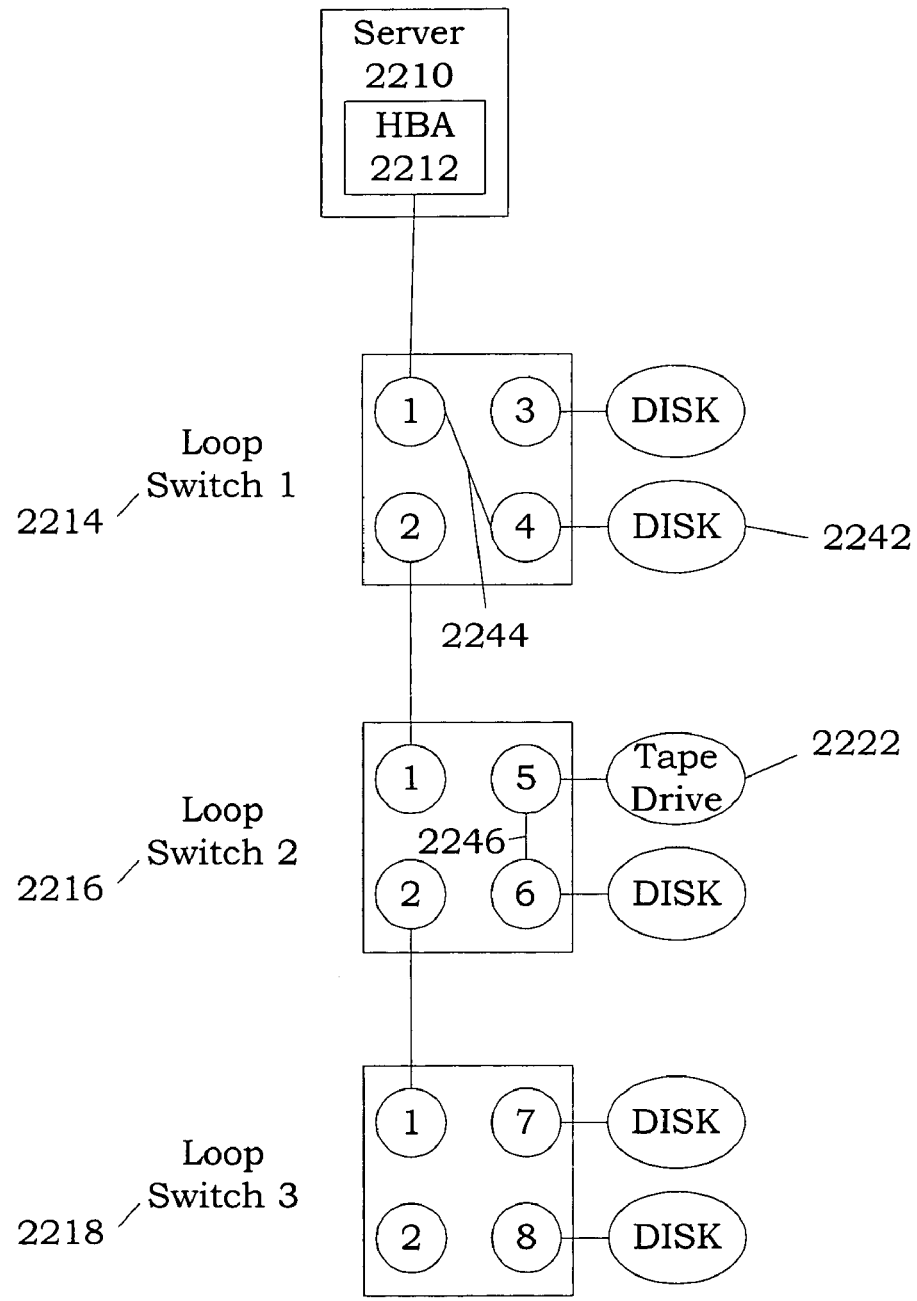
FIG. 30 shows a string of loop switches.

FIG. 30 shows when the cascade loop is not needed the connected switches can act individually when the only communication needed is intra-switch (within the same switch). Here the server 2210 using the HBA 2212 is sending and receiving data through a connection 2244 to the storage device 2242 while simultaneously Switch 2 2216 has connected 2246 the devices on Ports 5 and 6.

Figure 31:
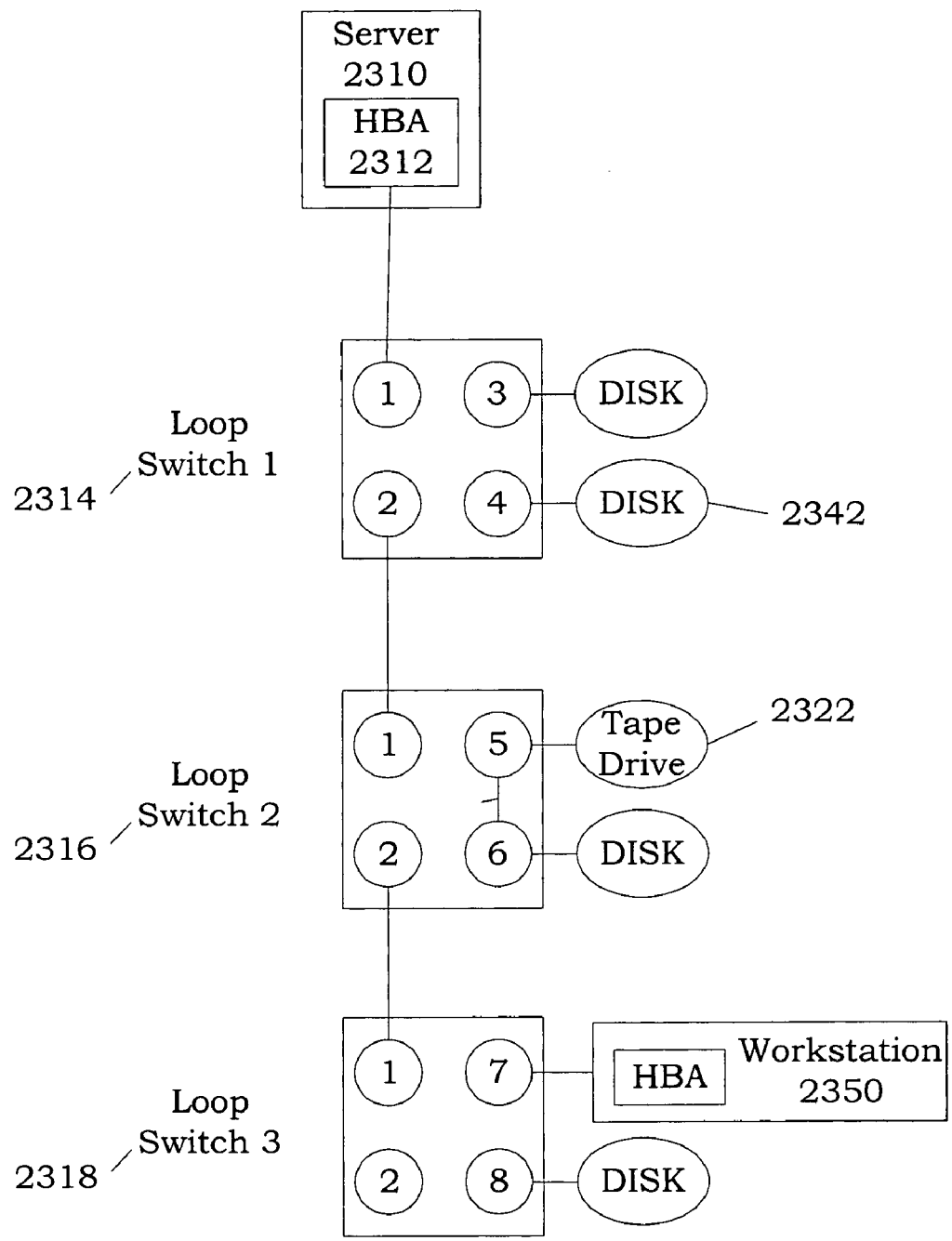
FIG. 31 shows a string of loop switches.

FIG. 31 shows how it is possible to connect another workstation server 2350 to a cascade loop switch 2318. In this configuration the HBA 2350 uses the same protocol as any other Arbitrated Loop device attached to the Loop Switch. Note that it would also be possible to attach the HBA directly to the cascade loop, using the cascade loop arbitration protocol previously discussed to obtain control of the loop.

Figure 32:
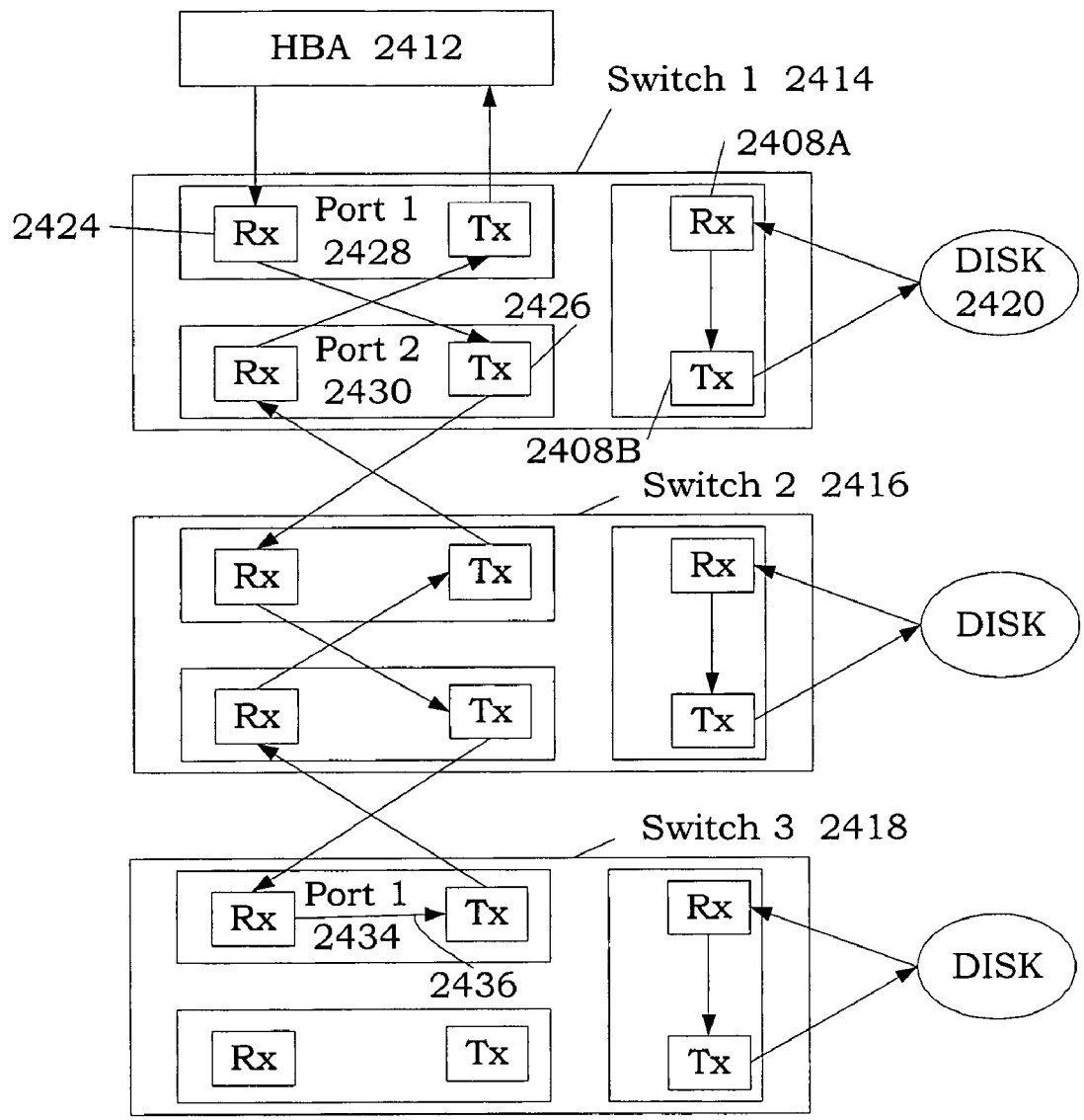
FIG. 32 shows a string of loop switches.

FIG. 32 shows the actual connectivity method used in the cascade loop. Every port is comprised of a receive module 2408A and a transmit module 2408B. When the cascade loop is in the idle mode the cascade loop comprises the receive module 2424 of Port 1 logically connected to the transmit module 2426 of Port 2 2430 and down through all three switches 2424, 2416, 2418. The interswitch connection between the switches is a physical connection. Note that Loop Switch 3 2418 port 1 2434 is connected to itself 2436. The communication loop then travels back up the string, as shown, eventually ending back up to the HBA 2412.

Figure 33:
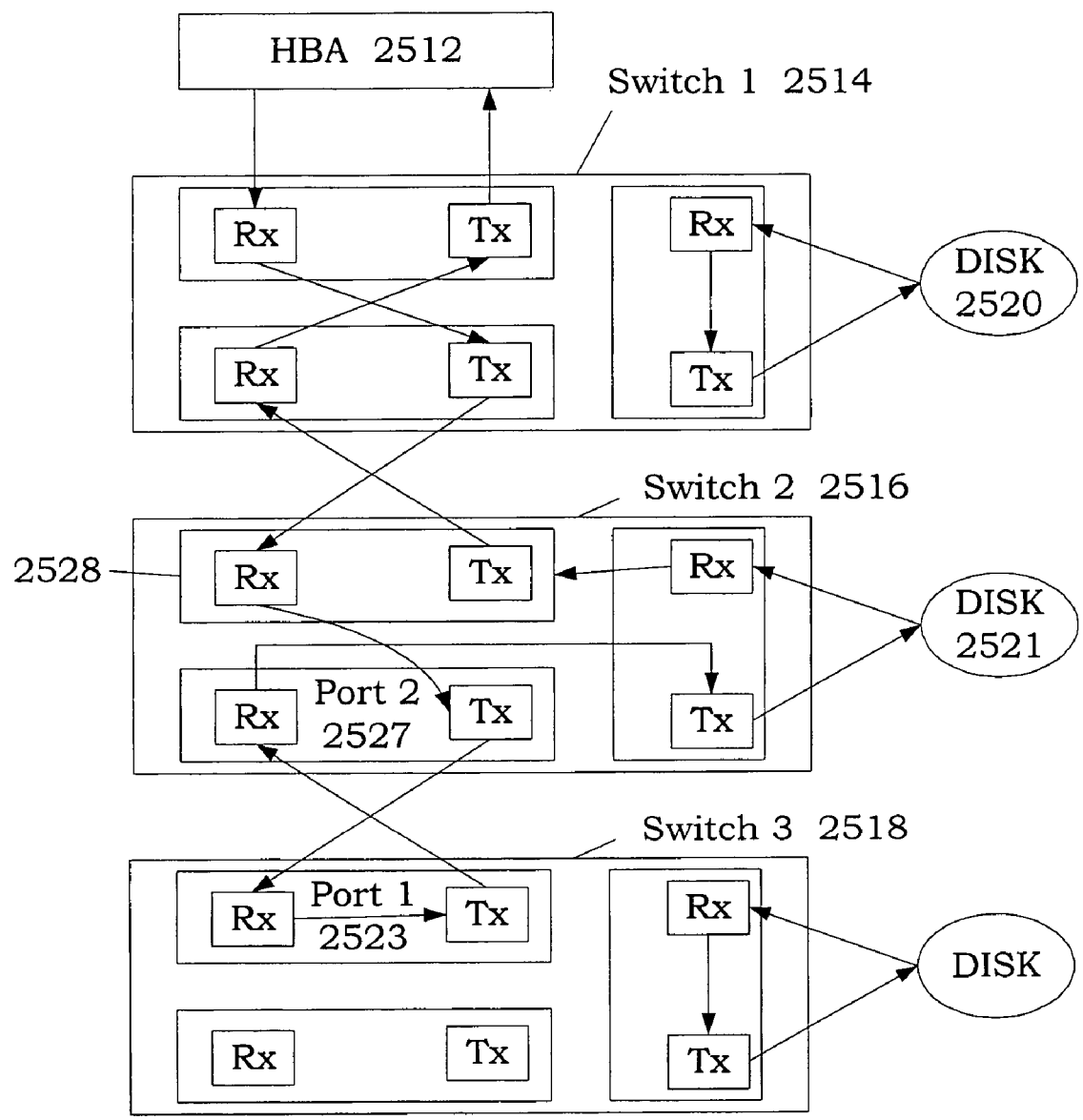
FIG. 33 shows a string of loop switches.

FIG. 33 shows the HBA 2512 connected to the Fibre Channel Hard Disk device 2521 on Loop Switch 2 2516. In the preferred mode the cascade loop still travels the entire chain of switches (note the data traveling through Loop Switch 3 port 1 2523 before reaching the Switch 2 2516 port 2 2527 receiving module whereupon the data is transported through the Crosspoint Switching module to the Fibre Channel Hard Disk device 2521.

Figure 34:
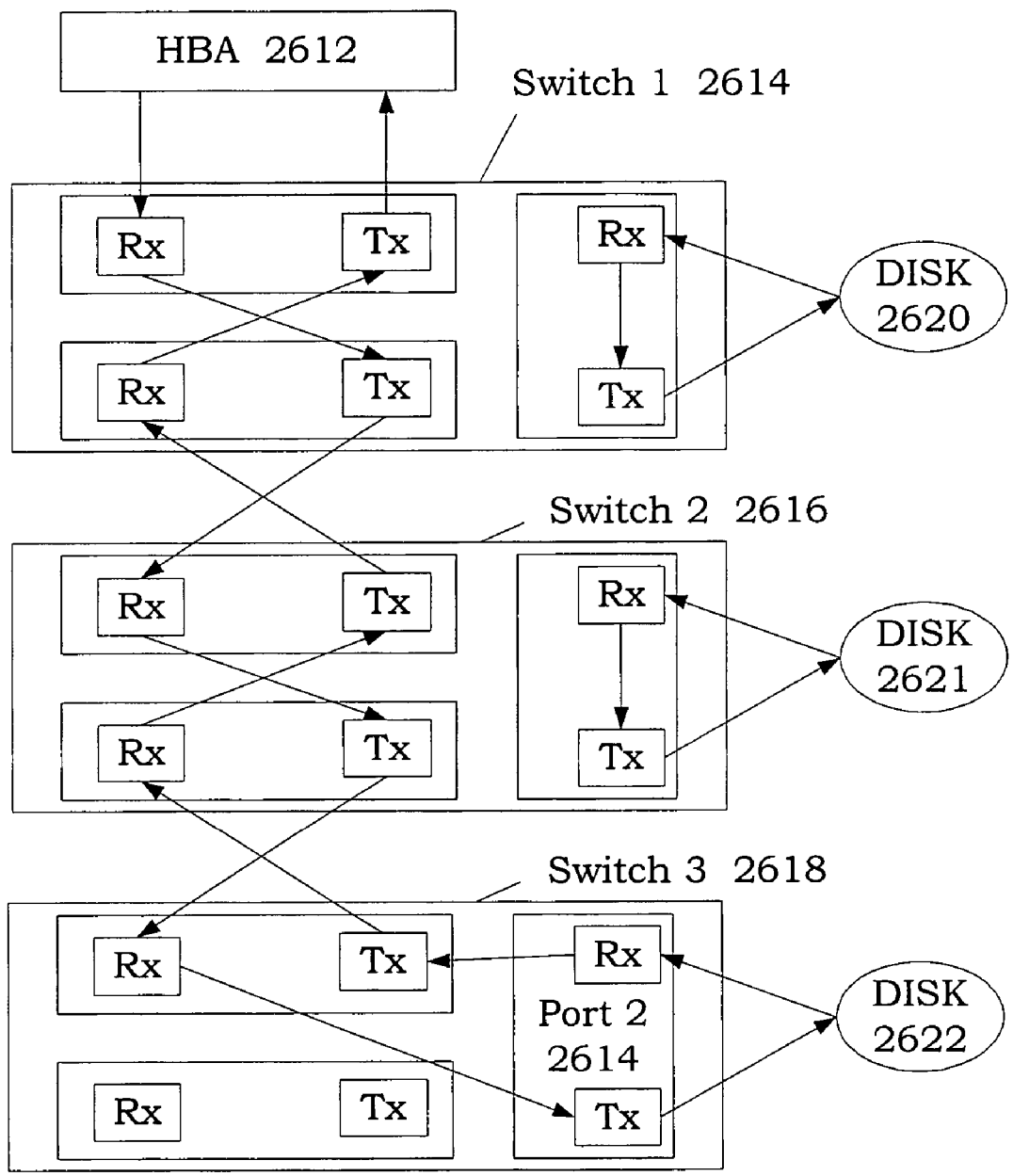
FIG. 34 shows a string of loop switches.

FIG. 34 shows a similar scenario with the HBA 2612 this time communicating with a storage device 2622 connected to port 2 2614 on Loop Switch 3 2618 in the Loop Switch cascade 2614, 2616, 2618. Obviously there can be more than three switches connected into a cascade loop or tree cascade loop. The only limitation is that there be a maximum of 126 addressable devices on the cascade string.

Figure 35:
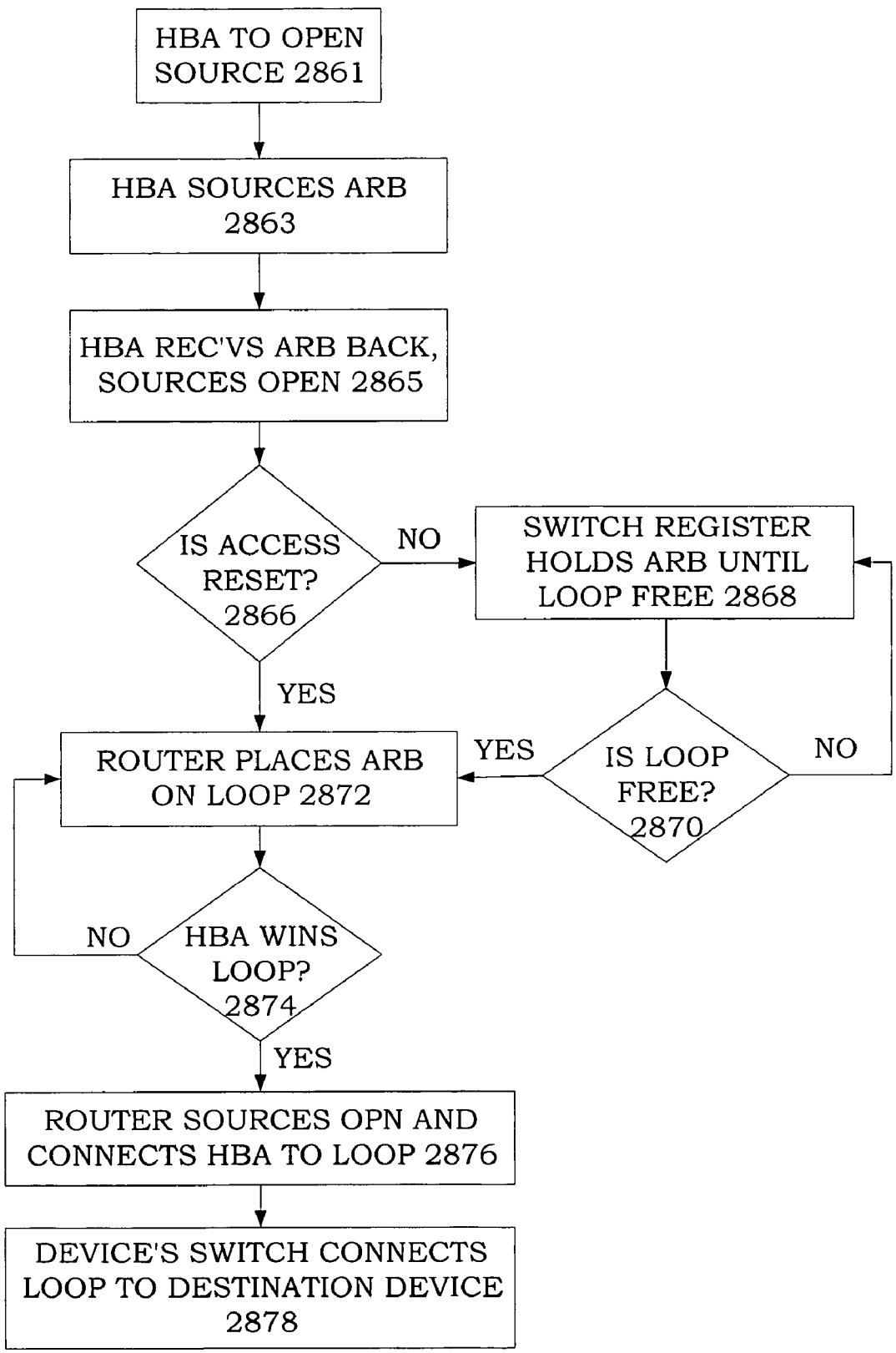
FIG. 35 is a flow chart relating to an HBA and the winning of arbitration in cascaded loop switches.

FIG. 4 shows a block diagram of a Loop Switch with its main components. The switch core 150 is comprised of the Crosspoint Switching module that actually makes the logical connections to the correct associated ports, the Router 149 maintains the addresses of the devices wishing to connect to the cascade loop and contains the ALPA filter that strips the address of the source device from the OPN request and uses that address for the cascade loop arbitration request. The open request could be in a half-duplex operational mode in which no source information is present. In this case the AL-PA used for arbitration is the last ARB address received before the current OPN request. If the OPN request has a destination address for a device on the same switch as the source device then the Crosspoint Switching module connects the ports that the devices reside on. If the OPN request has a destination address on a different switch than the one on which the requesting device resides then the switch router logs in the source device address and ARBs for the loop. FIG. 35 is a flowchart showing the process an HBA uses to ARB for the cascade loop. The HBA sources an ARB to its associated switch port 2863. The port connects its transmit and receive ports together returning the ARB to the HBA. The HBA upon receipt of its own ARB has then won access and sources an OPN 2865 to its associated port. That port then sends the OPN to the switch core where it is processed. If the switch router determines that the destination address is on a different switch the router then checks the switch access status 2866. If the switch has access to the cascade loop it will then place the ARB on that loop 2872. If the switch doesn't yet have access to the cascade loop then the switch will place the OPN request in a FIFO queue 2868 and wait for access to become available. When access does become available the switch will place the ARB onto the cascade loop 2872. If the HBA's ARB has the highest priority of any ARB also on the loop at the same time then the HBA's ARB will win control of the loop and the switch that the HBA is on will source an OPN and connect the HBA to the cascade loop. The OPN will travel the loop until it comes to the switch containing the device with the destination address. That switch will then use its Crosspoint Switching module to connect the cascade loop to the destination device 2878.

5.9.3 Repetitive Closure Impacts on Fairness

Despite the mechanisms previously described in the sections on cascades and fairness, a system may still get into a pattern of access collisions where a particular device is repeatedly closed down. A simple illustration of this condition is shown in FIG. 18.

Figure 18:
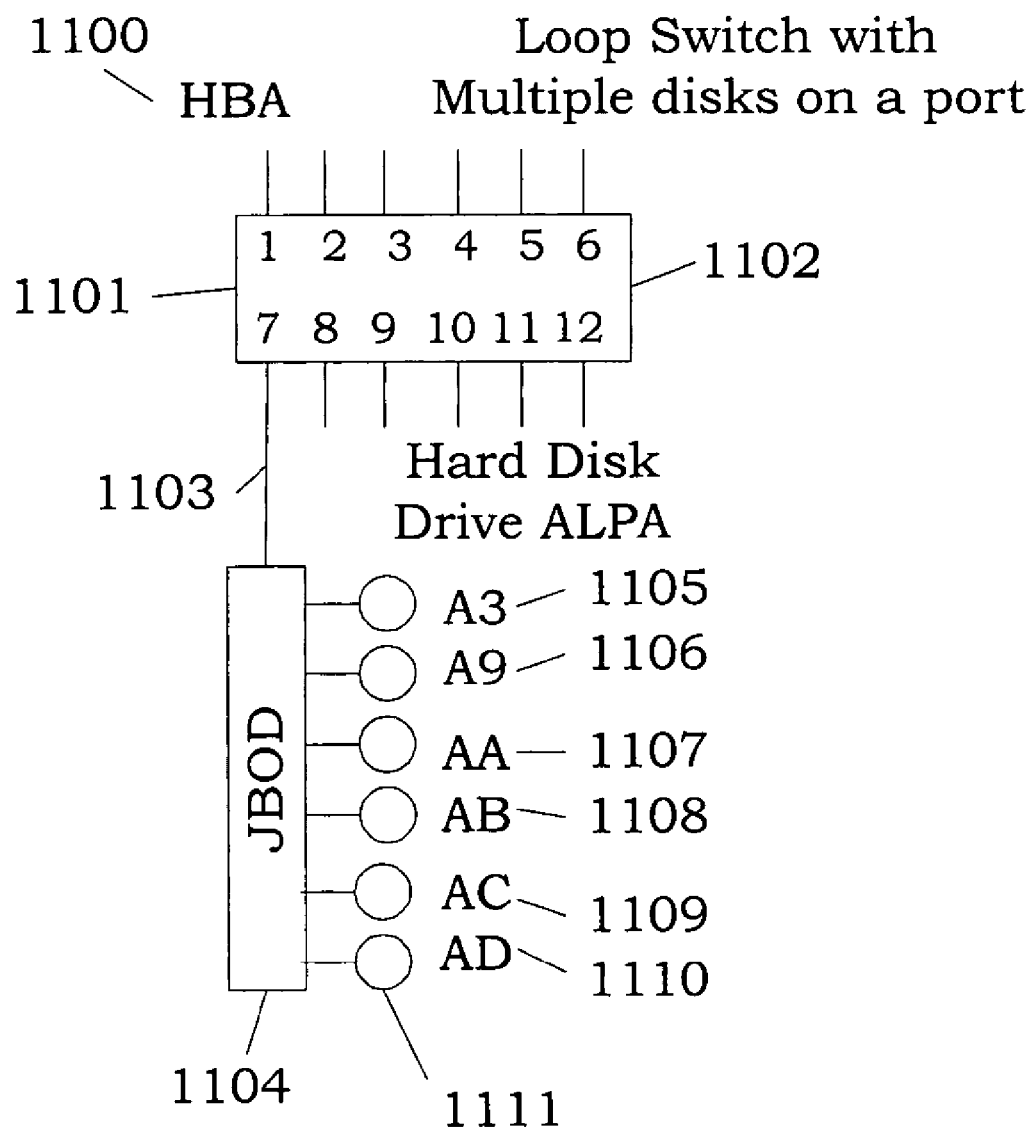
FIG. 18 is a diagram of a Loop Switch with multiple disks on a port.

FIG. 18 shows a single HBA 1100 attached to an Loop Switch 1102 that has a loop of 6 disks 1105, 1106, 1107, 1108, 1109, 1110 attached to a port 1103. If all the disks have requests pending simultaneously, the 6-disk JBOD 1104 will present ALPA A3 1105 to the Loop Switch port as it has highest priority and won the arbitrated loop within the JBOD. However, if the HBA 1100 access request to the JBOD 1104 arrived at the Loop Switch first, the rotating priority will send a CLS to the JBOD 1104 to allow the HBA 1100 access. Since disk A3 1105 was closed down, it cannot request another access until an IDLE has reset the fairness window on the JBOD 1104. After all the disks have been either serviced or closed down by the HBA 1100, an IDLE will be circulated on the JBOD and A3, as well as any other pending disks, can request access again. Again the HBA's request is pending prior to the request from disk A3 and it is closed down, loosing its access slot until fairness has been reset. If this continues, eventually disk A3 transactions will be starved causing the HBA to timeout and either LIP the loop or flag disk A3 as non-responsive.

To eliminate starvation conditions, a third layer of fairness mechanisms exists. A CLS counter based on ALPA'S, tracks the number of sequential times an ALPA's OPN requests are closed down without any frames being transferred. If the CLS counter reaches the software settable threshold the next time an OPN is received containing that ALPA as the source, its priority is increased to the highest priority. Until a connection is made that transfers at least a frame of data, any request made by this ALPA will retain the highest priority and will win any pending connection collisions. (If two ports with highest priority requests collide, the rotating first-come, first-served priority will determine the winner.) Each port can individually have this ALPA-based priority increase enabled/disabled via Port Control Register #1.

A "dumb" time-based priority mechanism also may be used. This mechanism increases the port's priority on a time-slot basis rather than on an ALPA basis. The duty cycle of this timer is controlled and ports are enabled via Port Control Register #1.

Both the ALPA and time-based priority controls may be applied to any type of port.

5.10 Zoning 5.10.1 Non-overlapping Zoning

In both hub emulation and switch (segmenting) modes of operation, each port can be assigned to one of a number of possible non-overlapping zones. Zone assignments for each port are assigned by programming specific zone values into the non-overlapping zone registers. The devices on each port within a zone are connected such that only those devices can talk to each other and they form a loop that is totally isolated from all other ports on the Loop Switch. Both data transfers and loop initialization activity is totally restricted to individual zones. Port discovery is valid only for zone 0 when non-overlapping zoning is turned on since Loop Switch is designed to support a single ALPA map. The non-overlapping zone information is also captured through the serial EEPROM interface.

5.10.2 Overlapping Zoning (Switching Mode)

In switching operation, overlapping zones can be configured by disabling certain source/destination port combinations. Since the Loop Switch in switching (segmenting) mode is broken up into individual loop segments for each port, the devices in each port are located in different zones. Normally devices on different ports can talk to each other through the processes described earlier. However, for each source port access to certain destination ports can be disabled, providing zone to zone isolation capability. This disabling function is accomplished by writing source/destination port disable controls in the overlapping zone destination port disable registers. By itself, overlapping hard zoning does not isolate loop initialization activity to individual loop segments. LIP isolation must be explicitly enabled for this to occur.

5.11 LIP Isolation

Normally when a LIP is received on any port, the Loop Switch reverts into hub emulation mode if it is not already configured that way. LIPs then propagate through all of the Loop Switch ports to allow loop initialization. Depending upon the system requirements this may result in unacceptable interruptions to loop traffic. In order to reduce the frequency or at least manage the timing of these interruptions, the Loop Switch can be configured to provide LIP isolation in switching mode. This isolation includes preventing a LIP from propagating when a GBIC/SFP is removed (and subsequently reinserted). Two main categories of LIP isolation are possible: non-stealth mode and stealth mode.

5.11.1 Non-Stealth Modes

Non-stealth mode isolation either keeps the LIP propagation isolated to a specific zone, which has no impact on other zones, or totally isolates the device from the loop. The device that generated the LIP is isolated from the system until it is determined that a LIP and subsequent loop initialization cycle will not impact system performance.

5.11.1.1 Hub Emulation Mode

Non-overlapping hard zones guarantee that LIPs do not propagate from one zone to another, but a LIP in any zone causes all of the other ports in that zone to re-initialize.

5.11.1.2 Switching (Segmenting) Mode

In the Loop Switch switching (segmenting) mode two LIP isolation solutions are possible. For any solution to be enabled a global LIP isolation enable bit must be set in the router. This does not determine a specific behavior for any port; it simply enables the port-specific behavior for all ports. The LIP isolation behavior for each port is controlled in the port control registers and is individually selectable on a port basis.

| Non-Stealth LIP Isolation Control Summary | | | |
|---|---|---|---|
| LIP Isolation Mode | global_isolate_en (router) | port_isolate_en (port) | pass_LIP (port) |
| Non-Isolated (global) | 0 | x | x |
| Non-Isolated (per port) | 1 | 0 | 0 |
| Manual Insert | 1 | 1 | 0 |
| Local Insert | 1 | 1 | 1 |

5.11.1.2.1 Manual Insert Mode (LIP Blocking)

In manual insert mode, LIPs are blocked prior to leaving the port. For this mode to be activated on a port the global isolation enable bit must be set in the router and the port isolation enable must be set for that port. Blocked LIPs do not influence the other ports, nor are they allowed to propagate around the full loop where the LIP is originated. This is the most restrictive form of LIP isolation and the LIP'ing device is held inactive and not allowed to communicate. In order to insert the port back into the loop, either LIP's must be sent through all of the Loop Switch ports or the microprocessor may send a directed LIP to that port to allow it to enter the loop. In both cases, the entire system is rolled into a loop and all ports participate in a loop initialization cycle. Firmware can detect that a port was isolated with an interrupt for that port.

5.11.1.2.2 Local Insert Mode

Local insert mode is similar to manual insert mode except that the port that detects the LIP allows local, isolated loop initialization to proceed for that port as a stand-alone loop. Following the local loop initialization, the port is wired to itself internally. Local data transfers are allowed to proceed but communication with other ports is not allowed. If an OPN is sent from another port to an isolated port, the OPN request normally waits until the isolated port becomes available before being answered or until the entire Loop Switch is initialized. If there is no response to the OPN the source port may send a CLS and then attempt another connection. If selected in the router control registers, the port may receive a CLS back immediately from the Loop Switch when an OPN is sent to an isolated port. In both cases, the entire system is rolled into a loop and all ports participate in a loop initialization cycle. As in manual insert mode, firmware can detect that a port was isolated with an interrupt for that port.

5.11.2 Stealth Mode

Stealth mode LIP isolation provides a low-impact mechanism to allow devices that LIP to join the system without LIP'ing all the devices on the system. Depending on the configuration of the system, the impact on the system ranges from no devices receiving a LIP (except the new device), a few devices receiving a LIP or the whole system being LIP'ed.

Figure 19:
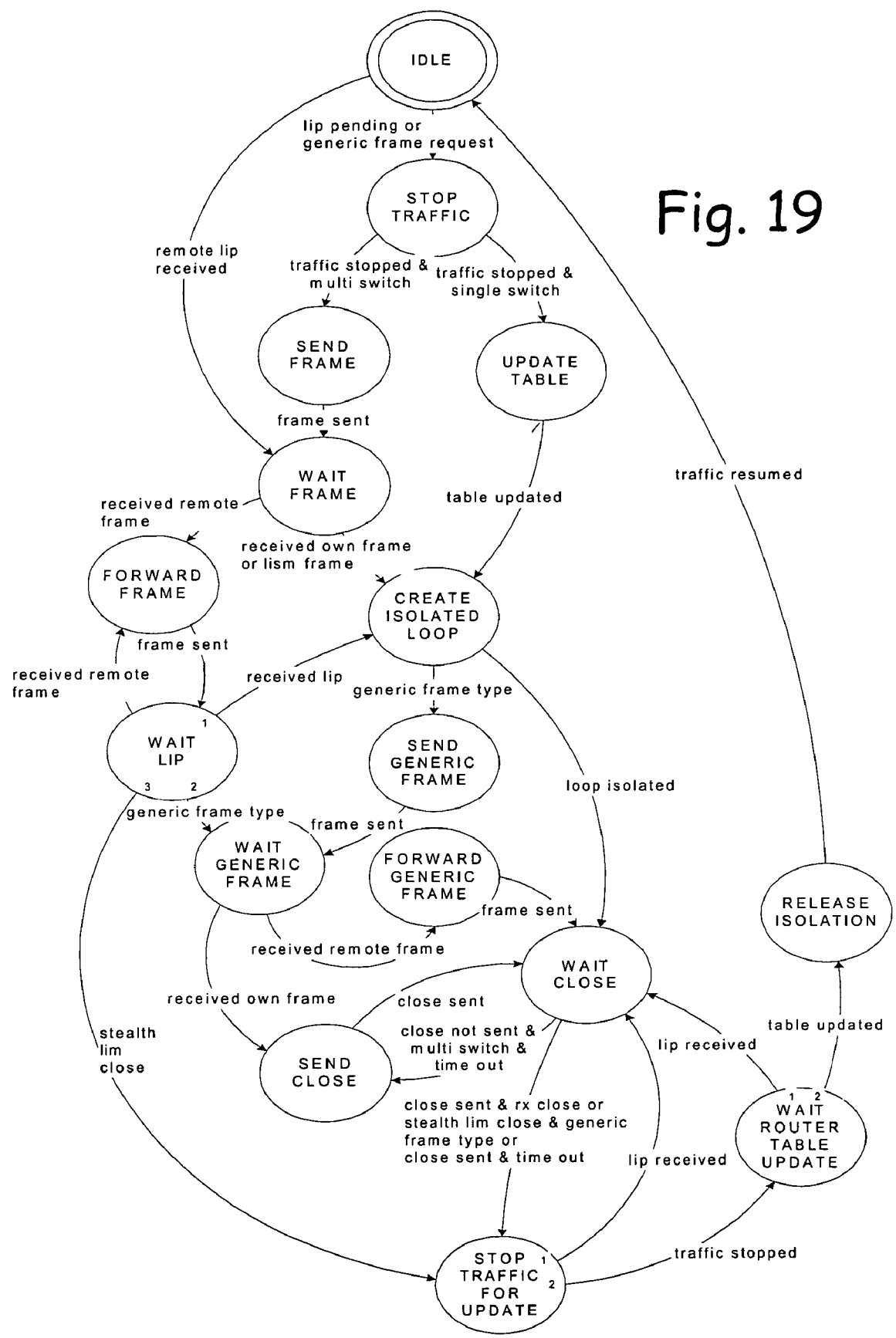
FIG. 19 is a state diagram of stealth mode LIP isolation within a Loop Switch.

The flowchart in FIG. 19 shows the flow the internal state-machine follows to process stealth LIP cycles.

Several levels of control exist for stealth mode isolation. The following sections will illustrate several configurations of stealth isolation on a single Loop Switch ASIC followed by cascaded Loop Switch ASIC examples of stealth isolation. In each case, a black-box description is given followed by a detailed description of the steps that occur within the Loop Switch ASIC's circuitry.

In the table below, the functions of the port-level controls for stealth isolation are shown as well as the global isolation control enable.

| LIP Isolation Mode | global_isolate_en (router) | port_isolate_en (port) | Stealth_rcv_lip (port) | Stealth_gen_lip (port) |
|---|---|---|---|---|
| No Isolation (global) | 0 | x | x | x |
| No Isolation (per port) | 1 | 1 | 1 | 1 |
| Receive LIP from router | 1 | 1 | 1 | 0 |
| Forward LIP to router | 1 | 1 | 0 | 1 |
| Full Isolation | 1 | 1 | 0 | 0 |

In addition to the bits shown above, route-blocking and LIP isolation groups are used to control device to device routing access based on the ALPA of each device as well as LIP isolation based on switch ports.

5.11.2.1 Route-Blocking Groups

The Loop Switch ASIC supports multiple groups that provide route-blocking based on each device's ALPA. Each group contains a set of 126 bits corresponding to each ALPA possible on the loop. If the bit is set to '1', that associated device cannot communicate with any other device in that group whose enable is also set to '1'. The route-blocking mechanism covers any connection that passes through the Loop Switch ASIC, regardless of cascade hops. When the OPN is received by the router look-up state-machine, each route-blocking group is parsed to see if the connection is blocked. If the connection is blocked, the OPN is routed back to the originating port, making it appear to the originating device that the destination ALPA is not on the loop. A half-duplex OPN is a special case and route-blocking is not supported. The source port is not included in the OPN frame so the logic would have to parse all the ALPA's that exist on that port.

Some initiators will continually attempt to access a device whose ALPA appeared in the LILP frame but it is not able to open. After a several attempts, that initiator may LIP the loop. As long as the filtered LIRP/LILP mechanism is not disabled the LIP should clear the blocked ALPA from the initiator's LIP received during the LIP cycle and system operation should continue.

An ALPA can be contained in multiple route-blocking groups. If hardware generation of the LIP isolation groups is enabled, this route-blocking groups generates overlapping isolation groups automatically.

In the SOC422 Loop Switch three route-blocking groups are included in the SEPROM space to allow for some level of route-blocking/LIP isolation in an unmanaged switch.

5.11.2.2 LIP Isolation Zone Groups

The Loop Switch ASIC supports 16 LIP Isolation zones. Note that the number 16 is an implementation value, not a design limitation.

Each port has a control register defined in the router's memory map space containing a set of 16 bits corresponding to each isolation zone. If the bit is set to '1', the port is included in that LIP Isolation group, if set to '0', the port is not included. While groups are defined for a single Loop Switch ASIC, if multiple Loop Switch ASIC's are cascaded, a forwarded LIP from Zone 2 of one Loop Switch ASIC will cause ports in Zone 2 of every Loop Switch ASIC in the system to be affected.

Isolation groups may overlap on a port. If a LIP is detected on a port configured to forward LIP's, it will cause a loop initialization that includes all ports enabled to receive LIP's in every zone in which the original port belongs.

5.11.2.3 Interswitch Frames

The Loop Switch ASIC supports LIP isolation and route blocking over all switches in the system. If multiple stealth-mode switches exist in the system (indicated by a non-zero value in the Stealth-Interswitch Cascade Registers, a mechanism is required to arbitrate to determine the switch that has control of the loop in the case of simultaneous LIP events on multiple switches. Additionally, once control has been determined, a mechanism to communicate which zone(s) are involved in the LIP cycle is required. A broadcast, interswitch frame covers both needs. Also, a general-purpose interswitch frame is supported to provide a mechanism for the firmware to have in-band communication with the other switches in the system.

5.11.2.3.1 LIP Cycle Interswitch Frames

The LIP cycle's interswitch frame is loosely based on the general format of a Loop Initialization frame. Seven 32-bit words make up the header, followed by a 16-byte payload and then a CRC. This frame has the format in the figure shown below:

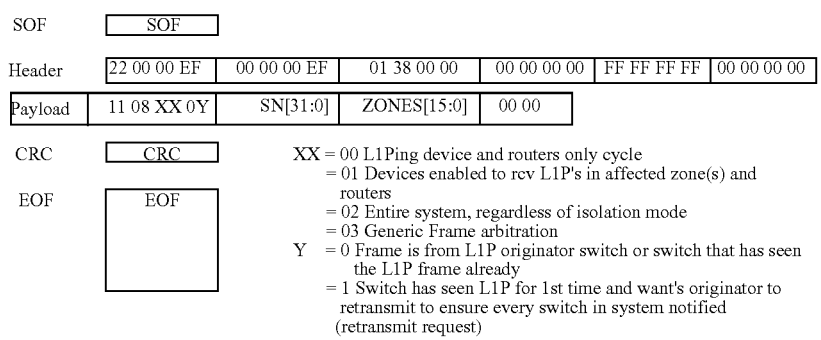

The $1^{st}$ word of the payload indicates the frame is the LIP Interswitch frame. The $2^{nd}$ word of the payload contains the serial number, bits 31-0 only, of the switch attempting to win control of the LIP cycle. The $3^{rd}$ word contains a bit-map indicating which zones are to be included in the LIP cycle in the upper half and is padded with 2 bytes of zeros in the lower half.

5.11.2.3.2 General Purpose Interswitch Frames

The general purpose interswitch frame is user programmable with the Loop Switch ASIC capturing the data frame on a match of the $1^{st}$ and $3^{rd}$ words in the header. The frame has a 32 byte payload. The first 4 bytes of the payload must be the serial number of the Loop Switch ASIC and are automatically inserted by the Loop Switch ASIC even though they are read-accessible in the transmit Interswitch frame registers. The remaining 28 bytes of the payload are user-defined.

| SOF | SOF | | | | | |
|---|---|---|---|---|---|---|
| Header | 22 00 00 FB | 00 00 00 00 | 01 38 00 FB | 00 00 00 00 | 00 00 00 00 | 00 00 00 00 |
| Payload | User defined payload of 32 bytes | | | | | |
| CRC | CRC | | | | | |
| EOF | EOF | | | | | |

The Loop Switch ASIC compares the received serial number in the payload against the local serial number to determine whether the frame is from another switch and should be forwarded or if the frame is originally from this switch and should be blocked. An interrupt can be generated on either detection of a remote frame or receipt of the wrapped-back local frame.

5.11.3 Stealth Mode Isolation, Single ASIC, Devices in a Single LIP Zone, No Route Blocking In the table below, the basic controls for stealth isolation for each device is shown.

| Device | Routes Blocked (router) | LIP Zone (router) | Stealth_rcv_lip (port) | Stealth_gen_lip (port) |
|---|---|---|---|---|
| HBA #1 1200 | None | 1 | 1 | 0 |
| HBA #2 1209 | None | 1 | 1 | 0 |
| Disk #1 1204 | None | 1 | 0 | 1 |
| Disk #2 1205 | None | 1 | 0 | 1 |

Figure 20:
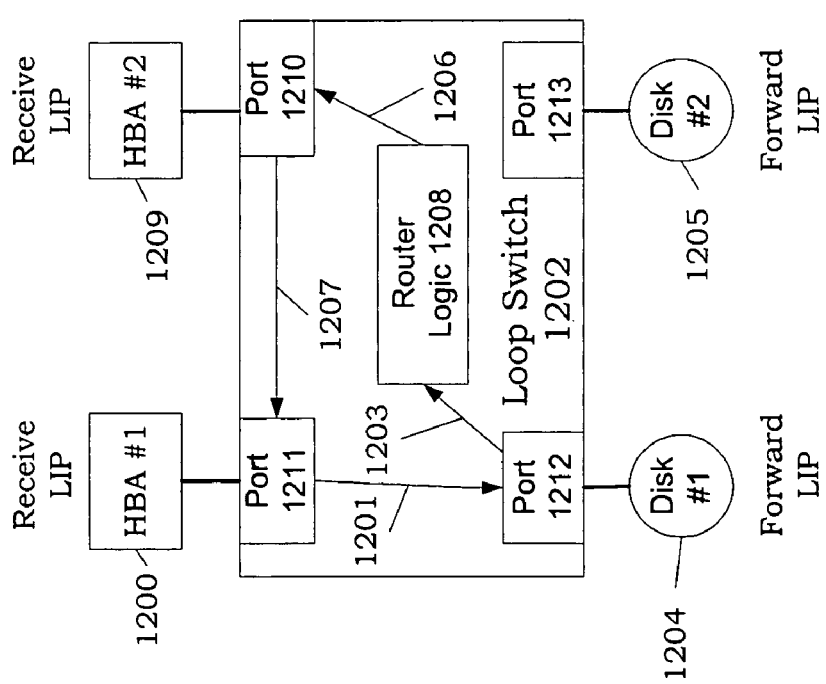
FIG. 20 is a diagram of a single Loop Switch and single zone stealth LIP isolation.

In this example, see FIG. 20, all four devices attached to the Loop Switch ASIC 1200, 1204, 1205, 1209 are in the same LIP Zone without any routes blocked. Route blocking prevents specific devices from communicating with other devices based on their ALPA's. The implication of being in a single zone is that any time a LIP is forwarded to the router 1208, all devices configured to be notified of a LIP will be involved in the resulting loop initialization. The HBA ports 1211, 1210 are configured so the HBA's are notified when a LIP is forwarded to the router 1208 but do not forward LIPs to other devices themselves. The disk ports 1212 and 1213 are configured in the opposite manner. A LIP from a disk is forwarded to the system however a LIP in the system is not passed on to a disk port.

Assuming a LIP is generated by Disk #1 1204, the ports will be connected into a loop as illustrated by the path internal to the Loop Switch 1201, 1203, 1206, 1207. The two HBA's 1200, 1209 included in a loop with Disk #1 1204 while Disk #2 1205 is unaffected. Disk #1 1204 forwards the LIP because it has been enabled for LIP forwarding. Disk #2 1205 is left out of the LIP cycle because unlike the HBA's it was not configured to receive LIP's. The three devices 1200, 1204, 1209 will perform a loop initialization cycle. Upon completion, all three devices will be allowed to enter switching mode and communicate with Disk #2 1205.

Within the Loop Switch ASIC, the port connected to Disk #1 1212 will detect the LIP. The LIP will be blocked at the port 1212 however a "LIP detected" signal will be forwarded to the router 1208. The router logic 1208 will control all the ports 1211, 1210, 1212, 1213 and cause fill words to be replaced with blocking ARB's to stop new connections from forming within the Loop Switch ASIC 1202. Additionally, R_RDY ordered sets will not be passed through the Loop Switch ASIC 1202 to cause existing connections to complete quickly.

The router logic 1208 will format bits to logically OR with the LIFA frame that include all ALPA's on the switch that are either not in the LIP'ed zone(s) or are on ports configured not to be notified of a LIP. (In this case 1 bit would be set for Disk #2). Additionally, the ALPA of every device on the switch within the zone(s) being LIP'ed, not configured to be notified of a LIP, is formatted into a list within the router to insert into the LIRP frame. In this case that would only be the ALPA for Disk #2 1205.

As soon as the logic detects all traffic has halted; the crossbar switch will be configured to connect the ports and router into a loop for the loop initialization cycle. At this point, traffic will be allowed to resume on all ports not included in the loop initialization. Any OPN directed toward a device that is in the initialization loop will be responded to with a CLS routed back to the OPN's originator, indicating the requested device is busy. The LIP from the port will then be allowed to circulate the loop of isolated ports.

As the LIFA frame passes through the router, it is modified by the router, OR'ing in all ALPA's from the list formatted in the router.

As the LIRP frame passes through the router, it is also modified. The ALPA list, containing devices in the zone(s) being initialized but not actually involved in the initialization, is inserted into the LIRP frame. The offset field is incremented and the CRC recalculated.

The loop initialization cycle concludes with the LILP frame and CLS ordered set being circulated around the loop.

When the Loop Switch ASIC detects the initialization is complete, the router will allow the isolated ports to participate with the main system again.

5.11.4 Stealth Mode Isolation, Single ASIC, Devices in Multiple LIP Zones, No Routes Blocked In the table below, the basic controls for stealth isolation for each device is shown, also refer to FIG. 21.

| Device | Routes Blocked (router) | LIP Zone (router) | Stealth_rcv_lip (port) | Stealth_gen_lip (port) |
|---|---|---|---|---|
| HBA #1 1220 | None | 1 1233 | 1 | 0 |
| HBA #2 1232 | None | 2 1234 | 1 | 0 |

-continued

| Device | Routes Blocked (router) | LIP Zone (router) | Stealth_rcv_lip (port) | Steath_gen_lip (port) |
|---|---|---|---|---|
| Disk #1 1228 | None | 1 1233 | 0 | 1 |
| Disk #2 1229 | None | 2 1234 | 0 | 1 |

Figure 21:
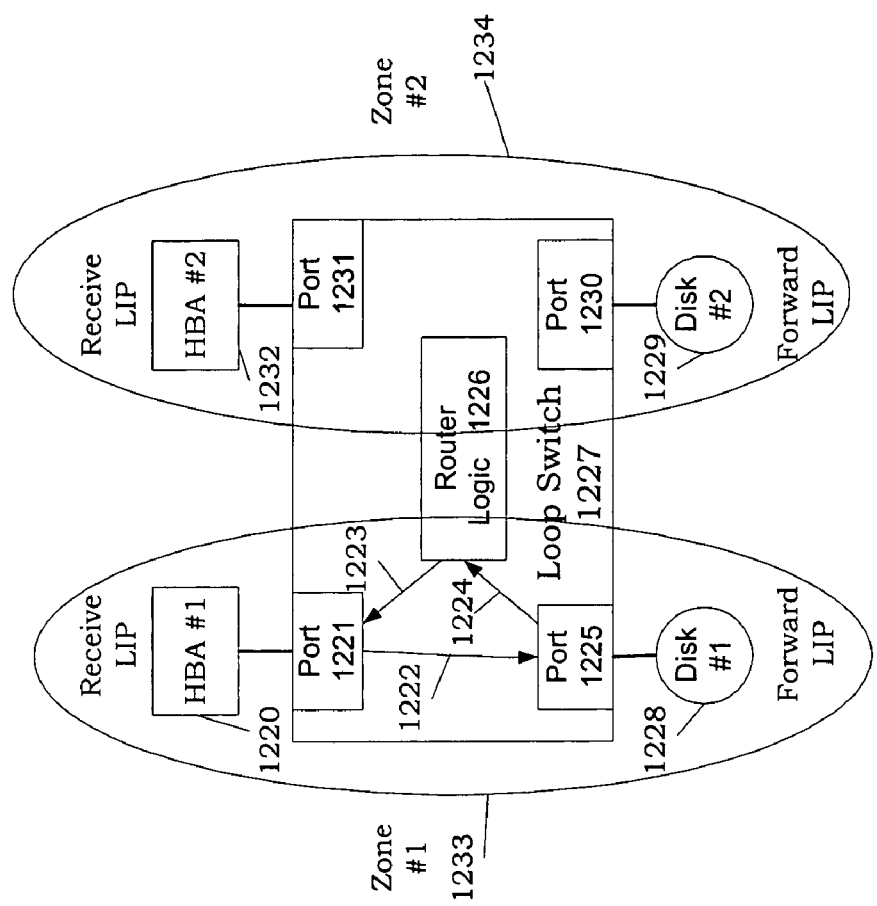
FIG. 21 is a diagram of a single Loop Switch with multiple LIP zones.

In this example, all four devices attached to the Loop Switch ASIC are in a combination of LIP Zones, see FIG. 21 1233, 1234. No routes are blocked. All devices 1220, 1228, 1232, 1229 can communicate with all other devices. The implication of being in a separate zone is that any time a LIP is forwarded to the router 1226, only devices within the same zone, configured to be notified of a LIP will be involved in the resulting loop initialization. The HBA ports 1221, 1231 are configured so the HBA's are notified when a LIP is forwarded to the router but do not forward LIPs to other devices themselves. The disk ports 1225, 1230 are configured in the opposite manner. A LIP from a disk is forwarded to the system however a LIP in the system is not passed on to a disk port 1230, and 1228.

Assuming a LIP is generated by Disk #1 1228, the ports will be connected into a loop as illustrated by path within the Loop Switch, 1222, 1223, 1224. Only HBA #1 1220 gets included in a loop 1222, 1223, 1224 with Disk #1 1228 while both HBA #2 1232 and Disk #2 1229 are unaffected and can continue communications. If HBA #2 1232 or Disk #2 1229 tries to send an OPN to either HBA #1 1220 or Disk #1 1228 while isolated, a CLS will be returned to the originating device. Disk #1 forwards the LIP to the router 1226 because it has been enabled for LIP forwarding. The two devices will perform a loop initialization cycle. Upon completion, both devices will be allowed to enter switching mode and communicate with HBA #2 and Disk #2.

HBA #1 was included in a loop initialization cycle that did not include the ALPA for HBA #2 in the LIRP/LILP frames. Communication from HBA #1 to HBA #2 is essentially broken since HBA #1 has no knowledge of HBA #2. An optional setting in the router control registers would allow all ALPA's in the system to be included in the LIRP/LILP frames.

Within the Loop Switch ASIC 1227, the port connected to Disk #1 1225 will detect the LIP. The LIP will be blocked at the port however a "LIP detected" signal will be forwarded to the router. The router logic 1226 will control all the ports 1221, 1231, 1225, 1230 and cause fill words to be replaced with blocking ARB's to stop new connections from forming within the Loop Switch ASIC 1227. Additionally, R_RDY ordered sets will not be passed through the Loop Switch ASIC to cause existing connections to complete quickly.

The router logic 1226 will format bits to logically OR with the LIFA frame. In this example, the bits corresponding to the ALPA's for HBA #2 and Disk #2 will be set. Unlike the single zone example, all devices in Zone 1 are included in the loop so no ALPA's are formatted into a list to be inserted into the LIRP frame.

As soon as the router logic detects all traffic has halted; the crossbar switch will be configured to connect the ports and router into a loop for the loop initialization cycle. At this point, traffic is allowed to resume on the ports connected to HBA #2 and Disk #2. If an OPN was directed toward either HBA #1 or Disk #1, it will be responded to with a CLS routed back to the OPN's originator, indicating the requested device is busy. The LIP from the port will then be allowed to circulate the loop of isolated ports.

As the LIFA frame passes through the router, it will be modified by the router, OR'ing in all ALPA's from the list formatted in the router.

As the LIRP frame passes through the router, it is not modified. All devices in the zone are involved in the loop initialization.

The loop initialization cycle concludes with the LILP frame and CLS ordered set being circulated around the loop.

When the Loop Switch ASIC detects the initialization is complete, the router will allow the isolated ports to participate with the main system again.

5.11.5 Stealth Mode Isolation, Single ASIC, Devices in Multiple LIP Zones, with Blocked Routes In the table below, the basic controls for stealth isolation for each device is shown, also refer to FIG. 22.

| Device | Routes Blocked (router) | LIP Zone (router) | Stealth_rcv_lip (port) | Steath_gen_lip (port) |
|---|---|---|---|---|
| HBA #1 1240 | To HBA #2 | 1 1255 | 1 | 0 |
| HBA #2 1241 | To HBA #1 | 2 1254 | 1 | 0 |
| Disk #1 1243 | None | 1 1255 | 0 | 1 |
| Disk #2 1242 | None | 1 & 2 1254, 1255 | 0 | 1 |

Figure 22:
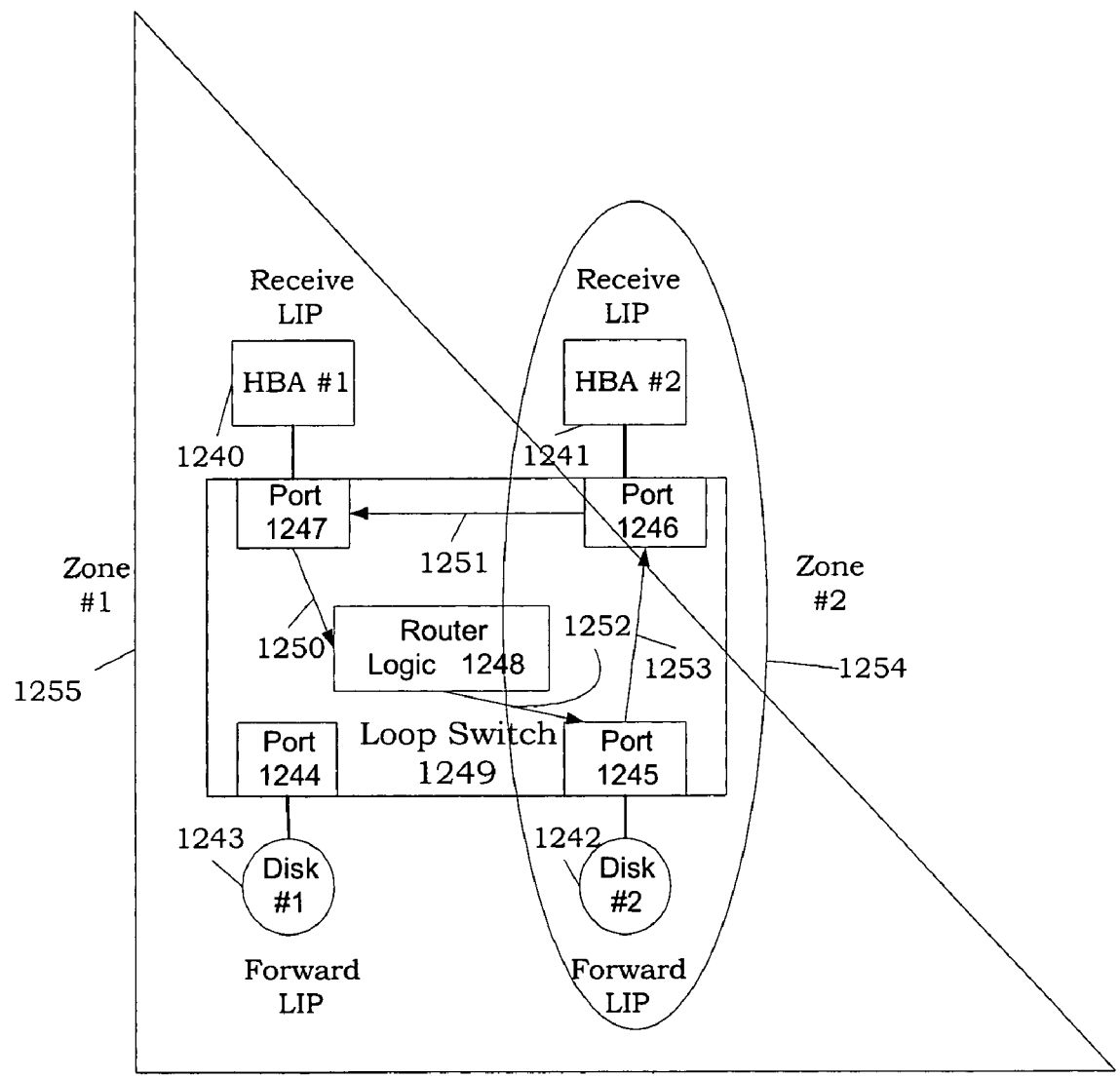
FIG. 22 is a diagram of a single Loop Switch with multiple overlapping LIP zones.

In this example, all four devices attached to the Loop Switch ASIC are in a combination of LIP Zones, see FIG. 22 1255, 1254. The route between both initiators 1240, 1241 is blocked. HBA #1 1240 gets LIP'ed if either disk 1243, 1242 LIP's. HBA #2 1241 only gets a LIP if Disk #2 1242 LIP's.

Assuming a LIP is generated by Disk #2 1242, the ports 1247, 1246, 1245 will be connected into a loop as shown by the path 1250, 1251, 1252, 1253. Both HBA #1 1240 and HBA #2 1241 get included in a loop 1255 with Disk #2 1242 while Disk #1 1243 is unaffected and could continue communications if another device was available. If Disk #1 1243 tries to send an OPN to any of the isolated devices, a CLS will be returned to the originating device. Disk #1 forwards the LIP to the router 1248 because it has been enabled for LIP forwarding and both HBA's are rolled into the isolation loop due to the overlapping zones 1255, 1254. The three devices will perform a loop initialization cycle 1240, 1243, 1242. Upon completion, all of the devices will be allowed to enter switching mode and communicate.

In this example, although both HBA's 1240, 1241 see the ALPA of the other HBA, any OPN sent from one HBA to the other is detected as a blocked route and the OPN is returned to the originating HBA. If either HBA gets upset by the continuous return of its OPN to a device it believes exists on the loop, it might LIP. This LIP would only include the LIP'ing HBA and the router 1248, which would insert only the ALPA's in that LIP zone into the LIRP frame, effectively removing the other HBA's ALPA from its table.

Within the Loop Switch ASIC 1249, the port connected to Disk #2 1245 will detect the LIP. The LIP will be blocked at the port however a "LIP detected" signal will be forwarded to the router logic 1248. The router logic 1248 will control all the ports 1247, 1246, 1244, 1245 and cause fill words to be replaced with blocking ARB's to stop new connections from forming within the Loop Switch ASIC 1249. Additionally, R_RDY ordered sets will not be passed through the Loop Switch ASIC 1249 to cause existing connections to complete quickly.

The router logic will format bits to logically OR with the LIFA frame. In this example, the bit corresponding to the ALPA for Disk #1 will be set. Additionally the ALPA for Disk #1 will be formatted into the list to be inserted into the LIRP frame.

As soon as the router logic detects all traffic has halted; the crossbar switch will be configured to connect the ports and router into a loop for the loop initialization cycle. At this point, traffic is allowed to resume on the port connected to Disk #1. If an OPN was directed toward either HBA or Disk #2, it will be responded to with a CLS routed back to the Disk #1, indicating the requested device is busy. The LIP from the port will then be allowed to circulate the loop of isolated ports.

As the LIFA frame passes through the router, it will be modified by the router, OR'ing in the bit corresponding to the ALPA for Disk #1.

As the LIRP frame passes through the router, it is also modified. The ALPA list, containing devices in the zone(s) being initialized but not actually involved in the initialization (Disk #1's ALPA), is inserted into the LIRP frame. The offset field is incremented and the CRC recalculated.

The loop initialization cycle concludes with the LILP frame and CLS ordered set being circulated around the loop.

When the Loop Switch ASIC detects the initialization is complete, the router will allow the isolated ports to participate with the main system again.

At this point, both HBA's will attempt to OPN each ALPA detected in the LILP frame to PLOGI into each device. Since the Route between HBA #1 and HBA #2 is blocked, the router will return the OPN to the originator when either HBA tries to open the other.

5.11.6 Stealth Mode Isolation, Multiple ASICs, Devices in Multiple LIP Zones, with Blocked Routes In the table below, the basic controls for stealth isolation for each device is shown, also refer to FIG. 23.

| Device | Routes Blocked (router) | LIP Zone (router) | Stealth_ rcv_lip (port) | Stealth_gen_ lip (port) |
|---|---|---|---|---|
| HBA #1 1300 | To HBA #2 | 1 1329 | 1 | 0 |
| HBA #2 1301 | To HBA #1 | 2 1328 | 1 | 0 |
| Disk #1 1302 | None | 1 1329 | 0 | 1 |
| Disk #2 1303 | None | 1 & 2 1329, 1328 | 0 | 1 |
| Disk #3 1304 | None | 2 1328 | 0 | 1 |

Figure 23:
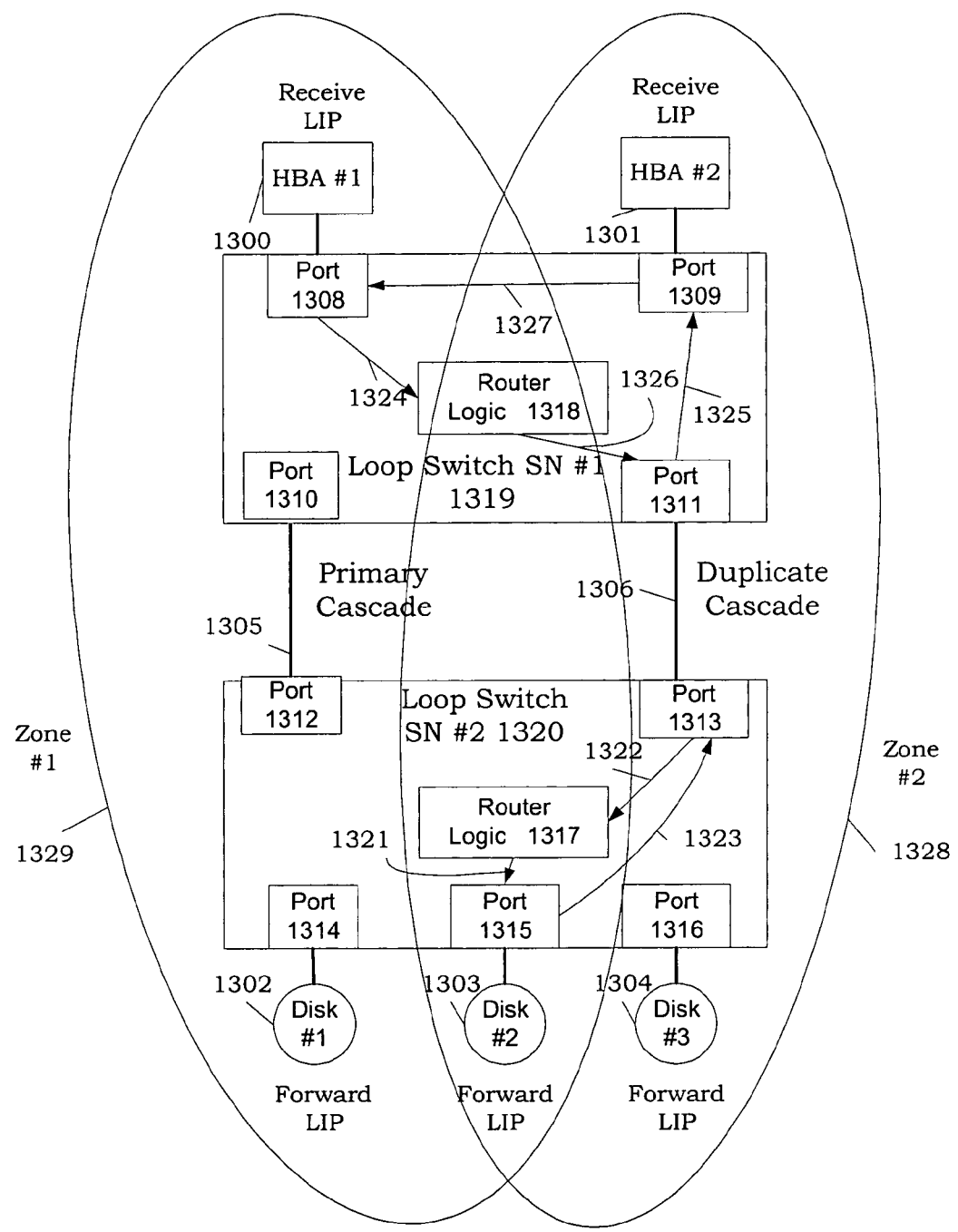
FIG. 23 is a diagram of multiple Loop Switches with multiple overlapping LIP zones.

In this example, all five devices attached to the Loop Switch ASICs are in a combination of LIP Zones, see FIG. 23, 1328, 1329. The route between both initiators HBA's 1300, 1301 is blocked. HBA #1 1300 gets LIP'ed if either disk #1 1302 or #2 1303 LIP's. HBA #2 1301 gets a LIP if Disk #2 1303 or #3 1304 LIP's. To support the multiple Loop Switch 1319, 1320 system, the duplicate cascade 1306 on each Loop Switch ASIC 1319, 1320 is configured as a stealth interswitch cascade.

Assuming a LIP is generated by Disk #2 1303, the ports will be connected within the Loop Switch by the path 1321, 1322, 1323. Both HBA #1 1300 and HBA #2 1301 get included in a loop 1324, 1325, 1326, 1327, 1322, 1323, 1321 with Disk #2 1303 while Disk #1 1302 and #3 1304 are unaffected and could continue communications if another device was available. If Disk #1 1302 or #3 1304 tries to send an OPN to any of the isolated devices, a CLS will be returned to the originating device. Disk #2 1303 forwards the LIP to the router 1317 because it has been enabled for LIP forwarding and both HBA's are rolled into the isolation loop due to the overlapping zones 1329, 1328. The three devices will perform a loop initialization cycle. Upon completion, all of the devices will be allowed to enter switching mode and communicate.

In this example, although both HBA's see the ALPA of the other HBA, any OPN sent from one HBA to the other is detected as a blocked route and the OPN is returned to the originating HBA. If either HBA gets upset by the continuous return of its OPN to a device it believes exists on the loop, it might LIP. This LIP would only include the LIP'ing HBA and the router, which would insert only the ALPA's in that LIP zone into the LIRP frame, effectively removing the other HBA's ALPA from its table.

Within the Loop Switch ASIC, the port 1315 connected to Disk #2 will detect the LIP. The LIP will be blocked at the port however a "LIP detected" signal will be forwarded to the router. The router logic will control all the ports and cause fill words to be replaced with blocking ARB's to stop new connections from forming within the ASIC. Additionally, R_RDY ordered sets will not be passed through the ASIC to cause existing connections to complete quickly.

Unlike the single Loop Switch ASIC system, this system has to arbitrate for the master of the initialization cycle and pass the LIP zone(s) affected information to the other Loop Switch ASIC. As soon as the traffic is stopped on the Loop Switch ASIC #2 1320, a loop connecting the router to the stealth interswitch cascade port, in this case the duplicate cascade 1306 between Loop Switch ASICs, is made within the Loop Switch. When the interswitch/router loop has been formed, a stream of 16 LIP's is sent out. Loop Switch ASIC #1's 1319 traffic is already halted so it can connect its router and the duplicate cascade into a loop upon receipt of the LIP's. The LIP interswitch frame is generated by Loop Switch ASIC #2, received by the router in Loop Switch ASIC #1 1319, stored and forwarded back to Loop Switch ASIC #2. Since Loop Switch ASIC #1 is seeing a LIP frame for the 1$^{st}$ time this cycle it sets the retransmit request bit in the frame forwarded back to Loop Switch ASIC #2. This causes Loop Switch ASIC #2 to resend the LIP frame. Loop Switch ASIC #1, forwards the frame back to Loop Switch ASIC #2 without modification this time as it has already seen the LIP frame. NOTE: This retransmit mechanism ensures that all switches receive the LIP frame regardless of the relationship of the stealth cascades and the router in the switch core.

ARB FF ordered sets are sent out by Loop Switch ASIC #2 as fill words.

Upon winning control of the initialization cycle, Loop Switch ASIC #2 1320 connects Disk #2 1303 into the loop with the local router 1317 and the duplicate cascade port 1313. After this loop is made, the LIP's are allowed to propagate from Disk #2 into the entire system.

Upon receipt of the second set of LIP's, Loop Switch ASIC #1 configures its ports for the initialization cycle based on the interswitch frame. In this case, both HBA's, the duplicate cascade port and the router are rolled into a loop. As soon as the isolated loop is created on each Loop Switch, each Loop Switch then allows all unaffected ports on that Loop Switch to resume communications and traffic could resume between the Loop Switch ASIC's on the primary cascade. The devices in the isolated loop initialization will start arbitrating to determine the LIM.

The router logic in Loop Switch ASIC #1 1318 will not attempt to modify either the LIFA or LIRP frames. Both devices attached locally to this Loop Switch ASIC are involved in the initialization cycle and don't require the Loop Switch ASIC to reserve their ALPA's. The router logic in Loop Switch ASIC #2 will format bits to logically OR with the LIFA frame. In this example, the bits corresponding to the ALPA's for Disks #1 and #3 will be set. Additionally the ALPAs for Disks #1 and #3 will be formatted into the list to be inserted into the LIRP frame.

As the LIFA frame passes through the router in Loop Switch ASIC #1, it is unaffected. As the LIFA frame passes through the router in Loop Switch ASIC #2, it will be modified by the router, OR'ing in all ALPA's from the list formatted in the router.

As the LIRP frame passes through the router in Loop Switch ASIC #2, it is also modified. The ALPA list, containing devices in the zone(s) being initialized but not actually involved in the initialization, is inserted into the LIRP frame. The offset field is incremented and the CRC recalculated.

The loop initialization cycle concludes with the LILP frame and CLS ordered set being circulated around the loop.

When the Loop Switch ASIC detects the initialization is complete, the router will allow the isolated ports to participate with the main system again.

At this point, both HBA's will attempt to OPN each ALPA detected in the LILP frame to PLOGI into each device. Since the Route between HBA #1 and HBA #2 is blocked, the router will return the OPN to the originator when either HBA tries to open the other. Additionally, HBA #1 may have discovered the presence of Disk #3 and will attempt to PLOGI into that disk. If this access is not desired either route blocking between HBA #1 and Disk #3 could be configured or a $3^{rd}$ isolation zone covering only Disk #3 and HBA #2 could be set up.

5.11.7 Stealth Mode Isolation, Multiple ASICs, Multiple Zones, HBA #1 & HBA #2 in Connection In the table below, the basic controls for stealth isolation for each device is shown, see also FIG. 23.

| Device | Routes Blocked (router) | LIP Zone (router) | Stealth_rcv_lip (port) | Stealth_gen_lip (port) |
|---|---|---|---|---|
| HBA #1 1300 | None | 1 1329 | 1 | 0 |
| HBA #2 1301 | None | 2 1328 | 1 | 0 |
| Disk #1 1302 | None | 1 1329 | 0 | 1 |
| Disk #2 1303 | None | 1 & 2 1329, 1328 | 0 | 1 |
| Disk #3 1304 | None | 2 1328 | 0 | 1 |

In this example, all five devices 1300, 1301, 1302, 1303, 1304 attached to the Loop Switch ASICs are in a combination of LIP Zones, see FIG. 231328, 1329. The route between both initiators 1300, 1301 is blocked. HBA #1 1300 gets LIP'ed if either disk #1 1302 or #2 1303 LIP's. HBA #2 1301 gets a LIP if Disk #2 1303 or #3 1304 LIP's. To support the multiple switch system 1319, 1320, the duplicate cascade 1306 on each Loop Switch ASIC is configured as a stealth interswitch cascade.

HBA #1 1300 and HBA #2 1301 are communicating when a LIP is generated by Disk #2 1303. After all traffic on the system is stopped, the ports will be connected into a loop as illustrated by the path 1321, 1322, 1323, 1325, 1327, 1326, 1324. Both HBA #1 1300 and HBA #2 1301 get included in a loop with Disk #2 1303 while Disk #1 1302 and #3 1304 are unaffected and could continue communications if another device was available. If Disk #1 1302 tries to send an OPN to any of the isolated devices, a CLS will be returned to the originating device. Disk #2 1303 forwards the LIP to the router 1317 because it has been enabled for LIP forwarding and both HBA's are rolled into the isolation loop due to the overlapping zones. The three devices will perform a loop initialization cycle. Upon completion, all of the devices will be allowed to enter switching mode and communicate.

Within the Loop Switch ASIC 1320, the port connected to Disk #2 1315 will detect the LIP. The LIP will be blocked at the port 1315 however a "LIP detected" signal will be forwarded to the router 1317. The router logic 1317 will control all the ports and cause fill words to be replaced with blocking ARB's to stop new connections from forming within the ASIC. Additionally, R_RDY ordered sets will not be passed through the ASIC to cause existing connections to complete quickly.

Unlike the single Loop Switch ASIC system, this system has to arbitrate for the master of the initialization cycle and pass the LIP zone(s) affected information to the other Loop Switch ASIC. As soon as the traffic is stopped on the Loop Switch ASIC #2, a loop connecting the router to the stealth interswitch cascade port, in this case the duplicate cascade between Loop Switch ASICs, is made within the switch. When the interswitch/router loop has been formed, a stream of 16 LIP's is sent out. Some of ASIC #1's traffic is still running, pending the end of the connection between HBA #1 and HBA #2. The cascades between Loop Switch ASIC #1 and Loop Switch ASIC #2 are halted from the Loop Switch ASIC #2 side. Loop Switch ASIC #1 detects the LIP's on the duplicate cascade so it connects its router and the duplicate cascade into a loop upon receipt of the LIP's. The LIP interswitch frame is generated by Loop Switch ASIC #2, received by the router in Loop Switch ASIC #1 and stored in Loop Switch ASIC #1's router. When all traffic on Loop Switch ASIC #1 has been stopped, the interswitch frame is forwarded to ASIC #2. ARB FF ordered sets are sent out by Loop Switch ASIC #2 as fill words.

Upon winning control of the initialization cycle, Loop Switch ASIC #1 connects Disk #2 into the loop with the local router and the duplicate cascade port. After this loop is made, the LIP's are allowed to propagate from Disk #2 into the entire system.

Upon receipt of the second set of LIP's, Loop Switch ASIC #1 configures its ports for the initialization cycle based on the interswitch frame. In this case, the HBA's, the duplicate cascade port and the router are rolled into a loop. As soon as a loop is created on each switch, each switch then allows all unaffected ports on that switch to resume communications and traffic could resume between the Loop Switch ASIC's on the primary cascade. The devices in the loop initialization will start arbitrating to determine the LIM.

The router logic in Loop Switch ASIC #1 will not attempt to modify either the LIFA or LIRP frames. Both devices attached locally to this Loop Switch ASIC are involved in the initialization cycle and don't require the Loop Switch ASIC to reserve their ALPA's. The router logic in Loop Switch ASIC #2 will format bits to logically OR with the LIFA frame. In this example, the bits corresponding to the ALPA's for Disks #1 and #3 will be set. Additionally the ALPAs for Disks #1 and #3 will be formatted into the list to be inserted into the LIRP frame.

As the LIFA frame passes through the router in Loop Switch ASIC #1, it is unaffected. As the LIFA frame passes through the router in ASIC #2, it is modified by the router, OR'ing in all ALPA's from the list formatted in the router.

As the LIRP frame passes through the router in Loop Switch ASIC #2, it is also modified. The ALPA list, containing devices in the zone(s) being initialized but not actually involved in the initialization, is inserted into the LIRP frame. The offset field is incremented and the CRC recalculated.

The loop initialization cycle concludes with the LILP frame and CLS ordered set being circulated around the loop.

When the Loop Switch ASIC detects the initialization is complete, the router will allow the isolated ports to participate with the main system again.

At this point, both HBA's will attempt to OPN each ALPA detected in the LILP frame to PLOGI into each device. Since the Route between HBA #1 and HBA #2 is blocked, the router will return the OPN to the originator when either HBA tries to open the other. Additionally, HBA #1 may have discovered the presence of Disk #3 and will attempt to PLOGI into that disk. If this access is not desired either route blocking between HBA #1 and Disk #3 could be configured or a 3d isolation zone covering only Disk #3 and HBA #2 could be set up.

Figure 24:
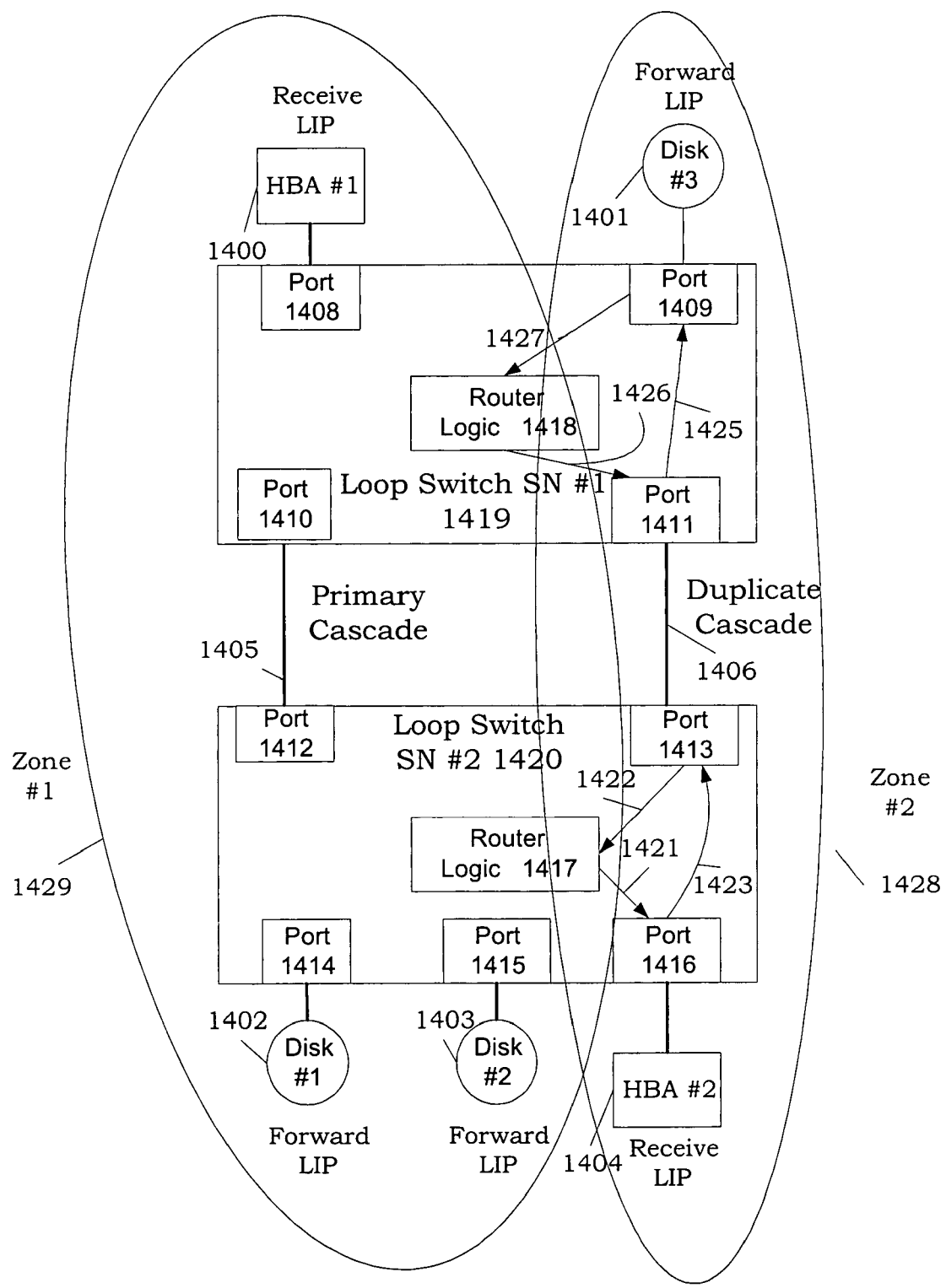
FIG. 24 is a diagram of multiple Loop Switches with multiple LIP Zones with simultaneous LIPs.
Figure 25:
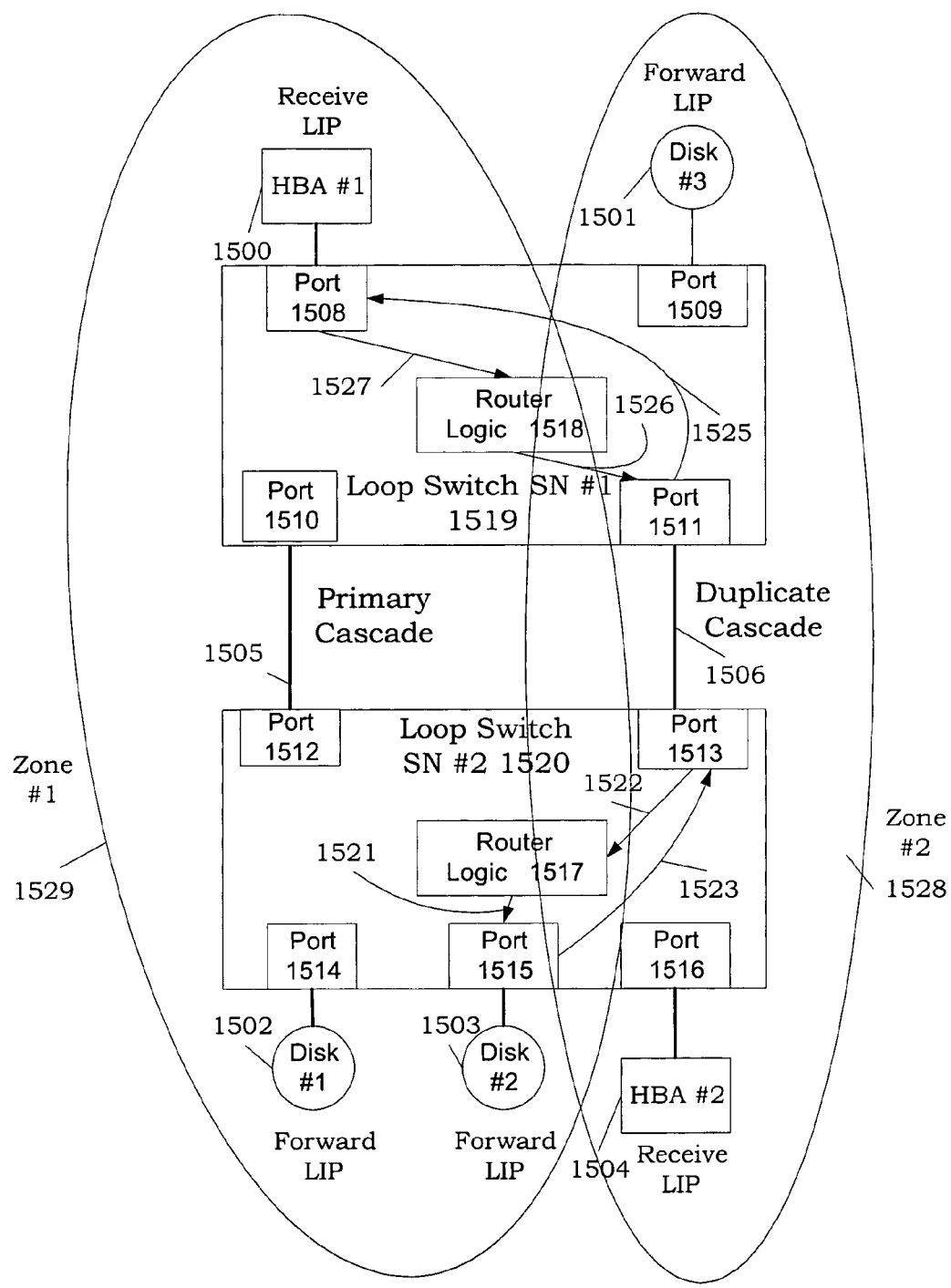
FIG. 25 is a diagram of multiple Loop Switches with multiple LIP Zones with simultaneous LIPs.

5.11.8 Stealth Mode Isolation, Multiple ASICs, Devices in Multiple LIP Zones, Simultaneous LIP's In the table below, the basic controls for stealth isolation for each device is shown, also refer to FIG. 24 and FIG. 25.

| Device | Routes Blocked (router) | LIP Zone (router) | Stealth_rcv_lip (port) | Stealth_gen_lip (port) |
|---|---|---|---|---|
| HBA #1 1400 1500 | None | 1 1429 1529 | 1 | 0 |
| HBA #2 1404 1504 | None | 2 1428 1528 | 1 | 0 |
| Disk #1 1402 1502 | None | 1 1429 1529 | 0 | 1 |
| Disk #2 1403 1503 | None | 1 1429 1529 | 0 | 1 |
| Disk #3 1401 1501 | None | 2 1428 1528 | 0 | 1 |

In this example, all five devices attached to the Loop Switch ASICs are in a combination of LIP Zones 1429, 1428, 1529, 1528. HBA #1 1400, 1500 gets LIP'ed if either disk #1 1402, 1502 or #2 1403, 1503 generates a LIP. HBA #2 1404, 1504 gets a LIP if Disk #3 1401, 1501 generates a LIP. To support the multiple switch system 1419, 1420, 1519, 1520, the duplicate cascade 1406, 1506 on each Loop Switch ASIC is configured as a stealth interswitch cascade.

Assuming a LIP is generated by Disk #2 1403, 1503 and Disk #3 1401, 1501 almost simultaneously, two loop initialization cycles will have to be performed to handle the non-overlapping zones. Loop Switch ASIC #1 1419, 1519 will win control of the first initialization cycle (due to the lower serial number) and the ports will be connected into a loop as illustrated by the path shown in FIG. 24, 1427, 1426, 1425. HBA #2 1404, 1504 gets included in a loop with only Disk #3 1401, 1501 while HBA #1 1400, 1500 and Disk #1 1402, 1502 are unaffected and could continue communications on the primary cascade. HBA #2 1404, 1504 and Disk #3 1401, 1501 will perform a loop initialization cycle. Upon completion, both of these devices will be allowed to enter switching mode and communicate with the rest of the system.

Upon detection of the complete loop initialization cycle, Loop Switch ASIC #2 1420, 1520 will then initiate a loop initialization cycle including HBA #1 1400, 1500 and Disk #2 1403, 1503. The resulting loop is shown in FIG. 25, 1525, 1526, 1527, 1522, 1521, 1523. HBA #1 1500 and Disk #2 1503 will perform a loop initialization cycle. Upon completion, both of these devices will be allowed to enter switching mode and communicate with the rest of the system. NOTE: If both LIP'ing devices had been in the same zone, Loop Switch ASIC #2 1520 would have detected this and only one loop initialization would have been required.

Within the Loop Switch ASICs, the ports 1514, 1515 connected to Disks #2 and #3 will detect the LIP's. The LIP's will be blocked at each port however a "LIP detected" signal will be forwarded to the router 1417, 1418, 1517, 1518 in each Loop Switch ASIC. The router logic 1417, 1418, 1517, 1518 will control all the ports 1408, 1409, 1410, 1411, 1412, 1413, 1414, 1415, 1416, 1508, 1509, 1510, 1511, 1512, 1513, 1514, 1515, 1516 and cause fill words to be replaced with blocking ARB's to stop new connections from forming within the Loop Switch ASIC. Additionally, R_RDY ordered sets will not be passed through the Loop Switch ASIC to cause existing connections to complete quickly.

Unlike the single Loop Switch ASIC system, this system has to arbitrate for the master of the initialization cycle and pass the LIP zone(s) affected information to the other Loop Switch ASIC. As soon as the traffic is stopped on each Loop Switch ASIC, a loop connecting the router to the stealth interswitch cascade port, in this case the duplicate cascade between Loop Switch ASICs, is made within the switch. When each Loop Switch ASIC's interswitch cascade/router loop has been formed, a stream of 16 LIP's is sent out. The LIP interswitch frame generated by Loop Switch ASIC #2, received by the router in Loop Switch ASIC #1, but is discarded since it has a higher serial number than Loop Switch ASIC #1. The Loop Switch ASIC #1 interswitch frame is received by Loop Switch ASIC #2, stored and forwarded back to Loop Switch ASIC #1. ARB FF ordered sets are sent out by both Loop Switch ASIC's as fill words. Upon detecting it won, Loop Switch ASIC #1 will roll Disk #3 and the duplicate cascade port into a loop and generate at least 10 milliseconds worth of LIP's.

Upon receipt of the second set of LIP's, Loop Switch ASIC #2 configures its ports for the initialization cycle based on the interswitch frame from Loop Switch ASIC #1. In this case, HBA #2, the duplicate cascade ports and Disk #3 are rolled into a loop. As soon as this loop is created on each Loop Switch, each switch then allows all unaffected ports on that switch to resume communications and traffic could resume between the Loop Switch ASIC's on the primary cascade. The devices in the loop initialization will start arbitrating to determine the LIM.

The router logic in Loop Switch ASIC #1 will OR in the bit representing the ALPA for HBA #1 in the LIFA frame but will not add the ALPA to the LIRP frame since HBA #1 is in another isolation zone. The router logic in Loop Switch ASIC #2 will format bits to logically OR with the LIFA frame. In this example, the bits corresponding to the ALPA's for Disks #1 and #2 will be set to reserve those ALPA's but it will not modify the LIRP frame since the other disks are in a separate LIP isolation zone.

The Loop Switch will detect the port that contains the LIM relative to each Loop Switch ASIC and connect the router in each Loop Switch ASIC between the LIM port and the other ports in the initialization loop. (In this case Disk #3 became the LIM) As the LIFA frame passes through the router in Loop Switch ASIC #1, HBA #1's ALPA bit is OR'ed in and the CRC is recalculated. As the LIFA frame passes through the router in Loop Switch ASIC #2, it will be modified by the router, OR'ing in all ALPA's for both Disk #1 and Disk #2.

As the LIRP frame passes through the router in each Loop Switch ASIC, it is not modified.

The loop initialization cycle concludes with the LILP frame and CLS ordered set being circulated around the loop.

When the Loop Switch ASIC detects the initialization is complete, the router will allow the isolated ports to participate with the main system again.

Loop Switch ASIC #2 will then detect that the LIP Zone #2 1428, 1528 cycle is complete and will initiate the LIP Zone #1 1429, 1529 loop initialization cycle.

5.12 CPU Port Interface

5.12.1 CPU Port Description and Operation

There are situation in which in band communication needs to take place between switches and remote Fibre Channel devices such as RAID controllers when the Loop Switch is contained in an SBOD configuration. The cpu_port is a Fibre Channel MAC, the encoder/decoder or link side is connected to the Loop Switch crossbar switch. This is then accessed as an additional port. The CPU Port will look like another device sitting on a Loop Switch port. In which the 23rd or additional port can be configured to be a device, tree, or string port like any other port along with all other port functionality.

A transmit engine is used to send data to commands out of the FC interfaces. Firmware will create the frame or packet in RAM. It will configure and load the data from RAM to the CPU Port transmit buffer. The buffer is large enough to hold an entire FC frame (2112 byte payload). An interrupt will go back to the processor to indicate when the transmit is completed. CRC will be created and sent out with the frame. The CPU port transmit buffer will be accessible through the parallel or I$^2$C interface.

The receive engine will handle frames and packets that are sent to the CPU port. The buffer is large enough to hold an entire FC frame (2112 byte payload). CRC will be checked when the frame arrives. An interrupt will go back to the processor to indicate when a frame has been received and when the frame has been read out. The CPU port receive buffer will be accessible through the parallel or I$^2$C interface.

Figure 26:
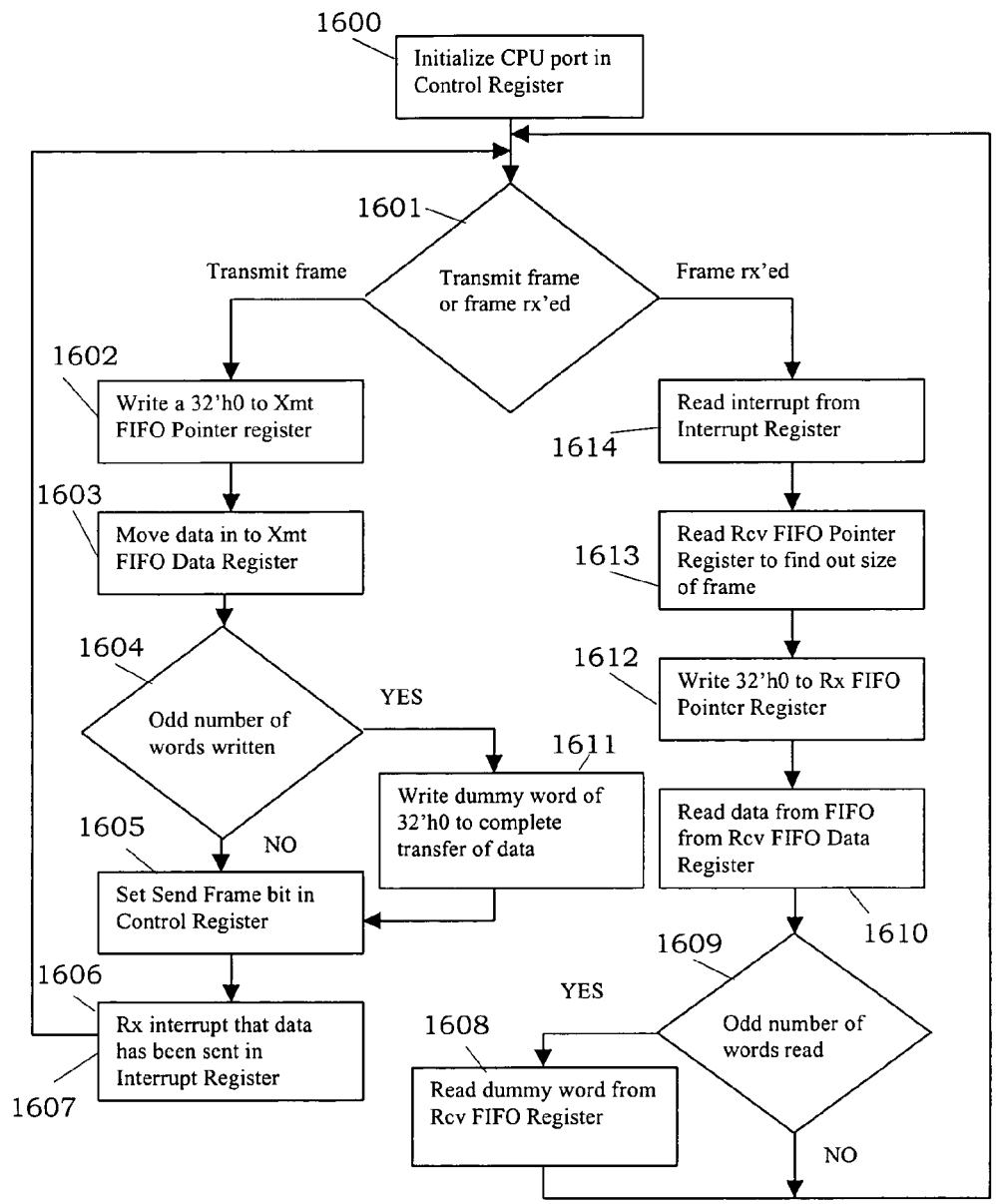
FIG. 26 is a flow diagram of the CPU port operation.

In the transmit engine the processor moves data into the transmit FIFO in the CPU Port, see FIG. 26. This is accomplished by first writing a zero to the Tx FIFO Pointer register 1602. This sets the FIFO pointer address to zero. Next, write the data to the Data Port register 1603. The data that is being written to the FIFO is writing to a two word wide FIFO which means that data is not written to the FIFO until two words have been sent. So even if there are an odd number of words being written a dummy write of 32'h0 needs to be done to load in the last two words 1611. The first and last words sent are the system SOF and EOF delimiters. The definitions of the system delimiters are below. A valid SOF delimiter would be 32'h2e000000 and a valid EOF would be 32'h41000000. After the DMA transfer is complete, set the Send Frame bit in the Control Register to send the frame to the switch core 1605.

In the Receive engine the processor reads data from CPU port to RAM. An interrupt will occur upon a frame being rx'ed in the Rx FIFO. The Rx FIFO Pointer register should be read to determine the length of the Rx frame 1613. The Rx Pointer register then needs to be written a zero to preload the data for reading 1612. The first and last words in the frame will be the specially encoded system SOF and EOF delimiters.

5.13 Port Management Functions

5.13.1 Port Control

Port control functions include beaconing, forcing a port insertion or bypass, setting policies, transmitting ordered sets into the port or loop and capturing ordered sets on the port.

5.13.2 Port Status

Port status functions include port initialization state, GBIC/SFP status, transceiver operational status as well as the ordered set detection capability on a per port basis.

5.13.3 Ordered Set Detection

Ordered set detection is constantly occurring with Port Detector Register. This register is cleared on read or by writing to the Clear Status Register bit in the Port Control Register. For a management card to do a detection cycle, it would clear the Detector register, wait for an amount of time to sample the data stream and then read Detector Register.

5.13.4 User Match Functions

The User Match functions provide another mechanism for detecting what is occurring on the loop or a port. The User Match functions include the ability to search for a particular ordered set, search for any ordered set that doesn't have a predefined detector bit, count the number of ordered sets that match the search criteria and capture an ordered set that matches the search criteria.

The first function, search for a particular ordered set is accomplished by setting up the User Ordered Set Match register with the ordered set to look for and setting the User Match Enable bit in the Port Control register. If a match occurs, the User Match bit in the Port Detector Register is set. Optional bits that can also be set are the Match3x bit and one or more of the Match Mask bits. The Match3x bit forces the logic to see three consecutive ordered sets that match the search criteria before setting the User Match bit. This is to allow the search for FC Primitive Sequences. The Match Mask bits allow the user to make any of the bits in the ordered set don't cares. This provides for the ability to search for any SOF, for example, without regard to what type of SOF it might be or to search for any OPN regardless of the source or destination ALPA.

The second function is the ability to search for ordered sets that don't have a predefined bit in the detector register. This is done by setting the match_othr bit and the User Match Enable bit. The User Ordered Set Match register is not used for this function. When an ordered set is received that is not a LIP, OPN, CLS, RRDY, ARB, IDLE, SOF or EOF, the User Match bit is set. Note that if the ordered set that is received is a Point-to-Point OS (i.e. OLS, NOS, LR or LRR), the Match, Unknown OS and Pt-Pt Primitive bits are set in the Port Detector register. If the received OS is anything else, the Match (usr_match_detect) and Unknown OS Detect (unk_os_detect) bit are set. Note that the match3x flag is ignored when the Match Other bit is set.

The next two functions occur anytime either of the first two functions are enabled. The Port Match Count register counts each occurrence of a match. Note the counter counts each ordered set, even if the Match 3x bit is set. If only two consecutive ordered sets are received that match the User Ordered Set Match register, the count is incremented by two, but the detector bit is not seen unless a third OS is received. The Match Counter is cleared only when the Match Enable bit is written to the Port Control register and continues to count until the bit is cleared.

The Port Capture Ordered Set register is used to record the FIRST ordered set that matches the search criteria. Again this function does not use the Match3x bit. This function can be used to see what ordered set caused the setting of the User Match (usrm_en)bit. This function is most interesting when using the Match Mask bits or when using the Match Other bit.

Another function of the User Match registers is to inject an internal parity error upon detection of a user match. This function allows software error handling routines to be exercised.

5.13.5 Ordered Set Transmission

Ordered set transmission is accomplished by writing the desired ordered set to the Port User Ordered Set Transmit Registers along with the control bits in that register to set the method to use in sending the ordered sets. The 'S' bit controls whether to continuously send the given ordered set or just send it 1-15 times. (Control of the number of Ordered Sets to send is via the Port Control Register #2 Bits.) The 'I' bit controls whether to immediately send the ordered set(s) or wait and replace only fill words. The 'M' bit allows the user to define a particular ordered set to look for in the receive data stream, using the User Ordered Set Match register, and replace this ordered set with the new one defined in the User Ordered Set Transmit register. The 'F' acts a little differently in that it doesn't use the data fields in the User Ordered Set Transmit register, but looks for ordered sets that match the User Ordered Set Match register and replaces them with the current fill word.

To send an ordered set, the lower word must be written first followed by the upper word with the TX Enable (xmit_os_reg) bit set. To change to another transmit word, the new lower word is written and then the new upper word is written, again with the TX Enable bit set. When the upper word write is complete, the Loop Switch synchronously changes to the new word. To stop transmission of the user word, the upper word is written with the TX Enable bit cleared. The Loop Switch synchronously terminates the transmission when the register write is complete.

Note that if the port is inserted in the loop, the transmission of ordered sets replaces the ordered sets that would normally be sent. If the port is not inserted the normal IDLE or ARB characters that would have been transmitted are replaced with the given ordered set. When the requested transmission is complete, the normal data stream is resumed.

An example of using the transmit capability on an operating loop would be to send a Mark character around the loop to detect which Loop Switches are connected together. The User Ordered Set Match and the User Ordered Set Transmit registers would be loaded with the Mark character. The 'E', 'S' and the 'F' bits would be set in the User Ordered Set Transmit register as well. This would send the Mark character once (if count set to one) by replacing a fill word and when the Mark comes back around and is detected by the match function, it would be removed.

5.13.6 GBIC/SFP Status and Control

The port status and control registers allow the management card to access the status pins of the GBIC/SFP as well and the control pins. The status includes receiver loss of signal (RX_LOS), transmitter fault (TX_FAULT) and the Mod_Def pins that indicate the type of GBIC or SFP installed. The only control signal for the GBIC/SFP is the transmit disable pin.

5.13.7 GBIC/SFP Serial ID

The Loop Switch provides a mechanism to read serial ID data from an attached GBIC/SFP that supports the I²C interface. Two microprocessor accessible registers are defined that assist the Loop Switch in reading the EEPROM. The first register is an address register that indicates where the next access to the EEPROM is to occur. The second register is a 16-bit data register that the serial ID data is read into. After reset or after a GBIC or SFP is inserted into the Loop Switch, the Loop Switch pauses for 2 seconds to allow the GBIC/SFP internal logic to settle to a known state and then automatically reads the first 2 bytes from the GBIC and put them into the data register, the Loop Switch then sets the Serial ID Ready bit in the Port Status Register #2. The microprocessor can then read the GBIC/SFP Serial ID Data Register to get the data, which in turn causes the Loop Switch to read the next 2 words. The microprocessor could also write a different address into the GBIC/SFP Read Address Register and then do the read of the data register that causes the Loop Switch to read data from the new location. The micro must set the address first and then do the data register read to cause the Loop Switch to read from the proper location. Note that the GBIC Read Address Register shouldn't be modified unless the Serial ID Ready bit is set in the Port Status Register #2 to prevent the corruption of the address during the read process.

Note that the data is read from the GBIC/SFP one byte at a time. It also does the read using a fully compliant I²C protocol to prevent the problems seen with reading Finisar GBICs.

5.13.8 Error Counters

Each port maintains frame CRC error and bad transmission word counters. Bad transmission characters are detected within the 10b/8b decode logic. If bad characters are detected within a 40-bit word, the counter is incremented by 1. The CRC is calculated for each frame that is detected on the receiver of the port. The CRC is calculated and verified on a 16-bit data path at the receiver of each port. Both counters stick at their maximum value and are cleared by a read from the microprocessor. Along with the detection of a CRC error, the Loop Switch saves the low order byte of the S_ID of the last frame that had the error in the CRC Error ALPA Register. This can be used to determine the ALPA of the frame's source node. This information can be used to determine where a bad link might exist.

Each port also maintains an 8 bit counter for both port insertions and loop up state changes. The loop up counter is maintained in each port to allow the ports to be hard zoned and still maintain a loop up counter for each zone.

Another error detection function is the ability to capture the number of the first port that generates a LIP. This can be used to determine is a particular port is experiencing problems that require frequent loop initializations to occur.

5.13.9 Port Monitoring Mode

The router logic has registers called the Switch Matrix Control Registers. These registers allow a management entity to configure any port to be a monitoring port. This monitoring port can be connected to the receiver of any port, including the expansion port or the receiver of the monitoring port itself. This capability allows a particular port to be set aside as an analyzer port where a FC protocol analyzer can be plugged in. The management card 'moves' the analyzer from port to port to discover what is happening. Note that whenever the Switch Matrix Control register takes over control of a port, that port's bypass LED starts blinking to indicate manual control is in effect.

5.13.10 Port External Loopback

A port can be placed in monitoring mode, as explained above, where the port is monitoring itself. In this case, the port is operating in a loopback mode where anything received on the port is sent back out its transmitter. An administrator can test a link to the Loop Switch before actually allowing it to be inserted into the loop using this mode. With the port in loopback, the loop segment connected to the port completes loop initialization, if the link is good. With the diagnostics of the Loop Switch, the administrator can verify the loop is operational and then put the port into the loop.

5.13.11 Frequency Check Circuit

The frequency check circuit is implemented within the elasticity buffer. This circuit is a word counter that is used to determine the time between inserts/deletes within the elasticity buffer. The counter is 16 bits with the upper bit specifying whether the upstream node is higher or lower in frequency. A one in the $16^{th}$ bit denotes that the upstream node frequency is higher and a zero denotes the upstream node frequency is lower. The remaining 15 bits count the frequency delta between inserts or deletes. A count value less than approximately 10,000 decimal (2710 hex) signifies a frequency delta outside the specified range (plus or minus 100 PPM=200 PPM). The counter value is loaded into the processor accessible register every 752.94 microseconds and then reinitialized to start a new sample. The sample period is enabled on the first insert/delete after the read, then disabled on the second insert/delete.

The clock tolerance of a Fibre Channel transmitter is +/−100 parts per million. If one of the transmitters is transmitting at the slow end of the tolerance range and the other is transmitting at the fast end of the tolerance range, the maximum allowable difference between the two clocks would be 200 parts per million. The ideal frequency of a Fibre Channel transmitter is 1062500 Kbps and so 200 ppm would be a difference of 200 KBPS. This corresponds to one transmission word every 5,000 words or one word every 10,000 half-words (the elastic-store portion of the design uses a 16 bit internal data path while the reset of the ASIC uses a 32 bit path). Since the counter increments every half-word, the allowable limit would be 10,000. Values 0x8000 or 1x0000 in this register indicate that an insert or delete did not occur since the last read of the register, again indicating that the two clocks are well within spec.

For clocks that are very close to the same frequency, a prescaler circuit allows the counter to track the longer times between insertions or deletions by changing the resolution of the lsb of the frequency counter. The counter works in exactly the same way as described above except that the value reported in the frequency counter must be processed to account for the prescaler setting.

5.13.12 Port Operational Policies

The Loop Switch ASIC has many automatic features that may or may not be desirable in a particular installation. These policies are loaded via the EEPROM policy bits. Because of this, several of the Loop Switch's features have management overrides built in. These overrides are contained in the Port Configuration Register. A management station can set one or more of these policy flags to disable an undesired function, on a per port basis. With the exception of TINMAN, all policies are independent.

Port Insertion on word sync (TINMAN): This mode allows a port to be inserted if a signal is present on the receive inputs that the chip can sync to. No checks are made to insure that the data received is good other than it contains comma characters. Disables all other policies except byp-_no_comma when enabled. The initial state is set by the Policy bit[0] in the EEPROM.

Disable attached device discovery (SEOC): At port insertion time, a port attempts to determine what type of device is connected by sending various signals to the device. If this signaling causes interoperability problems, setting this policy disables it. The initial state is set by the Policy bit[1] in the EEPROM.

Port Bypass on LIPf8 presence (byp on lipf8): Anytime a port detects LIPf8 ordered sets, it changes them to LIPf7s and lets them be passed around the loop. When the LIPf7 has made it back to the port, the port is bypassed and the loop is allowed to proceed through the normal insertion process. Setting this policy flag disables the LIPf8 substitution and subsequent bypass. The initial state is set by the Policy bit[2] in the EEPROM.

Port bypass on no data (byp no comma): Anytime a port detects that it is not passing ordered sets that contain a comma character for more than 100 us, the port is bypassed and remains that way until the port can pass the insertion criteria. Setting this policy flag disables the check & subsequent bypass. The initial state is set by the Policy bit[3] in the EEPROM.

LIP on port bypass(lip on byp): When a port is bypassed, the Loop Switch forces a LIPf7 into the loop to guarantee that all devices on the loop recognize the change in the loop configuration. Setting this policy disables the LIP generation and the port simply is removed from the loop. NOTE: LIPf7 is not generated if TINMAN policy is active. The initial state is set by the Policy bit[4] in the EEPROM.

LIP on port insertion(lip on ins): When a port is inserted into the loop, the Loop Switch forces a LIPf7 into the loop to guarantee that all devices on the loop recognize the change in the loop configuration. Setting this policy disables the LIP generation and simply inserts the port into the loop. This allows the mixing of current devices that follow the FC-AL1 initialization protocol with future devices that may not chose to follow the older protocol. NOTE: LIPf7 is not generated if TINMAN policy is active. The initial state is set by the Policy bit[5] in the EEPROM.

Disable cascade hardware load balancing (dis balance): When multiple trunks are connected between Loop Switches, setting this bit disables hardware detection of initiators for load-balancing of the trunks. Software assigned load balancing of connections is still enabled.

5.13.13 ALPA to Port Map

The Loop Switch executes a device discovery process that maps all existing ALPAs to the ports on the Loop Switch. This mapping is available in the Router's Port ALPA Registers for use by a management entity to create a topology map.

5.13.14 Traffic Patterns

Traffic patterns are determined by maintaining a OPN port bit map register for each port. When a connection is made between 2 ports, the register for the port sourcing the OPN is updated by setting the bit corresponding to the destination port. In addition, each port saves the destination ALPA when a connection is made. The port bit map register is cleared by a read from the microprocessor.

5.13.15 Port/Loop Segment Utilization Measurement

Each Loop Switch port has a register set that is used to provide an indication of the port utilization. This measurement is done in one of two ways. In loop Loop Switch mode the measurement is of the amount of frame data that passing the port. In switching mode, the measurement is of the percentage of time the port is involved in a connection, regardless of the amount of data that is being sent.

In loop mode, one of the registers is continuously counting transmission words while another register is counting transmission words between a SOF and an EOF. When the $1^{st}$ counter reaches terminal count, the most significant bits of the $2^{nd}$ register are stored off as a representation of the percentage of the traffic that carried actual data payloads. This stored off value can be sampled by the CPU every ~240 ms.

In switching mode the operation is similar except instead of counting transmission words between an SOF and an EOF, the $2^{nd}$ counter is counting transmission words while the connection is up on the port.

The 2 counters are 24 bit counters with the $1^{st}$ counting up to 0xC80000 and the top 8 bits of the second counter being the measure of utilization. This 8-bit value is stored in a CPU readable register and represent utilization in 0.5% increments.

5.13.16 Port Overlapping Hard Zoning (Segmenting Mode Only)

Connections between ports can be disabled using the destination disable registers. A register exists for each port and masks the valid bit in the ALPA-to-port registers during lookup. The microcontroller must write these registers before completion of port discovery to insure connections are not made when the switched mode is enabled. If a device requests a connection to a port and access to the port is disabled, the node that sent the OPN receives it back. Note that the same actions occur if the ALPA does not exist.

5.13.17 Raw Data Snoop Port

A secondary function of the port logic is that it can be configured as a snoop port that can be connected to any of the receive ports of the Loop Switch chip. In this mode, the decoded transmission words from a port go through the switch matrix and the data stream is presented at the snoop port's transmitter. The port in this mode can be used as a debugging tool by connecting the port to a logic analyzer and viewing the raw data output of any port. The switch control register is used to select which port to snoop. NOTE: A limitation of the snoop port is that any R_RDY Ordered sets received after the OPN but before the connection has actually been established is not reflected to the snoop port.

5.14 Loop Switch Management Functions 5.14.1 Input Data Signals

The frame extraction logic also has the ability to filter data frames by replacing the $EOF_x$ with an $EOF_a$, corrupting the CRC or replacing the entire frame with the last fill word. External logic provides a "filter frame" command and the receiver port number of the frame that is to be filtered. Logic inside the ASIC will route the filter command to the appropriate transmitter. Note this filter frame command is time critical as the transmitter filters out either the current or next frame it sees after the filter command.

5.15 Loop Switch Management Functions 5.15.1 Environmental Monitoring

The Loop Switch has two environmental monitoring functions. The first is an input for an over-temperature sensor. This is a single signal input that indicates that the enclosure temperature has an externally configured threshold. The second function is a set of 4 inputs that indicate whether there has been a fan failure in the enclosure. The Loop Switch illuminates the environmental alert LED if either of these functions has a failure and reports the failure condition in the Router Status Register #3 for reporting to a management entity. This also causes an interrupt to be generated to the management card, if present.

5.15.2 Loopstate Detection and LED

The Loop Switch has two separate methods of tracking the state of the loop. In the first method, each port has a state machine that tracks progress through loop initialization. This state is reported in the Port's Status Register #1. This information is provided for the case where ports are partitioned into zones and reporting on each of the zone's loopstate is needed.

In the second method, the router also has a state machine that tracks progress of the loop initialization. This state machine is in the logic that accomplishes the port discovery process. The loopstate in the router state machine is used to drive the Loop Switch's Loop Up LED. In hard-zoned mode, the Loop Up LED reflects the status of zone 0.

5.15.3 Loop Initialization

The Loop Switch can reset the loop by writing to the Router Configuration Register. This can be used if a Loop Switch reconfiguration is necessary to guarantee the change is seen. This capability only applies when non-overlapping hard zones are not used in hub emulation mode, and when LIP isolation is not selected in switching (segmenting) mode.

5.16 FC Port Interfaces 5.16.1 GBIC/SFP Pins

The Loop Switch supports all the status and control pins of the standard GBIC and SFP. This includes transmit disable, transmit fault, receiver loss of signal and the mod_def pins. The Loop Switch also provides the ability to access a serial ID EEPROM on any GBIC or SFP that supports this feature.

5.16.2 Lock-to-Reference

The Loop Switch has the internal logic to drive a Lock-to-Reference signal for each internal transceiver. If a part that requires lock_to_ref must be used, this signal can be routed out.

5.17 System Interface

The system interface includes the locally generated clocks and the reset signal. The Loop Switch requires a single 106.25 MHz system clock.

5.18 Microprocessor Interface

The Loop Switch is directly accessible either through an $I^2C$ interface or a parallel interface with 16 non-multiplexed address and data lines, RD, WR and CS.

5.18.1 Interrupt Signal

If the Loop Switch is operating in a configuration that includes a management entity, it generates interrupts for various configuration changes that might be of interest to a management entity. These changes include:

Loop going down or coming up.
Insertion or removal of a GBIC/SFP.
Insertion or bypass of a port.
Insertion of a cascade to another Vixel Loop Switch. A port has met all insertion criteria and the microprocessor can interrogate the serial number register to see if multiple cascades to another switching (segmenting) mode Loop Switch has been made. Note that multiple cascades are only supported between managed switching (segmenting) mode Loop Switches. If everything is OK, the port is allowed to complete the insertion.
Environment Fault: A fan has failed or the temperature has exceeded a predetermined point.

Invalid OPN ordered set received.

LIP ordered set received and isolated

Error counter threshold(s) exceeded.

The interrupt pin is an open drain signal to allow multiple Loop Switches to drive it. The microprocessor should read the router status register #2 in the Loop Switch '00' to determine if it is asserting the interrupt signal. If it isn't, the microprocessor reads the other the Loop Switch's status registers. Once the proper the Loop Switch is found, the status register indicates if a port is causing the interrupting condition. If it is, the microprocessor must read the Port Error/Change Status Register to see what the interrupting condition is. If the router were causing the interrupt, its status register would indicate one of the other interrupting conditions.

Interrupt mask registers are provided for each interrupt status register. These mask registers enable all interrupts by default.

5.18.2 I²C Serial Interface

An I²C interface is used to manage the circuitry deployed around the SOC422.

5.18.3 Parallel Processor Interface

In addition to the I²C interface, The Loop Switch provides a sixteen bit asynchronous parallel interface.

5.19 Serial EEPROM Interface

The serial EEPROM is used to store the power on reset configuration information for the Loop Switch. An internal state machine reads the configuration after each reset and stores the information in various registers in the Loop Switch. If the external EEPROM_pres pin is pulled to a logic high, the ASIC assumes no EEPROM is present and skips the prom loading process.

6. Register Definitions For Vixel SOC 422 Loop Switch

6.1 Router Register Definitions

| Register Description | | |
|---|---|---|
| Configuration Register | | R/W |
| Control Register #1 | | R/W |
| Control Register #2 | | R/W |
| Remove Connection/OPN #1 | | R/W |
| Remove Connection/OPN #2 | | R/W |
| Stall Threshold | | R/W |
| SEOC USER2 | SEOC USER1 | RW |
| RTR SW Matrix Configuration Register | | R/W |
| Port Active (15-0) | | R |
| Reserved | Port Active (22-16) | NA |
| Switch Matrix Control Registers | | |
| Port 1 | Port 0 | R/W |
| Port 3 | Port 2 | R/W |
| Port 5 | Port 4 | R/W |
| Port 7 | Port 6 | R/W |
| Port 9 | Port 8 | R/W |
| Port 11 | Port 10 | R/W |
| Port 13 | Port 12 | R/W |
| Port 15 | Port 14 | R/W |
| Port 17 | Port 16 | R/W |
| Port 19 | Port 18 | R/W |
| Port 21 | Port 20 | R/W |
| Reserved | CPU Port | |
| Switch Matrix Select Registers | | |
| Port 1 | Port 0 | R |
| Port 3 | Port 2 | R |
| Port 5 | Port 4 | R |
| Port 7 | Port 6 | R |
| Port 9 | Port 8 | R |
| Port 11 | Port 10 | R |
| Port 13 | Port 12 | R |
| Port 15 | Port 14 | R |
| Port 17 | Port 16 | R |
| Port 19 | Port 18 | R |
| Port 21 | Port 20 | R |
| Reserved | CPU Port | R/W |
| Reserved | LED_update_timer | R/W |
| Reserved | rem_conn_cnt | R/W |
| Ports Unfair [ports 15:0] | | NA |
| Reserved | Ports Unfair [22:16] | NA |
| Port 15-0 Interrupt Status | | R |
| Reserved | Interrupt Status (22-16) | NA |
| Status Register #1 | | R |
| Status Register #2 | | R |
| Status Register #3 | | R |
| Status Register #4 | | R |
| Block_ALPA | Loop Up Counter | R |
| Port 3 LED OVRD | Port 2 LED OVRD | Port 1 LED OVRD | Port 0 LED OVRD | R/W |
| Port 7 LED OVRD | Port 6 LED OVRD | Port 5 LED OVRD | Port 4 LED OVRD | R/W |
| Port 11 LED OVRD | Port 10 LED OVRD | Port 9 LED OVRD | Port 8 LED OVRD | R/W |
| Port 15 LED OVRD | Port 14 LED OVRD | Port 13 LED OVRD | Port 12 LED OVRD | R/W |
| Port 19 LED OVRD | Port 18 LED OVRD | Port 17 LED OVRD | Port 16 LED OVRD | R/W |
| Reserved | Port 21 LED OVRD | Port 20 LED OVRD | R/W |
| Router Control Register #3 | | R/W |
| System LED Overrides | | R/W |
| Router Interrupt Mask | | R/W |
| Port Fairness Control | | R/W |
| Variable Priority Timer Register | | R/W |
| User I/O Direction Register | | R/W |
| User I/O Register | | R/W |
| FPGA Revision | | R |

| Overlapping Zone Control (Upper_page_select = 0000) | |
|---|---|
| Port 0 Overlapping Hard Zone Control (Ports 15-0) | R/W |
| Port 0 Overlapping Hard Zone Control (Ports 31-16) | R/W |
| . | |
| . | |
| . | |
| Port XX Overlapping Zone Control (Ports 15-0) | R/W |
| Port XX Overlapping Zone Control (Ports 31-16) | R/W |
| Opened Port Map (Upper_page_select = 0001) | |
| Opened Port Map (Ports (15-0) - Port 0 | R |
| Opened Port Map (Ports 31-16) - Port 0 | R |
| . | |
| . | |
| . | |
| Opened Port Map (Ports (15-0) - Port XX | R |
| Opened Port Map (Ports 31-16) - Port XX | R |
| ALPA Port Map (Upper_page_select = 0010) | |
| Port for ALPA 0x01 | Port for ALPA 0x00 | R/W |
| . | . | R/W |

-continued

| | | |
|---|---|---|
| . | . | |
| Reserved | Port for ALPA 0xEF | R/W |
| ALPA Position Map (Upper_page_select = 0011) | | |
| ALPA Position 1 | Offset Byte | R |
| . | . | R |
| . | . | |
| ALPA Position 127 | ALPA position 126 | R |
| EEPROM (Upper_page_select = 0100) | | |
| Local Serial Number Upper (EEPROM Bits [15:0]) | | R/W |
| Local Serial Number Middle (EEPROM Bits [31:16]) | | R/W |
| Loop Switch Configuration (EEPROM Bits[47:40]) | Serial Number Lower (EEPROM Bits [39:32]) | R/W |
| Reserved | Reserved | NA |
| Reserved | Misc System Configuration Bits | R/W |
| Date Code (EEPROM Bits[95:80]) | | R/W |
| Non-Overlapping Hard Zone Map Ports [3:0] | | R/W |
| Non-Overlapping Hard Zone Map Ports [7:4] | | R/W |
| Non-Overlapping Hard Zone Map Ports [11:8] | | R/W |
| Non-Overlapping Hard Zone Map Ports [15:12] | | R/W |
| Non-Overlapping Hard Zone Map Ports [19:16] | | R/W |
| Reserved | Non-Overlapping H. Zone Map Ports [22:20] | R/W |
| SerDes/Selftest Enable Ports [15:0] | | R/W |
| Reserved | SerDes/Selftest Enables Ports [21:16] | R/W |
| SEEPROM Calculated CRC (bits 15:0) | | R |
| SEEPROM Caclulated CRC (bits 31:16) | | R |
| Reserved | | |
| LIM WWN [63:48] | | R |
| LIM WWN [47:32] | | R |
| LIM WWN [31:16] | | R |
| LIM WWN [15:0] | | R |
| Duplicate Cascade Load Balancing (Upper_page_select = 0101) | | |
| SW Override of Initiators #0 (bit ordered per LixA frames) | | R\W |
| SW Override of Initiators #1 (bit ordered per LixA frames) | | R\W |
| SW Override of Initiators #2 (bit ordered per LixA frames) | | R\W |
| SW Override of Initiators #3 (bit ordered per LixA frames) | | R\W |
| SW Override of Initiators #4 (bit ordered per LixA frames) | | R\W |
| SW Override of Initiators #5 (bit ordered per LixA frames) | | R\W |
| SW Override of Initiators #6 (bit ordered per LixA frames) | | R\W |
| SW Override of Initiators #7 (bit ordered per LixA frames) | | R |
| Hardware Detected Initiators #0 (bit ordered per LixA frames) | | R |
| Hardware Detected Initiators #1 (bit ordered per LixA frames) | | R |
| Hardware Detected Initiators #2 (bit ordered per LixA frames) | | R |
| Hardware Detected Initiators #3 (bit ordered per LixA frames) | | R |
| Hardware Detected Initiators #4 (bit ordered per LixA frames) | | R |
| Hardware Detected Initiators #5 (bit ordered per LixA frames) | | R |
| Hardware Detected Initiators #6 (bit ordered per LixA frames) | | R |
| Hardware Detected Initiators #7 (bit ordered per LixA frames) | | R |
| reserved | #0 Assigned Trunk Port | Reserved | #0 Trunkset Primary Port | R\W |
| reserved | #0 Initiator's Alpa | R\W |
| reserved | #1 Assigned Trunk Port | Reserved | #1 Trunkset Primary Port | R\W |
| reserved | #1 Initiator's Alpa | R\W |
| reserved | #2 Assigned Trunk Port | Reserved | #2 Trunkset Primary Port | R\W |
| reserved | #2 Initiator's Alpa | R\W |
| reserved | #3 Assigned Trunk Port | Reserved | #3 Trunkset Primary Port | R\W |
| reserved | #3 Initiator's Alpa | R\W |
| reserved | #4 Assigned Trunk Port | Reserved | #4 Trunkset Primary Port | R\W |
| reserved | #4 Initiator's Alpa | R\W |
| reserved | #5 Assigned Trunk Port | Reserved | #5 Trunkset Primary Port | R\W |
| reserved | #5 Initiator's Alpa | R\W |
| reserved | #6 Assigned Trunk Port | Reserved | #6 Trunkset Primary Port | R\W |
| reserved | #6 Initiator's Alpa | R\W |
| reserved | #7 Assigned Trunk Port | Reserved | #7 Trunkset Primary Port | R\W |
| reserved | #7 Initiator's Alpa | R\W |
| reserved | #8 Assigned Trunk Port | Reserved | #8 Trunkset Primary Port | R\W |
| Reserved | #8 Initiator's Alpa | R\W |
| . | . | |
| . | . | |
| . | . | |
| reserved | #22 Assigned Trunk Port | Reserved | #22 Trunkset Primary Port | R\W |
| Reserved | #22 Initiator's Alpa | R\W |
| reserved | #23 Assigned Trunk Port | Reserved | #23 Trunkset Primary Port | R\W |
| reserved | #23 Initiator's Alpa | R\W |
| Learned Port ALPA Map (Upper_page_select = 0110) | | |
| Port for ALPA 0x01 | Port for ALPA 0x00 | R\W |
| . | . | R\W |
| . | . | |
| Reserved | Port for ALPA 0xEF | R\W |
| Misc Controls (Upper_page_select = 0111) | | |
| Reserved | Probe Mux Select A | R\W |
| Reserved | Probe Mux Select B | R\W |
| R | Utility Timer 0 Current Value(Write preload is for simulation only) | R\W |
| x | Utility Timer 0 Maximum Count | R\W |
| R | Utility Timer 1 Current Value(Write preload is for simulation only) | R\W |
| x | Utility Timer 1 Maximum Count | R\W |
| R | Utility Timer 2 Current Value(Write preload is for simulation only) | R\W |
| x | Utility Timer 2 Maximum Count | R\W |
| Close Count on Destination ALPA [15:0] | | R\W |
| Reserved | Close count Dest ALPA (22-16) | R\W |
| PLL control register | | R\W |
| ALPA 04 OPN_max | ALPA 02 OPN_max | ALPA 01 OPN_max | ALPA 00 OPN_max | R\W |
| . | . | . | . | . |
| . | . | . | . | . |
| . | . | . | . | . |
| Reserved | ALPA EF OPN_max | ALPA E8 OPN_max | ALPA E4 OPN_max | R\W |
| LIP Isolation Controls/LIFA Map (Upper_page_select = 1000) | | |
| Stealth Isolation Control Register #1 | | R/W |
| Stealth Isolation Control Register #2 | | R/W |
| Stop Traffic Control, Ports 15:0 | | R/W |
| Stealth Cycle Interval | Reserved | Stop Traffic Ctrl, Ports 22:16 | R/W |
| Status Register #5 (Stealth Interrupt Status) | | R |
| Mask Register for Status Register #5 | | R/W |
| Stealth Timeout Register | | R |
| Status Register #6 (Stealth State) | | R |
| Stealth LIP Inter-Switch Frame Transmit Payload Registers | | R/W |
| Stealth LIP Inter-Switch Frame Receive Payload Registers | | R |
| LIFA Modification ALPA Bit Map, Word 0, bits 15:0 | | R/W |
| LIFA Modification ALPA Bit Map, Word 0, bits 31:16 | | R/W |
| LIFA Modification ALPA Bit Map, Word 1, bits 15:0 | | R/W |
| LIFA Modification ALPA Bit Map, Word 1, bits 31:16 | | R/W |
| LIFA Modification ALPA Bit Map, Word 2, bits 15:0 | | R/W |
| LIFA Modification ALPA Bit Map, Word 2, bits 31:16 | | R/W |
| LIFA Modification ALPA Bit Map, Word 3, bits 15:0 | | R/W |

| | | |
|---|---|---|
| LIFA Modification ALPA Bit Map, Word 3, bits 31:16 | | R/W |
| LIP Isolation LIRP Modification Map | | |
| (Upper_page_select = 1001) | | |
| 1st ALPA for LIRP | LIRP ALPA Count | R/W |
| 3rd ALPA for LIRP | 2nd ALPA for LIRP | R/W |
| . | . | R/W |
| . | . | |
| . | . | |
| 126th ALPA for LIRP | 125th ALPA for LIRP | R/W |
| Route-Blocking Groups, 7-0 | | |
| (Upper_page_select = 1010) | | |
| Route-Blocking Group 0, Bits [15:0] | | R/W |
| Route-Blocking Group 0, Bits [31:16] | | R/W |
| Route-Blocking Group 0, Bits [47:32] | | R/W |
| Route-Blocking Group 0, Bits [63:48] | | R/W |
| Route-Blocking Group 0, Bits [79:64] | | |
| Route-Blocking Group 0, Bits [95:80] | | R/W |
| Route-Blocking Group 0, Bits [111:96] | | R/W |
| Route-Blocking Group 0, Bits [127:112] | | R/W |
| Route-Blocking Group 1, Bits [15:0] | | R/W |
| Route-Blocking Group 1, Bits [31:16] | | R/W |
| Route-Blocking Group 1, Bits [47:32] | | R/W |
| Route-Blocking Group 1, Bits [63:48] | | R/W |
| Route-Blocking Group 1, Bits [79:64] | | R/W |
| Route-Blocking Group 1, Bits [95:80] | | R/W |
| Route-Blocking Group 1, Bits [111:96] | | R/W |
| Route-Blocking Group 1, Bits [127:112] | | R/W |
| Route-Blocking Group 2, Bits [15:0] | | R/W |
| . | | . |
| . | | . |
| . | | . |
| Route-Blocking Group 7, Bits [127:112] | | R/W |
| Route-Blocking Groups, 15-8 | | |
| (Upper_page_select = 1011) | | |
| Route-Blocking Group 8, Bits [15:0] | | R/W |
| Route-Blocking Group 8, Bits [31:16] | | R/W |
| Route-Blocking Group 8, Bits [47:32] | | R/W |
| Route-Blocking Group 8, Bits [63:48] | | R/W |
| Route-Blocking Group 8, Bits [79:64] | | |
| Route-Blocking Group 8, Bits [95:80] | | R/W |
| Route-Blocking Group 8, Bits [111:96] | | R/W |
| Route-Blocking Group 8, Bits [127:112] | | R/W |
| Route-Blocking Group 9, Bits [15:0] | | R/W |
| Route-Blocking Group 9, Bits [31:16] | | R/W |
| Route-Blocking Group 9, Bits [47:32] | | R/W |
| Route-Blocking Group 9, Bits [63:48] | | R/W |
| Route-Blocking Group 9, Bits [79:64] | | R/W |
| Route-Blocking Group 9, Bits [95:80] | | R/W |
| Route-Blocking Group 9, Bits [111:96] | | R/W |
| Route-Blocking Group 9, Bits [127:112] | | R/W |
| Route-Blocking Group 10, Bits [15:0] | | R/W |
| . | | . |
| . | | . |
| . | | . |
| Route-Blocking Group 11, Bits [127:112] | | R/W |
| LIP Isolation Zone Control | | |
| (Upper_page_select = 1100) | | |
| Port 0 LIP Isolation Group Control | | R/W |
| Port 1 LIP Isolation Group Control | | R/W |
| . | | . |
| . | | . |
| . | | . |
| Port 18 LIP Isolation Group Control | | R/W |
| Port 19 LIP Isolation Group Control | | R/W |
| Port 20 LIP Isolation Group Control | | R/W |
| Port 21 LIP Isolation Group Control | | R/W |
| CPU Port LIP Isolation Group Control | | R/W |
| Generic Interswitch Frame Buffers | | |
| (Upper_page_select = 1101) | | |
| Stealth Inter-Switch Frame Header Registers | | R/W |
| Stealth Generic Inter-Switch Frame Transmit Payload Registers | | R/W |
| Stealth Generic Inter-Switch Frame Receive Payload Registers | | R |

6.1.1 Router Configuration Register

The bits in the configuration register are operating modes that are set once/changed infrequently.

| Bits | Field Name | Description |
|---|---|---|
| 15 | on_line | When set this bit enables a Loop Switch to go from the startup mode to the operational mode. When clear, this bit holds off the Loop Switch from becoming operational until the management card has had a chance to reconfigure it, if necessary. Used only if a management card is present. |
| 14 | smd_dis | Disable switch mode operation. |
| 13 | discvr_dis | Disable device discovery. When this bit is set, device discovery does not take place during loop initialization. |
| 12 | Reserved | |
| 11 | fast_time | Bit controls whether internal timers are driven by a normal timer tick or an accelerated one for simulations. |
| 10 | up_filt_dis | I²C glitch filter disable. Only used for simulation. |
| 9-6 | Upper_page_select | Select active function for upper portion of Router Register map NOTE: Upper pages are normally controlled via RAR Upper Byte. These bits are mainly for preexisting simulation compatibility.<br>0000 - Hard Zone Control Active<br>0001 - Opened Port Map<br>0010 - Alpa Port Map<br>0011 - Alpa Position Map<br>0100 - EEPROM Data Map<br>0101 - Load Balance Control Map<br>0110 - Learned Port ALPA Map<br>0111 - Misc Controls Map<br>1000 - LIP Isolation Controls/LIFA Map<br>1001 - LIP Isolation Manipulated LIRP MAP<br>1010 - Route Blocking Groups 0 to 7<br>1011 - Route Blocking Groups 8 to 15<br>1100 - Lip Isolation Zone Control<br>1101 - Generic Interswitch Frame Buffers |

-continued

| Bits | Field Name | Description |
|---|---|---|
| 5 | force_smd_en | Force switch mode enable. Setting this bit forces Loop Switch into switch mode operation. It is assumed that the ALPA-to-port map registers have been loaded to allow switch mode. NOTE: This bit should not be set until Loop Switch_rdy bit in Router Status Register #1 is set. Also, this bit is for test purposes only. |
| 4:3 | Fault/selftest_control | These bits control the fault and selftest functions of the Loop Switch. 00 - normal mode, selftest starts after EEPROM read correctly with valid CRC 01 - fault override, override both selftest and EEPROM CRC faults and continue operation 10 - generate fault, force a Loop Switch fault that disables Loop Switch operation and turn on the Loop Switch Fault LED 11 - run selftest, run the selftest 1 time whenever the control bits are first changed to 11. |
| 2 | loopback | Internal Loopback mode. Causes internal loopback pin to transceivers to be enabled and allows a management card to do a selftest. |
| 1 | lilp_update_dis | When this bit is set, the ALPA map is not updated when a LILP frame is received during loop initialization. |
| 0 | pause_map_cln | When this bit is set the ALPA map update is paused between the steps where the LILP frame is used to update the remaining valid ALPAs and the step where the remaining unmapped ALPAs are converted to invalid ALPAs. This bit is used mainly for test purposes. |

6.1.2 Router Control Register #1

The control register contains bits that are changed during normal operation. These bits affect the operation of the entire Loop Switch/router. Individual ports are controlled through the port control registers.

Router Control Register #1 Definition

| Bits | Field Name | Description |
|---|---|---|
| 15 | frc_arb_block | When this bit is set, the Loop Switch blocks all port arbitration. This is required if the microprocessor manually loads the ALPA map and then forces the Loop Switch into switching mode with the force_seg_mode bit. |
| 14 | clr_pstats | Setting this bit clears all Port Detector registers at one time. This bit is self-clearing. |
| 13 | global_isolate_en | When set, LIP isolation behavior is individually selectable for each port in that port's control registers. When this bit is reset LIP isolation is totally disabled. |
| 12-8 | reinsert_port_id | This field identifies a port to be re-inserted when the reinsert_port bit is set. |
| 7 | block_LILP_CLS | When this bit is set, and a destination port is blocked out for a source port in the overlapping hard zone control registers, and a valid LILP frame was received during the previous full-hub emulation mode initialization cycle, a CLS is sent to the source port. If not true, then the source port receives its own OPN back instead. |
| 6 | block_force_CLS | When this bit is set and a destination port is blocked out for a source port in the overlapping hard zone control registers, a CLS is sent back to the source port. If this is not true, then the source port receives its own OPN back instead. |
| 5 | dis_string_follow | When this bit is not set, traffic through a Loop Switch, arriving on a port that is a cascade trunk defined as a string will go out the Loop Switch on the other port assigned to the same string, ignoring load-balance settings. If this bit is set, the load-balance settings take precedence on the path. |
| 4 | reinsert_port | When this bit is set, a request is issued to the router to re-insert a LIP isolated port. The port to be re-inserted is identified by the reinsert_port_id field. This bit is self-clearing. |
| 3 | classic_led | Setting this bit to '1' makes the LED flashing behavior match the Hydra 2 behavior . . . The Activity LED flashes during switch-mode data transactions. If this bit is set to '0', the |

Router Control Register #1 Definition

| Bits | Field Name | Description |
|---|---|---|
| | | Activity LED is unused and the GBIC LED flashes during switch-mode data transactions. The flash rate of all the LED's is controlled by the LED Update Timer Register for both LED modes. |
| 2 | frc_leds_off | Forces all LEDs off. 2nd highest priority control of LEDs after frc_leds_on. |
| 1 | frc_leds_on | Forces all LEDs on. Highest priority control of LEDs. |
| 0 | init_loop | When set, causes the Loop Switch to send a LIP to re-initialize the loop. A LIP is originated on the port connected to the router. When the LIP returns to that port the Loop Switch allows the loop master to take control of the loop initialization process. This bit is self-clearing. Since only one non-overlapping hard zone can be connected to the router at a time, this feature has limited use for non-overlapping hard zone applications. NOTE: This feature is disabled if Stealth Isolation is active. |

6.1.3 Router Control Register #2

The control register contains bits that are changed during normal operation. These bits affect the operation of the entire Loop Switch or the router. Individual ports are controlled through the port control registers.

6.1.4 Remove Connection/Pending OPN Registers

In Remove Connection Mode:

When any of these bits are set, any existing switching connection for the port(s) that correspond to the set bits is removed. This is useful for breaking deadlocked connec-

Router Control Register #1 Definition

| Bits | Field Name | Description |
|---|---|---|
| 15-14 | Data_rate | These pins control the data rate of the internal serdes.<br>00 TX/RX Rate 1.06 Gbps<br>01 TX/RX Rate 2.12 Gbps<br>10 TX/RX Rate 4.24 Gbps<br>11 TX/RX Rate Selected by pins |
| 13 | pwr_dwn_serdes_no_gbic | Setting this bit will cause each serdes to be powered down if the associated moddef pins on that port indicate no GBIC or SFP is present. When a GBIC/SFP is detected on a port, the associated serdes will be enabled. |
| 12 | dis_hw_initiator_det | Setting this bit disables the hardware-based initiator detection function. Software load balancing is still enabled. |
| 11 | Rtrim_termen | Termination Trimming Enable for serdes auto-trim module. For test use only. Should always be set to 0. |
| 10 | Rtrim_pd | Power-down control for serdes auto-trim module. For test use only. Should always be set to 0. |
| 9 | dis_isolate_send_CLS | When this bit is not set and an OPN request is made to a LIP-isolated destination port, a CLS is sent back to the source port. If this bit is set, a route is not established to the destination port and the OPN is returned to the originating port. |
| 8 | RESET_SYSTEM | Writing a '1' to this bit resets the entire ASIC. |
| 7:4 | Cscd_wdog_max | Cascade watchdog timeout maximum value. Watchdog to ensure that a cascade string port does not get stuck scrubbing ARB's off the string. LSB of value is 10 microseconds. |
| 3:0 | Delta_cnt_prescale | Prescaler for delta frequency counter. See paragraph 5.13.11 for more details. Valid values of 0-15 set the resolution of delta counter's LSB as follows:<br>Bits 3:0 LSB Resolution<br>0 ~18.8 ns (61 ppm)<br>1 ~37.6 ns (30 ppm)<br>2 ~56.4 ns (15 ppm)<br>. .<br>. .<br>. .<br>15 ~282 ns | tions in the event that a CLS is never generated to close the connection between two communicating devices. These bits are self-clearing. Ports 15-0 are controlled by bits 15-0 respectively in Remove Connection Register #1, Ports 21-16 are controlled by Remove Connection Register #2. Note: Register #1 must be written to first, followed by a write to Register #2. The write to Remove Connection Register #2 latches in both registers to ensure the remove connect acts on all ports simultaneously.

In Remove Pending OPN mode (bit 14 of address 0x08 is '1'):

Only pending OPN's are removed to account for lockup conditions when multiple ports are pending OPN's to each other.

To allow the processor to kill all connections quickly, bit 15 of Remove Connection Register #2 is a global remove connect bit. Setting this bit will break down every connection (or every pending OPN).

| Addr | Bits | Description |
|------|------|-------------|
| 0x06 | 15:0 | Remove Connect/Pending OPN ports 15:0 |
| 0x08 | 15 | Global Remove/Pending OPN connect, breaks all connections. |
| 0x08 | 14 | |
| 0x08 | 13:6 | Reserved Always returns 0 |
| 0x08 | 5:0 | Remove Connect/Pending OPN, ports 22:16 |

6.1.5 Stall Threshold Register

This register contains the stall threshold value for port connections in switching mode. The value in this register is used as a threshold for the number of timer ticks that must be counted in the port stall counters before a stall_detect interrupt is triggered in the port interrupt status registers. The resolution of the stall counter is 10 microseconds.

6.1.6 Router Local SEOC USER Register

This register contains the information that is transmitted as payload in the SEOC exchange sequence ordered sets USER1 and USER2. Received information from remote Loop Switch devices is stored at the individual port level. If an EEPROM is present, this data is loaded from the EEPROM at reset. NOTE: The data loaded into this register must be neutral disparity or the link will not function correctly.

6.1.7 RTR SW Matrix Configuration Register

This register configures the operation of the Router snoop port and sets the data rate, overriding the discrete input data rate select.

| Router Data Rate/SW Matrix Configuration Register Definition | | |
|---|---|---|
| Bits | Field Name | Description |
| 15-8 | rtr_mtrx_sel | Router Switch Matrix Selected. Actual setting used by the router. If manual mode should match the rtr_mtrx_ctrl. If auto mode, shows active setting. |
| 7-0 | rtr_mtrx_ctrl | Router Switch Matrix Control. Controls which port the router is to monitor. Value should normally be left at 0x40, which enables auto mode selection. Valid entries are defined below: |
| | | 00000000-00011111  Port 0-31 selected |
| | | 001xxxxx  Router Selected |

| Router Data Rate/SW Matrix Configuration Register Definition | | |
|---|---|---|
| Bits | Field Name | Description |
| | | 01xxxxxx  Auto mode selected |
| | | 1xxxxxxx  Reserved |

Router Data Rate/SW Matrix Configuration Register Definition

6.1.8 Port Active Status Registers

The P_Active registers show the current state of the P_Active signals for Port's 0-21 and CPU PORT (port22).

6.1.9 Switch Matrix Control Register

These registers contain twenty 8-bit fields that indicate whether a port is running in automatic mode or is forced configured as a monitor port and its transmitter is connected to another port's receiver. When a port is in monitoring mode, its receiver is left unconnected from the switch matrix, unless another port is configured to monitor that port. This mode can be used to establish one or more ports as monitor ports that an analyzer would be connected to and through management, be connected to various ports for diagnostic purposes.

If a port is monitoring the probe mux, care must be taken that it is monitoring a valid data stream from the probe mux. Only pbmux[5:0] address 0x03 through 0x07 on ports 0-21 and CPU PORT(port22) are valid. Monitoring any other probe mux selection will have undefined results.

Note that the ports are in auto mode after a reset. This register can be used in both loop and Loop Switch switching mode. The following table defines what the various bit configurations mean for each port:

| Field Value | Definition |
|---|---|
| 0x00-0x15 | Connect to port 0-21 |
| 0x16 | CPU PORT (port22) |
| 0x17 | Connect to probe mux A |
| 0x18 | Connect to probe mux B |
| 0x19-0x1f | Reserved |
| 0x20 | Connect to router |
| 0x40 | Port running in auto mode (default mode) |
| All other addresses | Reserved |

6.1.10 Switch Matrix Select Register

This register shows the configuration of the switch matrix during operation. Each port's 8 bit value indicates which port the mux is monitoring. The router logic muxes (Port #32) are located in the RTR SW Matrix Configuration register.

6.1.11 Rem conn cnt Register

This 10 bit register sets the delay that remove connect waits between stopping traffic via blocking ARB's and eating R_RDY's and resetting the receive state machines of the affected ports. Each LSB is 10 microseconds, with the default setting causing a 2-millisecond delay.

6.1.12 Port Unfair Registers

These registers allow ports to be set in unfair mode where the port priority logic is bypassed. These bits are primarily used on cascade ports to allow more access.

6.1.13 Port 15-0 Interrupt Status Register

This register contains Port 15-0 interrupt status bits. If a bit in this register is set to one, then bit 0 in the Router Interrupt Status Register is set to generate an interrupt to the processor.

6.1.14 Future Port 31-23/Port 22-16 Interrupt Status Register

This register contains Port 22-16 interrupt status bits as well as reserved bits for Future Port 31-23 interrupt status bits. If a bit in this register is set to one, then bit 1 in the Interrupt Status Register is set to generate an interrupt to the processor.

6.1.15 Router Status Register #1

The register provides a real time snapshot of the conditions indicated. The Status Register Clear does NOT clear this control register.

| Bits | Field Name | Description |
|---|---|---|
| | Router Status Register #1 Definition | |
| 15-14 | HW Rev Code | 2 bit value that indicates the silicon revision. |
| 13 | prom_done | When set, indicates that The Loop Switch has completed reading of the startup configuration from the serial EEPROM. NOTE: If the EEPROM is not present as indicated by the discrete input signal EEPROM_present#, this bit will be also be set. |
| 12-9 | Router State Bits | The current state of the router state machine:<br>0x0 - waiting or verifying to enter switch mode<br>0x1 - wait for port request (ARB/OPN)<br>0x2 - check for valid/blocked request<br>0x5 - connect ports<br>0x6 - port-connection wait state<br>0x7 - disconnect losing pending requests<br>0x8 - wait before attempting to disconnect losing pending requests<br>0x9 - delay |
| 8-7 | Rate | Indicates the current data rate of the Loop Switch.<br>00 - 1 Gbps operation<br>01 - 2 Gbps operation<br>10 - 4 Gbps operation<br>11 - not defined |
| 6 | hub_ready | When set, indicates the Loop Switch has completed its startup process and is waiting for the management card to reconfigure it, if necessary. Used only if management card is present. |
| 5 | hub_fault | Internal selftest failed. The Loop Switch goes into halt mode and prevent any port insertions from occurring. |
| 4 | Mgmt_Pres | The bit read from the serial status register. Provided for testing purposes. |
| 3 | Seg_Mode | Current operating mode based on configuration EEPROM and completion of Loop Switch initialization and device discovery.<br>0 - Hub Emulation Mode<br>1 - Switching (segmenting) Mode |
| 2-0 | Board id | Board ID bits from serial status interface. |

6.1.16 Router Status Register #2 (Router Interrupt Status)

This register reports changes in the state of the Loop Switch. This includes loop state as well as port configuration state. Any bit set in this register causes the interrupt pin to be asserted. This register is cleared on read except for bits 0,1,2 and 8. These bits need to be cleared in the corresponding interrupt status register.

Note that the management failure LED is keyed off the reading of this status register. If the management present signal indicates that a management card exists, then a watchdog timer is activated by the first read of this register. This timer expects that this register is then read at least every 100 ms. If it is not, the management LED is not illuminated.

| Bits | Field Name | Description |
|---|---|---|
| | Router Status Register #2 Definition | |
| 15 | Reset Complete | The Loop Switch has finished its reset processing and if Management is present, the Loop Switch is waiting to go online. |
| 14 | Loop Down | Loop state in Router Status Register #3 has gone from state ''100' or higher to state '011' or lower. |
| 13 | Loop Up | Loop state in Router Status Register #3 has gone from state '011' to state '100' or higher. |
| 12 | Ext Status Active | A fan fault or an over temp condition has been detected in Router Status Register #3. |
| 11 | Frame_filt_err | More than 8 words have been selected on one of the frame filters. The filter will be disabled until this error is corrected. |

-continued

Router Status Register #2 Definition

| Bits | Field Name | Description |
|---|---|---|
| 10 | Zone_violation | A zone access violation was detected. A device tried to access another device that was not within the same logical zone of the Loop Switch. (Note: The connection was not allowed.) |
| 9 | pdisc_error | This bit is set if multiple ports claim the same ALPA during full-Loop Switch loop initializtion and port discovery. |
| 8 | CPU PORT int | This bit is set if the FCPM or CPU port has an interrupt. This bit is used only if interrupt2 (cpu_port_int) is not used. |
| 7 | seprom_crc_fail | This bit is set if a CRC error is detected while reading the seprom data. |
| 6 | Utility_tmr2_tick | Utility timer 2 max has been reached. NOTE the timer rolls over and continues counting automatically. |
| 5 | Utility_tmr1_tick | Utility timer 1 max has been reached. NOTE the timer rolls over and continues counting automatically. |
| 4 | Utility_tmr0_tick | Utility timer 0 max has been reached. NOTE the timer rolls over and continues counting automatically. |
| 3 | Interswitch_frame | An inter-switch frame has been received |
| 2 | Stealth_Isolation | An event has happened during Stealth LIP isolation that requires processor intervention. |
| 1 | Port 22 - 16 Interrupt | One port in the corresponding port bank needs attention, as indicated by a change in that Port's Error/Change Status Register. Bit 22 is the interrupt for the port that is connected to the CPU PORT. |
| 0 | Port 15 - 0 Interrupt | One port in the corresponding port bank needs attention, as indicated by a change in that Port's Error/Change Status Register. |

6.1.17 Router Status Register #3

The register provides a real time snapshot of the conditions indicated. The Status Register Clear does NOT clear this control register.

Router Status Register #3 Definition

| Bits | Field Name | Description |
|---|---|---|
| 15 | LIP_Valid | When set, indicates LIP_Port field is valid. This field is cleared on read. NOTE: Isolated ports are not included in last LIP'ed port logic. |
| 14-10 | LIP_Port | The port number that received the last LIP since the last status register read. NOTE: Isolated ports are not included in last LIP'ed port logic. |
| 9 | M_Ethernet_LED | Ethernet Activity LED. This bit is latched until read. |
| 8 | Over_Temp | Indicates temperature sensor detected an over temperature condition. |
| 7 | N_fan3_ok | Fan 3 not OK |
| 6 | N_fan2_ok | Fan 2 not OK |
| 5 | N_fan1_ok | Fan 1 not OK |
| 4 | N_fan0_ok | Fan 0 not OK |
| 3-0 | Loop State bits | 4'h0 - IDLE: Loop Down, No port inserted 4'h1 - INIT: Loop Initializing (LIP seen) 4'h2 - OPEN_INIT: Loop Open Init state (SOF seen) 4'hb - LINKUP: Loop and Loop Switch initialization complete. 4'hc - SRC_LIPS: uP is re-initializing the loop by forcing LIPs on loop. 4'hd - CLR_TMR: End of uP loop re-init phase. Notes: 1. When state changes from state 4'h2 to 4'h3 thru 4'hb, this is considered a loop up event which increments the loop up count and turns on the Loop Up LED. 2. When the state changes from states 4'h3 thru 4'hb to any other state, this is considered a loop down event which turns off the Loop Up LED. |

6.1.18 Router Status Register #4

The register provides a real time snapshot of the conditions indicated. The Status Register Clear does NOT clear this control register.

Router Status Register #4 Definition

| Bits | Field Name | Description |
|---|---|---|
| 15 | WWN_valid | Read only bit. When this bit is set it indicates that during the previous loop initialization cycle the WWN of the loop master was captured from the last LISM frame to pass through, and is available to be read. This bit is reset when a LIP is received by any port on the device. NOTE: Only valid for zone 0. |
| 14 | LILP_valid | Read only bit. When this bit is set it indicates that during the last loop initialization cycle a LILP frame was received and the payload is ready to be read. This bit is reset when a LIP is received by any port on the device. NOTE: Only valid for zone 0. |
| 13 | map_done | Read only bit. The loop initialization portion of port discovery has completed and some of the data in the ALPA map registers is valid, but might not be fully resolved. The ALPA map locations would only be fully resolved if the lilp_valid bit is set in the router status register #4 or if each potential device on the loop is either successfully or unsuccessfully accessed. NOTE: Only valid for zone 0. |
| 12-7 | Reserved | |
| 6 | Force LIM Port | Writing a '1' to this bit forces the LIM port to maintain the value written to bits 4:0 regardless of the true LIM port determined during subsequent loop initialization cycles. |
| 5 | EEPROM_PRES | Read only bit. Monitors the status of the EEPROM present input line to allow the processor to determine if the ASIC has a companion EEPROM attached for initial configuration. |
| 4-0 | Lim_port_value | Contains the port value where the current LIM resides. NOTE: This value is only valid for ports in zone 0 where passive port discovery is performed. In zones other than zone 0, the LIM_port bit in the Port Status Register #1 registers should be checked. NOTE: A value of 0x1F in this field indicates no valid LIM port at this time. |

| Router Status Register #4 Definition | | |
|---|---|---|
| Bits | Field Name | Description |
| | | Writing to this field will set the LIM port only until the next loop initialization cycle unless the Force LIM Port (bit 6) bit is set to '1'. |

6.1.19 Block ALPA/Router Loop Up Counter Register

This register combines the programmable Idle-blocking ALPA value with the count of the number of times the loop has come up.

| Router Block ALPA/Router Loop Up Counter Register Definition | | |
|---|---|---|
| Bits | Field Name | Description |
| 15-8 | block_ALPA | ARB ALPA value to use for blocking idles in switching mode. This value is reset to 0xff. |
| 7-0 | loop_up_count | Count of the number of times the loop has come up. The count sticks at maximum count and is cleared on read. This register is incremented each time full-Loop Switch loop initialization occurs, which can be either in loop mode, or in switching mode when LIP isolation is disabled. |

6.1.20 Router Control Register #3

Each bit in this register controls the functions as defined in the table below.

| Bits | Field Name | Description |
|---|---|---|
| 15-10 | Reserved | |
| 9 | dis_emc_opn_lockup_rmv | When set, disables multiple-cascade lockup detection logic for root-Loop Switch systems. |
| 8 | en_old_string_fairness | When set to '1', a tree cascade port's access request to a string is unfair. The tree cascade's arb will go on the string on the next arbitration cycle even if fairness has not be reset on the string. |
| 7 | dis_cls_cnt_opn_lockup_rmv | Disable for close count open-lockup condition. (NOTE: This bit is for test only.) |
| 6 | dis_opn_lockup_rmv | Disable for tree cascade lockup clearing logic. If two or more multiple cascade trunksets are configured on an ASIC and no strings are defined. (Note This bit is for test only.) |
| 5 | dis_opn_wait | Set this bit to a '1' to disable the wait for IDLE to appear on a port before allowing a pending request to connect to that port. Normally, a pending request is held off until the IDLE is detected to ensure that a port that has both a target and initiator is not in an active connection. |
| 4 | Port_pri_en | Setting this bit causes ports that have the same configuration type (tree or string cascade) to use the rotating priority to determine if a conflicting port is closed. If the bit is not set, a pending port that is held off by an active connection may have its pending request closed down by another port of the same type regardless of the rotating priority. |
| 3 | Scsi_init_det_en | SCSI Initiator detect enable. When set, initiators are detected based on SCSI FCP frames. When clear, initiators are detected based on received PRLI frames. |
| 2 | dis_initiator_lockup_remove | If set, disables the initiator lockup resolution logic. This is only required if bit 0, dis_initiator_dflt_2_primary, is set and the HBA's are on strings. Auto-remove connect on stall can also be used to resolve initiator lockups. |
| 1 | en_port_priority_dis_on_arb | If set, does not increment port_priority logic on receipt of the ARB. |
| 0 | dis_initiator_dflt_2_primary | If set, disables the logic that forced initiator to initiator communications to follow the primary string. NOTE: Setting this bit may cause some short-term system lockups which can be resolved by enabling the auto-remove connect on stall feature. However, this may imact system performance |

6.1.21 System LED Override Registers

This register contains LED overrides to allow the microprocessor to directly control the state of the system level LED's. Setting the override bit for each function allows the microprocessor to control that LED.

| Bits | Field Name | Description |
|---|---|---|
| 15-14 | Reserved | |
| 13-12 | Reserved | |
| 11-10 | Segment Mode LED Override | These bits allow the microprocessor to directly control the associated LED as defined below:<br>0 0  Normal LED operation<br>0 1  Blink at 440 ms rate<br>1 0  LED Forced off<br>1 1  LED Forced on |
| 9-8 | Environmental LED Override | These bits allow the microprocessor to directly control the associated LED as defined below:<br>0 0  Normal LED operation<br>0 1  Blink at 440 ms rate<br>1 0  LED Forced off<br>1 1  LED Forced on |
| 7-6 | Loop Switch Fault LED Override | These bits allow the microprocessor to directly control the associated LED as defined below:<br>0 0  Normal LED operation<br>0 1  Blink at 440 ms rate<br>1 0  LED Forced off<br>1 1  LED Forced on |

-continued

| Bits | Field Name | Description |
|---|---|---|
| 5-4 | Loop Up LED Override | These bits allow the microprocessor to directly control the associated LED as defined below:<br>0 0 Normal LED operation<br>0 1 Blink at 440 ms rate<br>1 0 LED Forced off<br>1 1 LED Forced on |
| 3-2 | Management Present LED Override | These bits allow the microprocessor to directly control the associated LED as defined below:<br>0 0 Normal LED operation<br>0 1 Blink at 440 ms rate<br>1 0 LED Forced off<br>1 1 LED Forced on |
| 1-0 | Ethernet LED Override | These bits allow the microprocessor to directly control the associated LED as defined below:<br>0 0 Normal LED operation<br>0 1 Blink at 440 ms rate<br>1 0 LED Forced off<br>1 1 LED Forced on |

6.1.22 Router Interrupt Mask Register

This register is used to mask router interrupt status bits. If a bit in this register is set to one, then the corresponding bit in the Router Status Register #2 is enabled to generate an interrupt to the processor.

6.1.23 Port Fairness Control Register

This register is controls the operation of the CLS counter which is used to vary the priority of a port based on the ALPA and the number of times that ALPA has attempted a transaction without being able to transfer a single frame of data

| Bits | Field Name | Description |
|---|---|---|
| 15-10 | | |
| 9 | dis_cls_cnt_initiator | When set to '1', disables the destination ALPA close counter on ALPA's that have been defined as initiators. |
| 8 | en_per_alpa_cls_cnt | Setting this bit to a '1' causes the OPN close counter to use the individual thresholds for increasing the priority of closed down ports. This function provides some support for multiple-level QOS based on ALPA's. |
| 7-4 | cls_cnt_max_dst | Global Threshold value for OPN close counter on destination. When the close count associated with a specific ALPA hits the threshold value, the priority of that port will be increased to minimize its chances of being closed down. This mechanism is to ensure no devices are starved. To enable this function, either bit of this register needs to be set to '0', to support initiators, or bits in the Close Count on Destination ALPA registers need to be set. NOTE: The cls_cnt_en bit must be set on a per port basis to enable this function. |
| 3-0 | Cls_cnt_max | Global Threshold value for OPN close counter. When the close count associated with a specific ALPA hits the threshold value, the priority of that port will be increased to minimize its chances of being closed down. This mechanism is to ensure no devices are starved. This global threshold is used unless the en_per_alpa_cls_cnt, bit 8, is set to a '1'. If en_per_alpa_cls_cnt is set, the per_alpa_cls_cnt$_{xx}$ values are used. NOTE: The cls_cnt_en bit must be set on a per port basis to enable this function. |

6.1.24 Variable Priority Timer Register

This register sets the duty cycle of the variable priority ports. The port will have its normal priority, set by the port type for the low_pulse duty cycle. During the high_pulse duty cycle, the port's priority is increased to minimize pending OPN requests from being closed down and possibly starving a device. NOTE: It is recommended that the ALPA based close counter is used in normal operation.

| Bits | Field Name | Description |
|---|---|---|
| 15-8 | High_pulse | Time, in milliseconds, that the port has the highest priority enabled. |
| 7-0 | Low_pulse | Time, in milliseconds, that the port has the priority associated with the port type. |

6.1.25 Router Overlapping Hard Zone Control Registers

This set of registers defines bitmaps to prevent devices on any given port from accessing devices on other ports. A 32-bit map is defined for each port. Bits 31-0 of each port bitmap represent ports 31 through port 0 respectively. Setting the appropriate bit disables access for the port (i.e. setting bit 2 and bit 14 of register 0x80 prevents port 0 from accessing ports 2 and 14). This register is only used in switching mode. Note: References to ports above port 21 are for future implementations.

These registers can be accessed at the specified address when the upper_page_select bits are set to "0000".

6.1.26 Router Opened Port Map Registers

These registers contain a cumulative bit map of the ports OPNed by the specified port. These registers are clear on read. This register is only used in switching mode.

These registers can be accessed at the specified address when the upper_page_select bits are set to "0001".

6.1.27 Router ALPA Port May Register

This register set contains an ALPA to port map for each possible ALPA. The ALPAs are determined during port discovery. The ALPA to port bitmap for each ALPA is as defined in the following table. These registers are both read and write accessible so that Port Discovery can be performed by firmware prior to entering switching mode if there are ASIC problems with Port Discovery.

| Field Value | Definition |
| --- | --- |
| 00000000-00011111 | ALPA exists on port 0-31 |
| 110xxxxx | ALPA does not exist on loop |
| 111xxxxx | ALPA probably does not exist on loop but may be shadowed |

These registers can be accessed at the specified address when the upper_page select bits are set to "0010".

6.1.28 Router ALPA Position Map (LILP Payload) Register

This register set contains an ALPA to port map for each possible ALPA. These registers contain a snapshot of the LILP frame payload from the most recent loop initialization cycle where positional mapping was supported.

These registers can be accessed at the specified address when the upper_page select bits are set to "0011".

6.1.29 Router Serial EEPROM Capture Registers

These registers report the global controls read from the serial EEPROM at startup. These values can also be written by the microprocessor for debug or ASIC simulation. Configuration bits that are port specific are accessible via port register accesses to the appropriate registers.

NOTE: While a write to the ASIC changes the values in the Router memory map, the processor is responsible for updating the EEPROM via the I²C bus.

These registers can be accessed at the specified address when the upper_page_select bits are set to "0100".

6.1.30 Loop Initialization Master WWN Register

These registers contain the captured value of the WWN from the last LISM frame during the most recent loop initialization cycle. The bits 63-48 are contained in register #1, bits 47-32 in register #2, bits 31-16 in register #3, and bits 15-0 in register #4.

These registers can be accessed at the specified address when the upper_page_select bits are set to "0100".

6.1.31 Software Override Initiator Bit Map

This 128-bit table is organized per the table below. Under software control, initiators can be added or subtracted from the hardware Captured Initiator Table described below. This table is XOR'ed with the Captured Initiator Table to provide the hardware with the initiators present on the loop. If the hardware detects 2 initiators in a requested OPN connection, that connection is routed down the primary cascade. If only one of the ALPA's in the OPN is an initiator, the hardware defaults to routing the connection down the primary cascade unless an alternative duplicate trunk route is defined in the Trunk Grouping Registers described below.

Software can force a specific device to be treated as an initiator for target-based load balancing. Defining half the targets as initiators forces all their traffic down the primary connection while all other connections are routed down the duplicate trunk.

| | | | | | | BIT Position | | | | | | | | | |
| --- | --- | --- | --- | --- | --- | --- | --- | --- | --- | --- | --- | --- | --- | --- | --- |
| 15 | 14 | 13 | 12 | 11 | 10 | 09 | 08 | 07 | 06 | 05 | 04 | 03 | 02 | 01 | 00 |
| 26 | 25 | 23 | 1F | 1E | 1D | 1B | 18 | 17 | 10 | 0F | 08 | 04 | 02 | 01 | 00 |
| 3C | 3A | 39 | 36 | 35 | 34 | 33 | 32 | 31 | 2E | 2D | 2C | 2B | 2A | 29 | 27 |
| 56 | 55 | 54 | 53 | 52 | 51 | 4E | 4D | 4C | 4B | 4A | 49 | 47 | 46 | 45 | 43 |
| 73 | 72 | 71 | 6E | 6D | 6C | 6B | 6A | 69 | 67 | 66 | 65 | 63 | 5C | 5A | 59 |
| 9B | 98 | 97 | 90 | 8F | 88 | 84 | 82 | 81 | 80 | 7C | 7A | 79 | 76 | 75 | 74 |
| B3 | B2 | B1 | AE | AD | AC | AB | AA | A9 | A7 | A6 | A5 | A3 | 9F | 9E | 9D |
| CE | CD | CC | CB | CA | C9 | C7 | C6 | C5 | C3 | BC | BA | B9 | B6 | B5 | B4 |
| | EF | E8 | E4 | E2 | E1 | E0 | DC | DA | D9 | D6 | D5 | D4 | D3 | D2 | D1 |

These registers can be accessed at the specified address when the upper_page_select bits are set to "0101".

6.1.32 Captured Initiator Bit Map

These registers contain the ALPAs of all initiators detected on the loop XOR'ed with initiators set in the Software Override Initiator Bit map. This 128-bit table is organized per the bit mappings in the table below. The ALPA of a detected initiator has its corresponding bit set in the table. A LIP clears the table to ensure valid entries are loaded every time the loop initializes. If the hardware initiator detection function is disabled in Router Control Register #2, no initiators are detected. The XOR with the Software Override of Initiators Registers above allows software to override individual ALPAs by either defining or masking out of the initiator table.

If detection of initiators is disabled by the dis_hw_initiator_det bit these bits will always be '0'.

| | | | | | | BIT Position | | | | | | | | | |
| --- | --- | --- | --- | --- | --- | --- | --- | --- | --- | --- | --- | --- | --- | --- | --- |
| 15 | 14 | 13 | 12 | 11 | 10 | 09 | 08 | 07 | 06 | 05 | 04 | 03 | 02 | 01 | 00 |
| 26 | 25 | 23 | 1F | 1E | 1D | 1B | 18 | 17 | 10 | 0F | 08 | 04 | 02 | 01 | 00 |
| 3C | 3A | 39 | 36 | 35 | 34 | 33 | 32 | 31 | 2E | 2D | 2C | 2B | 2A | 29 | 27 |
| 56 | 55 | 54 | 53 | 52 | 51 | 4E | 4D | 4C | 4B | 4A | 49 | 47 | 46 | 45 | 43 |
| 73 | 72 | 71 | 6E | 6D | 6C | 6B | 6A | 69 | 67 | 66 | 65 | 63 | 5C | 5A | 59 |

-continued

| | | | | | | BIT Position | | | | | | | | | |
|---|---|---|---|---|---|---|---|---|---|---|---|---|---|---|---|
| 15 | 14 | 13 | 12 | 11 | 10 | 09 | 08 | 07 | 06 | 05 | 04 | 03 | 02 | 01 | 00 |
| 9B | 98 | 97 | 90 | 8F | 88 | 84 | 82 | 81 | 80 | 7C | 7A | 79 | 76 | 75 | 74 |
| B3 | B2 | B1 | AE | AD | AC | AB | AA | A9 | A7 | A6 | A5 | A3 | 9F | 9E | 9D |
| CE | CD | CC | CB | CA | C9 | C7 | C6 | C5 | C3 | BC | BA | B9 | B6 | B5 | B4 |
| | EF | E8 | E4 | E2 | E1 | E0 | DC | DA | D9 | D6 | D5 | D4 | D3 | D2 | D1 |

These registers can be accessed at the specified address when the upper_page_select bits are set to "0101".

6.1.33 Trunk Grouping Registers

The Trunk Grouping Registers consists of 24 sets of 2 registers containing 3 fields: 1) the trunkset primary port, 2) the trunkset assigned (or alternate) port and the ALPA of the affected initiator. If an ALPA is defined as an initiator in one of the tables described above, it can be loaded into this table. An OPN request is initially processed as a normal connection. The port number output from the lookup it compared to the trunkset primary port entries. If the lookup table's output port number matches one in the Trunk Grouping Table as well as the ALPA entry, the OPN is routed down the indicated alternate port. The alternate port is qualified with the internal "p_active" flag to verify it is an active port. If the alternate port is not active, the connection defaults back to the original primary port. Two exceptions exist to this rule: 1) OPN's between initiators are always routed down the primary connection and 2) half-duplex OPN's are always routed down the primary port. These 2 exceptions exist to minimize 2 OPN requests from devices A and B going down separate cascades to each other and providing a dead-lock situation.

For each pair of trunkset registers the bit format is as shown below:

| Bits | Field Name | Description |
|---|---|---|
| 15-13 | Reserved | Unused |
| 12:8 | Assigned Trunk Port | Port in this group of trunks that will handle all traffic for the ALPA, defined below in the upper word, with the exceptions of initiator-to-initiator and half-duplex traffic. |
| 7-5 | Reserved | Unused |
| 4-0 | Trunkset Primary Port | The primary port for this group of trunks. This port is the port that will be active during loop initialization while in loop mode. |
| 15:8 | Reserved | Unused |
| 7-0 | ALPA of Initiator | ALPA of initiator that is to send all its traffic via the defined duplicate trunk, described above in the lower word, when the Loop Switch is in switching (segmenting) mode. |

These registers can be accessed at the specified address when the upper_page_select bits are set to "0101".

6.1.34 Learned Initiator Port Map Registers

This register set contains an ALPA to port map for each possible initiator ALPA. The ALPA port mappings are determined by monitoring received OPN frames and loading the port number of any OPN with an initiator as its source into the table. This table is used to ensure transactions to an initiator use the path the initiator used in its last transaction to minimize congestion.

| Field Value | Definition |
|---|---|
| 00000000-00011111 | ALPA exists on port 0-31 |
| 110xxxxx | ALPA does not exist on loop |
| 111xxxxx | ALPA probably does not exist on loop but may be shadowed |

These registers can be accessed at the specified address when the upper_page_select bits are set to "0110".

This register can be accessed at the specified address when the upper_page_select bits are set to "0111".

6.1.35 Close Count on Destination ALPA Registers

Each bit in these register corresponds to a port, with address 0x90 configures ports 15:0, address 0x92 bits 5:0 configures ports 21:16 respectively. If a bit is set, the destination of the OPN determines the close counter to increment. NOTE: Initiators automatically default to using the destination of the OPN to determine the close counter to increment unless explicitly disabled in the Port Fairness Control Register.

6.1.36 Per ALPA Open Counter Max Registers

The Per ALPA Open Counter registers allow the OPN counter to increase the priority of each ALPA's OPN request with a unique maximum closed OPN count threshold per ALPA. The threshold is a value from 1x0 to 1x0f per ALPA. A value of 0x0 always increases the priority. A value of 0xf disables the CLS counter operation for that particular ALPA, a value of 0x01 increases the priority after 1 close, a value of 0x2 increase the priority after 2 closes, etc. The thresholds are arranged four to a register in sequentially increasing ALPA order.

This register can be accessed at the specified address when the upper_page_select bits are set to "0111".

6.1.37 Stealth Isolation Control Register #1

The Stealth Isolation Control Register #1 controls Stealth Isolation modes of operation from a policy standpoint. These controls are intended to be set at during the original configuration and not modified in normal operation.

This register can be accessed when the upper_page_select bits are set to "1000".

| Bits | Field Name | Description |
| --- | --- | --- |
| 15 | Frc_LIRP_FRM | Setting this bit forces the payload in the LIRP frame to be overwritten by the data contained in the LIRP frame modification registers. NOTE: Any active port the LIRP frame is routed through after the router will append ALPA's present on that port to the list in the LIRP payload. |
| 14 | Frc_LIFA_FRM | Setting this bit forces the payload in the LIFA frame to be overwritten by the data contained in the LIFA Modification Bit map. |
| 13 | Dis_LIRP_frm_mod | Setting this bit to a '1' disables LIRP frame modification during a Stealth loop initialization cycle. Normally, if a Stealth initialization cycle is in progress, the router will logically OR the data contained in the LIRP Frame Modification Registers into the LIRP frame. |
| 12 | Dis_LIFA frm_mod | Setting this bit to a '1' disables LIFA frame modification during a Stealth loop initialization cycle. Normally, if a Stealth initialization cycle is in progress, the router will logically OR the data contained in the LIFA Frame Modification Registers into the LIFA frame. |
| 11 | dis_redo_intsw_chg_on_to | Clearing this bit causes the ASIC to repeat the interswitch cascade stealth cycle if a timeout is detected. This corrects for two ASIC's cascade ports coming up out of sync when they are connected. |
| 10 | En_global_LIRP | Setting this bit places every ALPA in the system in the LIRP frame regardless of the LIP isolation settings. NOTE: In a multiple-ASIC system only the ALPA's local to this ASIC are included. |
| 9 | Dis_hw_LIRP_gen | Setting this bit disables the hardware state-machine from generating the LIRP entries to be appended to the list in the LIRP frame's payload during a stealth loop initialization cycle. |
| 8 | Dis_hw_LIFA_gen | Setting this bit disables the hardware state-machine from generating the LIFA ALPA bits to be OR'ed into the LIFA frame during a stealth loop initialization cycle. |
| 7 | dis_rx_lism_resets_to | Clearing this bit causes the timeout counter of the Stealth state machine to reset to 0x00 every time a LISM is detected. This allows for short timeouts for removed ports but allows LISM resolution to continue even though the timeout would be exceeded. |
| 6 | stlth_insert_lip | Setting this bit generates LIPs to all the ports in the stealth cycle loop for the entire time the lifa and lirp data is being parsed by the stealth state machine. |
| 5 | stlth_stop_all_til_done | Setting this bit stops traffic on all channels for the duration of the stealth isolation cycle |
| 4 | En_interactive_stealth | Setting this bit pauses the ASIC's stealth state-machine and allows the microprocessor to provide step-by-step control of the loop initialization cycle via the Stealth Isolation Control Register #2. |
| 3 | Relip_zones_pwrup | When reset, the switch forms a loop to initialize the system the first time. If this bit is set, after going into switching mode the first time, the ports enabled to receive LIPs in stealth are re-LIP'ed to ensure they have only the ALPA map of their zone. NOTE only valid if stealth is enabled. |
| 2 | Reserved | |
| 1 | Send_frame | Setting this bit will cause the ASIC to transmit a generic interswitch frame to all switches in the system. NOTE: This bit is autoclearing. |
| 0 | Byp_positional_map | Setting this bit will cause the ASIC to clear the positional mapping bit in the LISA frame during a Stealth loop initialization cycle. The LIM will not generate the LIRP and LILP frames if this bit is not set. |

6.1.38 Stealth Isolation Control Register #2

The Stealth Isolation Control Register #2 enables allow interactive control of a stealth loop initialization cycle by an external microprocessor.

This register can be accessed at the specified address when the upper_page_select bits are set to "1000.

| Bits | Field Name | Description |
| --- | --- | --- |
| 15 | Resume_hw_stealth | Setting this bit allows the hardware state machine to continue the processing a stealth loop isolation cycle if the "en_interactive_stealth" bit is set in the Stealth Isolation Control Register #1. The use of these bits allows the processor to be interrupted upon receipt of a LIP, manipulate the stealth control bits and then allow the hardware to complete the loop initialization cycle. NOTE: This bit is self-clearing. |
| 14 | Reserved | Always '0' |
| 13 | lip_on_intersw_chg | If this bit is set, the hardware will automatically LIP all the zones on the insertion or removal of a stealth interswitch link. If this bit is not set, no LIP will be generated. |

-continued

| Bits | Field Name | Description |
|---|---|---|
| 12:8 | Port_for_sw_LIP | The port defined in these bits is included in a software commanded lip cycle initiated by setting bit 2 or 1 as defined below. This port must have at least one device capable of becoming the LIM which generates the loop initialization frames. |
| 7 | Pause_lip_cls | If interactive_stealth is enabled as described in section6.1.37, the stealth state machine in the router will pause the stealth LIP processing after the CLS has circulated the loop. Blocking ARB's will be generated on each port to hold off device accesses and the isolated ports will not be allowed into the main system loop. An interrupt will be generated to the processor. The processor may determine which ALPA(s) have been added/subtracted during this LIP cycle and modify the isolation registers if required. Upon completion, the processor may then command the LIP cycle to complete, allowing the devices into the main system. Reserved for ASIC simulations only. |
| 6 | Pause_lip_frame | If interactive_stealth is enabled as described in section 6.1.37, the stealth state machine in the router will pause the stealth LIP processing upon the receipt of the interswitch frame, allowing the processor to format the frame to pass on instead of automatically forwarding the received frame. Reserved for ASIC simulations only. |
| 5 | Pause_before_lip_frame | If interactive_stealth is enabled as described in section 6.1.37, the stealth state machine in the router will pause the stealth LIP processing before transmitting an interswitch frame, allowing the processor to format the frame to. Reserved for ASIC simulations only. |
| 4 | Pause_lip_rcvd | If interactive_stealth is enabled as described in section 6.1.37, the stealth state machine in the router will pause the stealth LIP processing as soon as a LIP is detected. The processor may modify the settings for this LIP cycle then command the LIP cycle to resume. Reserved for ASIC simulations only. |
| 3 | Reserved | |
| 2 | Gen_router_only_LIP | Setting this bit generates LIP cycle with a special interswitch frame which has the payload bytes defined in section 6.1.44. This initialization cycle causes only the router in each switch to involved in the initialization loop. In a single ASIC system, setting this bit will cause the stealth cycle to run per the settings of the port specified by bits 12:8 in this register. NOTE: This bit is auto-clearing. |
| 1 | Gen_selective_LIP | Setting this bit generates LIP cycle with a special interswitch frame which has the payload bytes defined. This initialization cycle causes all ports enabled to be notified of a LIP event, in the zone(s) defined in bits in the payload of the interswitch frame, to be rolled into a loop. Each of these ports will then be involved in a loop initialization cycle. Ports not enabled for LIP notification will remain undisturbed. In a single ASIC system, setting this bit will cause the stealth cycle to run per the settings of the port specified by bits 12:8 in this register. NOTE: This bit is auto-clearing. |
| 0 | Gen_system_LIP | Setting this bit generates a LIP cycle which causes all ports, regardless of LIP isolation settings, to be rolled into a loop involving every port in a loop initialization cycle. This bit is not defined for single ASIC systems. NOTE: This bit is auto-clearing. |

6.1.39 Stop Traffic Control Registers

This register allows the microprocessor to force blocking ARB's as the fill word on any port as a mechanism to hold off OPN requests thus blocking traffic.

This register can be accessed at the specified address when the upper_page_select bits are set to "1000.

| Address | Bits | Description |
|---|---|---|
| 0x84 | 15-0 | Port 15:0 respectively controls to force blocking ARB's as the fill word transmitted out that port. A '1' enables blocking ARB generation. |
| 0x86 | 15-8 | Stlth_holdoff_interval Timer in milliseconds that holds off sequential local stealth LIP cycles to ensure that multi-cycle systems all have time to stop traffic and update their local router lookup tables. (Default value is 4 milliseconds) |
| 0x86 | 7-6 | Reserved, always '0' |
| 0x86 | 5-0 | Port 21:16 respectively controls to force blocking ARB's as the fill word transmitted out that port. A '1' enables blocking ARB generation. |

6.1.40 Status Register #5

This register contains status bits relating to Stealth Isolation Operation. All status bits are clear on read and are maskable via Status Register #5 Interrupt Mask Register. Any unmasked bit that goes high will generate an interrupt and set the Stealth_Isolation status bit in Router Status Register #2.

This register can be accessed at the specified address when the upper_page_select bits are set to "1000.

| Bits | Field Name | Description |
| --- | --- | --- |
| 15-13 | Unused | Always '0' |
| 12 | interswitch_link_chg | This bit is set if one of the stealth interswitch links is inserted or removed. |
| 11 | lip_cycle_to | The lip cycle timed out without receiving a CLS. This normally indicates a device was removed without any other devices in its zone enabled to receive the LIP thus driving the stealth cycle. |
| 10 | Rcvd_lism_frame | This bit is set if the switch detects a LISM frame instead of an expected interswitch frame. This indicates the device on the stlth_sw_cscd is either a switch not in stealth (possibly due to power-up sequence) or a non-switch device. |
| 9 | Rcvd_own_frame | This bit is set if the ASIC detects it has received its own Generic Inter-switch frame indicating the frame has circulated the loop. |
| 8 | Rcvd_remote_frame | This bit is set to indicate this ASIC has received a Generic Inter-switch frame from another ASIC. |
| 7 | Paused_for_lip_cls | This bit is set when a CLS following the LIP initialization cycle has been received when the en_interactive_stealth bit is set in Steatlh Control Register #1. Note: The Stealth Isolation state machine is halted until the resume_stealth bit is set. |
| 6 | Paused_for_lip_frame | This bit is set when a remote LIP inter-switch frame has been received when the en_interactive_stealth bit is set in Steatlh Control Register #1. Note: The Stealth Isolation state machine is halted until the resume_stealth bit is set. |
| 5 | Paused_before_lip_frame | This bit is set before the local LIP inter-switch frame has been transmitted when the en_interactive_stealth bit is set in Steatlh Control Register #1. Note: The Stealth Isolation state machine is halted until the resume_stealth bit is set. |
| 4 | Paused_for_lip_rcvd | This bit is set when a LIP has been received when the en_interactive_stealth bit is set in Steatlh Control Register #1. Note: The Stealth Isolation state machine is halted until the resume_stealth bit is set. |
| 3 | stealth_cycle_occurred | This bit is set to indicate that the stealth state machine has run (State machine leaves the IDLE state.) |
| 2 | frame_crc_err | This bit is set when a crc error is detected on either an interswitch LIP or generic frame. |
| 1 | gen_frm_cycle_cmplt | This bit is set when a locally requested interswitch generic frame cycle is completed. |
| 0 | Traffic_stopped | This bit is set when traffic has been stopped when the en_interactive_stealth bit is set in Steatlh Control Register #1 |

6.1.41 Mask Register for Status Register #5 Interrupt

This register contains mask bits for Status Register #5, relating to Stealth Isolation Operation. Any unmasked bit that goes high will generate an interrupt and set the Stealth_Isolation status bit in Router Status Register #2.

6.1.42 Stealth Timeout Register

This register the maximum value for the two timouts used by the stealth state machine.

| 0x8C | 15-8 | slth_cls_cntr_max —delay the stealth state machine waits after attempting to stop traffic with blocking ARB's until it issues a "remove_connect" pulse to any ports not stopped. A LSB is 100 microseconds and the default setting is 4 milliseconds (0x28) NOTE: A value of 0xff disables the timeout |
| --- | --- | --- |
| 0x8C | 7-0 | slth_wait_cntr_max —delay the stealth state machine waits until it generates a CLS to shut down a stalled stealth cycle. A LSB is 1 millisecond and the default setting is 100 milliseconds (0x64) NOTE: A value of 0xff disables the timeout |

6.1.43 Status Register #6 (Stealth State)

This register displays the current state of the stealth state machine as well as other control signal states as shown below:

| Bits | Field Name | Description |
| --- | --- | --- |
| 15:5 | reserved | |
| 5 | req_traffic_stopped | All ports that have a request to stop traffic has successfully stopped their traffic. |
| 4 | lip_pending | A LIP has been detected and stealth resolution is pending |
| 3:0 | stlth_state | 0 = IDLE |
| | | 1 = STOP_TRAFFIC |
| | | 2 = SEND_FRAME |
| | | 3 = WAIT_FRAME |
| | | 4 = FORWARD_FRAME |
| | | 5 = WAIT_LIP |
| | | 6 = CREATE_ISOLATED_LOOP |
| | | 7 = WAIT_CLS |
| | | 8 = WAIT_TABLE_UPDATE |
| | | 9 = SEND_GEN_FRAME |
| | | A = WAIT_GEN_FRAME |

-continued

| Bits | Field Name | Description |
|---|---|---|
| | | B = FORWARD_GEN_FRAME |
| | | C = SEND_CLS |
| | | D = RELEASE_ISOLATION |
| | | E = UPDATE_LOOKUP_TABLE |
| | | F = STOP_TRAFFIC_4_UPDATE |

6.1.44 Stealth LIP Inter-Switch Transmit Payload Registers

These registers contain the ten bytes of the payload to be loaded into the transmitted LIP interswitch frame. During normal stealth LIP isolation cycles, this frame is passed through the router of each switch to determine which switch controls the existing loop initialization cycle as well as containing the LIP isolation zones that are involved in the cycle. The ASIC will automatically format the frame during an automatic stealth isolation cycle. A commanded cycle during interactive stealth frame will use the data written to these registers by the processor. The format the payload of the frame is shown below:

| Register | Payload Byte | LIP Control Frame |
|---|---|---|
| 0x90, bits[7:0] | 0 | 00 |
| 0x90, bits[15:0] | 1 | 08 |
| 0x92, bits[7:0] | 2 | 00 = LIPing port and routers |
| | | 01 = LIPing port, ports in zone enabled to rcv LIPs and routers |
| | | 02 = All ports regardless of isolation modefor ports |
| 0x92, bits [15:0] | 3 | 00 |
| 0x94, bits[7:0] | 4 | Local SN [7:0] |
| 0x94, bits [15:0] | 5 | Local SN [15:8] |
| 0x96, bits[7:0] | 6 | Local SN [23:16] |
| 0x96, bits [15:0] | 7 | Local SN [31:24] |
| 0x98, bits[7:0] | 8 | Isolation Zones[7:0] |
| 0x98, bits [15:0] | 9 | Isolation Zones[15:8] |

6.1.45 Stealth Received Inter-ASIC Frame Registers

These read-only registers contain the 10 byte payload received in the LIP interswitch frame. During stealth LIP isolation cycles, this frame is received to determine which switch controls the existing loop initialization cycle as well as containing the LIP isolation zones that are involved in the cycle.

| Register | Payload Byte | LIP Control Frame |
|---|---|---|
| 0xA0, bits[7:0] | 0 | 00 |
| 0xA0, bits [15:0] | 1 | 08 |
| 0xA2, bits[7:0] | 2 | 00 = LIPing port and routers |
| | | 01 = LIPing port, ports in zone enabled to rcv LIPs and routers |
| | | 02 = All ports regardless of isolation modefor ports |
| 0xA2, bits [15:0] | 3 | 00 |
| 0xA4, bits[7:0] | 4 | Local SN [7:0] |
| 0xA4, bits [15:0] | 5 | Local SN [15:8] |
| 0xA6, bits[7:0] | 6 | Local SN [23:16] |
| 0xA6, bits [15:0] | 7 | Local SN [31:24] |
| 0xA8, bits[7:0] | 8 | Isolation Zones[7:0] |
| 0xA8, bits [15:0] | 9 | Isolation Zones[15:8] |

6.1.46 LIFA Frame Modification Registers

The LIFA Frame modification registers hold the values used to modify the LIFA frame during stealth LIP isolation cycles. In normal operation, this registers are read-only by the microprocessor with the ASIC's hardware formatting the bits representing each ALPA. If the dis_hw_LIFA_GEN bit is set in the Stealth Isolation Control Register #2, write access to these registers is enabled and the processor is responsible for generating the values in these registers.

If the FRC_LIFA_FRM_MOD bit is set in the Stealth Isolation Control Register #2, the values in these registers will overwrite the payload in the LIFA frame. If the FRC_LIFA_FRM_MOD bit is not set, the ASIC will logically OR the LIFA payload and these registers together.

This register can be accessed at the specified address when the upper_page_select bits are set to "1000.

| | | | | | | BIT Position | | | | | | | | | |
|---|---|---|---|---|---|---|---|---|---|---|---|---|---|---|---|
| 15 | 14 | 13 | 12 | 11 | 10 | 09 | 08 | 07 | 06 | 05 | 04 | 03 | 02 | 01 | 00 |
| 25 | 23 | 1F | 1E | 1D | 1B | 18 | 17 | 10 | 0F | 08 | 04 | 02 | 01 | 00 | X |
| 3A | 39 | 36 | 35 | 34 | 33 | 32 | 31 | 2E | 2D | 2C | 2B | 2A | 29 | 27 | 26 |
| 55 | 54 | 53 | 52 | 51 | 4E | 4D | 4C | 4B | 4A | 49 | 47 | 46 | 45 | 43 | 3C |
| 72 | 71 | 6E | 6D | 6C | 6B | 6A | 69 | 67 | 66 | 65 | 63 | 5C | 5A | 59 | 56 |
| 98 | 97 | 90 | 8F | 88 | 84 | 82 | 81 | 80 | 7C | 7A | 79 | 76 | 75 | 74 | 73 |
| B2 | B1 | AE | AD | AC | AB | AA | A9 | A7 | A6 | A5 | A3 | 9F | 9E | 9D | 9B |
| CD | CC | CB | CA | C9 | C7 | C6 | C5 | C3 | BC | BA | B9 | B6 | B5 | B4 | B3 |
| EF | E8 | E4 | E2 | E1 | E0 | DC | DA | D9 | D6 | D5 | D4 | D3 | D2 | D1 | CE |

6.1.47 LIRP Frame Modification Registers

The LIRP Frame modification registers hold the values used to modify the LIRP frame during stealth LIP isolation cycles. In normal operation, this registers are read-only by the microprocessor with the ASIC's hardware formatting the count and ALPA list. If the dis_hw_LIRP_GEN bit is set in the Stealth Isolation Control Register #2, write access to these registers is enabled and the processor is responsible for generating the values in these registers.

If the FRC_LIRP_FRM_MOD bit is set in the Stealth Isolation Control Register #2, the values in these registers will overwrite the payload in the LIRP frame. If the FRC_LIRP_FRM_MOD bit is not set, the ASIC will append the number of ALPA's indicated by the LIRP ALPA count field to the ALPA's already in the LIRP payload and update the count to reflect the added ALPA's.

This register can be accessed at the specified address when the upper_page_select bits are set to "1001.

| LIP Isolation LIRP Modification Map (Upper page select = 1001) | | |
|---|---|---|
| 1$^{st}$ ALPA for LIRP | LIRP ALPA Count | R/W |
| 3$^{rd}$ ALPA for LIRP | 2$^{nd}$ ALPA for LIRP | R/W |
| . | . | R/W |
| . | . | |
| . | . | |
| 126$^{th}$ ALPA for LIRP | 125$^{th}$ ALPA for LIRP | R/W |

6.1.48 Route Blocking Registers, Groups 0 to 7

The route blocking registers hold the values used to determine access privileges between various devices using the ALPA's contained in the OPN ordered set. Writing a '1' to a location blocks a device with that ALPA from communicating with any device whose ALPA is also blocked. Each ALPA is represented by a single bit in each group as shown in the table below where the '?' in the address field is a value of 8-F for groups 0-7 respectively. NOTE: The unused bit is placed in the most significant position of each group, unlike LixA frames that use the least significant position.

| | BIT Position | | | | | | | | | | | | | | | |
|---|---|---|---|---|---|---|---|---|---|---|---|---|---|---|---|---|
| ADDR | 15 | 14 | 13 | 12 | 11 | 10 | 09 | 08 | 07 | 06 | 05 | 04 | 03 | 02 | 01 | 00 |
| 0x?0: | 26 | 25 | 23 | 1F | 1E | 1D | 1B | 18 | 17 | 10 | 0F | 08 | 04 | 02 | 01 | 00 |
| 0X?2: | 3C | 3A | 39 | 36 | 35 | 34 | 33 | 32 | 31 | 2E | 2D | 2C | 2B | 2A | 29 | 27 |
| 0X?4: | 56 | 55 | 54 | 53 | 52 | 51 | 4E | 4D | 4C | 4B | 4A | 49 | 47 | 46 | 45 | 43 |
| 0X?6: | 73 | 72 | 71 | 6E | 6D | 6C | 6B | 6A | 69 | 67 | 66 | 65 | 63 | 5C | 5A | 59 |
| 0X?8: | 9B | 98 | 97 | 90 | 8F | 88 | 84 | 82 | 81 | 80 | 7C | 7A | 79 | 76 | 75 | 74 |
| 0X?A: | B3 | B2 | B1 | AE | AD | AC | AB | AA | A9 | A7 | A6 | A5 | A3 | 9F | 9E | 9D |
| 0X?C: | CE | CD | CC | CB | CA | C9 | C7 | C6 | C5 | C3 | BC | BA | B9 | B6 | B5 | B4 |
| 0X?E: | | EF | E8 | E4 | E2 | E1 | E0 | DC | DA | D9 | D6 | D5 | D4 | D3 | D2 | D1 |

This register can be accessed at the specified address when the upper_page_select bits are set to "1010.

6.1.49 Route Blocking Registers, Groups 8 to F

The route blocking registers hold the values used to determine access privileges between various devices using the ALPA's contained in the OPN ordered set. Writing a '1' to a location blocks a device with that ALPA from communicating with any device whose ALPA is also blocked. Each ALPA is represented by a single bit in each group as shown in the table below where the '?' in the address field is a value of 8-F for groups 8-F respectively. NOTE: The unused bit is placed in the most significant position of each group, unlike LixA frames that use the least significant position.

| | BIT Position | | | | | | | | | | | | | | | |
|---|---|---|---|---|---|---|---|---|---|---|---|---|---|---|---|---|
| ADDR | 15 | 14 | 13 | 12 | 11 | 10 | 09 | 08 | 07 | 06 | 05 | 04 | 03 | 02 | 01 | 00 |
| 0x?0: | 26 | 25 | 23 | 1F | 1E | 1D | 1B | 18 | 17 | 10 | 0F | 08 | 04 | 02 | 01 | 00 |
| 0X?2: | 3C | 3A | 39 | 36 | 35 | 34 | 33 | 32 | 31 | 2E | 2D | 2C | 2B | 2A | 29 | 27 |
| 0X?4: | 56 | 55 | 54 | 53 | 52 | 51 | 4E | 4D | 4C | 4B | 4A | 49 | 47 | 46 | 45 | 43 |
| 0X?6: | 73 | 72 | 71 | 6E | 6D | 6C | 6B | 6A | 69 | 67 | 66 | 65 | 63 | 5C | 5A | 59 |
| 0X?8: | 9B | 98 | 97 | 90 | 8F | 88 | 84 | 82 | 81 | 80 | 7C | 7A | 79 | 76 | 75 | 74 |
| 0X?A: | B3 | B2 | B1 | AE | AD | AC | AB | AA | A9 | A7 | A6 | A5 | A3 | 9F | 9E | 9D |
| 0X?C: | CE | CD | CC | CB | CA | C9 | C7 | C6 | C5 | C3 | BC | BA | B9 | B6 | B5 | B4 |
| 0X?E: | | EF | E8 | E4 | E2 | E1 | E0 | DC | DA | D9 | D6 | D5 | D4 | D3 | D2 | D1 |

This register can be accessed at the specified address when the upper_page_select bits are set to "1011.

6.1.50 LIP Isolation Zone Control Registers

This set of registers defines bitmaps to set the LIP isolation zones within the ASIC. Each port has a 16-bit register associated with it where Bit 0 corresponds to LIP isolation zone 0, Bit 1 corresponds to zone 1, etc.

These registers can be accessed at the specified address when the upper_page_select bits are set to "1100".

6.1.51 Stealth Generic Inter-Switch Frame Header Registers

These registers contain the 6 words of the header to be loaded into the transmitted Generic interswitch frames. Additionally, words 0 and 3 of the header are used to detect received Generic interswitch frames.

| Header Word | Field Description |
|---|---|
| 0 [31:16] | |
| 0 [15:0] | |
| 1 [31:16] | |
| 1 [15:0] | |
| 2 [31:16] | |
| 2 [15:0] | |
| 3 [31:16] | |
| 3 [15:0] | |
| 4 [31:16] | |
| 4 [15:0] | |
| 5 [31:16] | |
| 5 [15:0] | |

These registers can be accessed at the specified address when the upper_page_select bits are set to "1110".

6.1.52 Stealth Generic Inter-Switch Frame Trasnmit Payload Registers

These registers contain the 8 words of the payload to be loaded into the transmitted Generic interswitch frame. NOTE: Payload word 0 must be the local serial number for broadcast frames. If the local serial number is not used, the frame will be blocked by a switch with the matching serial number.

| Payload Word | Field Description |
|---|---|
| 0 [31:16] | Local Serial Number [31:15] |
| 0 [15:0] | Local Serial Number [15:0] |
| 1 [31:16] | User Data |
| 1 [15:0] | User Data |
| 2 [31:16] | User Data |
| 2 [15:0] | User Data |
| 3 [31:16] | User Data |
| 3 [15:0] | User Data |
| 4 [31:16] | User Data |
| 4 [15:0] | User Data |
| 5 [31:16] | User Data |
| 5 [15:0] | User Data |
| 6 [31:16] | User Data |
| 6 [15:0] | User Data |
| 7 [31:16] | User Data |
| 7 [15:0] | User Data |

These registers can be accessed at the specified address when the upper_page_select bits are set to "1101".

6.1.53 Stealth Generic Inter-Switch Frame Payload Registers

These registers contain the 8 words of the payload to be received in a Generic interswitch frame.

| Payload Word | Field Description |
|---|---|
| 0 [31:16] | Rcvd Serial Number [31:15] |
| 0 [15:0] | Rcvdl Serial Number [15:0] |
| 1 [31:16] | User Data |
| 1 [15:0] | User Data |
| 2 [31:16] | User Data |
| 2 [15:0] | User Data |
| 3 [31:16] | User Data |
| 3 [15:0] | User Data |
| 4 [31:16] | User Data |
| 4 [15:0] | User Data |
| 5 [31:16] | User Data |
| 5 [15:0] | User Data |
| 6 [31:16] | User Data |
| 6 [15:0] | User Data |
| 7 [31:16] | User Data |
| 7 [15:0] | User Data |

These registers can be accessed at the specified address when the upper_page_select bits are set to "1101".

6.2 Port Register Definitions

| Port Logic Registers | | | |
|---|---|---|---|
| | Register Description | | |
| | Configuration Register | | R/W |
| | Control Register #1 | | R/W |
| | Port Interrupt Mask #1 | | R/W |
| | Port Interrupt Mask #2 | | R/W |
| | User OS Match Byte 2 Mask | User OS Match Byte 2 | R/W |
| | User OS Match Byte 3 Mask | User OS Match Byte 3 | R/W |
| | User OS Match Byte 4 Mask | User OS Match Byte 4 | R/W |
| | User Tx Byte 3 | User Tx Byte 4 | R/W |
| E S I M F Ob Ib RES | | User Tx Byte 2 | R/W |
| | Reserved | User_10b_word[9:0] | R/W |
| | Reserved | User_10b_word[19:10] | R/W |
| | Reserved | User_10b_word[29:20] | R/W |
| | Reserved | User_10b_word[39:30] | R/W |
| | Local SEOC P_INFO | Reserved | R/W |
| | Reserved | No Comma Timer | R/W |
| | OS Error Threshold Lower | | R/W |
| | CRC Error Threshold | OS Error Threshold Upper | R/W |
| | Control Register #2 | | R/W |
| | Stall Counter | | R/W |
| | Status Register #1 | | R |
| | Status Register #2 | | R |
| | Port Detector Register #1 | | R |
| | Port Detector Register #2 | | R |
| | Port Error/Change (Interrupt) Status Register #1 | | R/W |
| | Port Error/Change (Interrupt) Status Register #2 | | R/W |
| | OS Error Count Lower | | R |
| | Current destination register | OS Error Count Upper | R |
| | Match Count Lower | | R |
| | Reserved | MC Upper | R |
| | RX Frame Count Register | | R |
| | Future TX Frame Count Register | | N/A |
| | Port Connections Attempted | | R |
| | Port Connections Held Off | | R |
| | Clock Delta | | R |
| | Reserved | Port Utilization % | R |
| | OS Capture Byte 3 | OS Capture Byte 4 | R |
| | Reserved | OS Capture Byte 2 | R |
| | CRC Error Count | Invalid OPN/Broadcast | R |
| | | ALPA Capture Reg. | |
| | Port Insertion Count | Loop Up Count | R |
| Val | Reserved | CRC Error ALPA | R |
| | Src ALPA | Dest ALPA | R |
| | Port_alpa_bitmap[0.14] | | R/W |
| | Port_alpa_bitmap[15.30] | | R/W |
| | Port_alpa_bitmap[31.46] | | R/W |
| | Port_alpa_bitmap[47.62] | | R/W |
| | Port_alpa_bitmap[63.78] | | R/W |
| | Port_alpa_bitmap[79.94] | | R/W |

-continued

| Port Logic Registers Register Description | | |
|---|---|---|
| Port_alpa_bitmap[95.1102] | | R/W |
| Port_alpa_bitmap[111.126] | | R/W |
| Remote SEOC SN Byte 1 | Remote SEOC SN Byte 2 | R |
| Remote SEOC SN Byte 3 | Remote SEOC SN Byte 4 | R |
| Remote SEOC P_INFO | Remote SEOC SN Byte 5 | R |
| Remote SEOC USER2 | Remote SEOC USER1 | R |
| Reserved | GBIC/SFP Read Address[10:0] | R/W |
| stop_traffic_cnt | prt_opn_lockup_max | R/W |
| GBIC/SFP Serial ID Data | | R |
| OPN Mismatch Src ALPA | OPN Mismatch Dest ALPA | R |
| Reserved | OPN Mismatch D_ID from Frame | R |
| Src/Dest ALPAs From Unknown OPN/Lost Node | | R |
| Extra Control Register | | |
| SCSI Statistics Source ALPA | SCSI Statistics Destination ALPA | R/W |
| SCSI Read IO Counter | | R/W |
| SCSI Write IO Counter | | R/W |
| SCSI Read Byte Counter[15:0] | | R/W |
| SCSI Read Byte Counter[31:16] | | R/W |
| SCSI Read Byte Counter[47:32] | | R/W |
| SCSI Write Byte Counter[15:0] | | R/W |
| SCSI Write Byte Counter[31:16] | | R/W |
| SCSI Write Byte Counter[47:32] | | R/W |
| Serdes Control Register | | R/W |

-continued

| Port Logic Registers Register Description | |
|---|---|
| Serdes Sync Control Register | R/W |
| Serdes Sync Mask Register | R/W |
| Serdes Analog Configuration Register | R/W |
| Serdes Compatibility Register | R/W |
| Serdes Status Register | R |

Note: Many port register addresses are marked Read Only. Some of these registers (e.g., counters which stick at max) may in reality be Read/Write for testing and simulation purposes. In normal operation, these registers are only intended to be read, and as such, should never be written to by firmware!

6.2.1 Port Configuration Register

The port configuration register bits define operating modes that are set once or control signals that are changed infrequently.

| Port Configuration Register | | |
|---|---|---|
| Bits | Field Name | Description |
| 15 | rmv_conn_on_dup_stall | When set, issues a remove connect to duplicate cascades that have stalled while pending a connection. |
| 14 | rmv_conn_on_stall | When set, issues a remove connect to the port on detection of a stall. |
| 13 | Pending_opn_en | When set, modifies stall detection to occur starting with the pending open state. |
| 12 | filt_dis | GBIC/SFP I2C glitch filter disable. Used only for ASIC simulation. |
| 11 | tx_disable | When set, asserts the transmit disable signal to the GBIC/SFP. Also causes the bypassed LED to blink. Warning: setting this bit can bring down an operational loop. |
| 10 | forced_insert | When set, causes the port to be inserted into the loop regardless of the input signal. Also causes the bypassed LED to blink. |
| 9 | forced_bypass | Port insertion state machine is disabled and prevents the port from participating in activity, even if all other conditions for insertion are present. Also causes the bypassed LED to blink. |
| 8 | p_beacon | When set, port LED's blink at a 2 Hz rate. |
| 7 | en_ins_rdy | When set, the Loop Switch asserts the Insertion Rdy bit in the Port Error/Change Status Register any time a port is going to be inserted. This differs from normal operation when the Insertion Rdy bit is only set when a serial number is exchanged during the insertion process. |
| 6 | dis_arbff | Disables the normal replacement of received Idles with ARBff for EMI emissions control. |
| 5 | dis_lip_on_ins | Port logic normally forces reinitialization by sourcing LIPf7s into the loop when a port is switched in. Setting this bit disables this function. NOTE: This bit is automatically set by the ASIC if this port is configured as a duplicate cascade. |
| 4 | dis_lip_on_byp | Port logic normally forces reinitialization by sourcing LIPf7s into the loop when a port is switched out. Setting this bit disables this function. NOTE: This bit is automatically set by the ASIC if this port is configured as a duplicate cascade. |
| 3 | dis_byp_no_comma | Port logic normally switches out a port if a valid comma character is not received in 100 usec. Setting this bit disables this function. |
| 2 | dis_byp_on_lipf8 | Port logic normally replaces LIPf8s received on the port with LIPf7s and switches out the port. Setting this bit disables this function. |
| 1 | dis_seoc | Port logic normally attempts to determine the type of device attached to the port. Setting this bit disables this function. |

-continued

| | Port Configuration Register | |
|---|---|---|
| Bits | Field Name | Description |
| 0 | Tinman | Setting this bit allows any port to be inserted provided word sync is acquired. No other checks are done. |

6.2.2 Port Control Register #1

| | Port Control Register #1 Definition | |
|---|---|---|
| Bits | Field Name | Description |
| 15 | clear_detector | Set to clear port detector register. Bit is auto cleared. |
| 14 | comp_ins | Complete insertion. The microprocessor sets this bit in response to the setting of the Insertion Rdy bit in Status Register #1 when the controller has finished configuring the port for insertion. This would include any required duplicate port registers in the router. Only used in when management is present. Bit is auto cleared. |
| 13 | dup_cascade_conn | When set, indicates that the port is a duplicate (secondary) cascade connection to another Loop Switch. |
| 12-10 | Port type | Controls port mode of operation.<br>0 0 0 non-cascade<br>0 0 1 tree cascade<br>0 1 0 auto cascade,non cascade unless SEOC successfully completes and changes to tree<br>0 1 1 reserved<br>1 0 0 string #0 cascade<br>1 0 1 string #1 cascade<br>1 1 0 string #2 cascade<br>1 1 1 string #3 cascade |
| 9 | hi_priority_tmr_en | When set, varies the priority of the port between the normal priority set by the port type field above and highest priority to help ensure that the port doesn't have any devices that are starved. |
| 8 | Close_cntr_dis | Disable the ALPA close counter. If an OPN request is closed down without a SOF ordered set being received, the close counter for the source's ALPA is incremented. If that counter reaches the threshold value set in the router registers and this bit is set, the priority of this port will be increased until 1 successful connection has been made to minimize the chances of a device being starved. |
| 7 | pass_thru | When this bit is set, data is passed straight thru the port. |
| 6 | util_conn | If this bit is not set or in hub emulation mode, the utilization counter reflects the % of data sent within a frame as compared to the total data bandwidth. When this bit is set in switching mode, this bit enables the port utilization count register to reflect the % of time that a port is connected and generating/requesting traffic. |
| 5 | match3x | User match must see 3 consecutive matching ordered sets. Note this bit is ignored if the Match Other bit is set. |
| 4 | usrm_en | 0 - User match is disabled and OS capture is reset.<br>1 - User match is enabled and OS capture is started.<br>The user match count is reset when this bit transitions from the reset (0) to the set (1) condition. |
| 3 | match_othr | 1 - Match on any ordered set that doesn't have a detect bit in Port Detector Register. The exception to this rule is that pt-pt ordered sets set a detector bit and match other as well, since more than that OS can set the detector bit. |
| 2 | match_mask_4 | 0 - Byte 4 is used in match.<br>1 - Byte 4 is ignored in match |
| 1 | match_mask_3 | 0 - Byte 3 is used in match.<br>1 - Byte 3 is ignored in match |
| 0 | match_mask_2 | 0 - Byte 2 is used in match.<br>1 - Byte 2 is ignored in match |

6.2.3 Port User Ordered Set Match Register

This is set of registers defines an ordered set that the port searches for in the received data stream. Each bit of the payload bytes of the ordered set can be individually masked off. When a match is found, the USR Match bit in the status register is set.

The lower 8 bits of Address 0x04 contains the $2^{nd}$ byte of the ordered set following a K28.5. The upper 8 bits of Address 0x04 contain the bit mask for the $2^{nd}$ byte. If a bit is set in the bit mask, that bit is treated as "don't care" during the byte compare operation. Address 0x06 contains the $3^{rd}$ byte to match and its associated mask. Address 0x08 contains the 4th byte to match and its associated mask. Note that the 1st byte of the ordered set is hardwired to K28.5 (positive or negative running disparity). This means that K28.5s must be present on the loop in order to do a capture. Note that EOFs can be captured since a K28.5 of either running disparity is recognized.

If the parity error on match bit is set, any ordered sets that match the value in this register will generate a parity error.

6.2.4 Port User Ordered Set Transmit Register

This set of registers defines an arbitrary ordered set that is to be sent on the loop. The lower 8 bits of Address 0x0C is the 2nd byte to be transmitted after a K28.5. Address 0x0A contains the 3rd and 4th byte. For this data to be properly written, the lower register must be written prior to the upper, and the upper register write must have the enable bit (xmit_os_reg) set in the data that is to be written.

| Port User Ordered Set Transmit Register Definition | | |
|---|---|---|
| Bits | Field Name | Description |
| | | Address 0x0A (lower) |
| 15-8 | Tx Byte #3 | |
| 7-0 | Tx Byte #4 | Least significant byte of ordered set |
| | | Address 0x0C (upper) |
| 15 | xmit_os_reg | Global enable for ordered set transmit register contents. Setting only this bit replaces all fill words with the contents of the Ordered Set Transmit Registers |
| 14 | xmit_some | When this bit is set and the xmit_os_reg bit is set, the given ordered set is sent one through 15 times based on the count in Port Control Register #2. If clear, the ordered set is sent continuously. |
| 13 | xmit_imm | When this bit is set and the xmit_os_reg bit is set, the given ordered set replaces the next ordered set. If clear, only fill words are replaced. |
| 12 | xmit_match | When this bit is set and the xmit_os_reg bit is set, the given ordered set replaces ordered sets that meet the User match criteria |
| 11 | xmit_fill | When this bit is set and the xmit_os_reg bit is set, ordered sets that meet the User match criteria are replaced with the current fill word. |
| 10 | Xmit_bad_os_reg | Global enable for bad ordered set transmit register contents. |
| 9 | xmit_bad_10b_once | When this bit is set and the xmit_bad_os_reg bit is set, the contents of the a badUser 10b Word-encoded ordered set (with negative disparity) is sent once. |
| 8 | xmit_bad_10b_imm | When this bit is set and the xmit_bad_os_reg bit is set, the contents of the User 10B Word a bad 10b-encoded ordered set (with negative disparity) replaces the next ordered set. Otherwise, if just the xmit_bad_os_reg is set, only fill words are replaced |
| 7-0 | Tx Byte #2 | Most significant byte of ordered set |

6.2.5 User 10B Word

These registers contain a user configurable 10b encoded word. When the conditions of the xmit_bad_10b_once or xmit_bad_10b_imm bits of the Port User Ordered Set Transmit Register are met, this encoded word is transmitted from the ASIC. Note: The ASIC does not perform any checks on the word and its use is intended strictly for testing purposes.

| Bits | Field Name | Description |
|---|---|---|
| | | Address 0x0E |
| 15:10 | Reserved | |
| 9:0 | OS Byte #3 | Bits [9:0] of the ordered set |
| | | Address 0x10 |
| 15:10 | Reserved | |
| 9:0 | OS Byte #2 | Bits [19:10] of the ordered set |
| | | Address 0x12 |
| 15:10 | Reserved | |
| 9:0 | OS Byte #1 | Bits [29:20] of the ordered set |

-continued

| Bits | Field Name | Description |
|---|---|---|
| | | Address 0x14 |
| 15:10 | Reserved | |
| 10:0 | OS Byte 0 | Ordered set bits [39:32] Normally K28.5 character |

6.2.6 Local SEOC P INFO

The upper 8 bits of this register contain the payload data for this port's P_INFO SEOC ordered set. During reset this value is loaded to a neutral-disparity value to indicate the port. The neutral-disparity values start with 0x00 for port 0, 0x01 for port 1 0x02 for port 2, 0x04 for port 3, etc.

6.2.7 Port Interrupt Mask Register #1

This register is used to mask port interrupt status bits in port error status register #1. If a bit in this register is set to one, then the corresponding bit in the port interrupt status register is enabled to generate an interrupt to the processor.

6.2.8 Port Interrupt Mask Register #2

This register is used to mask port interrupt status bits in port error status register #2. If a bit in this register is set to one, then the corresponding bit in the port interrupt status register is enabled to generate an interrupt to the processor.

6.2.9 No Comma Timer Register

| | | |
|---|---|---|
| 15-8 | Reserved | |
| 7-0 | No Comma Timer | These bits are used to configure the amount of time to look for the absence of comma characters before bypassing a port. This 8-bit register counts the time in increments of 100 us. The value 'n' written to this register results in an interval of between (n) and (n + 1) * 100 us. (Due to unsynchronized internal timers there may be a fraction of 1 lsb added to the count.) This register defaults to a value of 1, which indicates an interval of 100 us. NOTE: A value of 0 in invalid. |

6.2.10 OS/CRC Error Threshold Registers

The 24-bit value contained in address 0x1e and the bottom 8 bits of address 0x20, is compared to the count in the OS Error Count registers and if the count exceeds the threshold, an interrupt is generated to the CPU. A certain number of ordered set errors is expected to occur. The threshold value should be set to a value such that the interrupt is triggered very infrequently under normal operating conditions.

The value in the upper 8 bits of address 0x20 is compared to the count in the CRC Error Count register and if the count exceeds the threshold, an interrupt is generated to the CPU. This value resets to 0xFF.

6.2.11 Port Control Register #2

The port control #2 register contains bits that are changed during normal operation.

| | | Port Control Register #2 Definition |
|---|---|---|
| Bits | Field Name | Description |
| 15-12 | Xmt_os_cnt | Four bit field that modifies the xmt_os_once control to send 1-16 ordered sets instead of just one. A value of 0x0 sends 1 ordered set, a value of 0xf sends 16. |

Port Control Register #2 Definition

| Bits | Field Name | Description |
|---|---|---|
| 11-10 | rx_los_mode | Determines the source of the rx_los used by insertion logic<br>0 0 - Use SFP rx_los only<br>0 1 - Use serdes rx_los only<br>1 x - Logically OR SFP and serdes rx_los |
| 9 | request_seoc | When set to a '1', this bit forces the port to rerun the SEOC algorithm, causing the port to reinsert. NOTE: This bit is self-clearing. |
| 8 | Port_filter_en | When this bit is set, the frame header filter for this port is enabled. The filter type controls must be set in the router memory map to select the enabled filter(s). |
| 7 | tx_fault_polarity | Invert polarity of tx_fault signal.<br>0 - tx_fault is active high<br>1 - tx_fault is active low |
| 6 | Rx_los_polarity | Invert polarity of rx_los_tx signal.<br>0 - rx_los_tx is active high<br>1 - rx_los_tx is active low |
| 5 | Parity_err_on_match | When this bit is set, a USER match generates bad panty on the internal data bus. |
| 4 | Rcv_lip | Stealth LIP Isolation control. If set to '1' this port is LIP'ed and involved in a loop initialization cycle any time a port, within the same LIP zone, with fwd_lip set, receives a LIP from an external device. |
| 3 | Fwd_lip | Stealth LIP Isolation control. If set to '1' this port forwards a LIP to the system to LIP all ports, within the same LIP zone, with rcv_lip set, whenever it receives a LIP from an external device. |
| 2 | Manual_LIP | When this bit is set and LIP isolation is enabled for the port, local loop initialization is blocked and not allowed to proceed on a LIP-isolated loop segment. |
| 1 | Pass_LIP | When this bit is set and LIP isolation is enabled for the port, local loop initialization is allowed to proceed on a LIP-isolated loop segment. |
| 0 | Port_isolate_en | When this bit is set and the global_isolate_en bit is set in the router, LIP isolation is enabled for the port. |

6.2.12 Stall Counter Register

The stall counter register contains the time a port has had a connection active and has not seen a SOF or EOF ordered set pass by. The counter resets by detecting a SOF or EOF ordered set or by a processor write of 0x0000. The counter has a terminal count at the stall threshold, set in the router memory map space. Upon reaching the stall threshold, an interrupt is generated. The resolution of the counter is 10 □s.

6.2.13 Port Error/Change Status Register #1

This register reports errors or changes in the configuration of the port. Any change in the state of this register causes an interrupt to the Router Status Register #2. This allows a management entity to simply poll the Router Status register for any changes and then read the appropriate port register to determine the change. This register is cleared on read.

Port Error Status Register #1 Definition

| Bits | Field Name | Description |
|---|---|---|
| 15 | int2_active | This bit is set when an interrupt is triggered by port error status register #2. |
| 14 | user_match_int | This bit is set if the user match bit in the port detector register is asserted. This bit is only cleared by a microprocessor access directly to this register. |
| 13 | snum_change | Serial number exchange completed. This interrupt is set after the last sequence in the exchange is completed. |
| 12 | crc_err_th | CRC Error Threshold count has been exceeded. |
| 11 | os_err_th | Ordered Set Error Threshold count has been exceeded. |
| 10 | gbic_insert | A GBIC/SFP has been inserted since the last read. |
| 9 | gbic_bypass | A GBIC/SFP has been removed since the last read. |
| 8 | loop_up | Port State in Port Status Register #1 has gone from state '01010' to state '01100' or higher. |
| 7 | loop_down | Port state in Port Status Register #1 has gone from state '01100' or higher to state '01000' or lower. |
| 6 | port_insert | Port has changed from being bypassed to being inserted. |
| 5 | port_bypass | Port has changed from being inserted to being bypassed. |
| 4 | insert_lipf8_fault | Indicates that the Port kicked out of the Validate Data state because LIP(F8) was received after having xmt'ed LIP(F7) to the attached node for more than 15 ms. |

-continued

Port Error Status Register #1 Definition

| Bits | Field Name | Description |
|---|---|---|
| 3 | insert_timeout | Indicates that LIP(F7,F7) was never received by the port during the 112 ms wait in Validate Data. |
| 2 | insertion_rdy | When set, indicates that a port is ready to be inserted and requires manual intervention by the management card. If the en_ins_rdy policy bit in the Port Configuration Register is clear, then this bit is only set if a management card is present and the insertion process exchanged serial numbers with another Vixel Loop Switch. If the policy bit is set, any port insertion attempt generates this bit. |
| 1 | crc_error | CRC Error detected in a frame. LSB of S_ID of last frame w/error is contained in CRC Error ALPA Register. |
| 0 | connect_overflow | An error occurred during a connection attempt where a frame arrived before the connection was made. This can happen if a node is using non-zero BB_credit or if an OPN broadcast was used. Only valid in switching mode. |

6.2.14 Port Error/Change Status Register #2

This register reports errors or changes in the configuration of the port. Any change in the state of this register causes an interrupt to the Router Status Register #2. This allows a management entity to simply poll the Router Status register for any changes and then read the appropriate port register to determine the change. This register is cleared on read.

Port Error Status Register #2 Definition

| Bits | Field Name | Description |
|---|---|---|
| 15-12 | Reserved | |
| 11 | Parity_error | A parity error was detected at prx_sw mux |
| 10 | Parity_error | A parity error was detected at ptx_sw mux. |
| 9 | Parity_error | A parity error was detected at transmit encoder_ |
| 8 | Lost_node | An OPN was looped back on a port that the ALPA map indicates the device should exist on. This indicates either the OPN was misrouted or the device has gone off-line. The source and destination ALPAs are stored in a register. |
| 7 | Unknown_OPN | An OPN was detected that does not exist in the lookup table and the source and destination ALPAs stored. NOTE: Hardware has no mechanism to determine if this unknown OPN is the result of an initiator "walking" the loop or a true error. Software has to make the determination. |
| 6 | OPN_D_ID_mismatch | A mismatch was detected between the destination ALPA in the last OPN received and the destination ID in the FC header of a frame. |
| 5 | Alpa_valid | This bit is set when a frame is received by the ASIC. The bit being set indicates that a valid src/dest ALPA is available in the Src/Dest ALPA Register. |
| 4 | Stall_detect | This bit is set if the stall counter exceeds the stall threshold. |
| 3 | Reserved | |
| 2 | Rx_invalid_opn | This bit is set when an OPN has been sent out on a destination port in switching mode and a different OPN is returned before the loop is closed. When this bit is set, the ALPA in the last ARBx received on that port prior to the OPN is captured in the Invalid OPN ALPA capture register. |
| 1 | Reserved | Always '0' |
| 0 | isolated_LIP | This bit is set whenever a LIP is received and isolated on a port. |

6.2.15 Port Status Register #1

This register provides a real time status of the port at the time the read occurs.

Port Status Register #1 Definition

| Bits | Field Name | Description |
|---|---|---|
| 15 | src_conn | port connected as a source (switching mode) |
| 14 | dest_conn | port connected as a destination (switching mode) |
| 13 | Lim_port | This bit is set to indicate that the port is the LIM on its loop. |
| 12-8 | port state | Valid in hub emulation and switching modes:<br>'0x0' port is switched out.<br>'0x1' port is performing insertion algorithm.<br>'0x8' loop in initializing state (LIP seen).<br>'0x9' loop in open init state (SOF seen).<br>'0xa' loop in open init, post LISM state (ARBf0 seen)<br>'0xc' loop init complete (CLS seen).<br>Valid only in switching mode:<br>'{1'b1,rx_state[3:0]}', where rx_state is one of the following:<br>0x0: RX_INACTIVE - power up state, until port is inserted<br>0x1: RX_ACTIVE - port active and idle<br>0x2: ARB_CREQ - ARBx received and request ARB connection. Also used for a destination port when that port is a cascade port and has not yet won cascade arbitration.<br>0x3: ARB_CONN - ARB connection made and waiting for OPN. Also used for a destination port when that port is a cascade port and has not yet won cascade arbitration.<br>0x4: OPN_CREQ1 - OPN received and connection requested.<br>0x5: OPN_CREQ2 - OPN connection still requested and destination lookup has been performed. Waiting for source and destination ports to be properly connected, or waiting to be be disconnected if a higher priority port needs access.<br>0x6: SRC_OPEN - Send the OPN or send CLS back to self if request is blocked and CLS behavior is selected.<br>0x7: SLV_CONN - Port connected as a slave (destination).<br>0x8: SRC_CONN - Port connected as a source.<br>0x9: WAIT_SCLS - CLS received and waiting for port to send it back out.<br>0xA: WAIT_RCLS - CLS sent out and waiting for port to receive it.<br>0xB: WAIT_S - State used when connections are removed. Wait for port to be disconnected.<br>0xC: WAIT_FCLS - If OPN request was made and another higher priority port is requesting access to use it as a destination, a CLS is sent out and the port waits for it to return until becoming connected as a slave. |
| 5:0 | Ctl_state | INACTIVE    6'h00    WAIT_PINFO 6'h14<br>DET_VIX     6'h01    DELAY_PINFO 6'h15<br>WAIT_VIX    6'h02    LIP_USER1 6'h16<br>DELAY_VIX   6'h03    WAIT_USER1 6'h17<br>LIP_SN1     6'h04    DELAY_USER1 6'h18<br>WAIT_SN1    6'h05    LIP_USER2 6'h19<br>DELAY_SN1   6'h06    WAIT_USER2 6'h1A<br>LIP_SN2     6'h07    DELAY_USER2 6'h1B<br>WAIT_SN2    6'h08    WAIT_UC 6'h1C<br>DELAY_SN2   6'h09    VAL_DATA 6'h1D<br>LIP_SN3     6'h0A    SCRB_LOOP 6'h1E<br>WAIT_SN3    6'h0B    PASV_VAL 6'h1F<br>DELAY_SN3   6'h0C    ACTIVE 6'h20<br>LIP_SN4     6'h0D    INIT 6'h21<br>WAIT_SN4    6'h0E    OPN_INIT1 6'h22 |

-continued

Port Status Register #1 Definition

| Bits | Field Name | Description | | | |
|---|---|---|---|---|---|
| | | DELAY_SN4 6'h23 | 6'h0F | OPN_INIT2 | |
| | | LIP_SN5 6'h25 | 6'h10 | LINK_UP | |
| | | WAIT_SN5 6'h26 | 6'h11 | WAIT_16 | |
| | | DELAY_SN5 6'h27 | 6'h12 | BLINK_TX | |
| | | LIP_PINFO 6'h28 | 6'h13 | LINK_OR_NOT_2_BLINK | |
| | | WAIT_UC_ 6'h29 | | NOLIP | |
| | | , | | | |
| | | , | | | |
| | | , | | | |
| | | , | | | |
| | | , | | | |
| | | , | | | |
| | | , | | | |
| | | ; | | | |

6.2.16 Port Status Register #2

Port Status Register #2 Definition

| Bits | Field Name | Description |
|---|---|---|
| 15 | serial_id_rdy | GBIC/SFP Serial ID data ready. New data is present in the GBIC/SFP serial ID data register. This bit is cleared during a read operation. |
| 14 | port_activity | Latched Port Activity. This bit indicates that the port has been involved in a connection since it was read last. This bit is cleared during a read operation. |
| 13 | port_bypassed | Real time Port bypassed state. Port has/may have a GBIC/SFP, but is not inserted into the loop or is not part of the connection matrix. |
| 12 | gbic_ok | Real time GBIC/SFP present and tx_fault is deasserted. |
| 11 | reserved | Always returns 0 |
| 10-8 | mod_def | Real time port GBIC/SFP type from GBIC/SFP<br>Bits 10-8    Description<br>1 1 1        No GBIC or SFP present<br>0 1 1        Serial ID Module<br>All other values indicate module present, non-serial ID |
| 7 | Reserved | Always returns 0 |
| 6 | tx_fault_ltch | Latched Transmitter Fault from GBIC/SFP. This bit is cleared during a read operation. |
| 5 | rx_los_ltch | Latched Loss of Signal from GBIC/SFP. This bit is cleared during a read operation. |
| 4 | loss_sync_ltch | Latched Loss of Sync status. This bit is cleared during a read operation. |
| 3 | Reserved | Always returns 0 |
| 2 | tx_fault | Real time Transmitter Fault from GBIC/SFP |
| 1 | rx_los | Real time Loss of Signal from GBIC/SFP. |
| 0 | loss_sync | Real time Loss of Sync > RTTOV status |

6.2.17 Port Detector Register #1

This register contains the detector bits that indicate that particular conditions have occurred on the port. This register is cleared on read, but can also be cleared by setting the Clear Detector Register bit in Port Control Register. A third way to clear this register on all ports simultaneously is by setting the Clear Port Detector bit in the Router Control register. Note that this register has bits set after a reset due to the passing of the data pattern during selftest. The selftest pattern is designed to set all the bits except User Match (0xFFFE).

Port Detector Register #1 Definition

| Bits | Field Name | Description |
|---|---|---|
| 15 | pt_pt_primitive_detect | A Point-to-Point Primitive Sequence was detected. This includes OLS, NOS, LR and LRR. (3 ordered sets in a row). Note that these are illegal on a loop. |
| 14 | crcerr_detect | CRC Error detected in a frame. LSB of S_ID of last frame w/error is contained in CRC Error ALPA Register. |
| 13 | Invalid_tx_word_detect | Transmission word received with encoding error |
| 12 | Unk_os_detect | Any ordered set that does not already set any of the Detector Reg #1 bits 1-11, 15, Reg #2 bits 0-4. |
| 11 | lip_detect | Any LIP primitive sequence detected (3 ordered sets in a row). |
| 10 | lipf7_detect | LIP f7 primitive sequence detected (3 ordered sets in a row). |
| 9 | lipf8_detect | LIP f8 primitive sequence detected (3 ordered sets in a row). |
| 8 | opn_detect | Any OPN ordered set detected. |
| 7 | cls_detect | A CLS ordered set detected. |
| 6 | rrdy_detect | A RRDY ordered set detected. |
| 5 | arb_detect | Any ARB ordered set detected. |
| 4 | arbff_detect | ARBff ordered set detected. |
| 3 | idle_detect | IDLE ordered set detected. |
| 2 | sof_detect | Any Start of Frame ordered set detected. |
| 1 | eof_detect | Any End of Frame ordered set detected. |
| 0 | user_match_detect | User defined ordered set detected. Note that mask match bits from control register are used in match. |

6.2.18 Port Detector Register #2

This register contains the detector bits that indicate that particular conditions have occurred on the port. This register is cleared on read, but can also be cleared by setting the Clear Detector Register bit in Port Control Register. A third way to clear this register on all ports simultaneously is by setting the Clear Port Detector bit in the Router Control register.

Port Detector Register #2 Definition

| Bits | Field Name | Description |
|---|---|---|
| 15 | Reserved | |
| 14 | Reserved | |
| 13 | Reserved | |
| 12 | Reserved | |
| 11 | Reserved | |
| 10 | Reserved | |
| 9 | Reserved | |
| 8 | Reserved | |
| 7 | Reserved | |
| 6 | LIPff_detected | LIPff ordered set detected |
| 5 | device_detected | Ordered set other than blocking ARB detected after OPN |
| 4 | Half_dup_opn_detect | Half-duplex OPN ordered set detected |
| 3 | mrk_detect | MRK ordered set detected |
| 2 | brdcst_lpe_detect | LPE ordered set detected |
| 1 | brdcst_lpb_detect | LPB ordered set detected |
| 0 | brdcst_opn_detect | Broadcast OPN ordered set detected |

6.2.19 Port OS Error Count

This 24 bit counter maintains a running count of the number of transmission words that are received on this port with an encoding error. The counter increments only once for each bad word, even if multiple errors occur within a single word. The count sticks at maximum count and is cleared when the lower OS Error Count Register is read. This counter requires the reading of two registers. The least significant register must be read first and then the most significant register must be read last to guarantee an accurate reading. When the least significant register is read, the most significant register is put into a holding register before clearing both registers.

6.2.20 Current Destination Register

This 8 bit value shows the port that is currently connected to this port. Due to the high speed of connections and the low speed of the I²C interface, this register is intended mainly to assist in clearing stalled connections. These 8 bits are located in bits [15:8] of the 16 bit register. The lower half is for Port OS error Count described above.

6.2.21 Port Match Count Register

The lower 4 bits of Upper Match Count Register and the Lower Match Count Register make up a 20 bit counter that is used to count the number of User Match ordered sets seen on the link being monitored. This function is enabled while the user match function is enabled. This counter requires the reading of two registers. The least significant register must be read first and then the most significant register must be read last to guarantee an accurate reading. This register is only cleared when the User Match function is enabled and not when it is read. This count is reset when the user match enable bit transitions from a zero to a one.

6.2.22 Port Utilization % Register

This register contains an 8-bit value that can be used to reflect two different measurements. By default, this register represents the percentage of the transmission words received that were within a frame relative to the total traffic. If the util_conn_en bit is set in the port control register and the Loop Switch is operating in switching (segmenting) mode this register represents the percentage of time connections were made with this port while in switching mode. This value is updated every ~240 ms. The bit value is given in 0.5% increments.

6.2.23 Port Capture Ordered Set Register

This set of registers is used to store the ordered set present when the User Match bit was set. This register is only re-enabled for capture by the User Match Enable control bit being cleared and then set. This function can be used as a simple triggered analyzer.

Register 3E is the 2nd byte of the ordered set following a K28.5. Register 3C contains the 3rd and 4th byte. Note that the 1st byte of the ordered set is hardwired to K28.5. This means that K28.5s must be present on the loop in order to do a capture.

6.2.24 Invalid OPN/Broadcast (ARBx) ALPA Capture Register

| | Invalid OPN/Broadcast Register Definition | |
|---|---|---|
| Bits | Field Name | Description |
| 15-8 | Crc_err_count | This register maintains a running count of the number of CRC errors that are detected in frames passing through the port. The count sticks at its maximum count and is cleared when the register is read. Note that after reset this register has a count of 2 reset due to the passing of the data pattern during selftest. |
| 7-0 | rx_arb_alpa | When the rx_invalid_opn interrupt status bit or a broadcast OPN, LPB or LPE is set, the ALPA value from the previous ARBx received by this port is captured into this register. This value is not overwritten until the corresponding interrupt is cleared and this register is read. This clearing mechanism is required since all interrupts are automatically cleared on read, otherwise the interrupt status bit alone could be used to disable/enable this register to be overwritten by the port logic. |

6.2.25 Port Insertion/Loop Up Counter Register

| | Port Insertion/Loop Up Count Register Definition | |
|---|---|---|
| Bits | Field Name | Description |
| 15-8 | Port Insertion Count | Count of the number of times this port has been inserted into the loop. The count sticks at maximum count and is cleared on read. |
| 7-0 | Loop Up Count | Count of the number of times the loop connected to this port has come up. The count sticks at maximum count and is cleared on read. |

6.2.26 Port CRC Error ALPA Register

This register contains the ALPA of the last frame that had a CRC error. The ALPA is derived from the SID of the frame. Note that there is a probability that the SID was corrupted, so this ALPA may not be accurate. The MSB indicates whether the ALPA field has been updated or not. The valid bit is cleared when the register is read. Note that after reset this register indicates that a CRC error has occurred and has captured the ALPA. This is a result of the data pattern sent around the internal loop during selftest. The value in this register will be 0x80D5.

6.2.27 RX Frame Count Register

The RX Frame Count Register is a 16 bit counter that is used to count the number of frames seen on the RX link being monitored. This count is reset on read.

6.2.28 Port Connections Attempted Register

Count of the number of times this port has attempted to make a connection due to ARB connect requests. The count sticks at maximum count and is cleared on read. This value is valid in switching mode only.

6.2.29 Port Connections Held Off Register

Count of the number of times this port has attempted to make a connection and was held off by a busy port. The count sticks at maximum count and is cleared on read. This value is valid in switching mode only.

6.2.30 Port Clock Delta Counter

This register contains the value of the transmit/receive clock delta counter.

6.2.31 Src/Dest ALPA Register

When ALPA Valid bit is set in Port Error/Change Status Register #2, this register contains the source and destination ALPA of the last frame received into this port. This register is cleared after each read access

6.2.32 Port ALPA Bitmap Registers

These registers contain a bitmap of the ALPAs claimed on this port during the last loop initialization cycle.

6.2.33 Remote SEOC P INFO Register

This register contains the payload data from the P_INFO SEOC ordered set received from a remote SEOC compliant device when is detected. If no device or a non-SEOC compliant device is detected, this register is set to all zeros.

6.2.34 Remote SEOC USER Register

This register contains the payload data from the USER1 and USER2 SEOC ordered sets received from a remote SEOC compliant device when is detected. If no device or a non-SEOC compliant device is detected, this register is set to all zeros.

6.2.35 GBIC/SFP Read Address Register

This register contains the address of the next location in the GBIC's (or SFP's) Serial ID EEPROM to be read by the Loop Switch. This register is reset to zero on reset and is incremented each time a read occurs to the GBIC/SFP. The microprocessor can write a new value in this register to change where the Loop Switch reads the next value. This register should only be changed when the Serial ID RDY bit is set in the Port Status Register #2. Note: The GBIC/SFP address is an 11-bit value. The top 5 bits of the register are always 0.

6.2.36 Port Open Lockup Max Count Register

Bits [7:0] of this register sets the timeout value of the Port OPN Lockup watchdog timer. This 8-bit field is in the lower half of the register and has a resolution of 40 microseconds.

Bits [15:8] of this register contain the stop_traffic_cnt_max value. This 8-bit field defines the delay the "rxstate" state machine delays before determining that traffic is truly stopped if the state machine is steady in state ARB_CREQ or ARB_CONN. The resolution of this counter is 10 microseconds.

6.2.37 GBIC/SFP Serial ID Data Register

This register contains the data read from the GBIC's (or SFP's) Serial ID EEPROM. After reset, the Loop Switch reads the first 2 bytes from the GBIC/SFP (assuming it's a serial ID GBIC or SFP) and store them here. Loop Switch also sets the Serial ID Rdy bit in the Port Status Register #2 to indicate the data is ready. The microprocessor can then read this data. When that happens, the Loop Switch automatically goes out and reads the next 2 bytes from the GBIC/SFP. The Loop Switch reads the data from the EEPROM one byte at a time and the first byte read is placed in the LSB and the second byte in the MSB of this register.

6.2.38 SRC/DEST ALPA on Mismatch OPN Register

This register contains the source, bits [15:8], and destination, bits [7:0], ALPAs associated with the last detection of a frame whose destination ID doesn't match the destination ALPA in the previously received OPN. Only valid in switching mode and is cleared in hub emulation mode.

6.2.39 Destination ID on OPN Mismatch Register

This register contains destination Id from the FC header of a frame, bits [7:0], whose destination ID doesn't match the destination ALPA in the previously received OPN. This register is only used in switching mode and is cleared in hub emulation mode.

6.2.40 SRC/DEST ALPA from Unknown OPN/Lost Node Register

This register contains the source, bits [7:0], and destination, bits [15:8], ALPAs associated with the last detection of either an Unknown OPN or Lost Node error. This register is only used in switching mode and is cleared in hub emulation mode.

6.2.41 Extra Control Register

| | Port Insertion/Loop Up Count Register Definition | |
|---|---|---|
| Bits | Field Name | Description |
| 15-3 | Reserved | |
| 2 | dis_new_cscd_arb | If not set, the logic for rx_new_cscd_arb will function as normal for detecting hidden opens when there are multiple devices on ports. If set, then this logic will be disabled and having HBA with devices on a same port will fail. |
| 1 | dis_block_arb | If not set, after an ARB wins arbitration, ARBs with that ALPA will be blocked for the internal scrubber timeout. If set, that ALPA will not be blocked. |
| 0 | dis_block_init_arb | If not set, the scrubber logic scrubs the ARB detected immediately preceeding the OPN if an ARBf0 is detected for the scrub timeout. If set, disables the ARBf0 detection of the ARBs and does normal scrubbing. |

6.2.42 SCSI Statistics ALPA

The lower 8 bits of this register control a filter that determines the destination ALPA of the SCSI FCP frames that are used for collecting read and write statistics. A value of 0xff enables all destination ALPA's for aggregate port statistics. A specific destination ALPA will cause the ASIC to track statistics for only that destination ALPA. The upper 8 bits determine the source ALPA of the FCP frames being tracked. A value of 0xff in the upper 8 bits enables tracking of all source ALPA's.

6.2.43 SCSI Read IO Counter

This register contains a clear on read counter that tracks the number of read I/O's of frames that match the source/destination ALPA criteria set in the SCSI Statistics ALPA register.

6.2.44 SCSI Write IO Counter

This register contains a clear on read counter that tracks the number of write I/O's of frames that match the source/destination ALPA criteria set in the SCSI Statistics ALPA register.

6.2.45 SCSI Read Byte Counter

These registers contain a clear on read counter that tracks the number of read bytes from frames that match the source/destination ALPA criteria set in the SCSI Statistics ALPA register. NOTE: To ensure accurate reading of the counter, bits 47 to 16 of the counter are loaded into a temporary holding register on a read of bits 15 to 0 (address 0x84). The temporary holding register is shared with the write byte counter so care must be taken when accessing the upper 2 words of both registers.

6.2.46 SCSI Write Byte Counter

These registers contain a clear on read counter that tracks the number of write bytes from frames that match the source/destination ALPA criteria set in the SCSI Statistics ALPA register. NOTE: To ensure accurate reading of the counter, bits 47 to 16 of the counter are loaded into a temporary holding register on a read of bits 15 to 0 (address 0x8a). The temporary holding register is shared with the read byte counter so care must be taken when accessing the upper 2 words of both registers.

6.3 CPU Port Registers

| | | | | | | | | | | |
|---|---|---|---|---|---|---|---|---|---|---|
| | | | CPU Port Register Summary | | | | | | | |
| Register | RW | Bits | | | Description | | | | | |
| Interrupt | RW | 31:24 | | | | | | Heartbeat | Timer 1 | Timer 0 |
| | RW | 23:16 | | | | | | Rcv Frame DMA'ed | Xmt Frame Sent | Rcv Frame Received |
| | RW | 15:8 | Xmit Word CNTR Wrap | Rcv Word CNTR Wrap | Xmt Delimiter Error CNTR Wrap | Rcv DMA Service CNTR Wrap | Rcv Delimiter Error CNTR Wrap | Rcv Tag Error CNTR Wrap | Rcv CRC Error CNTR Wrap |
| | RW | 7:0 | Rcv DMA | | Xmt FIFO | Rcv FIFO | Xmt Missing | Rcv Missing | Rcv Tag Error | Rcv CRC |

-continued

CPU Port Register Summary

| Register | RW | Bits | Description | | | | | | |
|---|---|---|---|---|---|---|---|---|---|
| Interrupt mask | RW | 31:0 | Service Timer Expired | Overrun | Overrun | Delimiter | Delimiter | | Error |
| Control | RW | 31:24 | Xmt Frame cnt | Rcv Frame cnt | Xmt Delim error cnt | Rcv DMA service cnt | Rcv Delim err cnt | Tag Error cnt | CRC Error cnt | Send frame |
| | RW | 23:16 | 10us Reset | MSTB Reset | Rx write tag [1:0] | | | | Tx write tag [1:0] | |
| | RW | 15:8 | ARM reset | Global reset | | Router Request Enable | Discard Frame on Error Enable | Xmt DMA Request Enable | Rcv DMA Request Enable | Xmt Tag Generation Enable |
| | RW | 7:0 | Rcv Tag Checking Enable | Reset | Big endian | Rcv DMA Service Timer Enable | Xmt CRC Generation Enable | Rcv CRC Checking Enable | Xmt Enable | Rcv Enable |
| Xmt FIFO Read/Write Pointer | RW | 31:0 | Xmt FIFO read pointer [8:0] | | | | | Xmt FIFO write pointer [8:0] | |
| Xmt FIFO Data | RW | 31:0 | Xmt FIFO data word [31:0] | | | | | | |
| Rcv DMA Service Timer | RW | 31:0 | Rcv DMA Service Max [9:0] | | | | | Rcv DMA Service Timer [9:0] | |
| Rcv FIFO Read/Write Pointer | RW | 31:0 | Rcv FIFO read pointer [8:0] | | | | | Rcv FIFO write pointer [8:0] | |
| Rcv FIFO Data | RW | 31:0 | Rcv FIFO data word [31:0] | | | | | | |
| Rcv CRC error | RW | 31:0 | Counter [31:0] | | | | | | |
| Rcv Tag error | RW | 31:0 | Counter [31:0] | | | | | | |
| Rcv Delimiter error | RW | 31:0 | Counter [31:0] | | | | | | |
| Rcv DMA service expired | RW | 31:0 | Counter [31:0] | | | | | | |
| Xmt Delimiter error | RW | 31:0 | Counter [31:0] | | | | | | |
| Rcv word count | RW | 31:0 | Counter [31:0] | | | | | | |
| Xmt word count | RW | 31:0 | Counter [31:0] | | | | | | |
| MS Timebase | RW | 31:16 | MS timebase reload [15:0] | | | | | | |
| | RW | 15:0 | MS timebase counter [15:0] | | | | | | |
| 10us Timebase | RW | 31:16 | 10us timebase reload [15:0] | | | | | | |
| | RW | 15:0 | 10us timebase counter [15:0] | | | | | | |

6.3.1 Interrupt Register

| Register | RW | Bits | Description | | | | | | |
|---|---|---|---|---|---|---|---|---|---|
| Interrupt | RW | 31:24 | | | | | Heartbeat | Timer 1 | Timer 0 |
| | RW | 23:16 | | | | | Rcv Frame DMA'ed | Xmt Frame Sent | Rcv Frame Received |
| | RW | 15:8 | Xmit Word CNTR Wrap | Rcv Word CNTR Wrap | Xmt Delimiter Error CNTR Wrap | Rcv DMA Service CNTR Wrap | Rcv Delimiter Error CNTR Wrap | Rcv Tag Error Wrap | Rcv CRC Error CNTR Wrap |
| | RW | 7:0 | Rcv DMA Service Timer Expired | Xmt FIFO Overrun | Rcv FIFO Overrun | Xmt Missing Delimiter | Rcv Missing Delimiter | Rcv Tag Error | Rcv CRC Error |

Rcv CRC error (bit 0). This is set when a CRC error is detected on the Recieve data frame (Data from switch core). This bit resets to zero.

Rcv Tag error (bit 1). This is set when a CRC error is detected on the Recieve data frame (Data from switch core). This bit resets to zero.

Rcv Missing Delimiter error (bit 2). This is set when a missing SOF or EOF is detected on the Receive data frame (Data from switch core). This bit resets to zero.

Xmt Missing Delimiter error (bit 3). This is set when a missing SOF or EOF is detected on the Receive data frame (Data from switch core). This bit resets to zero.

Rcv FIFO overrun (bit 4). This is set when there is an overrun in the Recieve FIFO. This bit resets to zero.

Xmt FIFO overrun (bit 5). This is set when there is an overrun in the Transmit FIFO. This bit resets to zero.

Rcv DMA service timer expired (bit 7). This is set when the DMA Service timer expired on the Recive side. This bit resets to zero.

Rcv CRC error counter wrap (bit 8). This is set when the Rcv CRC error counter wraps from its maximum count back to zero. This bit resets to zero.

Rcv Tag error counter wrap (bit 9). This is set when the Rcv Tag error counter wraps from its maximum count back to zero. This bit resets to zero.

Rcv Delimiter error counter wrap (bit 10). This is set when the Rcv Delimiter error counter wraps from its maximum count back to zero. This bit resets to zero.

Rcv DMA service expired counter wrap (bit 11). This is set when the Rcv DMA service counter wraps from its maximum count back to zero. This bit resets to zero.

Xmt Delimiter error counter wrap (bit 12). This is set when the Xmt Delimeter error counter wraps from its maximum count back to zero. This bit resets to zero.

Rcv Word counter wrap (bit 14). This is set when the Rcv word counter wraps from its maximum count back to zero. This bit resets to zero.

Xmt word counter wrap (bit 15). This is set when the Xmt word counter wraps from its maximum count back to zero. This bit resets to zero.

Rcv Frame recieved (bit 16). This is set when the Rcv FIFO recieved a complete frame from the switch core. This bit resets to zero.

Xmt Frame recieved (bit 17). This is set when the Xmt FIFO transmitted a complete frame from the switch core. This bit resets to zero.

Rcv Frame DMA'ed (bit 18). This is set after the Rcv frame is FIFO has been DMA'ed by the processor.

Timer 0 (bit 24). This is set when the Timer 0 counter reaches 0.

Timer 0 (bit 25). This is set when the Timer 1 counter reaches 0.

Heartbeat (bit 26). This is set when the Heartbeat counter reaches 0.

6.3.2 Interrupt Mask Register

| Register | RW | Bits | Description |
|---|---|---|---|
| Interrupt mask | RW | 31:0 | (See Interrupt register) |

Event interrupt mask (bits 31:0). Set the mask bits corresponding to the interrupt bits that are to generate interrupt to the processor. Reset the mask bits corresponding to the interrupt bits to be ignored. This register resets to zero. Note: this register only selects the interrupt bits that contribute to the "INT_" output pin. It has no effect on the actual interrupt register bits.

6.3.3 Control Register

| Register | RW | Bits | Description | | | | | | | |
|---|---|---|---|---|---|---|---|---|---|---|
| Control | RW | 31:24 | Xmt Frame cnt | Rcv Frame cnt | Xmt Delim error cnt | Rcv DMA service cnt | Rcv Delim err cnt | Tag Error cnt | CRC Error cnt | Send frame |
| | RW | 23:16 | 10 us Reset | MSTB Reset | Rx write tag [1:0] | | | | Tx write tag [1:0] | |
| | RW | 15:8 | ARM reset | Global reset | | Router Request Enable | Discard Frame on Error Enable | Xmt DMA Request Enable | Rcv DMA Request Enable | Xmt Tag Generation Enable |
| | RW | 7:0 | Rcv Tag Checking Enable | DMA Reset | Big endian | Rcv DMA Service Timer Enable | Xmt CRC Generation Enable | Rcv CRC Checking Enable | Xmt Enable | Rcv Enable |

Rcv enable (bit 0). This bit must be set to enable the recieve path. This bit resets to zero.

Xmt enable (bit 1). This bit must be set to enable the recieve path. This bit resets to zero.

Rcv CRC checking enable (bit 2). When this bit must is set, CRC checking is enabled in the Recive path. This bit resets to zero.

Xmt CRC generation enable (bit 3). When this bit is set, CRC generation is enabled in the Trasmit path. This bit resets to zero.

Rcv DMA service timer enable (bit 4). When this bit is set, the Recieve DMA service timer is enabled. This bit resets to zero.

Big endian (bit 5). When this bit is set, bytes are swapped on all words going to and from the switch core as follows: [7:0] to [31:24],[15:8] to [23:16], [23:16] to [15:8], and [31:24] to [7:0].

DMA Reset (bit 6). When set, this bit initialixes the CPU port module. Thisi bit must be written to zero to terminate the reset operation. This bit resets to zero.

Rcv Tag checking enable (bit 7). When this bit is set, Tag checking is enabled in the Receive path. This bit resets to zero.

Xmt Tag generation enable (bit 8). When this bit is set, Tag generation is enabled in the Transmit path. If this bit is not set then the Tag information needs to be provided via the TX write Tag and the Rx Write tag. Note: the EOF Tag needs to be set on the previous two data words. This bit resets to zero.

Rcv DMA request enable (bit 9). When this bit is set, The DMA request interface function is enabld in the Recieve path. This bit resets to zero.

Xmt DMA request enable (bit 10). When this bit is set, The DMA request interface function is enabld in the Recieve path. This bit resets to zero.

TAG Error Cnt Enable (bit26). This bit corresponds to the statistic counters. When this bit is set the counter is enabled.

RCV Delimeter Error Cnt Enable (bit27). This bit corresponds to the statistic counters. When this bit is set the counter is enabled.

DMA Service Expired Cnt Enable (bit28). This bit corresponds to the statistic counters. When this bit is set the counter is enabled.

XMT Delimiter Error Cnt Enable (bit29). This bit corresponds to the statistic counters. When this bit is set the counter is enabled.

RCV Frame Cnt Enable (bit30). This bit corresponds to the statistic counters. When this bit is set the counter is enabled.

XMT Frame Cnt Enable (bit31). This bit corresponds to the statistic counters. When this bit is set the counter is enabled.

6.3.4 Xmt FIFO Read and Write Pointer Register

| Register | RW | Bits | Description | |
|---|---|---|---|---|
| Xmt FIFO Read/Write Pointer | RW | 31:0 | Xmt FIFO read pointer [8:0] | Xmt FIFO write pointer [8:0] |

Discard frame on error enable (bit 11). When this bit is set, A frame is discarded when an error is detected. This bit resets to zero.

Router request enable (bit 12). When this bit is set, The Router interface function is enabled. This bit resets to zero.

Global Reset (bit 14). This signal is mapped to an output pin to reset the entire group of ASICs for maintaining system level sycchonation. This bit must be written to zero to terminate the rest operation. This bit resets to zero.

ARM Reset (bit 15). When set, this bit initializes the ARM processor. This bit must be written to zero to terminate the reset operation. This bit resets to zero.

Tx write tag [1:0] (bit 17:16). This field provides the tag when manually writting to the Tx FIFO's. This field resets to zero.

Rx write tag [1:0] (bit 21:20). This field provides the tag bits when manually writing to the Rx FIFO. This field resets to zero MSTB Reset (bit 22). When this millisecond timer reset to zero. This bit resets to zero.

10us Reset (bit 22). When this bit is set the 10 microsecond timer reset to zero. This bit resets to zero.

Xmt FIFO write pointer [8:0](bits 8:0). This field specifies the next location to be written in the Xmt FIFO. This field resets to zero.

Xmt FIFO write pointer [8:0](bits 24:16). This field specifies the next location to be written in the Xmt FIFO. This field resets to zero.

6.3.5 Xmt FIFO Data Register

| Register | RW | Bits | Description |
|---|---|---|---|
| Xmt FIFO Data | RW | 31:0 | Xmt FIFO data word [31:0] |

Xmt FIFO data [31:0] (bits 31:0). Reading this register reports the contents of the Xmt FIFO RAM word addressed by Xmt read pointer. The Xmt read pointer auto-increments by one with each read from this register. Writing this register writes to the word addressed by the Xmt write pointer. The Xmt write pointer auto-increments by one with each write to this register. This register resets to zero.

6.3.6 Rcv DMA Service Timer Register

| Register | RW | Bits | Description | |
|---|---|---|---|---|
| Rcv DMA Service Timer | RW | 31:0 | Rcv DMA Service Max [9:0] | Rcv DMA Service Timer [9:0] |

Send Frame (bit 24). After a frame has been loaded into the Tx FIFO then this bit needs to be set to send the frame to the switch core. THis bit is selfclearing.

CRC Error Cnt Enable (bit25). This bit corresponds to the statistic counters. When this bit is set the counter is enabled.

Rcv DMA service timer [9:0] (bits (9:0). This field accesses DMA service timer counter. The counter starts counting upon a full frame being rev'ed into the FIFO and stops counting upon the full frame being completely DMA'ed. Each bit represents one millisecond that is based off of the MSTB counter. The DMA Service timer is the actual count the counter is on. This counter resets to zero Rcv DMA service Max [9:0] (bits 25:16). The RCV DMA Service max is the maximum the counter will count to before setting the corresponding interrupt bit. This counter resets to zero.

6.3.7 Rcv FIFO Read and Write Pointer Register

| Register | RW | Bits | Description |
|---|---|---|---|
| Rcv FIFO Read/Write Pointer | RW | 31:0 | Rcv FIFO read pointer [8:0] Rcv FIFO write pointer [8:0] |

Rcv FIFO write pointer [8:0] (bits 8:0). This field specifies the next location to be written in the Rcv FIFO. This field resets to zero.

Rev FIFO write pointer [8:0] (bits 24:16). This field specifies the next location to be read from the Rcv FIFO. This field resets to zero.

6.3.8 Rcv FIFO Data Register

| Register | RW | Bits | Description |
|---|---|---|---|
| Rcv FIFO Data | RW | 31:0 | Rcv FIFO data word [31:0] |

Rev FIFO data [31:0] (bits 31:0). Reading this register reports the contents of the Rev FIFO RAM word addressed by the Rev read pointer. The Rev read pointer auto-increments by one with each read from this register. Writing this register writes to the word addressed by the Rev write pointer. The Rev write pointer auto-increments by one with each write to this register. This register resets to zero.

6.3.9 Statistics Counter Registers

| Register | RW | Bits | Description |
|---|---|---|---|
| Rcv CRC error | RW | 31:0 | Counter [31:0] |
| Rcv Tag error | RW | 31:0 | Counter [31:0] |
| Rcv Delimiter error | RW | 31:0 | Counter [31:0] |
| Rcv DMA service expired | RW | 31:0 | Counter [31:0] |
| Xmt Delimiter error | RW | 31:0 | Counter [31:0] |
| Rcv word count | RW | 31:0 | Counter [31:0] |
| Xmt word count | RW | 31:0 | Counter [31:0] |

Statistics counter [31:0] (bits 31:0). Reading this register reports the counter value. Writing this register presets a counter with the value in this register. The enable bits for each corresponding register are in the Control Register. The counter resets to zero.

7. Signal Descriptions

The table below describes the signals from the Vixel SOC422 Loop Switch.

| SOC422 Signal Signal Descriptions | | |
|---|---|---|
| Signal Name | I/O | Signal Description |
| clk106 | I | 106.25 MHz clock, locally generated from crystal oscillator |
| refclkr[3:0] | I | 106.25 MHz clock, frequency locked to source driving clk106 must maintain +/- 1ns skew between clk106 and refclk0-3 |
| clk53 | O | 53.125 MHz clock, internally generated from 106 MHz input clock. |
| sysclk_out | O | 53.125 (1 Gbps) or 106.25 (2 Gbps) MHz internal system clock. |
| Reset_l | I | System reset. Must be held low for at least 80 ns. Active low. |
| lip_timeout | O | Reset out signal asserted when a forced loop initialization doesn't return a LIP |
| Serial EPROM Interface | | |
| Par_sel | I | Select parallel or I²C interface as active (1 = parallel interface active) |
| seeprom_clk | IO | Serial shift clock for EEPROM to be used to hold product serial number. |
| seeprom_data | IO | Serial data signal for EEPROM. |
| I²C Microprocessor Interface | | |
| up_data | IO | Microprocessor I²C serial data pin |
| up_clk | I | Microprocessor I²C serial clock pin |
| Dev_id[1:0] | I | Device ID for I²C bus. Allows 4 Loop Switch chips to share 1 I²C control bus |
| Parallel Microprocessor Interface | | |
| Addr[15:0] | IO | Parallel processor address bus. |
| Data[15:0] | IO | Parallel processor data bus. |
| Wrn | I | Parallel processor write control line |
| Rdn | I | Parallel processor read control line |
| Rwn | I | Parallel processor data bus direction control line |
| Csn | I | Parallel processor chip select line |
| interrupt | O | CPU Interrupt signal. Open collector output. |
| Probe Mux interface | | |
| Pbmuxi[10:0] | I | Select lines for the main probe mux. When set to all 0's, the probe mux outputs for all 3 probe muxes are disabled. (Alternative function is scan_in bus during scan testing.) |
| pbmuxo[19:0] | O | Dedicated probe data outputs. Refer to section Error! Reference source not found. for more details (Alternative function is scan_out bus during scan testing.) |
| pb_mux_sel2a[4:0] | I | Select lines for probe mux 2a. |
| pb_mux_sel2b[4:0] | I | Select lines for probe mux 2b. |
| Status and LED Interface | | |
| led_data | O | LED serial data. Used to shift LED data into external shift registers to drive LED's. |

-continued

SOC422 Signal Signal Descriptions

| Signal Name | I/O | Signal Description |
|---|---|---|
| Serial_clk | O | LED serial clock. Used to clock serial data into external shift registers. |
| d_rate_sel | I | Data rate select pin<br><br>0 - 1 GBPS Data Rate<br>1 - 2 GBPS Data Rate |
| act_d_rate | O | Active data rate of the Loop Switch. Software override of discrete input d_rate_sel may change the active rate from that selected. |
| Brd_id[2:0] | I | Board ID status. Allows processor to read the board revision. |
| Mgmt_Pres | I | Management Present Status. Allows the Loop Switch to determine whether a processor is present or not. |
| Mgmt_Activity | I | Ethernet interface activity status. Controls LED showing ethernet activity. |
| EEPROM_Pres | I | EEPROM Present status. If EEPROM is present, load data from EEPROM and start running. If no EEPROM is present, wait for processor configuration to complete and be placed on-line. (Low level indicates EEPROM is present) |
| Overtemp | I | Overtemp Status. Active low signal indicating temperature has exceeded limits. |
| Fan[3:0] | I | Fan Stall Status. Monitors for chassis fan stall. |

| Signal Name | I/O | Signal Description |
|---|---|---|
| *Port Interface (× 20)* | | |
| txp/txn | O | Encoded differential data to be transmitted. |
| tx_dis | O | Transmitter disable to GBIC/SFP to turn off a laser driver. |
| tx_fault | I | Transmitter fault from GBIC/SFP. Indicates a laser has had a failure. |
| rxp/rxn | I | Encoded differential data received by transceiver. |
| rx_los | I | Receiver loss of signal from GBIC/SFP. Indicates the receive signal does not have sufficient signal amplitude to recover a proper signal. |
| Moddef[2:0] | IO | GBIC/SFP Module ID pins. Note: moddef[0] is always an input, but moddef[2:1] are bi-directional signals to allow the port logic to read and write to these pins to read the serial ID on a GBIC/SFP Module.<br><br>moddef[0:2]　Description<br>111　No module present<br>110　Copper style 1 or style 2 active, inter-connector<br>101　Copper style 1 or style 2 passive, intra-connector<br>100　Optical LW 100-SM-LC-L<br>011　Serial ID Module<br>010　Optical SW 100-M5-SN-I or 100-M6-SN-I<br>001　Optical LW 100-SM-LC-L & similar 1.25 Gbd<br>000　Optical SW 100-M5-SN-I, 100-M6-SN-I & 1.25 Gbd |
| Rtrim | | Serdes process compensation circuit for tx/rx termination 1 input only, connect to 3.0K 1% resistor to VDD |
| *Discrete I/O* | | |
| Utility_tm r0 | O | Output pulse indicating that the utility timer has reached its max count and rolled over. |
| Utility_tm r1 | O | Output pulse indicating that the utility timer has reached its max count and rolled over. |

| Signal Name | I/O | Signal Description |
|---|---|---|
| Utility_tm r2 | O | Output pulse indicating that the utility timer has reached its max count and rolled over. |
| *Power/Ground* | | |
| rxbvdd[21:0] | | Serdes receiver serial analog power 1.8 V +/− 5% |
| rxbvss[21:0] | | Serdes receiver serial analog ground |
| portx_vdd[21:0] | | Serdes receiver analog power 1.8 V +/− 5% |
| rxvss[21:0] | | Serdes receiver analog ground |
| txbvdd[21:0] | | Serdes transmitter serial analog power 1.8 V +/− 5% |
| txbvss[21:0] | | Serdes transmitter serial analog ground |
| txvdd[21:0], port_x_vdd_the rm[x:0] | | Serdes transmitter analog power 1.8 V +/− 5% |
| txvss[21:0] | | Serdes transmitter analog ground |
| vdd18core | | Core power, 1.8 V +/− 5% |
| vddio33 | | 3.3 V digital I/O power 3.3 V +/− 5% |
| Vss | | Core and digital I/O ground |
| *Test Interface* | | |
| tri_enable | I | Chip tri-state control.<br><br>0 - All output pins are tri-stated<br>1 - Normal mode |
| iid_test | I | IDDQ test mode pin. Used only in chip production. Should be tied low for normal operation. |
| Prmndao | O | Process monitor output Used for factory test only |
| jtag_tclk | I | JTAG test clock |
| jtag_tdi | I | JTAG scan data input |
| jtag_tdo | O | JTAG scan data output |
| jtag_rst | I | JTAG reset |
| jtag_msel | I | JTAG mode select |
| scn_enb | I | Internal scan enable |
| scan_mode | I | Internal scan test mode.<br><br>0 - Normal Operating Mode<br>1 - Scan Mode, bypasses gated resets |

Although the foregoing invention has been described in some detail by way of illustration and example for purposes of clarity and understanding, it may be readily apparent to those of ordinary skill in the art in light of the teachings of this invention that certain changes and modifications may be made thereto without departing from the spirit or scope of the appended claims.

We claim:

1. A Fibre Channel Arbitrated Loop interconnect system comprising:

a first port in a plurality of ports, a second port in the plurality of ports, said first and second ports including port logic to monitor Open (OPN) arbitrated loop primitives, and adapted to connect to devices supporting a Fibre Channel Arbitrated Loop protocol, a crossbar switch coupled to the plurality of ports, a route determination apparatus including a routing table comprised of Arbitrated Loop Physical Addresses (AL-PAs) and their associated ports, the route determination apparatus separate from the plurality of ports and directly coupled to each of the plurality of ports and the crossbar switch through separate signaling paths, the route determination apparatus configured for routing based on primitives by programming the crossbar switch to establish direct paths between the first and second ports in the crossbar switch according to received OPN arbitrated loop primitives, the direct paths excluding all other ports, wherein the crossbar switch is configured as a primitive switch that creates the direct paths between the first and second ports based on the OPN arbitrated loop primitives, and wherein priority for each port is independent of the ALPAs.

2. A system for interconnecting Fibre Channel Arbitrated Loop devices comprising:

a first Arbitrated Loop containing one or more Fibre Channel arbitrated ioop devices, a second Arbitrated Loop device, a Fibre Channel Arbitrated Loop interconnect system, the interconnect system including:

a first port in a plurality of ports, the first port containing port logic coupled to the first Arbitrated Loop, a second port in the plurality of ports, the second port containing port logic coupled to the second Arbitrated Loop, the first and second ports adapted to connect to devices supporting a Fibre Channel Arbitrated Loop protocol, route determination apparatus separate from the plurality of ports and directly coupled to each of the plurality of ports through separate signaling paths and configured for routing based on primitives by selecting a direct route between the first and second ports based on received Fibre Channel Arbitrated Loop primitives from the ports, the direct route excluding all other ports, and including a routing table containing Arbitrated Loop Physical Addresses (ALPAs) and their associated ports, and a crossbar switch directly coupled to the first and second ports and to the route detennination apparatus through separate signaling paths, the crossbar switch configured as a primitive switch for switching frames between ports under control of the route determination apparatus, wherein Fibre Channel frames are transferred between a device on the first Arbitrated Loop and the second Arbitrated Loop device, and wherein priority for each port is independent of the ALPAs.

3. The interconnect system of claim 2 wherein the Arbitrated Loop primitives that cause the crossbar switch to create paths between ports includes one or more of the following: Arbitrate (ARB), Open (OPN) and Close (CLS).

4. The interconnect system of claim 2 including a Receiver Ready (R_RDY) counter to count R_RDY's sent by an originating Fibre Channel Arbitrated Loop device before the Open (OPN) response is received by the originating Fibre Channel Arbitrated Loop Device.

5. The interconnect system of claim 2 wherein the second Arbitrated Loop device is on the first port.

6. The interconnect system of claim 2 wherein the second Arbitrated Loop device is on the second port.

* * * * *